United States Patent
Singh

(10) Patent No.: US 10,270,789 B2
(45) Date of Patent: Apr. 23, 2019

(54) MULTIPHASE THREAT ANALYSIS AND CORRELATION ENGINE

(71) Applicant: Acalvio Technologies, Inc., Cupertino, CA (US)

(72) Inventor: Abhishek Singh, Morgan Hill, CA (US)

(73) Assignee: ACALVIO TECHNOLOGIES, INC., Cupertino, CA (US)

(*) Notice: Subject to any disclaimer, the term of this patent is extended or adjusted under 35 U.S.C. 154(b) by 0 days.

(21) Appl. No.: 15/404,693

(22) Filed: Jan. 12, 2017

(65) Prior Publication Data

US 2017/0223046 A1 Aug. 3, 2017

Related U.S. Application Data

(63) Continuation of application No. 15/404,434, filed on Jan. 12, 2017.
(Continued)

(51) Int. Cl.
*H04L 9/00* (2006.01)
*H04L 29/06* (2006.01)
(Continued)

(52) U.S. Cl.
CPC ........ *H04L 63/1416* (2013.01); *H04L 43/062* (2013.01); *H04L 51/12* (2013.01);
(Continued)

(58) Field of Classification Search
CPC .................................................. H04L 63/1441
(Continued)

(56) References Cited

U.S. PATENT DOCUMENTS

| | | | |
|---|---|---|---|
| 7,559,086 B2* | 7/2009 | Sobko | G06F 21/566 726/22 |
| 8,806,647 B1* | 8/2014 | Daswani | H04L 63/1425 713/161 |

(Continued)

FOREIGN PATENT DOCUMENTS

| | | |
|---|---|---|
| EP | 2 942 919 A1 | 11/2015 |
| WO | 2015/127472 A2 | 8/2015 |
| WO | 2017131963 A1 | 8/2017 |

OTHER PUBLICATIONS

PCT/US2017/013190 received an International Search and Written Opinion Report dated Apr. 20, 2017, all pages.
(Continued)

*Primary Examiner* — Christopher J Brown
(74) *Attorney, Agent, or Firm* — Kilpatrick Townsend & Stockton LLP

(57) ABSTRACT

Provided are systems, methods, and computer-program products for a targeted threat intelligence engine, implemented in a network device. The network device may receive incident data, which may include information derived starting at detection of an attack on the network until detection of an event. The network device may include analytic engines that run in a predetermined order. An analytic engine can analyze incident data of a certain data type, and can produce a result indicating whether a piece of data is associated with the attack. The network device may produce a report of the attack, which may include correlating the results from the analytic engines. The report may provide information about a sequence of events that occurred in the course of the attack. The network device may use the record of the attack to generate indicators, which may describe the attack, and may facilitate configuring security for a network.

22 Claims, 57 Drawing Sheets

Related U.S. Application Data

(60) Provisional application No. 62/288,842, filed on Jan. 29, 2016, provisional application No. 62/298,281, filed on Feb. 22, 2016, provisional application No. 62/364,723, filed on Jul. 20, 2016, provisional application No. 62/344,267, filed on Jun. 1, 2016.

(51) Int. Cl.
| | |
|---|---|
| *H04L 12/26* | (2006.01) |
| *H04L 12/58* | (2006.01) |
| *H04L 12/24* | (2006.01) |
| *G06F 21/53* | (2013.01) |
| *G06F 21/56* | (2013.01) |

(52) U.S. Cl.
CPC ...... *H04L 63/1425* (2013.01); *H04L 63/1433* (2013.01); *H04L 63/1441* (2013.01); *H04L 63/1491* (2013.01); *G06F 21/53* (2013.01); *G06F 21/564* (2013.01); *H04L 41/0816* (2013.01); *H04L 41/0886* (2013.01); *H04L 63/1408* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 9,158,915 | B1* | 10/2015 | Yumer | G06F 21/566 |
| 9,325,735 | B1 | 4/2016 | Xie et al. | |
| 9,495,188 | B1* | 11/2016 | Ettema | G06F 9/45533 |
| 2003/0028803 | A1 | 2/2003 | Bunker et al. | |
| 2009/0199265 | A1* | 8/2009 | Hudis | G06F 21/577 |
| | | | | 726/1 |
| 2013/0145465 | A1 | 6/2013 | Wang et al. | |
| 2014/0137180 | A1* | 5/2014 | Lukacs | G06F 21/53 |
| | | | | 726/1 |
| 2015/0156214 | A1 | 6/2015 | Kaminsky | |
| 2016/0094566 | A1 | 3/2016 | Parekh | |

OTHER PUBLICATIONS

U.S. Appl. No. 15/404,434 received a First Action Interview Pilot Program Pre-Interview Communication, dated Feb. 23, 2017, all pages.
U.S. Appl. No. 15/404,434 received a Final Office Action, dated Jul. 31, 2017, all pages.
U.S. Appl. No. 15/404,434, filed Jan. 12, 2017, Non-Final Office Action dated Dec. 28, 2017, all pages.
U.S. Appl. No. 15/404,788, filed Jan. 12, 2017, Non-Final Office Action dated Aug. 28, 2018, all pages.

* cited by examiner

4900

4904  4906

From: John Doe (John.Doe@senderdomain.com)
Subject: The contents of an email header
Date: January 1, 2016 12:00:00 PM PDT
To: Jane.Smith@receiverdomain.com
Return-Path: <John.Doe@senderdomain.com>
Envelope-To: Jane.Smith@receiverdomain.com>
Delivery-Date: January 1, 2016 12:05:03 -0700
Received: from po-out-1718.senderdomain.com([72.14.252.155]:54907) by cl35.gs01.server.com with esmtp (Exim 4.63) (envelope-from <John.Doe@senderdomain.com>) id 1KDoNH-0000f0-RL for Jane.Smith@receiverdomain.com; Fri, 1 Jan 2016 12:05:03 -0700
Received: by po-out-1718.senderdomain.com with SMTP id y22so795146pof.4 for <John.Doe@receiverdomain.com>; Fri, 1 Jan 2016 12:04:58 -0700 (PDT)
Received: by 10.141.116.17 with SMTP id t17mr3929916rvm.251.1214951458741; Fri, 1 Jan 2016 12:04:58 -0700 (PDT)
Received: by 10.140.188.3 with HTTP; Fri, 1 Jan 2016 12:04:58 -0700 (PDT)
Dkim-Signature: v=1; a=rsa-sha256; c=relaxed/relaxed; d=senderdomain.com; s=gamma; h=domainkey-signature:received:received:message-id:date:from:to :subject:mime-version:content-type;
bh=+JqkmVt+sHDFIGX5jKp3oP18LQf10VQjAmZAKl1lspY=;
b=F87jySDZnMayyitVxLdHcQNL073DytKRyrRh84GNsl24IRNakn0oOfrC2luliNvdea
LGTk3adIrzt+N96GyMseWz8T9xE6O/
sAl16db48q4lqkd7uOiDvFsvS3CUQINhybNw8m CH/
o8eELTN0zbSbn5Trp0dkRYXhMX8FTAwrH0=
Domainkey-Signature: a=rsa-sha1; c=nofws; d=senderdomain.com; s=gamma; h=message-id:date:from:to:subject:mime-version:content-type;
b=wkbBjOM8NCUlbol6idKooejg0sL2ms7fDPe1tHUkR9Ht0qr5IAJX4q9PMVJeyjWalH
36n4qGLtC2euBJY070bVra8IBB9FeDEW9C35BC1vuPT5XyucCm0hulbE86+uiUTXCka
B 6ykquzQGCer7xPAcMJqVfXDkHo3H61HM9oCQM=
Message-Id:
<c8f49cec0807011530k11196ad4p7cb4b9420f2ae752@mail.senderdomain.com>
Mime-Version: 1.0
Content-Type: multipart/alternative; boundary="----
=_Part_3927_12044027.1214951458678"
X-Spam-Status: score=3.7 tests=DNS_FROM_RFC_POST, HTML_00_10, HTML_MESSAGE, HTML_SHORT_LENGTH version=3.1.7
X-Spam-Level: ***

4902

Message Body: This email provides an example of the contents of an email header.

*FIG. 49*

MULTIPHASE THREAT ANALYSIS AND CORRELATION ENGINE

CROSS REFERENCES TO RELATED APPLICATIONS

This application is a continuation of U.S. patent application Ser. No. 15/404,434 filed on Jan. 12, 2017 which claims the benefit of U.S. Provisional Application No. 62/288,842, filed on Jan. 29, 2016; U.S. Provisional Application No. 62/298,281, filed on Feb. 22, 2016; U.S. Provisional Application No. 62/364,723, filed on Jul. 20, 2016; and U.S. Provisional Application No. 62/344,267, filed on Jun. 1, 2016; each of which are incorporated herein by reference in their entirety.

BRIEF SUMMARY

Network security tools generally protect a site's network by identifying legitimate network packets and questionable network packets. Analyzing suspect network traffic may provide information about an effect the associated packets may have on a network. This information may be useful for determining whether a site's network has already been infiltrated and harmed. This information can also be used to strengthen existing network defenses. This information can also confirm whether suspect network traffic is truly harmful, or whether the suspect network traffic is actually innocent.

Provided are methods, network devices, and computer-program products for obtaining targeted threat intelligence using a high-interaction network. In various implementations, targeted threat intelligence includes using a network device in a network to receive suspect network traffic. Suspect network traffic can include network traffic identified as potentially causing harm to the network. The network device can further determine that the suspect network traffic is associated with an unknown threat. The network device can further analyze the suspect network traffic using a high-interaction network. The high-interaction network can be configured to emulate at least a part of the network. Analyzing can include determining a behavior of the suspect network traffic in the high-interaction network. The network device can further generate indicators. The indicators can describe the suspect network traffic. The indicators can also facilitate analysis of a susceptibility of the network to the unknown threat.

In various implementations, the network device can further determine whether the network has been subjected to the unknown threat, wherein determining includes examining the network for a behavior described by the indicators.

In various implementations, the network device can receive additional indicators. In these implementations, determining that the suspect network traffic is associated with an unknown threat includes using the additional indicators.

In various implementations, the network device can receive additional suspect network traffic and determine that the network is incapable of responding to a behavior of the additional suspect network traffic.

In various implementations, the network device can receive additional suspect network traffic and determine that the network has been secured against a behavior of the additional suspect network traffic.

In various implementations, the network device can receive additional suspect network traffic and determine that the additional suspect network traffic is a known threat. The network device can further analyze the additional suspect network traffic using the high-interaction network. Analyzing the additional suspect network traffic can include determining whether the network can be harmed by a behavior of the additional suspect network traffic.

In various implementations, analyzing the suspect network traffic includes identifying a source of the suspect network traffic. In various implementations, analyzing the suspect network traffic includes determining whether the behavior of the suspect network traffic is manually driven or automatically driven.

In various implementations, the high-interaction network is a configurable network including a testing device.

Also provided are methods, network devices, and computer-program products for multiphase threat analysis and correlation, which can be used to reconstruct a threat incident in a network. In various implementations, multiphase threat analysis and correlation includes using a network device in a network to receive incident data. The incident data can include information derived starting at detection of an attack on the network until detection of an event. The incident data can include one or more types of data. The network device can include one or more analytic engines that run in a predetermined order. The network device can further analyze the incident data according to data type. An analytic engine can analyze incident data of a certain data type, and produce a result indicating whether a piece of data in the incident data is associated with the attack. The network device can further produce a report of the attack. Producing the report can include correlating the results from the analytic engines. The report can provide information about a sequence of events that occurred in the course of the attack. The network device can further use the record of the attack to generate one or more indicators. The indicators can describe the attack, and facilitate configuring security for the network.

In various implementations, correlating the results from the analytic engines includes using a result to examine the incident data for events relating to the result. Examining the incident data can include examining events that occurred before or after an event that corresponds to the result. In various implementations, a result from an analytic engine can indicate whether data from the incident data corresponds to an event that was adverse to the network.

In various implementations, the network device can further modify the predetermined order, add a new analytic engine to the predetermined order, or remove an analytic engine from the predetermined order. Modifying, removing, or adding can be based on updated threat intelligence.

In various implementations, the predetermined order of the analytic engines includes running one analytic engine after another analytic engine. In these implementations, the other analytic engine can use a result from the one analytic engine. In various implementations, the predetermined order includes running two or more analytic engines in parallel.

In various implementations, the incident data can be generated using a high-interaction network. The high-interaction network is a configurable network including a testing device.

Also provided are systems, methods, and computer-program products for classifying an email as malicious. In various implementations, classifying an email as malicious includes using a malicious email detection engine, possibly implemented in a network device, to configure a decoy email address. The decoy email address can include a username that is associated with the malicious email detection engine. Email directed to the decoy email address can be received by the malicious email detection engine. The malicious email detection engine can further make the decoy email address publicly available. The malicious email detection engine can further receive a suspect email, which includes a header and content, addressed to the decoy email address. The malicious email detection engine can further analyze the header using a header analysis engine and analyzing the content using a high-interaction network. The malicious email detection engine can further determine a status for the suspect email. The status can indicate whether the suspect email was malicious. Making this determination can include using the header and content analysis. The status can be determined using a results engine.

In various implementations, the malicious email detection engine can further generate the username of the decoy email address using common patterns for email usernames. In various implementations, the malicious email detection engine can generate the username of the decoy email address using a received email.

In various implementations, analyzing the header includes examining one or more fields in the header. Examining a field can include determining whether a value in the field corresponds with a suspect value. In various implementations, analyzing the header can include generating and sending a response email to a sender email address.

In various implementations, the contents included in the suspect email can include one or more of a file or an Internet link. In these implementations, analyzing the content can include interacting with the content using the high-interaction network.

In various implementations, the malicious email detection engine can further generate indicators for the suspect email. The indicators can identify the suspect email. The indicators can be generated using the results engine. The malicious email detection engine can further use the indicators to identify malicious email sent to a non-decoy email address.

In various implementations, malicious email detection engine can further determine that a computer system has been compromised. Determining that the computer system has been compromised can include using the header and content analysis. The computer system can be determined to be compromised using the results engine.

BRIEF DESCRIPTION OF THE DRAWINGS

Illustrative embodiments are described in detail below with reference to the following figures:

FIG. 49 illustrates an example of the format and content of an email header.

DETAILED DESCRIPTION

Figure 1:
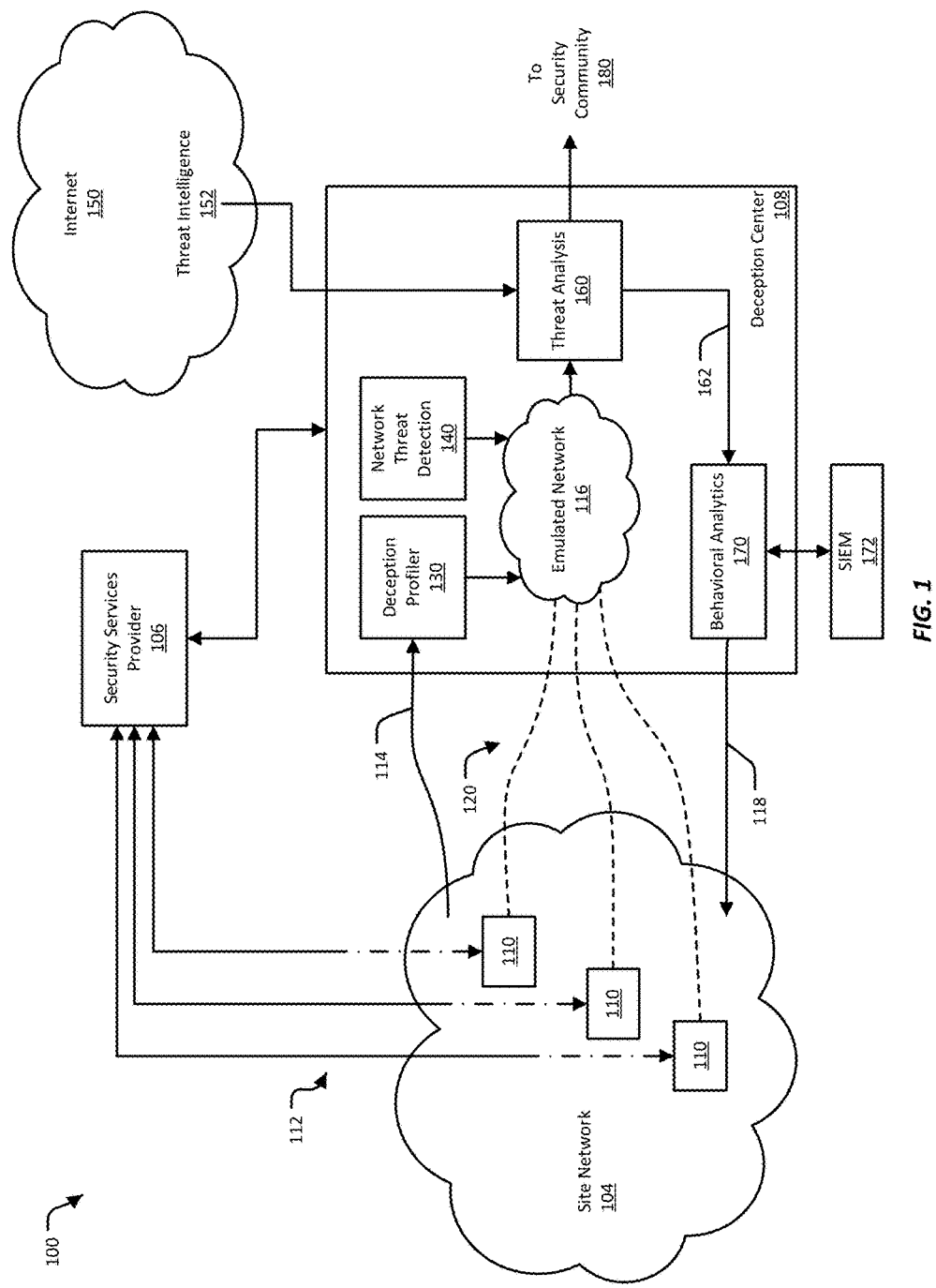
FIG. 1 illustrates an example of a network threat detection and analysis system, in which various implementations of a deception-based security system can be used.

Network deception mechanisms, often referred to as "honeypots," "honey tokens," and "honey nets," among others, defend a network from threats by distracting or diverting the threat. Honeypot-type deception mechanisms can be installed in a network for a particular site, such as a business office, to act as decoys in the site's network. Honeypot-type deception mechanisms are typically configured to be indistinguishable from active, production systems in the network. Additionally, such deception mechanisms are typically configured to be attractive to a network threat by having seemingly valuable data and/or by appearing vulnerable to infiltration. Though these deception mechanisms can be indistinguishable from legitimate parts of the site network, deception mechanisms are not part of the normal operation of the network, and would not be accessed during normal, legitimate use of the site network. Because normal users of the site network would not normally use or access a deception mechanism, any use or access to the deception mechanism is suspected to be a threat to the network.

"Normal" operation of a network generally includes network activity that conforms with the intended purpose of a network. For example, normal or legitimate network activity can include the operation of a business, medical facility, government office, education institution, or the ordinary network activity of a private home. Normal network activity can also include the non-business-related, casual activity of users of a network, such as accessing personal email and visiting web sites on personal time, or using network resources for personal use. Normal activity can also include the operations of network security devices, such as firewalls, anti-virus tools, intrusion detection systems, intrusion protection systems, email filters, adware blockers, and so on. Normal operations, however, exclude deceptions mechanisms, in that deception mechanisms are not intended to take part in business operations or casual use. As such, network users and network systems do not normally access deceptions mechanisms except perhaps for the most routine network administrative tasks. Access to a deception mechanism, other than entirely routine network administration, may thus indicate a threat to the network.

Threats to a network can include active attacks, where an attacker interacts or engages with systems in the network to steal information or do harm to the network. An attacker may be a person, or may be an automated system. Examples of active attacks include denial of service (DoS) attacks, distributed denial of service (DDoS) attacks, spoofing attacks, "man-in-the-middle" attacks, attacks involving malformed network requests (e.g. Address Resolution Protocol (ARP) poisoning, "ping of death," etc.), buffer, heap, or stack overflow attacks, and format string attacks, among others. Threats to a network can also include self-driven, self-replicating, and/or self-triggering malicious software. Malicious software can appear innocuous until activated, upon which the malicious software may attempt to steal information from a network and/or do harm to the network. Malicious software is typically designed to spread itself to other systems in a network. Examples of malicious software include ransomware, viruses, worms, Trojan horses, spyware, keyloggers, rootkits, and rogue security software, among others.

A network at a site such as a business or a private home typically includes at least basic network traffic monitoring and filtering to protect the network from harmful activity. For example, a site's network typically includes a firewall attached to or incorporated into a gateway device that connects the site's network to outside networks. A firewall generally applies rules to network traffic, and controls what network traffic can come into a network. The firewall also typically controls network traffic that can go out of the network. Some sites rely one more than just a firewall, and have multi-layer, sophisticated security perimeters with multiple network security tools, such as anti-virus software, intrusion protection systems (IPS), intrusion detection systems (IDS), email filters, and others.

Network security tools generally protect a site's network by identifying legitimate network packets and questionable network packets. Legitimate network traffic may be forwarded to the site's network. Suspect network traffic maybe logged and/or may trigger alerts, and may then be discarded. In some cases, the suspect network traffic corresponds to a known threat, such as previously identified malware, or a denial of service (DoS) attack from a known Internet Protocol (IP) address. When suspect network traffic corresponds to a known threat, in many cases the nature and effect of the threat is understood, and further analysis of the network traffic may not be necessary. When the exact threat posed by suspect network traffic is not known, however, further analyzing the associated packets, rather than discarding them, may be beneficial. For example, analyzing suspect network traffic may provide information about an effect the associated packets may have on a network. This information may be useful for determining whether a site's network has already been infiltrated and harmed. This information can also be used to strengthen existing network defenses. This information can also confirm whether suspect network traffic is truly harmful, or whether the suspect network traffic is actually innocent.

In various implementations, a targeted threat intelligence engine may be added to a site's network to analyze suspect network traffic. The threat intelligence engine may receive network traffic marked as suspect by other network security tools. In some implementations, when the suspect network traffic appears to correspond to a known network threat, the threat intelligence engine may log the threat and may take no further action. When the suspect network traffic does not correspond to a known threat, then the threat intelligence engine may analyze the suspect network traffic using a high-interaction network.

The high-interaction network is a closely monitored, isolated network that provides an environment in which the contents of suspect network traffic can be interacted with just as in a real network. The threat intelligence engine may use the high-interaction network to conduct static analysis of suspect network traffic (e.g., opening files, decompressing archives, etc.), dynamic analysis (e.g. unpacking the contents packets in the suspect network traffic, and interacting with the contents as would a network user), and network analysis (e.g., tracing network activity initiated by interacting with the contents of the suspect network traffic).

The high-interaction network may further record the results of these analyses, as well as information about the suspect network traffic. The threat intelligence engine may configure the high-interaction network to record data over the course of an incident. An "incident" is an attack or suspected attack on a network. The threat intelligence engine may record data for the incident from the time a suspected attack is detected until the suspected attack is terminated.

Once the threat intelligence engine has collected data for the incident, the threat intelligence engine may analyze the incident data, using an analytic engine. The analytic engine may have one or more analysis engines, each configure to analyze incident data of a particular type. The analytic engine may further include a correlation engine, configure to correlate the results from the various analysis engines, and reconstruct the events that led up to any damage caused by the incident.

From this correlation, the threat intelligence engine may generate indicators that describe the suspect network traffic. These indicators may include network indicators, file indicators, and static indicators. The indicators may also describe the harm (if any) the suspect network traffic may cause. The threat intelligence engine may use these indicators to verify whether a site's network has been previously infiltrated and compromised by the threat posed by the suspect network traffic. In some cases, the threat intelligence engine may also send the indicators to a central collector, for sharing with network at other sites. The central collector may also provide indicators to the threat intelligence engine that were generated by other networks. Sharing indicators between networks at different sites may allow each of these sites to have even stronger defenses.

Understanding the course of events in an attack that lead to harm on network may be useful in better defending a network. An incident report can be used to understand how an attack worked and/or what vulnerabilities in a network allowed the attack to occur. The incident report can also be used to defend against a network the same or similar attacks. The incident report can also be shared with the security community to improve network security across the Internet.

In various implementations, a targeted threat intelligence engine may produce a complete incident report, and be able to produce an incident report very nearly immediately after the incident occurred. Alternative methods of network threat identification and reporting may examine network traffic as it is received, and attempt to report on an attack in real time. These methods, however, by examining network traffic in real time, may not be able to have a global view of the incident. These methods thus may not be able to produce incident reports as accurately and precisely as the threat intelligence engine. Alternative methods may also lack the ability divert suspect network traffic to a high-interaction network, where the suspect network traffic may be safely released. These methods may, instead, terminate an attack as soon as it is detected, and thus not be able to describe what harm the attack is able to perpetrate on a network. Alternative methods may be used to attempt to determine the course of an attack after the attack has caused harm to a network. These methods may collect log files, memory snapshots, and whatever other data may be available from the network, and then attempt to analyze the data. This data, however, may be quite vast. By segregating suspect network traffic from other network traffic, the threat intelligence engine may reduce the amount of data that needs to be analyzed, and thus be able to produce an incident report much faster than a system that post-processes all the data from a network.

Electronic mail, or "email," is often used by malicious actors to attack enterprise networks and individual users' computers. Viruses, malware, hacking tools, and phishing links can be innocuously incorporated into an email. Carried along with an email, these attack tools can bypass network firewalls, anti-virus tools, and spam filters and get inside an otherwise secure system, through an email server or email program. The attack tools may even be delivered directly to an individual user's computer or device. Once inside a network or on a user's computer, the attack may be inadvertently released. Viruses and malware may immediately infect an entire network. Other tools, such as key loggers, may stay hidden on a computer, and may cause harm at a later time. Other tools cause yet more tools to be downloaded onto a system, possibly giving a malicious actor even more access to the network.

Malicious email often has identifiable characteristics. For example, quite often the "To" field in the email's header has been omitted. Hence it may be possible to identify, isolate, and/or destroy a malicious email before it does any harm. But for a typical email system, identifying and confirming that an email is malicious may be difficult. An enterprise network, or even a single user, may receive thousands of emails a day. While it may be possible to scan each email for suspect characteristics, confirming that the email is malicious, by interacting with the email, for example to see what attachments and links in the email do, may require time and computing resources. Examining each email received at an email server may thus cause unacceptable delays in email delivery, and/or may require a cost-prohibitive amount of computing resources. Additionally, interacting with an email may cause harmless but undesirable effects, such as unsubscribing a user's email address from a mailing list. At worst, however, interacting with a possibly malicious email may cause harm to a computer or network.

In various implementations, a system for classifying an email as malicious attempts to examine email arriving at a network or individual computer in a more directed manner. The system for classifying an email as malicious also may attempt to not only identify email as possibly malicious, but also to confirm that the email is malicious, without causing harm to a user's email account or system. The information gleaned from definitely and potentially malicious email can also be shared between customer networks to improve the overall security for all customer networks. Furthermore, this information can also be examined to attempt to locate compromised computers or networks.

In various implementations, a system for classifying an email as malicious involves configuring decoy email addresses on the email server for a customer network. The decoy email addresses are made public so that they may be found and acquired by malicious actors. The decoy email addresses are not associated with any of the customer network's email users, but is instead associated with a malicious email detection engine. Email addressed to the decoy email addresses is thus delivered to the malicious email detection engine. The malicious email detection engine may examine the header part of an email using heuristic, probabilistic, and/or machine learning algorithms, to look for characteristics often found in malicious email headers. The malicious email detection engine may also "detonate" the contents of the email in a high-interaction network. A high-interaction network is a physical and/or emulated network that is isolated from the customer's network, and is configured to react to the contents of the suspect email just as would a real network. The high-interaction network provides a contained space for interacting with a suspect email, where whatever activity the email may launch is free to do as it will. The malicious email detection engine may take the results of the header and content analysis and produce indicators that identify a malicious email. These indicators may be used by the customer network to improve email filtering for its email users. These indicators may also be shared to a central collector, which may distribute indicators for malicious email between various customer sites.

I. Deception-Based Security Systems

FIG. 1 illustrates an example of a network threat detection and analysis system 100, in which various implementations of a deception-based security system can be used. The network threat detection and analysis system 100, or, more briefly, network security system 100, provides security for a site network 104 using deceptive security mechanisms, a variety of which may be called "honeypots." The deceptive security mechanisms may be controlled by and inserted into the site network 104 using a deception center 108 and sensors 110, which may also be referred to as deception sensors, installed in the site network 104. In some implementations, the deception center 108 and the sensors 110 interact with a security services provider 106 located outside of the site network 104. The deception center 108 may also obtain or exchange data with sources located on the Internet 150.

Security mechanisms designed to deceive, sometimes referred to as "honeypots," may also be used as traps to divert and/or deflect unauthorized use of a network away from the real network assets. A deception-based security mechanism may be a computer attached to the network, a process running on one or more network systems, and/or some other device connected to the network. A security mechanism may be configured to offer services, real or emulated, to serve as bait for an attack on the network. Deception-based security mechanisms that take the form of data, which may be called "honey tokens," may be mixed in with real data in devices in the network. Alternatively or additionally, emulated data may also be provided by emulated systems or services.

Deceptive security mechanisms can also be used to detect an attack on the network. Deceptive security mechanisms are generally configured to appear as if they are legitimate parts of a network. These security mechanisms, however, are not, in fact, part of the normal operation of the network. Consequently, normal activity on the network is not likely to access the security mechanisms. Thus any access over the network to the security mechanism is automatically suspect.

The network security system 100 may deploy deceptive security mechanisms in a targeted and dynamic fashion. Using the deception center 108 the system 100 can scan the site network 104 and determine the topology of the site network 104. The deception center 108 may then determine devices to emulate with security mechanisms, including the type and behavior of the device. The security mechanisms may be selected and configured specifically to attract the attention of network attackers. The security mechanisms may also be selected and deployed based on suspicious activity in the network. Security mechanisms may be deployed, removed, modified, or replaced in response to activity in the network, to divert and isolate network activity related to an apparent attack, and to confirm that the network activity is, in fact, part of a real attack.

The site network 104 is a network that may be installed among the buildings of a large business, in the office of a small business, at a school campus, at a hospital, at a government facility, or in a private home. The site network 104 may be described as a local area network (LAN) or a group of LANS. The site network 104 may be one site belonging to an organization that has multiple site networks 104 in one or many geographical locations. In some implementations, the deception center 108 may provide network security to one site network 104, or to multiple site networks 104 belonging to the same entity.

The site network 104 is where the networking devices and users of the an organizations network may be found. The site network 104 may include network infrastructure devices, such as routers, switches hubs, repeaters, wireless base stations, and/or network controllers, among others. The site network 104 may also include computing systems, such as servers, desktop computers, laptop computers, tablet computers, personal digital assistants, and smart phones, among others. The site network 104 may also include other analog and digital electronics that have network interfaces, such as televisions, entertainment systems, thermostats, refrigerators, and so on.

The deception center 108 provides network security for the site network 104 (or multiple site networks for the same organization) by deploying security mechanisms into the site network 104, monitoring the site network 104 through the security mechanisms, detecting and redirecting apparent threats, and analyzing network activity resulting from the apparent threat. To provide security for the site network 104, in various implementations the deception center 108 may communicate with sensors 110 installed in the site network 104, using network tunnels 120. As described further below, the tunnels 120 may allow the deception center 108 to be located in a different sub-network ("subnet") than the site network 104, on a different network, or remote from the site network 104, with intermediate networks (possibly including the Internet 150) between the deception center 108 and the site network 104.

In some implementations, the network security system 100 includes a security services provider 106. In these implementations, the security services provider 106 may act as a central hub for providing security to multiple site networks, possibly including site networks controlled by different organizations. For example, the security services provider 106 may communicate with multiple deception centers 108 that each provide security for a different site network 104 for the same organization. In some implementations, the security services provider 106 is located outside the site network 104. In some implementations, the security services provider 106 is controlled by a different entity than the entity that controls the site network. For example, the security services provider 106 may be an outside vendor. In some implementations, the security services provider 106 is controlled by the same entity as that controls the site network 104.

In some implementations, when the network security system 100 includes a security services provider 106, the sensors 110 and the deception center 108 may communicate with the security services provider 106 in order to be connected to each other. For example, the sensors 110, which may also be referred to as deception sensors, may, upon powering on in the site network 104, send information over a network connection 112 to the security services provider 106, identifying themselves and the site network 104 in which they are located. The security services provider 106 may further identify a corresponding deception center 108 for the site network 104. The security services provider 106 may then provide the network location of the deception center 108 to the sensors 110, and may provide the deception center 108 with the network location of the sensors 110. A network location may take the form of, for example, an Internet Protocol (IP) address. With this information, the deception center 108 and the sensors 110 may be able to configure tunnels 120 to communicate with each other.

In some implementations, the network security system 100 does not include a security services provider 106. In these implementations, the sensors 110 and the deception center 108 may be configured to locate each other by, for example, sending packets that each can recognize as coming for the other. Using these packets, the sensors 110 and deception center 108 may be able to learn their respective locations on the network. Alternatively or additionally, a network administrator can configure the sensors 110 with the network location of the deception center 108, and vice versa.

In various implementations, the sensors 110 are a minimal combination of hardware and/or software, sufficient to form a network connection with the site network 104 and a tunnel 120 with the deception center 108. For example, a sensor 110 may be constructed using a low-power processor, a network interface, and a simple operating system. In various implementations, the sensors 110 provide the deception center 108 with visibility into the site network 104, such as for example being able to operate as a node in the site network 104, and/or being able to present or project deceptive security mechanisms into the site network 104, as described further below. Additionally, in various implementations, the sensors 110 may provide a portal through which a suspected attack on the site network 104 can be redirected to the deception center 108, as is also described below.

In various implementations, the deception center 108 may be configured to profile the site network 104, deploy deceptive security mechanisms for the site network 104, detect suspected threats to the site network 104, analyze the suspected threat, and analyze the site network 104 for exposure and/or vulnerability to the supposed threat.

To provide the site network 104, the deception center 108 may include a deception profiler 130. In various implementations, the deception profiler may 130 derive information 114 from the site network 104, and determine, for example, the topology of the site network 104, the network devices included in the site network 104, the software and/or hardware configuration of each network device, and/or how the network is used at any given time. Using this information, the deception profiler 130 may determine one or more deceptive security mechanisms to deploy into the site network 104.

In various implementations, the deception profiler may configure an emulated network 116 to emulate one or more computing systems. Using the tunnels 120 and sensors 110, the emulated computing systems may be projected into the site network 104, where they serve as deceptions. The emulated computing systems may include address deceptions, low-interaction deceptions, and/or high-interaction deceptions. In some implementations, the emulated computing systems may be configured to resemble a portion of the network. In these implementations, this network portion may then be projected into the site network 104.

In various implementations, a network threat detection engine 140 may monitor activity in the emulated network 116, and look for attacks on the site network 104. For example, the network threat detection engine 140 may look for unexpected access to the emulated computing systems in the emulated network 116. The network threat detection engine 140 may also use information 114 extracted from the site network 104 to adjust the emulated network 116, in order to make the deceptions more attractive to an attack, and/or in response to network activity that appears to be an attack. Should the network threat detection engine 140 determine that an attack may be taking place, the network threat detection engine 140 may cause network activity related to the attack to be redirected to and contained within the emulated network 116.

In various implementations, the emulated network 116 is a self-contained, isolated, and closely monitored network, in which suspect network activity may be allowed to freely interact with emulated computing systems. In various implementations, questionable emails, files, and/or links may be released into the emulated network 116 to confirm that they are malicious, and/or to see what effect they have. Outside actors can also be allowed to access emulated system, steal data and user credentials, download malware, and conduct any other malicious activity. In this way, the emulated network 116 not only isolated a suspected attack from the site network 104, but can also be used to capture information about an attack. Any activity caused by suspect network activity may be captured in, for example, a history of sent and received network packets, log files, and memory snapshots.

In various implementations, activity captured in the emulated network 116 may be analyzed using a targeted threat analysis engine 160. The threat analysis engine 160 may examine data collected in the emulated network 116 and reconstruct the course of an attack. For example, the threat analysis engine 160 may correlate various events seen during the course of an apparent attack, including both malicious and innocuous events, and determine how an attacker infiltrated and caused harm in the emulated network 116. In some cases, the threat analysis engine 160 may use threat intelligence 152 from the Internet 150 to identify and/or analyze an attack contained in the emulated network 116. The threat analysis engine 160 may also confirm that suspect network activity was not an attack. The threat analysis engine 160 may produce indicators 162 that describe the suspect network activity, including indicating whether the suspect activity was or was not an actual threat. The threat analysis engine 160 may share these indicators 162 with the security community 180, so that other networks can be defended from the attack. The threat analysis engine 160 may also send the indicators 162 to the security services provider 106, so that the security services provider 106 can use the indicators 162 to defend other site networks.

In various implementations, the threat analysis engine 160 may also send threat indicators 162, or similar data, to a behavioral analytics engine 170. The behavioral analytics engine 170 may be configured to use the indicators 162 to probe 118 the site network 104, and see whether the site network 104 has been exposed to the attack, or is vulnerable to the attack. For example, the behavioral analytics engine 170 may search the site network 104 for computing systems that resemble emulated computing systems in the emulated network 116 that were affected by the attack. In some implementations, the behavioral analytics engine 170 can also repair systems affected by the attack, or identify these systems to a network administrator. In some implementations, the behavioral analytics engine 170 can also reconfigure the site network's 104 security infrastructure to defend against the attack.

The behavioral analytics engine 170 can work in conjunction with a Security Information and Event Management (SIEM) 172 system. In various implementations, SIEM includes software and/or services that can provide real-time analysis of security alerts generates by network hardware and applications. In various implementations, the deception center 108 can communicate with the SIEM 172 system to obtain information about computing and/or networking systems in the site network 104.

Using deceptive security mechanisms, the network security system 100 may thus be able to distract and divert attacks on the site network 104. The network security system 100 may also be able to allow, using the emulated network 116, and attack to proceed, so that as much can be learned about the attack as possible. Information about the attack can then be used to find vulnerabilities in the site network 104. Information about the attack can also be provided to the security community 180, so that the attack can be thwarted elsewhere.

II. Customer Installations

The network security system, such as the deception-based system described above, may be flexibly implemented to accommodate different customer networks. FIGS. 2A-2D provide examples of different installation configurations 200a-200d that can be used for different customer networks 202. A customer network 202 may generally be described as a network or group of networks that is controlled by a common entity, such as a business, a school, or a person. The customer network 202 may include one or more site networks 204. The customer network's 202 site networks 204 may be located in one geographic location, may be behind a common firewall, and/or may be multiple subnets within one network. Alternatively or additionally, a customer network's 202 site networks 204 may be located in different geographic locations, and be connected to each other over various private and public networks, including the Internet 250.

Different customer networks 202 may have different requirements regarding network security. For example, some customer networks 202 may have relatively open connections to outside networks such as the Internet 250, while other customer networks 202 have very restricted access to outside networks. The network security system described in FIG. 1 may be configurable to accommodate these variations.

Figure 2A:
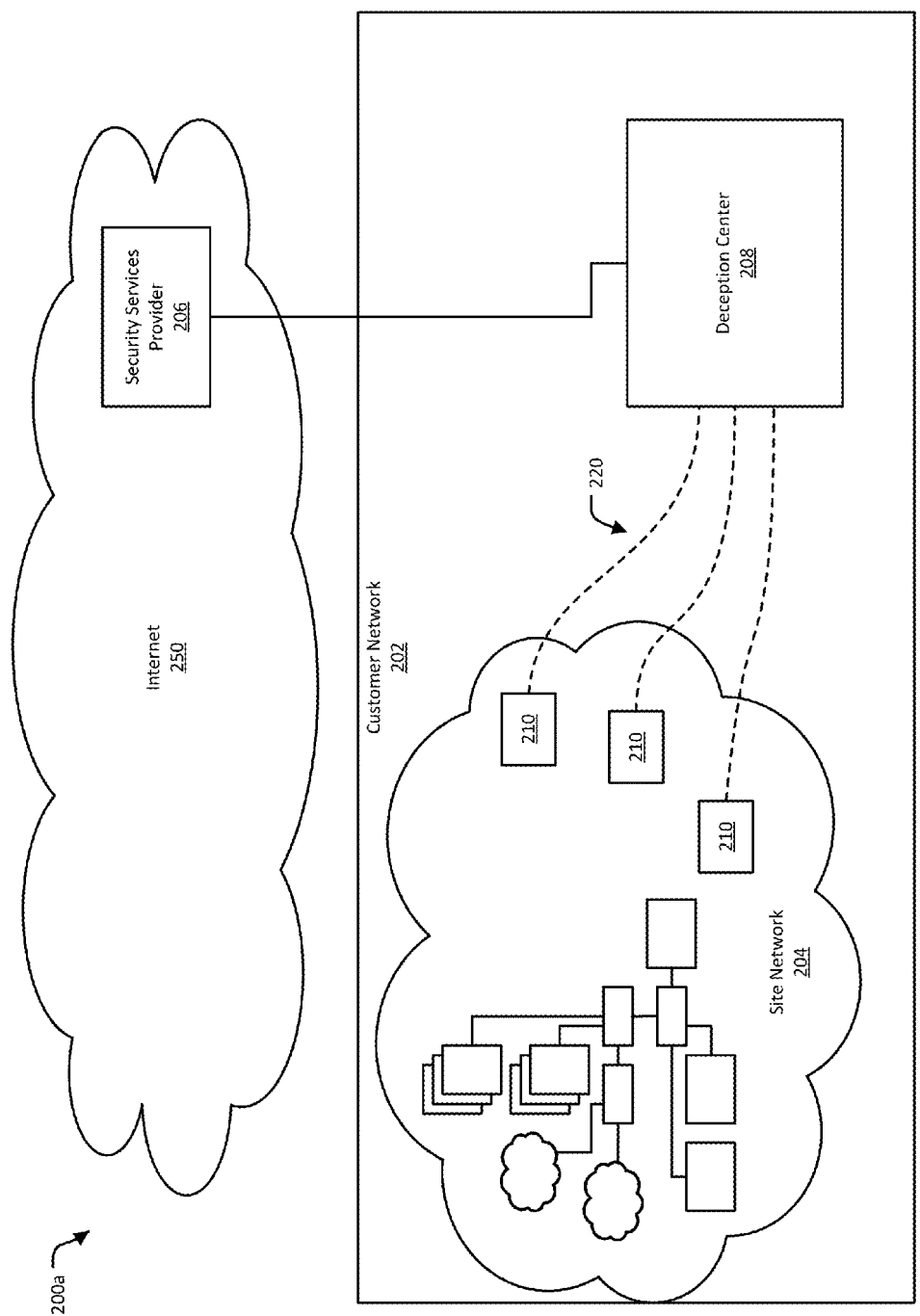
FIGS. 2A-2D provide examples of different installation configurations that can be used for different customer networks.

FIG. 2A illustrates one example of an installation configuration 200a, where a deception center 208 is located within the customer network 202. In this example, being located within the customer network 202 means that the deception center 208 is connected to the customer network 202, and is able to function as a node in the customer network 202. In this example, the deception center 208 may be located in the same building or within the same campus as the site network 204. Alternatively or additionally, the deception center 208 may be located within the customer network 202 but at a different geographic location than the site network 204. The deception center 208 thus may be within the same subnet as the site network 204, or may be connected to a different subnet within the customer network.

In various implementations, the deception center 208 communicates with sensors 210, which may also be referred to as deception sensors, installed in the site network over network tunnels 220 In this example, the network tunnels 220 may cross one or more intermediate within the customer network 202.

In this example, the deception center 208 is able to communicate with a security services provider 206 that is located outside the customer network 202, such as on the Internet 250. The security services provider 206 may provide configuration and other information for the deception center 208. In some cases, the security services provider 206 may also assist in coordinating the security for the customer network 202 when the customer network 202 includes multiple site networks 204 located in various geographic areas.

Figure 2B:
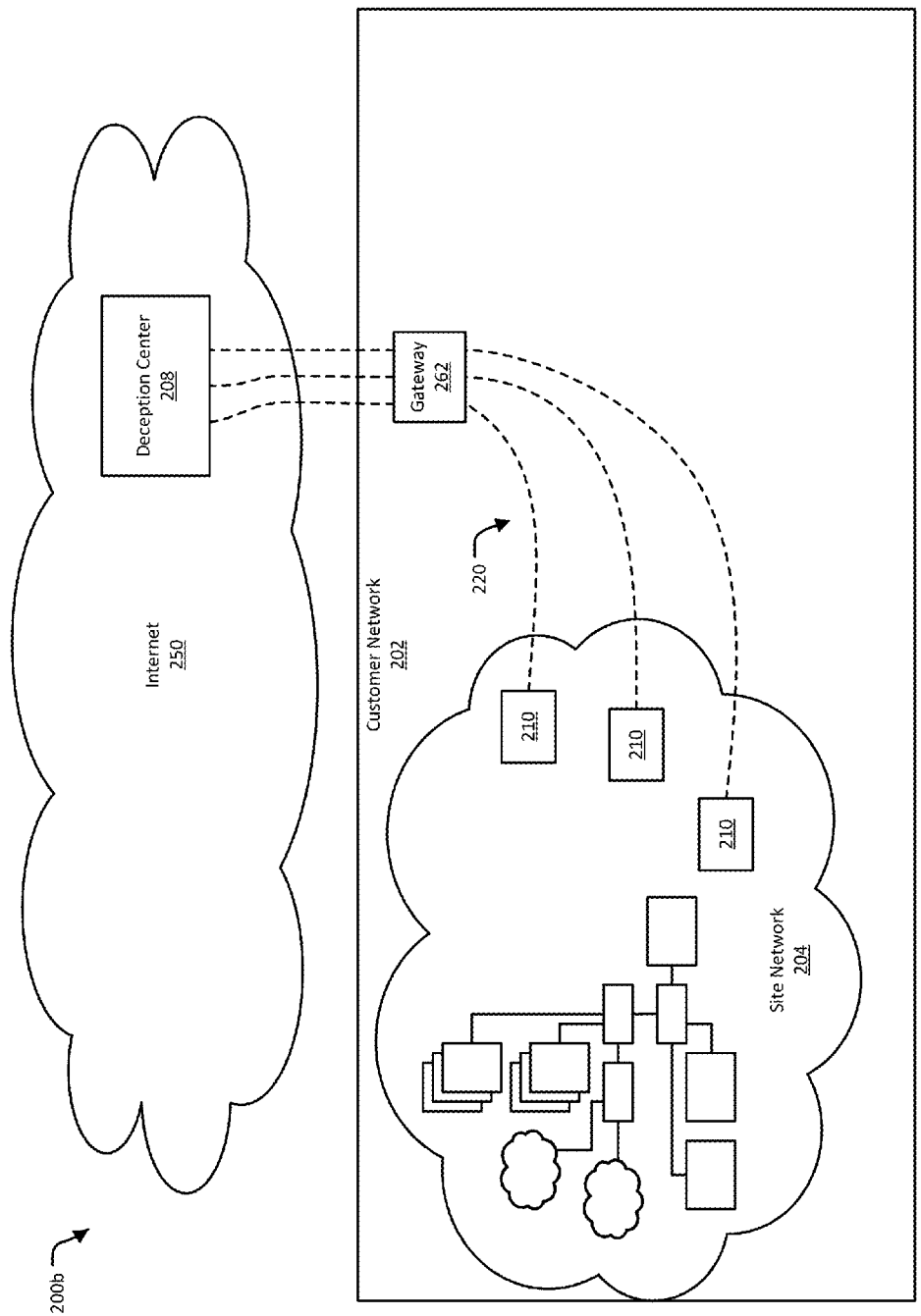

FIG. 2B illustrates another example of an installation configuration 200b, where the deception center 208 is located outside the customer network 202. In this example, the deception center 208 may connected to the customer network 202 over the Internet 250. In some implementations, the deception center 208 may be co-located with a security services provider, and/or may be provided by the security services provider.

In this example, the tunnels 220 connect the deception center 208 to the sensors 210 through a gateway 262. A gateway is a point in a network that connects the network to another network. For example, in this example, the gateway 262 connects the customer network 202 to outside networks, such as the Internet 250. The gateway 262 may provide a firewall, which may provide some security for the customer network 202. The tunnels 220 may be able to pass through the firewall using a secure protocol, such as Secure Socket Shell (SSH) and similar protocols. Secure protocols typically require credentials, which may be provided by the operator of the customer network 202.

Figure 2C:
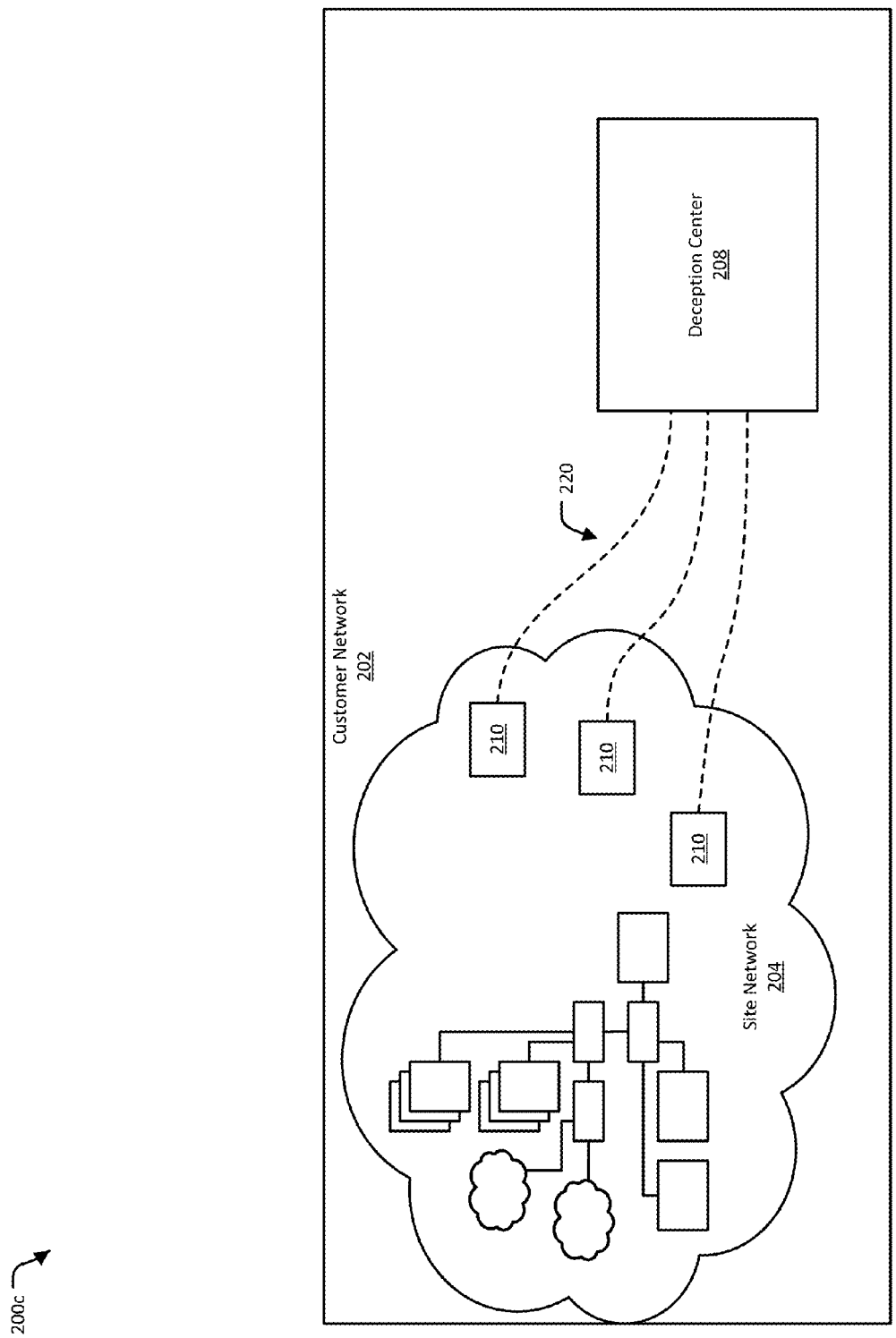

FIG. 2C illustrates another example of an installation configuration 200c, where the deception center 208 is located inside the customer network 202 but does not have access to outside networks. In some implementations, the customer network 202 may require a high level of network security. In these implementations, the customer network's 202 connections to the other networks may be very restricted. Thus, in this example, the deception center 208 is located within the customer network 202, and does not need to communicate with outside networks. The deception center 208 may use the customer networks 202 internal network to coordinate with and establish tunnels 220 to the sensors 210. Alternatively or additionally, a network administrator may configure the deception center 208 and sensors 210 to enable them to establish the tunnels 220.

Figure 2D:
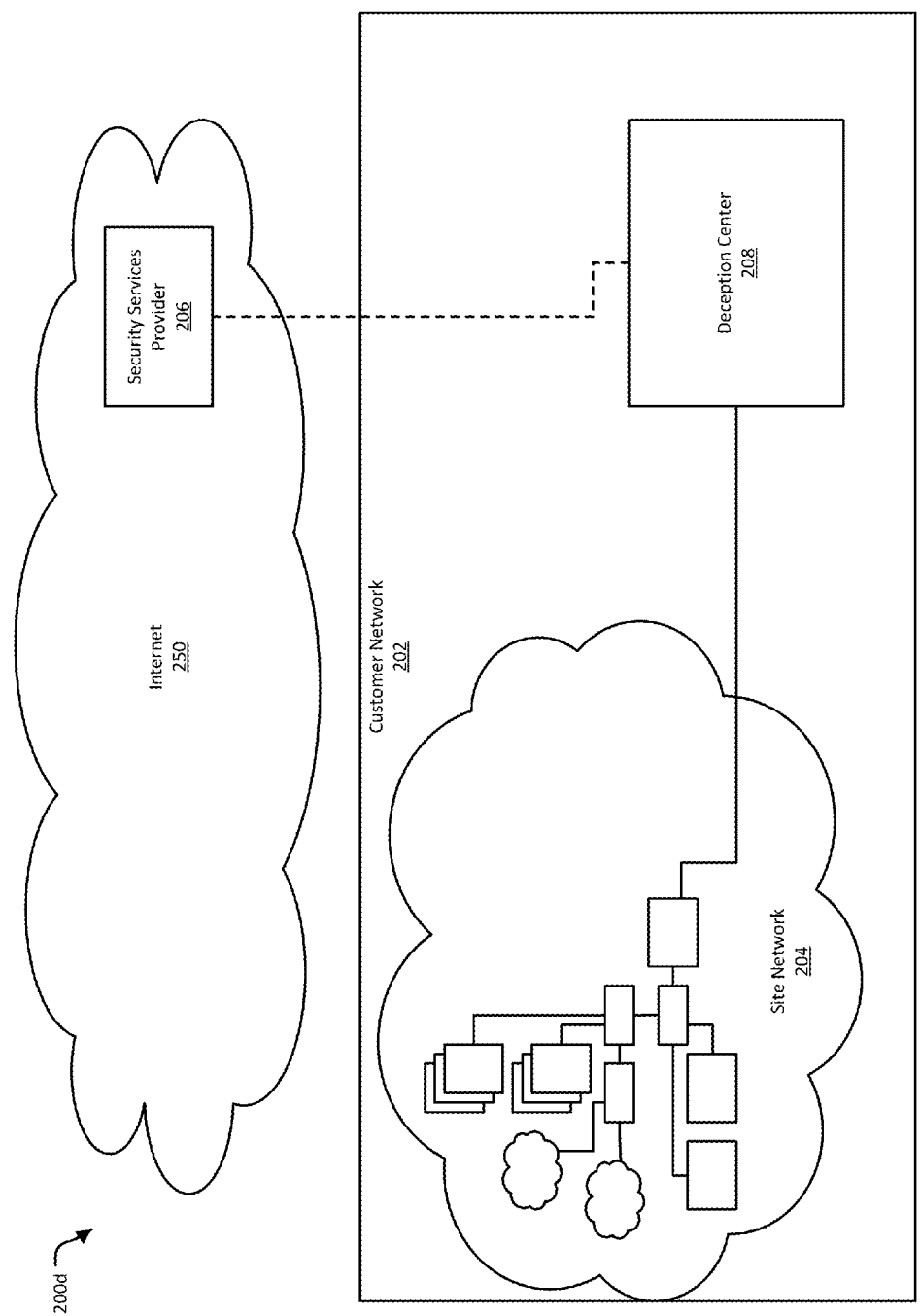

FIG. 2D illustrates another example of an installation configuration 200d. In this example, the deception center 208 is located inside the customer network 202, and further is directly connected to the site network 204. Directly connected, in this example, can mean that the deception center 208 is connected to a router, hub, switch, repeater, or other network infrastructure device that is part of the site network 204. Directly connected can alternatively or additionally mean that the deception center 208 is connected to the site network 204 using a Virtual Local Area Network (VLAN). For example, the deception center 208 can be connected to VLAN trunk port. In these examples, the deception center 208 can project deceptions into the site network 204 with or without the use of sensors, such as are illustrated in FIGS. 2A-2C.

In the example of FIG. 2D, the deception center 208 can also optionally be connected to an outside security services provider 206. The security services provider 206 can manage the deception center 208, including providing updated security data, sending firmware upgrades, and/or coordinating different deception centers 208 for different site networks 204 belonging to the same customer network 202. In some implementations, the deception center 208 can operate without the assistances of an outside security services provider 206.

III. Customer Networks

The network security system, such as the deception-based system discussed above, can be used for variety of customer networks. As noted above, customer networks can come in wide variety of configurations. For example, a customer network may have some of its network infrastructure "in the cloud." A customer network can also include a wide variety of devices, including what may be considered "traditional" network equipment, such as servers and routers, and non-traditional, "Internet-of-Things" devices, such as kitchen appliances. Other examples of customer networks include established industrial networks, or a mix of industrial networks and computer networks.

Figure 3A:
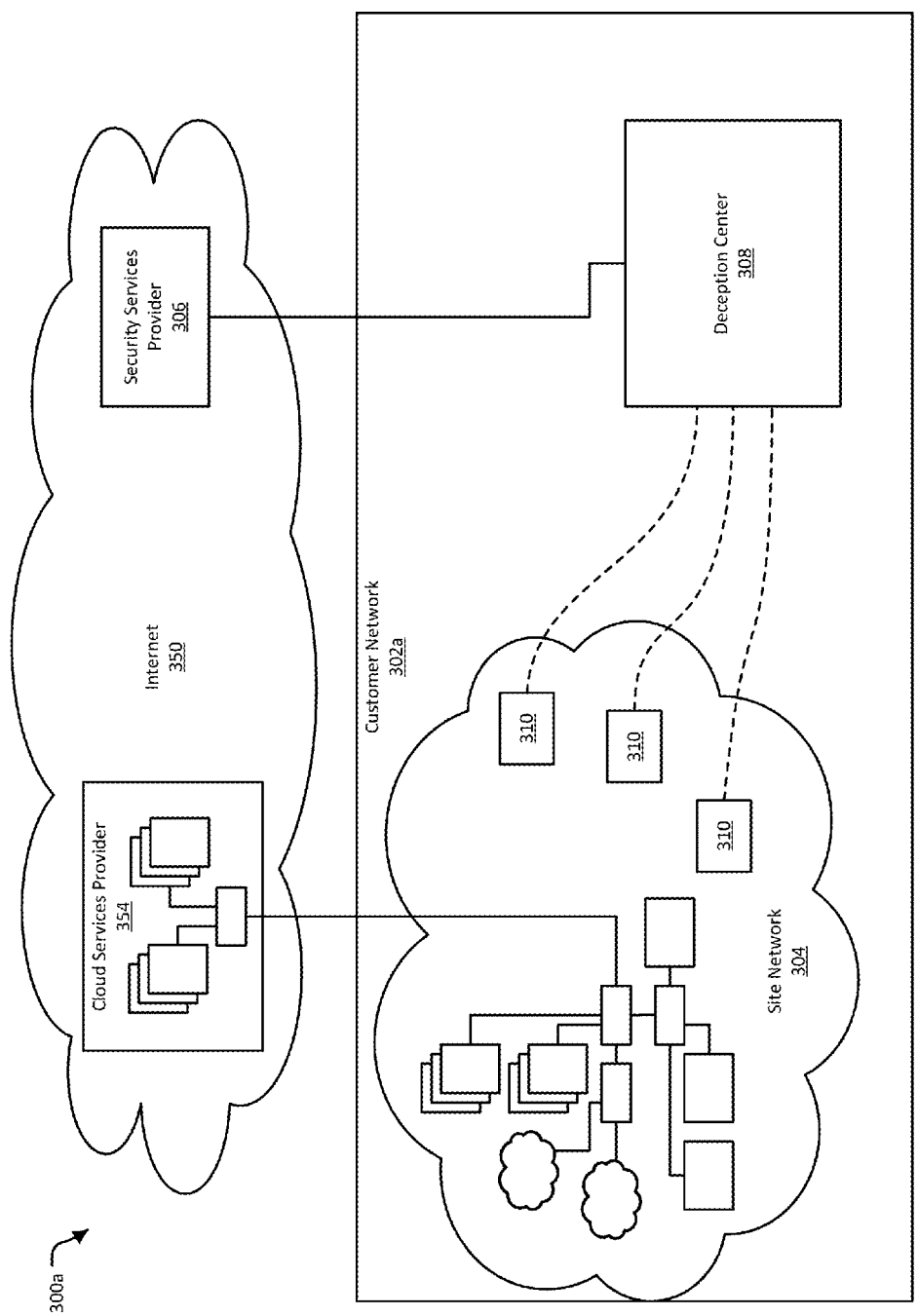
FIG. 3A-3B illustrate examples of customer networks where some of the customer networks' network infrastructure is "in the cloud," that is, is provided by a cloud services provider.
Figure 3B:
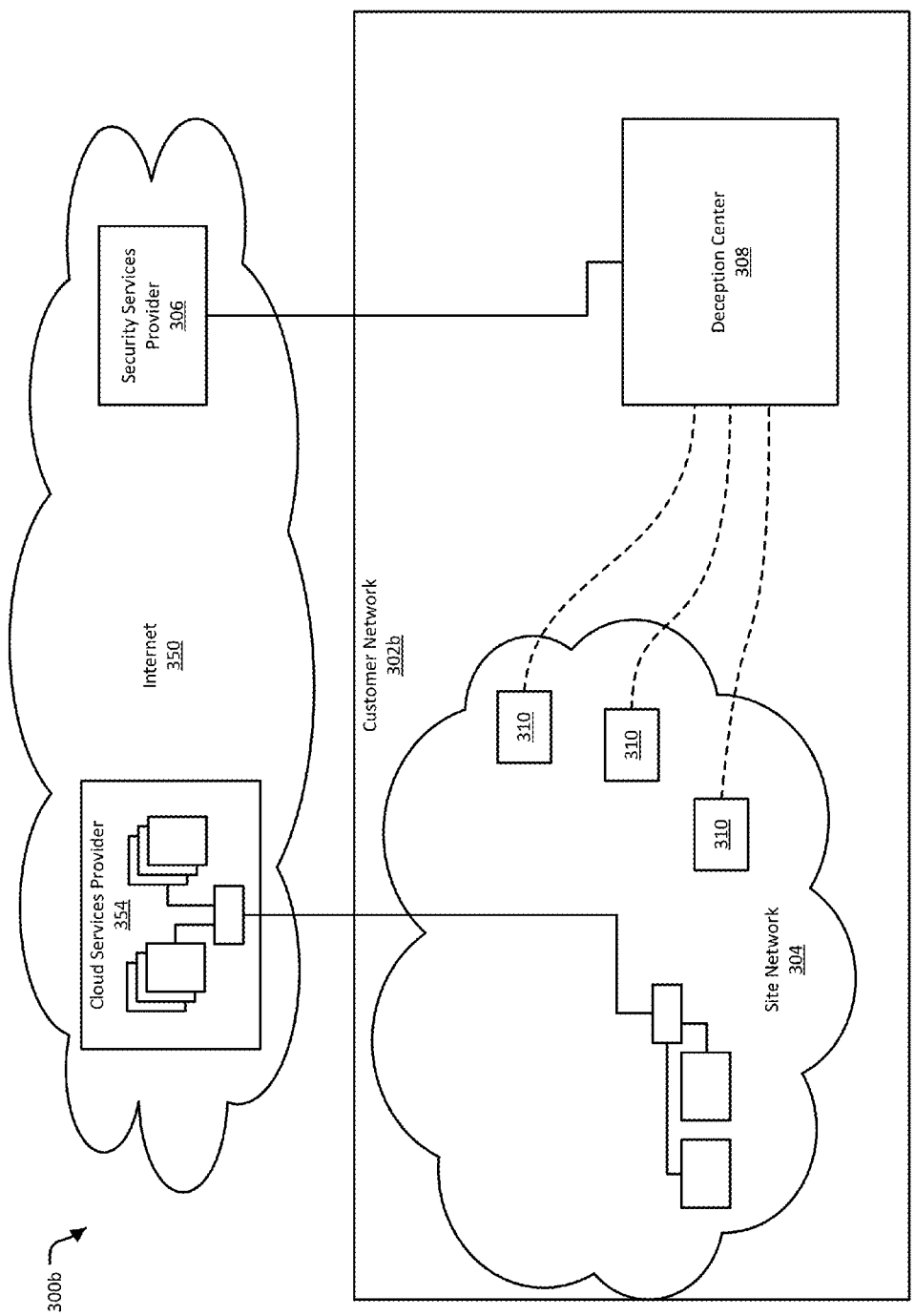

FIG. 3A-3B illustrate examples of customer networks 302a-302b where some of the customer networks' 302a-302b network infrastructure is "in the cloud," that is, is provided by a cloud services provider 354. These example customer networks 302a-302b may be defended by a network security system that includes a deception center 308 and sensors 310, which may also be referred to as deception sensors, and may also include an off-site security services provider 306.

A cloud services provider is a company that offers some component of cloud computer—such as Infrastructure as a Service (IaaS), Software as a Service (SaaS) or Platform as Service (PaaS)—to other businesses and individuals. A cloud services provider may have a configurable pool of computing resources, including, for example, networks, servers, storage, applications, and services. These computing resources can be available on demand, and can be rapidly provisioned. While a cloud services provider's resources may be shared between the cloud service provider's customers, from the perspective of each customer, the individual customer may appear to have a private network within the cloud, including for example having dedicated subnets and IP addresses.

In the examples illustrated in FIGS. 3A-3B, the customer networks' 302a-302b network is partially in a site network 304, and partially provided by the cloud services provider 354. In some cases, the site network 304 is the part of the customer networks 302a-302b that is located at a physical site owned or controlled by the customer network 302a-302b. For example, the site network 304 may be a network located in the customer network's 302a-302b office or campus. Alternatively or additionally, the site network 304 may include network equipment owned and/or operated by the customer network 302a-302b that may be located anywhere. For example, the customer networks' 302a-302b operations may consist of a few laptops owned by the customer networks 302a-302b, which are used from the private homes of the lap tops' users, from a co-working space, from a coffee shop, or from some other mobile location.

In various implementations, sensors 310 may be installed in the site network 304. The sensors 310 can be used by the network security system to project deceptions into the site network 304, monitor the site network 304 for attacks, and/or to divert suspect attacks into the deception center 308.

In some implementations, the sensors 310 may also be able to project deceptions into the part of the customer networks 302a-302b network that is provided by the cloud services provider 354. In most cases, it may not be possible to install sensors 310 inside the network of the cloud services provider 354, but in some implementations, this may not be necessary. For example, as discussed further below, the deception center 308 can acquire the subnet address of the network provided by the cloud services provider 354, and use that subnet address the create deceptions. Though these deceptions are projected form the sensors 310 installed in the site network 304, the deceptions may appear to be within the subnet provided by the cloud services provider 354.

In illustrated examples, the deception center 308 is installed inside the customer networks 302a-302b. Though not illustrated here, the deception center 308 can also be installed outside the customer networks 302a-302b, such as for example somewhere on the Internet 350. In some implementations, the deception center 308 may reside at the same location as the security service provider 306. When located outside the customer networks 302a-302b, the deception center 308 may connect to the sensors 310 in the site network 304 over various public and/or private networks.

FIG. 3A illustrates an example of a configuration 300a where the customer network's 302a network infrastructure is located in the cloud and the customer network 302a also has a substantial site network 304. In this example, the customer may have an office where the site network 304 is located, and where the customer's employees access and use the customer network 302a. For example, developers, sales and marketing personnel, human resources and finance employees, may access the customer network 302a from the site network 304. In the illustrated example, the customer may obtain applications and services from the cloud services provider 354. Alternatively or additionally, the cloud services provider 354 may provide data center services for the customer. For example, the cloud services provider 354 may host the customer's repository of data (e.g., music provided by a streaming music service, or video provided by a streaming video provider). In this example, the customer's own customers may be provided data directly from the cloud services provider 354, rather than from the customer network 302a.

FIG. 3B illustrates and example of a configuration 300b where the customer network's 302b network is primarily or sometimes entirely in the cloud. In this example, the customer network's 302b site network 304 may include a few laptops, or one or two desktop servers. These computing devices may be used by the customer's employees to conduct the customer's business, while the cloud services provider 354 provides the majority of the network infrastructure needed by the customer. For example, a very small company may have no office space and no dedicated location, and have as computing resources only the laptops used by its employees. This small company may use the cloud services provider 354 to provide its fixed network infrastructure. The small company may access this network infrastructure by connecting a laptop to any available network connection (e.g, in a co-working space, library, or coffee shop). When no laptops are connected to the cloud services provider 354, the customer network 302b may be existing entirely within the cloud.

In the example provided above, the site network 304 can be found wherever the customer's employees connect to a network and can access the cloud services provider 354. Similarly, the sensors 310 can be co-located with the employees' laptops. For example, whenever an employee connects to a network, she can enable a sensor 310, which can then project deceptions into the network around her. Alternatively or additionally, sensors 310 can be installed in a fixed location (such as the home of an employee of the customer) from which they can access the cloud services provider 354 and project deceptions into the network provided by the cloud services provider 354.

Figure 4:
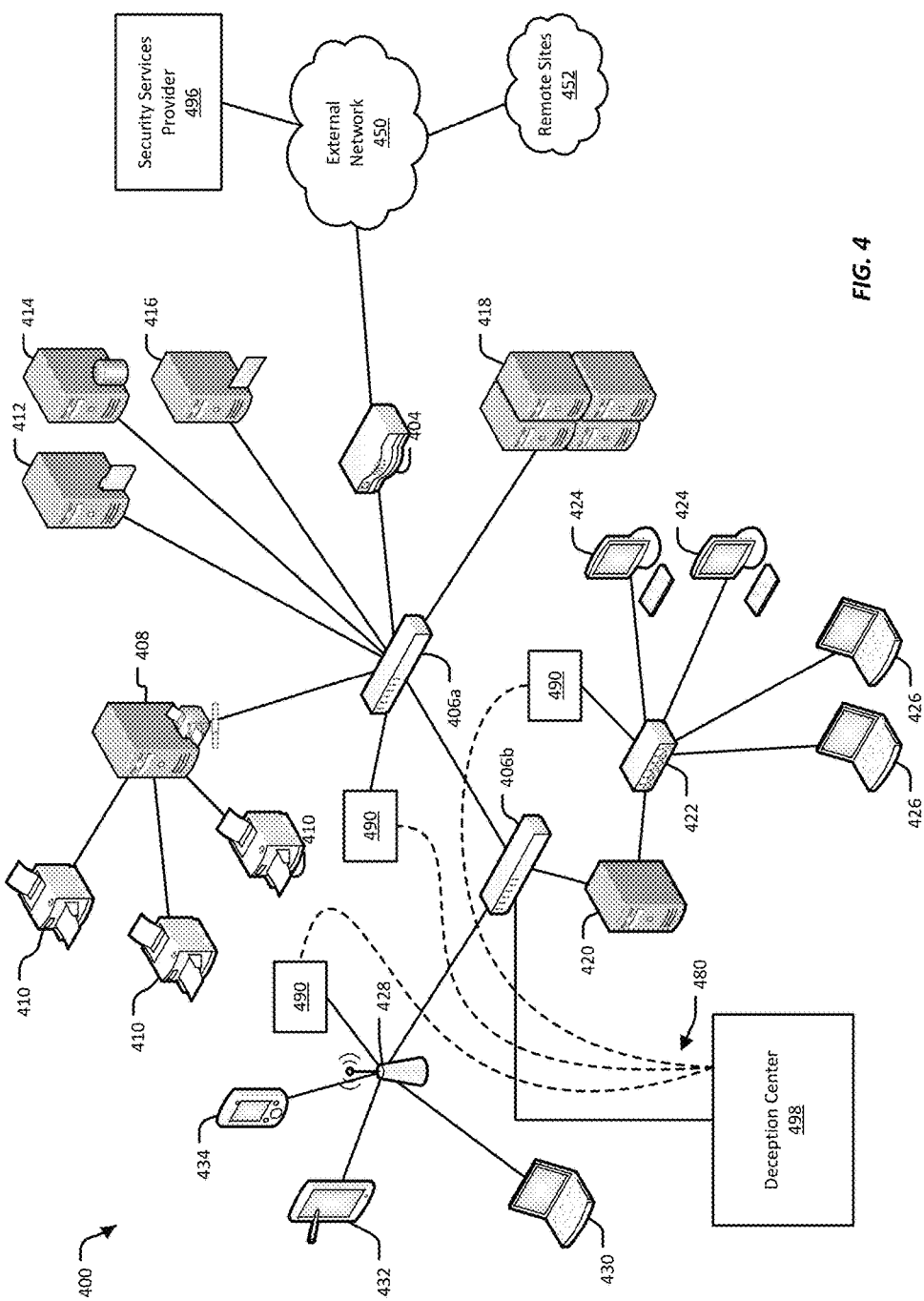
FIG. 4 illustrates an example of an enterprise network.

The network security system, such as the deception-based system discussed above, can provide network security for a variety of customer networks, which may include a diverse array of devices. FIG. 4 illustrates an example of an enterprise network 400, which is one such network that can be defended by a network security system. The example enterprise network 400 illustrates examples of various network devices and network clients that may be included in an enterprise network. The enterprise network 400 may include more or fewer network devices and/or network clients, and/or may include network devices, additional networks including remote sites 452, and/or systems not illustrated here. Enterprise networks may include networks installed at a large site, such as a corporate office, a university campus, a hospital, a government office, or a similar entity. An enterprise network may include multiple physical sites. Access to an enterprise networks is typically restricted, and may require authorized users to enter a password or otherwise authenticate before using the network. A network such as illustrated by the example enterprise network 400 may also be found at small sites, such as in a small business.

The enterprise network 400 may be connected to an external network 450. The external network 450 may be a public network, such as the Internet. A public network is a network that has been made accessible to any device that can connect to it. A public network may have unrestricted access, meaning that, for example, no password or other authentication is required to connect to it. The external network 450 may include third-party telecommunication lines, such as phone lines, broadcast coaxial cable, fiber optic cables, satellite communications, cellular communications, and the like. The external network 450 may include any number of intermediate network devices, such as switches, routers, gateways, servers, and/or controllers that are not directly part of the enterprise network 400 but that facilitate communication between the network 400 and other network-connected entities, such as a remote site 452.

Remote sites 452 are networks and/or individual computers that are generally located outside the enterprise network 400, and which may be connected to the enterprise network 400 through intermediate networks, but that function as if within the enterprise network 400 and connected directly to it. For example, an employee may connect to the enterprise network 400 while at home, using various secure protocols, and/or by connecting to a Virtual Private Network (VPN) provided by the enterprise network 400. While the employee's computer is connected, the employee's home is a remote site 452. Alternatively or additionally, the enterprise network's 400 owner may have a satellite office with a small internal network. This satellite office's network may have a fixed connection to the enterprise network 400 over various intermediate networks. This satellite office can also be considered a remote site.

The enterprise network 400 may be connected to the external network 450 using a gateway device 404. The gateway device 404 may include a firewall or similar system for preventing unauthorized access while allowing authorized access to the enterprise network 400. Examples of gateway devices include routers, modems (e.g. cable, fiber optic, dial-up, etc.), and the like.

The gateway device 404 may be connected to a switch 406a. The switch 406a provides connectivity between various devices in the enterprise network 400. In this example, the switch 406a connects together the gateway device 404, various servers 408, 412, 414, 416, 418, an another switch 406b. A switch typically has multiple ports, and functions to direct packets received on one port to another port. In some implementations, the gateway device 404 and the switch 406a may be combined into a single device.

Various servers may be connected to the switch 406a. For example, a print server 408 may be connected to the switch 406a. The print server 408 may provide network access to a number of printers 410. Client devices connected to the enterprise network 400 may be able to access one of the printers 410 through the printer server 408.

Other examples of servers connected to the switch 406a include a file server 412, database server 414, and email server 416. The file server 412 may provide storage for and access to data. This data may be accessible to client devices connected to the enterprise network 400. The database server 414 may store one or more databases, and provide services for accessing the databases. The email server 416 may host an email program or service, and may also store email for users on the enterprise network 400.

As yet another example, a server rack 418 may be connected to the switch 406a. The server rack 418 may house one or more rack-mounted servers. The server rack 418 may have one connection to the switch 406a, or may have multiple connections to the switch 406a. The servers in the server rack 418 may have various purposes, including providing computing resources, file storage, database storage and access, and email, among others.

An additional switch 406b may also be connected to the first switch 406a. The additional switch 406b may be provided to expand the capacity of the network. A switch typically has a limited number of ports (e.g., 8, 16, 32, 64 or more ports). In most cases, however, a switch can direct traffic to and from another switch, so that by connecting the additional switch 406b to the first switch 406a, the number of available ports can be expanded.

In this example, a server 420 is connected to the additional switch 406b. The server 420 may manage network access for a number of network devices or client devices. For example, the server 420 may provide network authentication, arbitration, prioritization, load balancing, and other management services as needed to manage multiple network devices accessing the enterprise network 400. The server 420 may be connected to a hub 422. The hub 422 may include multiple ports, each of which may provide a wired connection for a network or client device. A hub is typically a simpler device than a switch, and may be used when connecting a small number of network devices together. In some cases, a switch can be substituted for the hub 422. In this example, the hub 422 connects desktop computers 424 and laptop computers 426 to the enterprise network 400. In this example, each of the desktop computers 424 and laptop computers 426 are connected to the hub 422 using a physical cable.

In this example, the additional switch 406b is also connected to a wireless access point 428. The wireless access point 428 provides wireless access to the enterprise network 400 for wireless-enabled network or client devices. Examples of wireless-enabled network and client devices include laptops 430, tablet computers 432, and smart phones 434, among others. In some implementations, the wireless access point 428 may also provide switching and/or routing functionality.

The example enterprise network 400 of FIG. 4 is defended from network threats by a network threat detection and analysis system, which uses deception security mechanisms to attract and divert attacks on the network. The deceptive security mechanisms may be controlled by and inserted into the enterprise network 400 using a deception center 498 and sensors 490, which may also be referred to as deception sensors, installed in various places in the enterprise network 400. In some implementations, the deception center 498 and the sensors 490 interact with a security services provider 496 located outside of the enterprise network 400. The deception center 498 may also obtain or exchange data with sources located on external networks 450, such as the Internet.

In various implementations, the sensors 490 are a minimal combination of hardware and/or software, sufficient to form a network connection with the enterprise network 400 and a network tunnel 480 with the deception center 498. For example, a sensor 490 may be constructed using a low-power processor, a network interface, and a simple operating system. In some implementations, any of the devices in the enterprise network (e.g., the servers 408, 412, 416, 418 the printers 410, the computing devices 424, 426, 430, 432, 434, or the network infrastructure devices 404, 406a, 406b, 428) can be configured to act as a sensor.

In various implementations, one or more sensors 490 can be installed anywhere in the enterprise network 400, include being attached switches 406a, hubs 422, wireless access points 428, and so on. The sensors 490 can further be configured to be part of one or more VLANs. The sensors 490 provide the deception center 498 with visibility into the enterprise network 400, such as for example being able to operate as a node in the enterprise network 400, and/or being able to present or project deceptive security mechanisms into the enterprise network 400. Additionally, in various implementations, the sensors 490 may provide a portal through which a suspected attack on the enterprise network 400 can be redirected to the deception center 498.

The deception center 498 provides network security for the enterprise network 400 by deploying security mechanisms into the enterprise network 400, monitoring the enterprise network 400 through the security mechanisms, detecting and redirecting apparent threats, and analyzing network activity resulting from the apparent threat. To provide security for the enterprise network 400, in various implementations the deception center 498 may communicate with sensors 490 installed in the enterprise network 400, using, for example, network tunnels 480. The tunnels 480 may allow the deception center 498 to be located in a different sub-network ("subnet") than the enterprise network 400, on a different network, or remote from the enterprise network 400, with intermediate networks between the deception center 498 and the enterprise network 400. In some implementations, the enterprise network 400 can include more than one deception center 498. In some implementations, the deception center may be located off-site, such as in an external network 450.

In some implementations, the security services provider 496 may act as a central hub for providing security to multiple site networks, possibly including site networks controlled by different organizations. For example, the security services provider 496 may communicate with multiple deception centers 498 that each provide security for a different enterprise network 400 for the same organization. As another example, the security services provider 496 may coordinate the activities of the deception center 498 and the sensors 490, such as enabling the deception center 498 and the sensors 490 to connect to each other. In some implementations, the security services provider 496 is located outside the enterprise network 400. In some implementations, the security services provider 496 is controlled by a different entity than the entity that controls the site network. For example, the security services provider 496 may be an outside vendor. In some implementations, the security services provider 496 is controlled by the same entity as that controls the enterprise network 400. In some implementations, the network security system does not include a security services provider 496.

FIG. 4 illustrates one example of what can be considered a "traditional" network, that is, a network that is based on the interconnection of computers. In various implementations, a network security system, such as the deception-based system discussed above, can also be used to defend "non-traditional" networks that include devices other than traditional computers, such as for example mechanical, electrical, or electromechanical devices, sensors, actuators, and control systems. Such "non-traditional" networks may be referred to as the Internet of Things (IoT). The Internet of Things encompasses newly-developed, every-day devices designed to be networked (e.g., drones, self-driving automobiles, etc.) as well as common and long-established machinery that has augmented to be connected to a network (e.g., home appliances, traffic signals, etc.).

Figure 5:
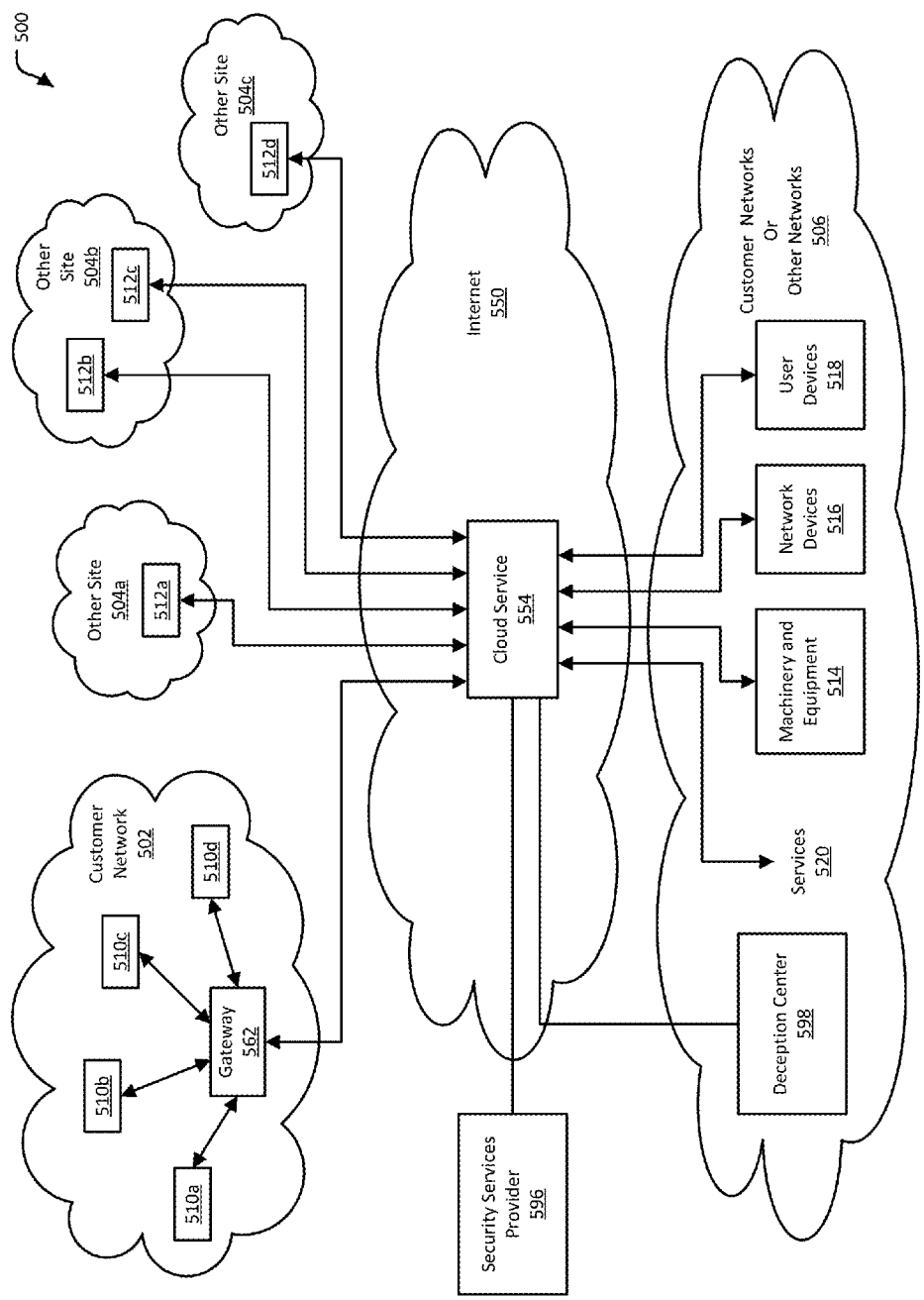
FIG. 5 illustrates a general example of an Internet-of-Things network.

FIG. 5 illustrates a general example of an IoT network 500. The example IoT network 500 can be implemented wherever sensors, actuators, and control systems can be found. For example, the example IoT network 500 can be implemented for buildings, roads and bridges, agriculture, transportation and logistics, utilities, air traffic control, factories, and private homes, among others. In various implementations, the IoT network 500 includes cloud service 554 that collects data from various sensors 510a-510d, 512a-512d, located in various locations. Using the collected data, the cloud service 554 can provide services 520, control of machinery and equipment 514, exchange of data with traditional network devices 516, and/or exchange of data with user devices 518. In some implementations, the cloud service 554 can work with a deception center 598 and/or a security service provider 596 to provide security for the network 500.

A cloud service, such as the illustrated cloud service 554, is a resource provided over the Internet 550. Sometimes synonymous with "cloud computing," the resource provided by the cloud services is in the "cloud" in that the resource is provided by hardware and/or software at some location remote from the place where the resource is used. Often, the hardware and software of the cloud service is distributed across multiple physical locations. Generally, the resource provided by the cloud service is not directly associated with specific hardware or software resources, such that use of the resource can continue when the hardware or software is changed. The resource provided by the cloud service can often also be shared between multiple users of the cloud service, without affecting each user's use. The resource can often also be provided as needed or on-demand. Often, the resource provided by the cloud service 554 is automated, or otherwise capable of operating with little or no assistance from human operators.

Examples of cloud services include software as a service (SaaS), infrastructure as a service (IaaS), platform as a service (PaaS), desktop as a service (DaaS), managed software as a service (MSaaS), mobile backend as a service (MBaaS), and information technology management as a service (ITMaas). Specific examples of cloud services include data centers, such as those operated by Amazon Web Services and Google Web Services, among others, that provide general networking and software services. Other examples of cloud services include those associated with smartphone applications, or "apps," such as for example apps that track fitness and health, apps that allow a user to remotely manage her home security system or thermostat, and networked gaming apps, among others. In each of these examples, the company that provides the app may also provide cloud-based storage of application data, cloud-based software and computing resources, and/or networking services. In some cases, the company manages the cloud services provided by the company, including managing physical hardware resources. In other cases, the company leases networking time from a data center provider.

In some cases, the cloud service 554 is part of one integrated system, run by one entity. For example, the cloud service 554 can be part of a traffic control system. In this example, sensors 510a-510d, 512a-512d can be used to monitor traffic and road conditions. In this example, the cloud service 554 can attempt to optimize the flow of traffic and also provide traffic safety. For example, the sensors 510a-510d, 512a-512d can include a sensor 512a on a bridge that monitors ice formation. When the sensor 512a detects that ice has formed on the bridge, the sensor 512a can alert the cloud service 554. The cloud service 554, can respond by interacting with machinery and equipment 514 that manages traffic in the area of the bridge. For example, the cloud service 554 can turn on warning signs, indicating to drivers that the bridge is icy. Generally, the interaction between the sensor 512a, the cloud service 554, and the machinery and equipment 514 is automated, requiring little or no management by human operators.

In various implementations, the cloud service 554 collects or receives data from sensors 510a-510d, 512a-512d, distributed across one or more networks. The sensors 510a-510d, 512a-512d include devices capable of "sensing" information, such as air or water temperature, air pressure, weight, motion, humidity, fluid levels, noise levels, and so on. The sensors 510a-510d, 512a-512d can alternatively or additionally include devices capable of receiving input, such as cameras, microphones, touch pads, keyboards, key pads, and so on. In some cases, a group of sensors 510a-510d may be common to one customer network 502. For example, the sensors 510a-510d may be motion sensors, traffic cameras, temperature sensors, and other sensors for monitoring traffic in a city's metro area. In this example, the sensors 510a-510d can be located in one area of the city, or be distribute across the city, and be connected to a common network. In these cases, the sensors 510a-510d can communicate with a gateway device 562, such as a network gateway. The gateway device 562 can further communicate with the cloud service 554.

In some cases, in addition to receiving data from sensors 510a-510d in one customer network 502, the cloud service 554 can also receive data from sensors 512a-512d in other sites 504a-504c. These other sites 504a-504c can be part of the same customer network 502 or can be unrelated to the customer network 502. For example, the other sites 504a-504c can each be the metro area of a different city, and the sensors 512a-512d can be monitoring traffic for each individual city.

Generally, communication between the cloud service 554 and the sensors 510a-510d, 512a-512d is bidirectional. For example, the sensors 510a-510d, 512a-512d can send information to the cloud service 554. The cloud service 554 can further provide configuration and control information to the sensors 510a-510d, 512a-512d. For example, the cloud service 554 can enable or disable a sensor 510a-510d, 512a-512d or modify the operation of a sensor 510a-510d, 512a-512d, such as changing the format of the data provided by a sensor 510a-510d, 512a-512d or upgrading the firmware of a sensor 510a-510d, 512a-512d.

In various implementations, the cloud service 554 can operate on the data received from the sensors 510a-510d, 512a-512d, and use this data to interact with services 520 provided by the cloud service 554, or to interact with machinery and equipment 514, network devices 516, and/or user devices 518 available to the cloud service 554. Services 520 can include software-based services, such as cloud-based applications, website services, or data management services. Services 520 can alternatively or additionally include media, such as streaming video or music or other entertainment services. Services 520 can also include delivery and/or coordination of physical assets, such as for example package delivery, direction of vehicles for passenger pick-up and drop-off, or automate re-ordering and re-stocking of supplies. In various implementations, services 520 may be delivered to and used by the machinery and equipment 514, the network devices 516, and/or the user devices 518.

In various implementations, the machinery and equipment 514 can include physical systems that can be controlled by the cloud service 554. Examples of machinery and equipment 514 include factory equipment, trains, electrical street cars, self-driving cars, traffic lights, gate and door locks, and so on. In various implementations, the cloud service 554 can provide configuration and control of the machinery and equipment 514 in an automated fashion.

The network devices 516 can include traditional networking equipment, such as server computers, data storage devices, routers, switches, gateways, and so on. In various implementations, the cloud service 554 can provide control and management of the network devices 516, such as for example automated upgrading of software, security monitoring, or asset tracking. Alternatively or additionally, in various implementations the cloud service 554 can exchange data with the network devices 516, such as for example providing websites, providing stock trading data, or providing online shopping resources, among others. Alternatively or additionally, the network devices 516 can include computing systems used by the cloud service provider to manage the cloud service 554.

The user devices 518 can include individual personal computers, smart phones, tablet devices, smart watches, fitness trackers, medical devices, and so on that can be associated with an individual user. The cloud service 554 can exchange data with the user devices 518, such as for example provide support for applications installed on the user devices 518, providing websites, providing streaming media, providing directional navigation services, and so on. Alternatively or additionally, the cloud service 554 may enable a user to use a user device 518 to access and/or view other devices, such as the sensors 510*a*-510*d*, 512*a*-512*d*, the machinery and equipment 514, or the network devices 516.

In various implementations, the services 520, machinery and equipment 514, network devices 516, and user devices 518 may be part of one customer network 506. In some cases, this customer network 506 is the same as the customer network 502 that includes the sensors 510*a*-510*d*. In some cases, the services 520, machinery and equipment 514, network devices 516, and user devices 518 are part of the same network, and may instead be part of various other networks 506.

In various implementations, customer networks can include a deception center 598. The deception center 598 provides network security for the IoT network 500 by deploying security mechanisms into the IoT network 500, monitoring the IoT network 500 through the security mechanisms, detecting and redirecting apparent threats, and analyzing network activity resulting from the apparent threat. To provide security for the IoT network 500, in various implementations the deception center 598 may communicate with the sensors 510*a*-5106*d*, 512*a*-510*d* installed in the IoT network 500, for example through the cloud service 554. In some implementations, the IoT network 500 can include more than one deception center 598. For example, each of customer network 502 and customer networks or other networks 506 can include a deception center 598.

In some implementations, the deception center 598 and the sensors 510*a*-510*d*, 512*a*-512*d* interact with a security services provider 596. In some implementations, the security services provider 596 may act as a central hub for providing security to multiple site networks, possibly including site networks controlled by different organizations. For example, the security services provider 596 may communicate with multiple deception centers 598 that each provide security for a different IoT network 500 for the same organization. As another example, the security services provider 596 may coordinate the activities of the deception center 598 and the sensors 510*a*-510*d*, 512*a*-512*d*, such as enabling the deception center 598 and the sensors 510*a*-510*d*, 512*a*-512*d* to connect to each other. In some implementations, the security services provider 596 is integrated into the cloud service 554. In some implementations, the security services provider 596 is controlled by a different entity than the entity that controls the site network. For example, the security services provider 596 may be an outside vendor. In some implementations, the security services provider 596 is controlled by the same entity as that controls the IoT network 500. In some implementations, the network security system does not include a security services provider 596.

Figure 6:
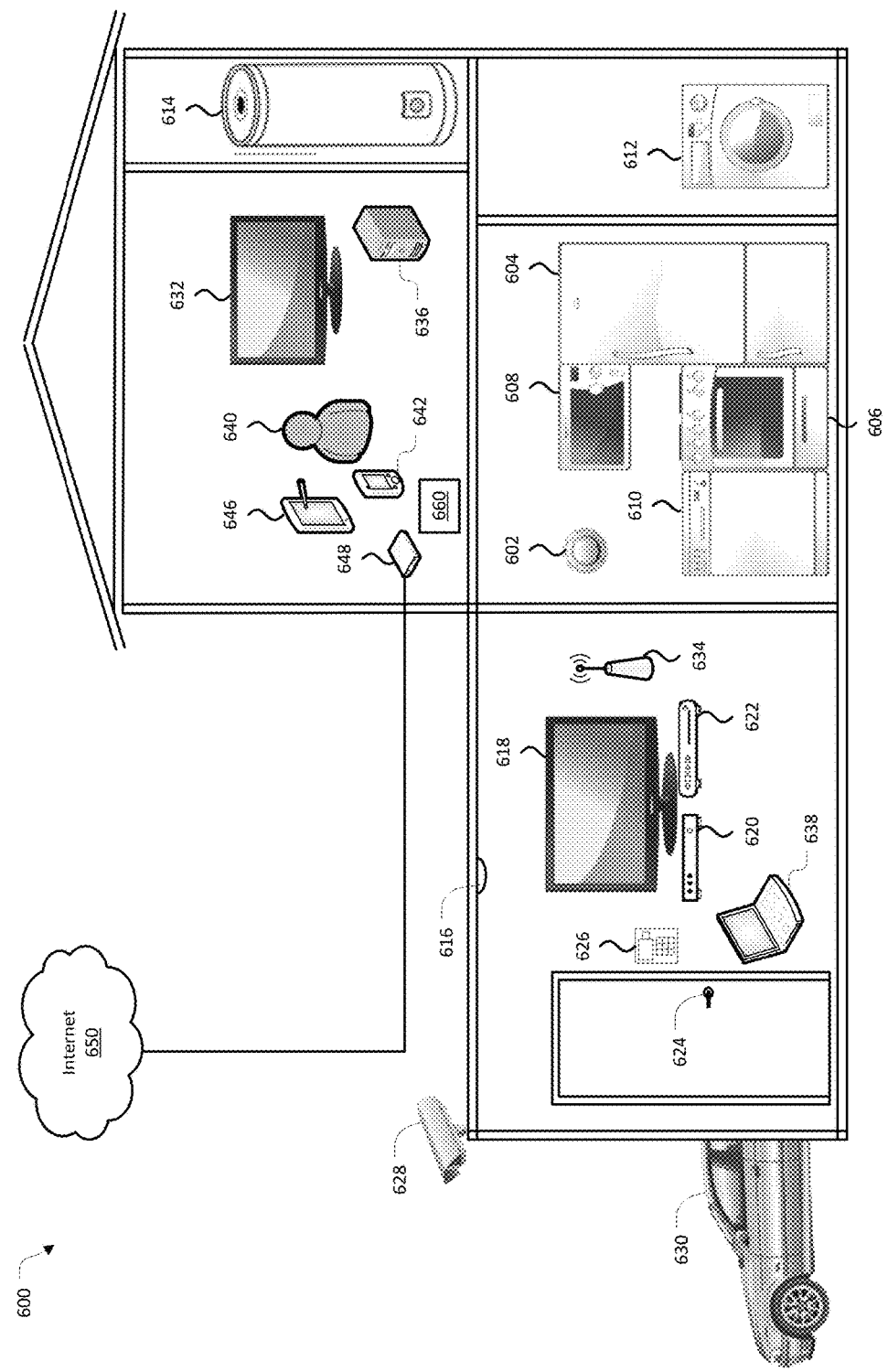
FIG. 6 illustrates an example of an Internet-of-Things network, here implemented in a private home.

IoT networks can also include small networks of non-traditional devices. FIG. 6 illustrates an example of a customer network that is a small network 600, here implemented in a private home. A network for a home is an example of small network that may have both traditional and non-traditional network devices connected to the network 600, in keeping with an Internet of Things approach. Home networks are also an example of networks that are often implemented with minimal security. The average homeowner is not likely to be a sophisticated network security expert, and may rely on his modem or router to provide at least some basic security. The homeowner, however, is likely able to at least set up a basic home network. A deception-based network security device may be as simple to set up as a home router or base station, yet provide sophisticated security for the network 600.

The example network 600 of FIG. 6 may be a single network, or may include multiple sub-networks. These sub-networks may or may not communicate with each other. For example, the network 600 may include a sub-network that uses the electrical wiring in the house as a communication channel. Devices configured to communicate in this way may connect to the network using electrical outlets, which also provide the devices with power. The sub-network may include a central controller device, which may coordinate the activities of devices connected to the electrical network, including turning devices on and off at particular times. One example of a protocol that uses the electrical wiring as a communication network is X10.

The network 600 may also include wireless and wired networks, built into the home or added to the home solely for providing a communication medium for devices in the house. Examples of wireless, radio-based networks include networks using protocols such as Z-Wave™, Zigbee™ (also known as Institute of Electrical and Electronics Engineers (IEEE) 802.15.4), Bluetooth™, and Wi-Fi (also known as IEEE 802.11), among others. Wireless networks can be set up by installing a wireless base station in the house. Alternatively or additionally, a wireless network can be established by having at least two devices in the house that are able to communicate with each other using the same protocol.

Examples of wired networks include Ethernet (also known as IEEE 802.3), token ring (also known as IEEE 802.5), Fiber Distributed Data Interface (FDDI), and Attached Resource Computer Network (ARCNET), among others. A wired network can be added to the house by running cabling through the walls, ceilings, and/or floors, and placing jacks in various rooms that devices can connect to with additional cables. The wired network can be extended using routers, switches, and/or hubs. In many cases, wired networks may be interconnected with wireless networks, with the interconnected networks operating as one seamless network. For example, an Ethernet network may include a wireless base station that provides a Wi-Fi signal for devices in the house.

As noted above, a small network 600 implemented in a home is one that may include both traditional network devices and non-traditional, everyday electronics and appliances that have also been connected to the network 600. Examples of rooms where one may find non-traditional devices connected to the network are the kitchen and laundry rooms. For example, in the kitchen a refrigerator 604, oven 606, microwave 608, and dishwasher 610 may be connected to the network 600, and in the laundry room a washing machine 612 may be connected to the network 600. By attaching these appliances to the network 600, the homeowner can monitor the activity of each device (e.g., whether the dishes are clean, the current state of a turkey in the oven, or the washing machine cycle) or change the operation of each device without needing to be in the same room or even be at home. The appliances can also be configured to resupply themselves. For example, the refrigerator 604 may detect that a certain product is running low, and may place an order with a grocery delivery service for the product to be restocked.

The network 600 may also include environmental appliances, such as a thermostat 602 and a water heater 614. By having these devices connected to the network 600, the homeowner can monitor the current environment of the house (e.g., the air temperature or the hot water temperature), and adjust the settings of these appliances while at home or away. Furthermore, software on the network 600 or on the Internet 650 may track energy usage for the heating and cooling units and the water heater 614. This software may also track energy usage for the other devices, such as the kitchen and laundry room appliances. The energy usage of each appliance may be available to the homeowner over the network 600.

In the living room, various home electronics may be on the network 600. These electronics may have once been fully analog or may have been standalone devices, but now include a network connection for exchanging data with other devices in the network 600 or with the Internet 650. The home electronics in this example include a television 618, a gaming system 620, and a media device 622 (e.g., a video and/or audio player). Each of these devices may play media hosted, for example, on network attached storage 636 located elsewhere in the network 600, or media hosted on the Internet 650.

The network 600 may also include home safety and security devices, such as a smoke detector 616, an electronic door lock 624, and a home security system 626. Having these devices on the network may allow the homeowner to track the information monitored and/or sensed by these devices, both when the homeowner is at home and away from the house. For example, the homeowner may be able to view a video feed from a security camera 628. When the safety and security devices detect a problem, they may also inform the homeowner. For example, the smoke detector 616 may send an alert to the homeowner's smartphone when it detects smoke, or the electronic door lock 624 may alert the homeowner when there has been a forced entry. Furthermore, the homeowner may be able to remotely control these devices. For example, the homeowner may be able to remotely open the electronic door lock 624 for a family member who has been locked out. The safety and security devices may also use their connection to the network to call the fire department or police if necessary.

Another non-traditional device that may be found in the network 600 is the family car 630. The car 630 is one of many devices, such as laptop computers 638, tablet computers 646, and smartphones 642, that connect to the network 600 when at home, and when not at home, may be able to connect to the network 600 over the Internet 650. Connecting to the network 600 over the Internet 650 may provide the homeowner with remote access to his network. The network 600 may be able to provide information to the car 630 and receive information from the car 630 while the car is away. For example, the network 600 may be able to track the location of the car 630 while the car 630 is away.

In the home office and elsewhere around the house, this example network 600 includes some traditional devices connected to the network 600. For example, the home office may include a desktop computer 632 and network attached storage 636. Elsewhere around the house, this example includes a laptop computer 638 and handheld devices such as a tablet computer 646 and a smartphone 642. In this example, a person 640 is also connected to the network 600. The person 640 may be connected to the network 600 wirelessly through personal devices worn by the person 640, such as a smart watch, fitness tracker, or heart rate monitor. The person 640 may alternatively or additionally be connected to the network 600 through a network-enabled medical device, such as a pacemaker, heart monitor, or drug delivery system, which may be worn or implanted.

The desktop computer 632, laptop computer 638, tablet computer 646, and/or smartphone 642 may provide an interface that allows the homeowner to monitor and control the various devices connected to the network. Some of these devices, such as the laptop computer 638, the tablet computer 646, and the smartphone 642 may also leave the house, and provide remote access to the network 600 over the Internet 650. In many cases, however, each device on the network may have its own software for monitoring and controlling only that one device. For example, the thermostat 602 may use one application while the media device 622 uses another, and the wireless network provides yet another. Furthermore, it may be the case that the various sub-networks in the house do not communicate with each other, and/or are viewed and controlled using software that is unique to each sub-network. In many cases, the homeowner may not have one unified and easily understood view of his entire home network 600.

The small network 600 in this example may also include network infrastructure devices, such as a router or switch (not shown) and a wireless base station 634. The wireless base station 634 may provide a wireless network for the house. The router or switch may provide a wired network for the house. The wireless base station 634 may be connected to the router or switch to provide a wireless network that is an extension of the wired network. The router or switch may be connected to a gateway device 648 that connects the network 600 to other networks, including the Internet 650. In some cases, a router or switch may be integrated into the gateway device 648. The gateway device 648 is a cable modem, digital subscriber line (DSL) modem, optical modem, analog modem, or some other device that connects the network 600 to an Internet Services Provider (ISP). The ISP may provide access to the Internet 650. Typically, a home network only has one gateway device 648. In some cases, the network 600 may not be connected to any networks outside of the house. In these cases, information about the network 600 and control of devices in the network 600 may not be available when the homeowner is not connected to the network 600; that is, the homeowner may not have access to his network 600 over the Internet 650.

Typically, the gateway device 648 includes a hardware and/or software firewall. A firewall monitors incoming and outgoing network traffic and, by applying security rules to the network traffic, attempts to keep harmful network traffic out of the network 600. In many cases, a firewall is the only security system protecting the network 600. While a firewall may work for some types of intrusion attempts originating outside the network 600, the firewall may not block all intrusion mechanisms, particularly intrusions mechanisms hidden in legitimate network traffic. Furthermore, while a firewall may block intrusions originating on the Internet 650, the firewall may not detect intrusions originating from within the network 600. For example, an infiltrator may get into the network 600 by connecting to signal from the Wi-Fi base station 634. Alternatively, the infiltrator may connect to the network 600 by physically connecting, for example, to the washing machine 612. The washing machine 612 may have a port that a service technician can connect to service the machine. Alternatively or additionally, the washing machine 612 may have a simple Universal Serial Bus (USB) port. Once an intruder has gained access to the washing machine 612, the intruder may have access to the rest of the network 600.

To provide more security for the network 600, a deception-based network security device 660 can be added to the network 600. In some implementations, the security device 660 is a standalone device that can be added to the network 600 by connecting it to a router or switch. In some implementations, the security device 660 can alternatively or additionally be connected to the network's 600 wireless sub-network by powering on the security device 660 and providing it with Wi-Fi credentials. The security device 660 may have a touchscreen, or a screen and a keypad, for inputting Wi-Fi credentials. Alternatively or additionally, the homeowner may be able to enter network information into the security device by logging into the security device 660 over a Bluetooth™ or Wi-Fi signal using software on a smartphone, tablet, or laptop, or using a web browser. In some implementations, the security device 660 can be connected to a sub-network running over the home's electrical wiring by connecting the security device 660 to a power outlet. In some implementations, the security device 660 may have ports, interfaces, and/or radio antennas for connecting to the various sub-networks that can be included in the network 600. This may be useful, for example, when the sub-networks do not communicate with each other, or do not communicate with each other seamlessly. Once powered on and connected, the security device 660 may self-configure and monitor the security of each sub-network in the network 600 that it is connected to.

In some implementations, the security device 660 may be configured to connect between the gateway device 648 and the network's 600 primary router, and/or between the gateway device 648 and the gateway device's 648 connection to the wall. Connected in one or both of these locations, the security device 660 may be able to control the network's 600 connection with outside networks. For example, the security device can disconnect the network 600 from the Internet 650.

In some implementations, the security device 660, instead of being implemented as a standalone device, may be integrated into one or more of the appliances, home electronics, or computing devices (in this example network 600), or in some other device not illustrated here. For example, the security device 660—or the functionality of the security device 660—may be incorporated into the gateway device 648 or a desktop computer 632 or a laptop computer 638. As another example, the security device 660 can be integrated into a kitchen appliance (e.g., the refrigerator 604 or microwave 608), a home media device (e.g., the television 618 or gaming system 620), or the home security system 626. In some implementations, the security device 660 may be a printed circuit board that can be added to another device without requiring significant changes to the other device. In some implementations, the security device 660 may be implemented using an Application Specific Integrated Circuit (ASIC) or Field Programmable Gate Array (FPGA) that can be added to the electronics of a device. In some implementations, the security device 660 may be implemented as a software module or modules that can run concurrently with the operating system or firmware of a networked device. In some implementations, the security device 660 may have a physical or virtual security barrier that prevents access to it by the device that it is integrated into. In some implementations, the security device's 660 presence in another device may be hidden from the device into which the security device 660 is integrated.

In various implementations, the security device 660 may scan the network 600 to determine which devices are present in the network 600. Alternatively or additionally, the security device 660 may communicate with a central controller in the network 600 (or multiple central controllers, when there are sub-networks, each with their own central controller) to learn which devices are connected to the network 600. In some implementations, the security device 660 may undergo a learning period, during which the security device 660 learns the normal activity of the network 600, such as what time of day appliances and electronics are used, what they are used for, and/or what data is transferred to and from these devices. During the learning period, the security device 660 may alert the homeowner to any unusual or suspicious activity. The homeowner may indicate that this activity is acceptable, or may indicate that the activity is an intrusion. As described below, the security device 660 may subsequently take preventive action against the intrusion.

Once the security device 660 has learned the topology and/or activity of the network 600, the security device 660 may be able to provide deception-based security for the network 600. In some implementations, the security device 660 may deploy security mechanisms that are configured to emulate devices that could be found in the network 600. In some implementations, the security device 660 may monitor activity on the network 600, including watching the data sent between the various devices on the network 600, and between the devices and the Internet 650. The security device 660 may be looking for activity that is unusual, unexpected, or readily identifiable as suspect. Upon detecting suspicious activity in the network 600, the security device 660 may deploy deceptive security mechanisms.

In some implementations, the deceptive security mechanisms are software processes running on the security device 660 that emulate devices that may be found in the network 600. In some implementations, the security device 660 may be assisted in emulating the security devices by another device on the network 600, such as the desktop computer 632. From the perspective of devices connected to the network 600, the security mechanisms appear just like any other device on the network, including, for example, having an Internet Protocol (IP) address, a Media Access Control (MAC) address, and/or some other identification information, having an identifiable device type, and responding to or transmitting data just as would the device being emulated. The security mechanisms may be emulated by the security device 660 itself; thus, while, from the point of view of the network 600, the network 600 appears to have additional devices, no physical equivalent (other than the security device 660) can be found in the house.

The devices and data emulated by a security mechanism are selected such that the security mechanism is an attractive target for intrusion attempts. Thus, the security mechanism may emulate valuable data, and/or devices that are easily hacked into, and/or devices that provide easy access to the reset of the network 600. Furthermore, the security mechanisms emulate devices that are likely to be found in the network 600, such as a second television, a second thermostat, or another laptop computer. In some implementations, the security device 660 may contact a service on the Internet 650 for assistance in selecting devices to emulate and/or for how to configure emulated devices. The security devices 660 may select and configure security mechanisms to be attractive to intrusions attempts, and to deflect attention away from more valuable or vulnerable network assets. Additionally, the security mechanisms can assist in confirming that an intrusion into the network 600 has actually taken place.

In some implementations, the security device 660 may deploy deceptive security mechanisms in advance of detecting any suspicious activity. For example, having scanned the network, the security device 660 may determine that the network 600 includes only one television 618 and one smoke detector 616. The security device 660 may therefore choose to deploy security mechanisms that emulate a second television and a second smoke detector. With security mechanisms preemptively added to the network, when there is an intrusion attempt, the intruder may target the security mechanisms instead of valuable or vulnerable network devices. The security mechanisms thus may serve as decoys and may deflect an intruder away from the network's 600 real devices.

In some implementations, the security mechanisms deployed by the security device 660 may take into account specific requirements of the network 600 and/or the type of devices that can be emulated. For example, in some cases, the network 600 (or a sub-network) may assign identifiers to each device connected to the network 600, and/or each device may be required to adopt a unique identifier. In these cases, the security device 660 may assign an identifier to deployed security mechanisms that do not interfere with identifiers used by actual devices in the network 600. As another example, in some cases, devices on the network 600 may register themselves with a central controller and/or with a central service on the Internet 650. For example, the thermostat 602 may register with a service on the Internet 650 that monitors energy use for the home. In these cases, the security mechanisms that emulate these types of devices may also register with the central controller or the central service. Doing so may improve the apparent authenticity of the security mechanism, and may avoid conflicts with the central controller or central service. Alternatively or additionally, the security device 660 may determine to deploy security mechanisms that emulate other devices, and avoid registering with the central controller or central service.

In some implementations, the security device 660 may dynamically adjust the security mechanisms that it has deployed. For example, when the homeowner adds devices to the network 600, the security device 660 may remove security mechanisms that conflict with the new devices, or change a security mechanism so that the security mechanism's configuration is not incongruous with the new devices (e.g., the security mechanisms should not have the same MAC address as a new device). As another example, when the network owner removes a device from the network 600, the security device 660 may add a security mechanism that mimics the device that was removed. As another example, the security device may change the activity of a security mechanism, for example, to reflect changes in the normal activity of the home, changes in the weather, the time of year, the occurrence of special events, and so on.

The security device 660 may also dynamically adjust the security mechanisms it has deployed in response to suspicious activity it has detected on the network 600. For example, upon detecting suspicious activity, the security device 660 may change the behavior of a security mechanism or may deploy additional security mechanisms. The changes to the security mechanisms may be directed by the suspicious activity, meaning that if, for example, the suspicious activity appears to be probing for a wireless base station 634, the security device 660 may deploy a decoy wireless base station.

Changes to the security mechanisms are meant not only to attract a possible intrusion, but also to confirm that an intrusion has, in fact occurred. Since the security mechanisms are not part of the normal operation of the network 600, normal occupants of the home are not expected to access the security mechanisms. Thus, in most cases, any access of a security mechanism is suspect. Once the security device 660 has detected an access to a security mechanism, the security device 660 may next attempt to confirm that an intrusion into the network 600 has taken place. An intrusion can be confirmed, for example, by monitoring activity at the security mechanism. For example, login attempts, probing of data emulated by the security mechanism, copying of data from the security mechanism, and attempts to log into another part of the network 600 from the security mechanism indicate a high likelihood that an intrusion has occurred.

Once the security device 660 is able to confirm an intrusion into the network 600, the security device 660 may alert the homeowner. For example, the security device 660 may sound an audible alarm, send an email or text message to the homeowner or some other designated persons, and/or send an alert to an application running on a smartphone or tablet. As another example, the security device 660 may access other network devices and, for example, flash lights, trigger the security system's 626 alarm, and/or display messages on devices that include display screens, such as the television 618 or refrigerator 604. In some implementations, depending on the nature of the intrusion, the security device 660 may alert authorities such as the police or fire department.

In some implementations, the security device 660 may also take preventive actions. For example, when an intrusion appears to have originated outside the network 600, the security device 660 may block the network's 600 access to the Internet 650, thus possibly cutting off the intrusion. As another example, when the intrusion appears to have originated from within the network 600, the security device 660 may isolate any apparently compromised devices, for example by disconnecting them from the network 600. When only its own security mechanisms are compromised, the security device 660 may isolate itself from the rest of the network 600. As another example, when the security device 660 is able to determine that the intrusion very likely included physical intrusion into the house, the security device 660 may alert the authorities. The security device 660 may further lock down the house by, for example, locking any electronic door locks 624.

In some implementations, the security device 660 may be able to enable a homeowner to monitor the network 600 when a suspicious activity has been detected, or at any other time. For example, the homeowner may be provided with a software application that can be installed on a smartphone, tablet, desktop, and/or laptop computer. The software application may receive information from the security device 660 over a wired or wireless connection. Alternatively or additionally, the homeowner may be able to access information about his network through a web browser, where the security device 660 formats webpages for displaying the information. Alternatively or additionally, the security device 660 may itself have a touchscreen or a screen and key pad that provide information about the network 600 to the homeowner.

The information provided to the homeowner may include, for example, a list and/or graphic display of the devices connected to the network 600. The information may further provide a real-time status of each device, such as whether the device is on or off, the current activity of the device, data being transferred to or from the device, and/or the current user of the device, among other things. The list or graphic display may update as devices connect and disconnect from the network 600, such as for example laptops and smartphones connecting to or disconnecting from a wireless sub-network in the network 600. The security device 660 may further alert the homeowner when a device has unexpectedly been disconnected from the network 600. The security device 660 may further alert the homeowner when an unknown device connects to the network 600, such as for example when a device that is not known to the homeowner connects to the Wi-Fi signal.

The security device 660 may also maintain historic information. For example, the security device 660 may provide snapshots of the network 600 taken once a day, once a week, or once a month. The security device 660 may further provide a list of devices that have, for example, connected to the wireless signal in the last hour or day, at what times, and for how long. The security device 660 may also be able to provide identification information for these devices, such as MAC addresses or usernames. As another example, the security device 660 may also maintain usage statistics for each device in the network 600, such as for example the times at which each device was in use, what the device was used for, how much energy the device used, and so on.

The software application or web browser or display interface that provides the homeowner with information about his network 600 may also enable the homeowner to make changes to the network 600 or to devices in the network 600. For example, through the security device 660, the homeowner may be able to turn devices on or off, change the configuration of a device, change a password for a device or for the network, and so on.

In some implementations, the security device 660 may also display currently deployed security mechanisms and their configuration. In some implementations, the security device 660 may also display activity seen at the security mechanisms, such as for example a suspicious access to a security mechanism. In some implementations, the security device 660 may also allow the homeowner to customize the security mechanisms. For example, the homeowner may be able to add or remove security mechanisms, modify data emulated by the security mechanisms, modify the configuration of security mechanism, and/or modify the activity of a security mechanism.

A deception-based network security device 660 thus can provide sophisticated security for a small network. The security device 660 may be simple to add to a network, yet provide comprehensive protection against both external and internal intrusions. Moreover, the security device 660 may be able to monitor multiple sub-networks that are each using different protocols. The security device 660, using deceptive security mechanisms, may be able to detect and confirm intrusions into the network 600. The security device 660 may be able to take preventive actions when an intrusion occurs. The security device 660 may also be able to provide the homeowner with information about his network, and possibly also control over devices in the network.

Figure 7:
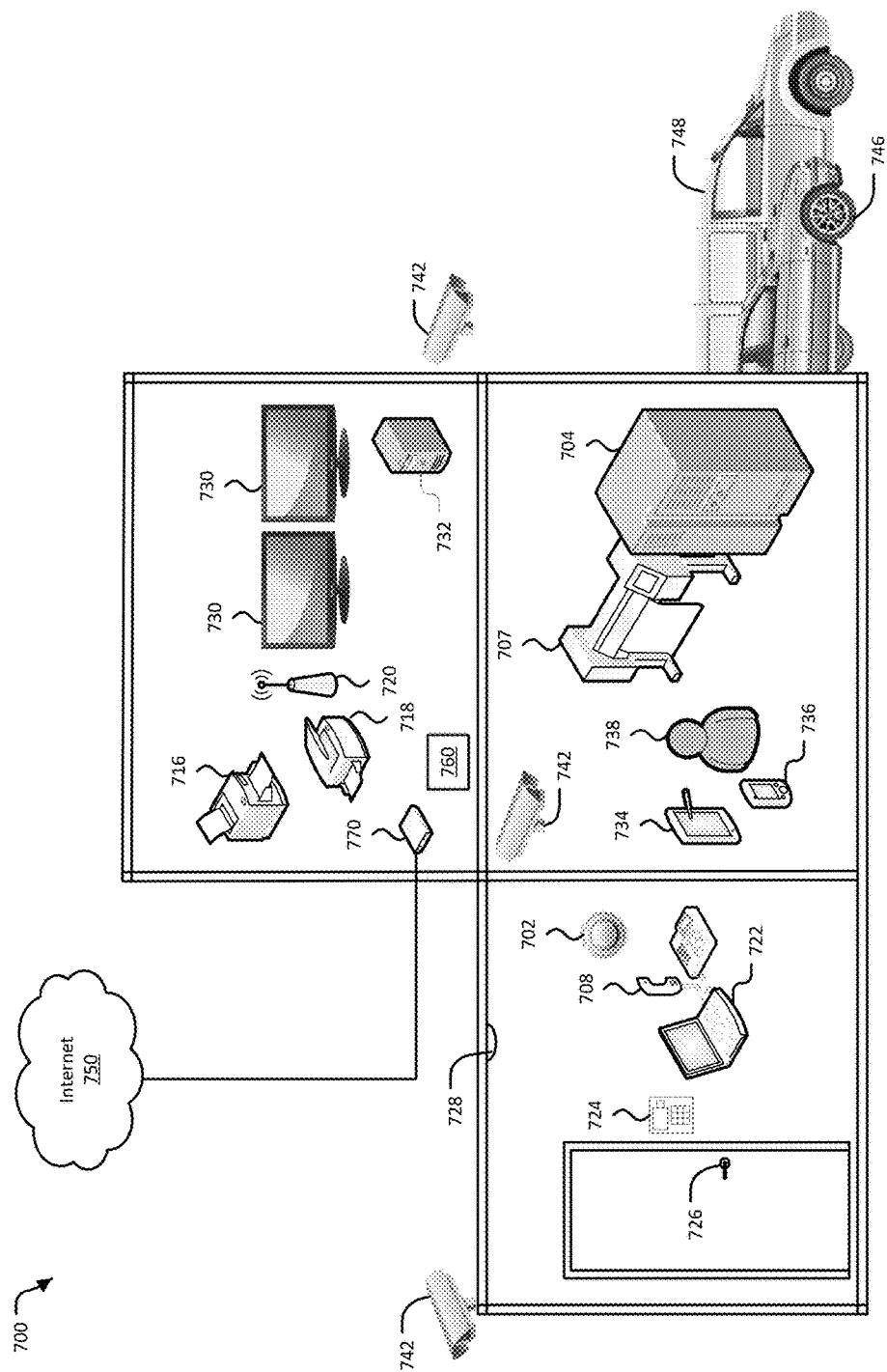
FIG. 7 illustrates an Internet-of-Things network, here implemented in a small business.

FIG. 7 illustrates another example of a small network 700, here implemented in a small business. A network in a small business may have both traditional and non-traditional devices connected to the network 700. Small business networks are also examples of networks that are often implemented with minimal security. A small business owner may not have the financial or technical resources, time, or expertise to configure a sophisticated security infrastructure for her network 700. The business owner, however, is likely able to at least set up a network 700 for the operation of the business. A deception-based network security device that is at least as simple to set up as the network 700 itself may provide inexpensive and simple yet sophisticated security for the network 700.

The example network 700 may be one, single network, or may include multiple sub-networks. For example, the network 700 may include a wired sub-network, such as an Ethernet network, and a wireless sub-network, such as an 802.11 Wi-Fi network. The wired sub-network may be implemented using cables that have been run through the walls and/or ceilings to the various rooms in the business. The cables may be connected to jacks in the walls that devices can connect to in order to connect to the network 700. The wireless network may be implemented using a wireless base station 720, or several wireless base stations, which provide a wireless signal throughout the business. The network 700 may include other wireless sub-networks, such as a short-distance Bluetooth™ network. In some cases, the sub-networks communicate with one another. For example, the Wi-Fi sub-network may be connected to the wired Ethernet sub-network. In some cases, the various sub-networks in the network 700 may not be configured to or able to communicate with each other.

As noted above, the small business network 700 may include both computers, network infrastructure devices, and other devices not traditionally found in a network. The network 700 may also include electronics, machinery, and systems that have been connected to the network 700 according to an Internet-of-Things approach. Workshop machinery that was once purely analog may now have computer controls. Digital workshop equipment may be network-enabled. By connecting shop equipment and machinery to the network 700, automation and efficiency of the business can be improved and orders, materials, and inventory can be tracked. Having more devices on the network 700, however, may increase the number of vulnerabilities in the network 700. Devices that have only recently become network-enabled may be particularly vulnerable because their security systems have not yet been hardened through use and attack. A deception-based network security device may provide simple-to-install and sophisticated security for a network that may otherwise have only minimal security.

The example small business of FIG. 7 includes a front office. In the front office, the network may include devices for administrative tasks. These devices may include, for example, a laptop computer 722 and a telephone 708. These devices may be attached to the network 700 in order to, for example, access records related to the business, which may be stored on a server 732 located elsewhere in the building. In the front office, security devices for the building may also be found, including, for example, security system controls 724 and an electronic door lock 726. Having the security devices on the network 700 may enable the business owner to remotely control access to the building. The business owner may also be able to remotely monitor the security of building, such as for example being able to view video streams from security cameras 742. The front office may also be where environmental controls, such as a thermostat 702, are located. Having the thermostat 702 on the network 700 may allow the business owner to remotely control the temperature settings. A network-enabled thermostat 702 may also track energy usage for the heating and cooling systems. The front office may also include safety devices, such as a network-connected smoke alarm 728. A network-connected smoke alarm may be able to inform the business owner that there is a problem in the building be connecting to the business owner's smartphone or computer.

Another workspace in this example small business is a workshop. In the workshop, the network 700 may include production equipment for producing the goods sold by the business. The production equipment may include, for example, manufacturing machines 704 (e.g. a milling machine, a Computer Numerical Control (CNC) machine, a 3D printer, or some other machine tool) and a plotter 706.

The production equipment may be controlled by a computer on the network 700, and/or may receive product designs over the network 700 and independently execute the designs. In the workshop, one may also find other devices related to the manufacturing of products, such as radiofrequency identification (RFID) scanners, barcode or Quick Response (QR) code generators, and other devices for tracking inventory, as well as electronic tools, hand tools, and so on.

In the workshop and elsewhere in the building, mobile computing devices and people 738 may also be connected to the network 700. Mobile computing devices include, for example, tablet computers 734 and smartphones 736. These devices may be used to control production equipment, track supplies and inventory, receive and track orders, and/or for other operations of the business. People 738 may be connected to the network through network-connected devices worn or implanted in the people 738, such as for example smart watches, fitness trackers, heart rate monitors, drug delivery systems, pacemakers, and so on.

At a loading dock, the example small business may have a delivery van 748 and a company car 746. When these vehicles are away from the business, they may be connected to the network 700 remotely, for example over the Internet 750. By being able to communicate with the network 700, the vehicles may be able to receive information such as product delivery information (e.g., orders, addresses, and/or delivery times), supply pickup instructions, and so on. The business owner may also be able to track the location of these vehicles from the business location, or over the Internet 750 when away from the business, and/or track who is using the vehicles.

The business may also have a back office. In the back office, the network 700 may include traditional network devices, such as computers 730, a multi-function printer 716, a scanner 718, and a server 732. In this example, the computers 730 may be used to design products for manufacturing in the workshop, as well as for management of the business, including tracking orders, supplies, inventory, and/or human resources records. The multi-function printer 716 and scanner 718 may support the design work and the running of the business. The server 732 may store product designs, orders, supply records, and inventory records, as well as administrative data, such as accounting and human resources data.

The back office may also be where a gateway device 770 is located. The gateway device 770 connects the small business to other networks, including the Internet 750. Typically, the gateway device 770 connects to an ISP, and the ISP provides access to the Internet 750. In some cases, a router may be integrated into the gateway device 770. In some cases, gateway device 770 may be connected to an external router, switch, or hub, not illustrated here. In some cases, the network 700 is not connected to any networks outside of the business's own network 700. In these cases, the network 700 may not have a gateway device 770.

The back office is also where the network 700 may have a deception-based network security device 760. The security device 760 may be a standalone device that may be enabled as soon as it is connected to the network 700. Alternatively or additionally, the security device 760 may be integrated into another device connected to the network 700, such as the gateway device 770, a router, a desktop computer 730, a laptop computer 722, the multi-function printer 716, or the thermostat 702, among others. When integrated into another device, the security device 760 may use the network connection of the other device, or may have its own network connection for connecting to the network 700. The security device 760 may connect to the network 700 using a wired connection or a wireless connection.

Once connected to the network 700, the security device 760 may begin monitoring the network 700 for suspect activity. In some implementations, the security device 760 may scan the network 700 to learn which devices are connected to the network 700. In some cases, the security device 760 may learn the normal activity of the network 700, such as what time the various devices are used, for how long, by whom, for what purpose, and what data is transferred to and from each device, among other things.

In some implementations, having learned the configuration and/or activity of the network 700, the security device 760 may deploy deceptive security mechanisms. These security mechanisms may emulate devices that may be found on the network 700, including having an identifiable device type and/or network identifiers (such as a MAC address and/or IP address), and being able to send and receive network traffic that a device of a certain time would send and receive. For example, for the example small business, the security device 760 may configure a security mechanism to emulate a 3D printer, a wide-body scanner, or an additional security camera. The security device 760 may further avoid configuring a security mechanism to emulate a device that is not likely to be found in the small business, such as a washing machine. The security device 760 may use the deployed security mechanisms to monitor activity on the network 700.

In various implementations, when the security device 760 detects suspect activity, the security device 760 may deploy additional security mechanisms. These additional security mechanisms may be selected based on the nature of suspect activity. For example, when the suspect activity appears to be attempting to break into the shop equipment, the security device 760 may deploy a security mechanism that looks like shop equipment that is easy to hack. In some implementations, the security device 760 may deploy security mechanisms only after detecting suspect activity on the network 700.

The security device 760 selects devices to emulate that are particularly attractive for an infiltration, either because the emulated device appears to have valuable data or because the emulated device appears to be easy to infiltrate, or for some other reason. In some implementations, the security device 760 connects to a service on the Internet 750 for assistance in determining which devices to emulate and/or how to configure the emulated device. Once deployed, the security mechanisms serve as decoys to attract the attention of a possible infiltrator away from valuable network assets. In some implementations, the security device 760 emulates the security mechanisms using software processes. In some implementations, the security device 760 may be assisted in emulating security mechanisms by a computer 730 on the network.

In some implementations, the security device 760 may deploy security mechanisms prior to detecting suspicious activity on the network 700. In these implementations, the security mechanisms may present more attractive targets for a possible, future infiltration, so that if an infiltration occurs, the infiltrator will go after the security mechanisms instead of the actual devices on the network 700.

In various implementations, the security device 760 may also change the security mechanisms that it has deployed. For example, the security device 760 may add or remove security mechanisms as the operation of the business changes, as the activity on the network 700 changes, as devices are added or removed from the network 700, as the time of year changes, and so on.

Besides deflecting a possible network infiltration away from valuable or vulnerable network devices, the security device 760 may use the security mechanisms to confirm that the network 700 has been infiltrated. Because the security mechanisms are not part of actual devices in use by the business, any access to them over the network is suspect. Thus, once the security device 760 detects an access to one of its security mechanisms, the security device 760 may attempt to confirm that this access is, in fact, an unauthorized infiltration of the network 700.

To confirm that a security mechanism has been infiltrated, the security device 760 may monitor activity seen at the security mechanism. The security device 760 may further deploy additional security mechanisms, to see if, for example, it can present an even more attractive target to the possible infiltrator. The security device 760 may further look for certain activity, such as log in attempts to other devices in the network, attempts to examine data on the security mechanism, attempts to move data from the security mechanism to the Internet 750, scanning of the network 700, password breaking attempts, and so on.

Once the security device 760 has confirmed that the network 700 has been infiltrated, the security device 760 may alert the business owner. For example, the security device 760 may sound an audible alarm, email or send text messages to the computers 730 and/or handheld devices 734, 736, send a message to the business's cars 746, 748, flash lights, or trigger the security system's 724 alarm. In some implementations, the security device 760 may also take preventive measures. For example, the security device 760 may disconnect the network 700 from the Internet 750, may disconnect specific devices from the network 700 (e.g., the server 732 or the manufacturing machines 704), may turn some network-connected devices off, and/or may lock the building.

In various implementations, the security device 760 may allow the business owner to monitor her network 700, either when an infiltration is taking place or at any other time. For example, the security device 760 may provide a display of the devices currently connected to the network 700, including flagging any devices connected to the wireless network that do not appear to be part of the business. The security device 760 may further display what each device is currently doing, who is using them, how much energy each device is presently using, and/or how much network bandwidth each device is using. The security device 760 may also be able to store this information and provide historic configuration and/or usage of the network 700.

The security device 760 may have a display it can use to show information to the business owner. Alternatively or additionally, the security device 760 may provide this information to a software application that can run on a desktop or laptop computer, a tablet, or a smartphone. Alternatively or additionally, the security device 760 may format this information for display through a web browser. The business owner may further be able to control devices on the network 700 through an interface provided by the security device 760, including, for example, turning devices on or off, adjusting settings on devices, configuring user accounts, and so on. The business owner may also be able to view any security mechanisms presently deployed, and may be able to re-configure the security mechanisms, turn them off, or turn them on.

IoT networks can also include industrial control systems. Industrial control system is a general term that encompasses several types of control systems, including supervisory control and data acquisition (SCADA) systems, distributed control systems (DCS) and other control system configurations, such as Programmable Logic Controllers (PLCs), often found in the industrial sectors and infrastructures. Industrial control systems are often found in industries such as electrical, water and wastewater, oil and natural gas, chemical, transportation, pharmaceutical, pulp and paper, food and beverage, and discrete manufacturing (e.g., automotive, aerospace, and durable goods). While a large percentage of industrial control systems may be privately owned and operated, federal agencies also operate many industrial processes, such as air traffic control systems and materials handling (e.g., Postal Service mail handling).

Figure 8:
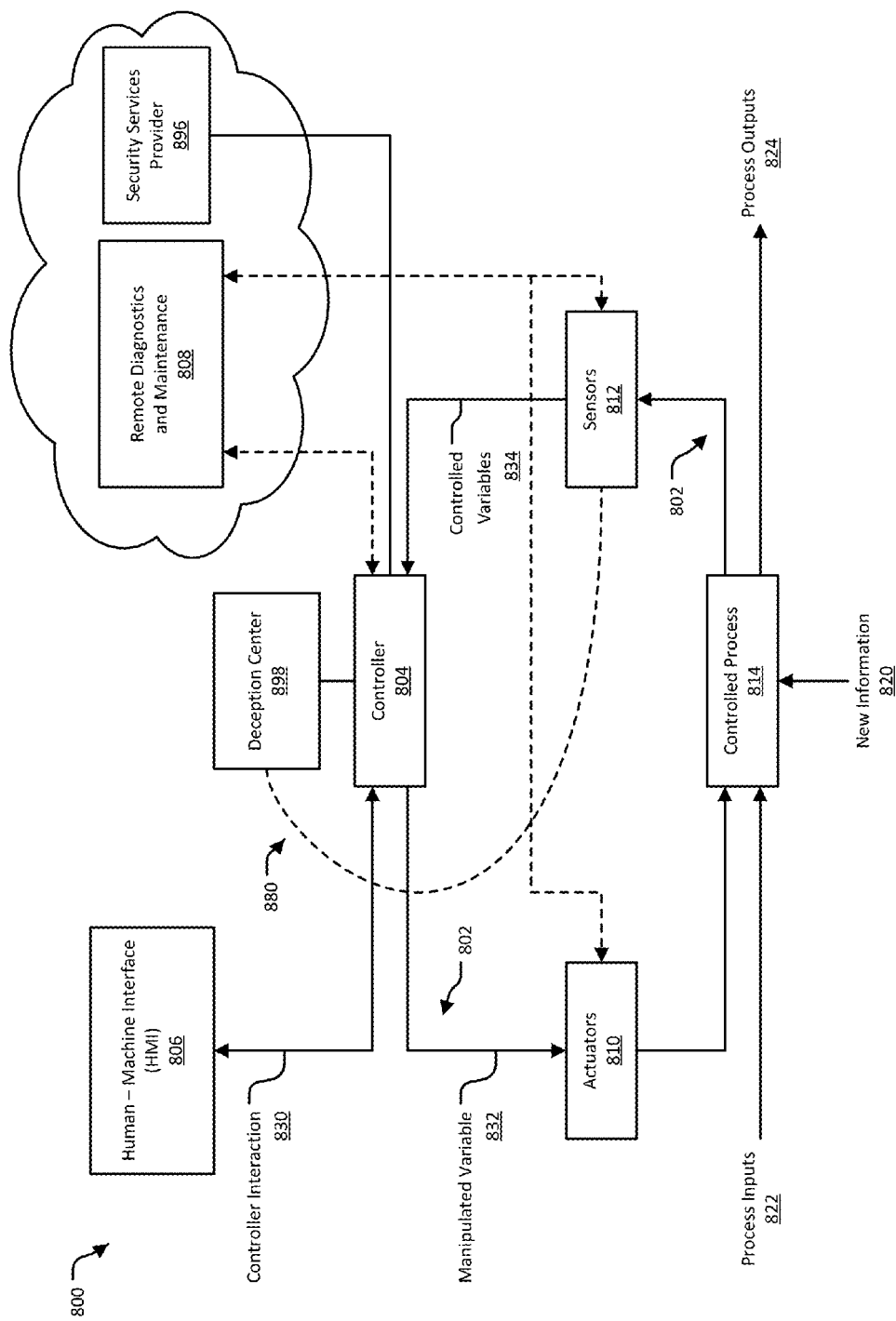
FIG. 8 illustrates an example of the basic operation of an industrial control system.

FIG. 8 illustrates an example of the basic operation of an industrial control system 800. Generally, an industrial control system 800 may include a control loop 802, a human-machine interface 806, and remote diagnostics and maintenance 808. In some implementations, the example industrial control system can be defended by a network threat detection and analysis system, which can include a deception center 898 and a security services provider 896.

A control loop 802 may consist of sensors 812, controller 804 hardware such as PLCs, actuators 810, and the communication of variables 832, 834. The sensors 812 may be used for measuring variables in the system, while the actuators 810 may include, for example, control valves breakers, switches, and motors. Some of the sensors 812 may be deceptions sensors. Controlled variables 834 may be transmitted to the controller 804 from the sensors 812. The controller 804 may interpret the controlled variables 834 and generates corresponding manipulated variables 832, based on set points provided by controller interaction 830. The controller 804 may then transmit the manipulated variables 832 to the actuators 810. The actuators 810 may drive a controlled process 814 (e.g., a machine on an assembly line). The controlled process 814 may accept process inputs 822 (e.g., raw materials) and produce process outputs 824 (e.g., finished products). New information 820 provided to the controlled process 814 may result in new sensor 812 signals, which identify the state of the controlled process 814 and which may also transmitted to the controller 804.

In some implementations, at least some of the sensors 812 can also provide the deception center 898 with visibility into the industrial control system 800, such as for example being able to present or project deceptive security mechanisms into the industrial control system. Additionally, in various implementations, the sensors 812 may provide a portal through which a suspected attack on the industrial control system can be redirected to the deception center 898. The deception center 898 and the sensors 810 may be able to communicate using network tunnels 880.

The deception center 898 provides network security for the industrial control system 800 by deploying security mechanisms into the industrial control system 800, monitoring the industrial control system through the security mechanisms, detecting and redirecting apparent threats, and analyzing network activity resulting from the apparent threat. In some implementations, the industrial control system 800 can include more than one deception center 898. In some implementations, the deception center may be located off-site, such as on the Internet.

In some implementations, the deception center 898 may interact with a security services provider 896 located outside the industrial control system 800. The security services provider 896 may act as a central hub for providing security to multiple sites that are part of the industrial control system 800, and/or for multiple separate, possibly unrelated, industrial control systems. For example, the security services provider 896 may communicate with multiple deception centers 898 that each provide security for a different industrial control system 800 for the same organization. As another example, the security services provider 896 may coordinate the activities of the deception center 898 and the sensors 812, such as enabling the deception center 898 and the sensors 812 to connect to each other. In some implementations, the security services provider 896 is located outside the industrial control system 800. In some implementations, the security services provider 896 is controlled by a different entity than the entity that controls the site network. For example, the security services provider 896 may be an outside vendor. In some implementations, the security services provider 896 is controlled by the same entity as that controls the industrial control system. In some implementations, the network security system does not include a security services provider 896.

The human-machine interface 806 provides operators and engineers with an interface for controller interaction 830. Controller interaction 830 may include monitoring and configuring set points and control algorithms, and adjusting and establishing parameters in the controller 804. The human-machine interface 806 typically also receives information from the controller 804 that allows the human-machine interface 806 to display process status information and historical information about the operation of the control loop 802.

The remote diagnostics and maintenance 808 utilities are typically used to prevent, identify, and recover from abnormal operation or failures. For diagnostics, the remote diagnostics and maintenance 808 utilities may monitor the operation of each of the controller 804, sensors 812, and actuators 810. To recover after a problem, the remote diagnostics and maintenance 808 utilities may provide recovery information and instructions to one or more of the controller 804, sensors 812, and/or actuators 810.

A typical industrial control system contains many control loops, human-machine interfaces, and remote diagnostics and maintenance tools, built using an array of network protocols on layered network architectures. In some cases, multiple control loops are nested and/or cascading, with the set point for one control loop being based on process variables determined by another control loop. Supervisory-level control loops and lower-level control loops typically operate continuously over the duration of a process, with cycle times ranging from milliseconds to minutes.

One type of industrial control system that may include many control loops, human-machine interfaces, and remote diagnostics and maintenance tools is a supervisory control and data acquisition (SCADA) system. SCADA systems are used to control dispersed assets, where centralized data acquisition is typically as important as control of the system. SCADA systems are used in distribution systems such as, for example, water distribution and wastewater collection systems, oil and natural gas pipelines, electrical utility transmission and distribution systems, and rail and other public transportation systems, among others. SCADA systems typically integrate data acquisition systems with data transmission systems and human-machine interface software to provide a centralized monitoring and control system for numerous process inputs and outputs. SCADA systems are typically designed to collect field information, transfer this information to a central computer facility, and to display the information to an operator in a graphic and/or textual manner. Using this displayed information, the operator may, in real time, monitor and control an entire system from a central location. In various implementations, control of any individual sub-system, operation, or task can be automatic, or can be performed by manual commands.

Figure 9:
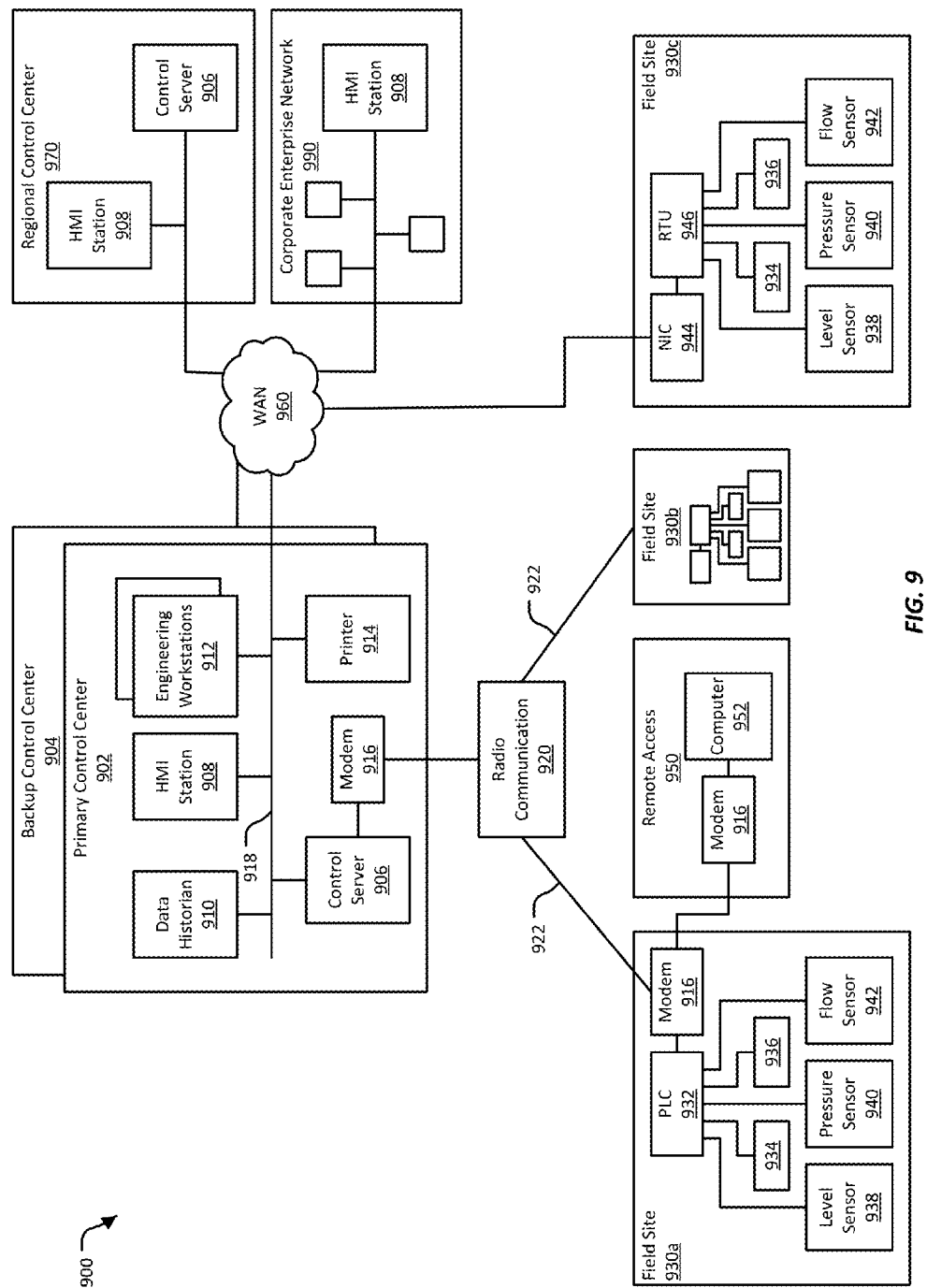
FIG. 9 illustrates an example of a SCADA system, here used for distributed monitoring and control.

FIG. 9 illustrates an example of a SCADA system 900, here used for distributed monitoring and control. This example SCADA system 900 includes a primary control center 902 and three field sites 930a-930c. A backup control center 904 provides redundancy in case of there is a malfunction at the primary control center 902. The primary control center 902 in this example includes a control server 906—which may also be called a SCADA server or a Master Terminal Unit (MTU)—and a local area network (LAN) 918. The primary control center 902 may also include a human-machine interface station 908, a data historian 910, engineering workstations 912, and various network equipment such as printers 914, each connected to the LAN 918.

The control server 906 typically acts as the master of the SCADA system 900. The control server 906 typically includes supervisory control software that controls lower-level control devices, such as Remote Terminal Units (RTUs) and PLCs, located at the field sites 930a-930c. The software may tell the system 900 what and when to monitor, what parameter ranges are acceptable, and/or what response to initiate when parameters are outside of acceptable values.

The control server 906 of this example may access Remote Terminal Units and/or PLCs at the field sites 930a-930c using a communications infrastructure, which may include radio-based communication devices, telephone lines, cables, and/or satellites. In the illustrated example, the control server 906 is connected to a modem 916, which provides communication with serial-based radio communication 920, such as a radio antenna. Using the radio communication 920, the control server 906 can communicate with field sites 930a-930b using radiofrequency signals 922. Some field sites 930a-930b may have radio transceivers for communicating back to the control server 906.

A human-machine interface station 908 is typically a combination of hardware and software that allows human operators to monitor the state of processes in the SCADA system 900. The human-machine interface station 908 may further allow operators to modify control settings to change a control objective, and/or manually override automatic control operations, such as in the event of an emergency. The human-machine interface station 908 may also allow a control engineer or operator to configure set points or control algorithms and parameters in a controller, such as a Remote Terminal Unit or a PLC. The human-machine interface station 908 may also display process status information, historical information, reports, and other information to operators, administrators, mangers, business partners, and other authorized users. The location, platform, and interface of a human-machine interface station 908 may vary. For example, the human-machine interface station 908 may be a custom, dedicated platform in the primary control center 902, a laptop on a wireless LAN, or a browser on a system connected to the Internet.

The data historian 910 in this example is a database for logging all process information within the SCADA system 900. Information stored in this database can be accessed to support analysis of the system 900, for example for statistical process control or enterprise level planning.

The backup control center 904 may include all or most of the same components that are found in the primary control center 902. In some cases, the backup control center 904 may temporarily take over for components at the primary control center 902 that have failed or have been taken offline for maintenance. In some cases, the backup control center 904 is configured to take over all operations of the primary control center 902, such as when the primary control center 902 experiences a complete failure (e.g., is destroyed in a natural disaster).

The primary control center 902 may collect and log information gathered by the field sites 930a-930c and display this information using the human-machine interface station 908. The primary control center 902 may also generate actions based on detected events. The primary control center 902 may, for example, poll field devices at the field sites 930a-930c for data at defined intervals (e.g., 5 or 60 seconds), and can send new set points to a field device as required. In addition to polling and issuing high-level commands, the primary control center 902 may also watch for priority interrupts coming from the alarm systems at the field sites 930a-930c.

In this example, the primary control center 902 uses point-to-point connections to communication with three field sites 930a-930c, using radio telemetry for two communications with two of the field sites 930a-930b. In this example, the primary control center 902 uses a wide area network (WAN) 960 to communicate with the third field site 930c. In other implementations, the primary control center 902 may use other communication topologies to communicate with field sites. Other communication topologies include rings, stars, meshes, trees, lines or series, and busses or multi-drops, among others. Standard and proprietary communication protocols may be used to transport information between the primary control center 902 and field sites 930a-930c. These protocols may use telemetry techniques such as provided by telephone lines, cables, fiber optics, and/or radiofrequency transmissions such as broadcast, microwave, and/or satellite communications.

The field sites 930a-930c in this example perform local control of actuators and monitor local sensors. For example, a first field site 930a may include a PLC 932. A PLC is a small industrial computer originally designed to perform the logic functions formerly executed by electrical hardware (such as relays, switches, and/or mechanical timers and counters). PLCs have evolved into controllers capable of controlling complex processes, and are used extensively in both SCADA systems and distributed control systems. Other controllers used at the field level include process controllers and Remote Terminal Units, which may provide the same level of control as a PLC but may be designed for specific control applications. In SCADA environments, PLCs are often used as field devices because they are more economical, versatile, flexible, and configurable than special-purpose controllers.

The PLC 932 at a field site, such as the first field site 930a, may control local actuators 934, 936 and monitor local sensors 938, 940, 942. Examples of actuators include valves 934 and pumps 936, among others. Examples of sensors include level sensors 938, pressure sensors 940, and flow sensors 942, among others. Any of the actuators 934, 936 or sensors 938, 940, 942 may be "smart" actuators or sensors, more commonly called intelligent electronic devices (IEDs). Intelligent electronic devices may include intelligence for acquiring data, communicating with other devices, and performing local processing and control. An intelligent electronic device could combine an analog input sensor, analog output, low-level control capabilities, a communication system, and/or program memory in one device. The use of intelligent electronic devices in SCADA systems and distributed control systems may allow for automatic control at the local level. Intelligent electronic devices, such as protective relays, may communicate directly with the control server 906. Alternatively or additionally, a local Remote Terminal Unit may poll intelligent electronic devices to collect data, which it may then pass to the control server 906.

Field sites 930a-930c are often equipped with remote access capability that allows field operators to perform remote diagnostics and repairs. For example, the first remote 930a may include a modem 916 connected to the PLC 932. A remote access 950 site may be able to, using a dial up connection, connect to the modem 916. The remote access 950 site may include its own modem 916 for dialing into to the field site 930a over a telephone line. At the remote access 950 site, an operator may use a computer 952 connected to the modem 916 to perform diagnostics and repairs on the first field site 930a.

The example SCADA system 900 includes a second field site 930b, which may be provisioned in substantially the same way as the first field site 930a, having at least a modem and a PLC or Remote Terminal that controls and monitors some number of actuators and sensors.

The example SCADA system 900 also includes a third field site 930c that includes a network interface card (NIC) 944 for communicating with the system's 900 WAN 960. In this example, the third field site 930c includes a Remote Terminal Unit 946 that is responsible for controlling local actuators 934, 936 and monitoring local sensors 938, 940, 942. A Remote Terminal Unit, also called a remote telemetry unit, is a special-purpose data acquisition and control unit typically designed to support SCADA remote stations. Remote Terminal Units may be field devices equipped with wireless radio interfaces to support remote situations where wire-based communications are unavailable. In some cases, PLCs are implemented as Remote Terminal Units.

The SCADA system 900 of this example also includes a regional control center 970 and a corporate enterprise network 990. The regional control center 970 may provide a higher level of supervisory control. The regional control center 970 may include at least a human-machine interface station 908 and a control server 906 that may have supervisory control over the control server 906 at the primary control center 902. The corporate enterprise network 990 typically has access, through the system's 900 WAN 960, to all the control centers 902, 904 and to the field sites 930a-930c. The corporate enterprise network 990 may include a human-machine interface station 908 so that operators can remotely maintain and troubleshoot operations.

Another type of industrial control system is the distributed control system (DCS). Distributed control systems are typically used to control production systems within the same geographic location for industries such as oil refineries, water and wastewater management, electric power generation plants, chemical manufacturing plants, and pharmaceutical processing facilities, among others. These systems are usually process control or discrete part control systems. Process control systems may be processes that run continuously, such as manufacturing processes for fuel or steam flow in a power plant, for petroleum production in a refinery, or for distillation in a chemical plant. Discrete part control systems have processes that have distinct processing steps, typically with a distinct start and end to each step, such as found in food manufacturing, electrical and mechanical parts assembly, and parts machining. Discrete-based manufacturing industries typically conduct a series of steps on a single item to create an end product.

A distributed control system typically uses a centralized supervisory control loop to mediate a group of localized controllers that share the overall tasks of carrying out an entire production process. By modularizing the production system, a distributed control system may reduce the impact of a single fault on the overall system. A distributed control system is typically interfaced with a corporate network to give business operations a view of the production process.

Figure 10:
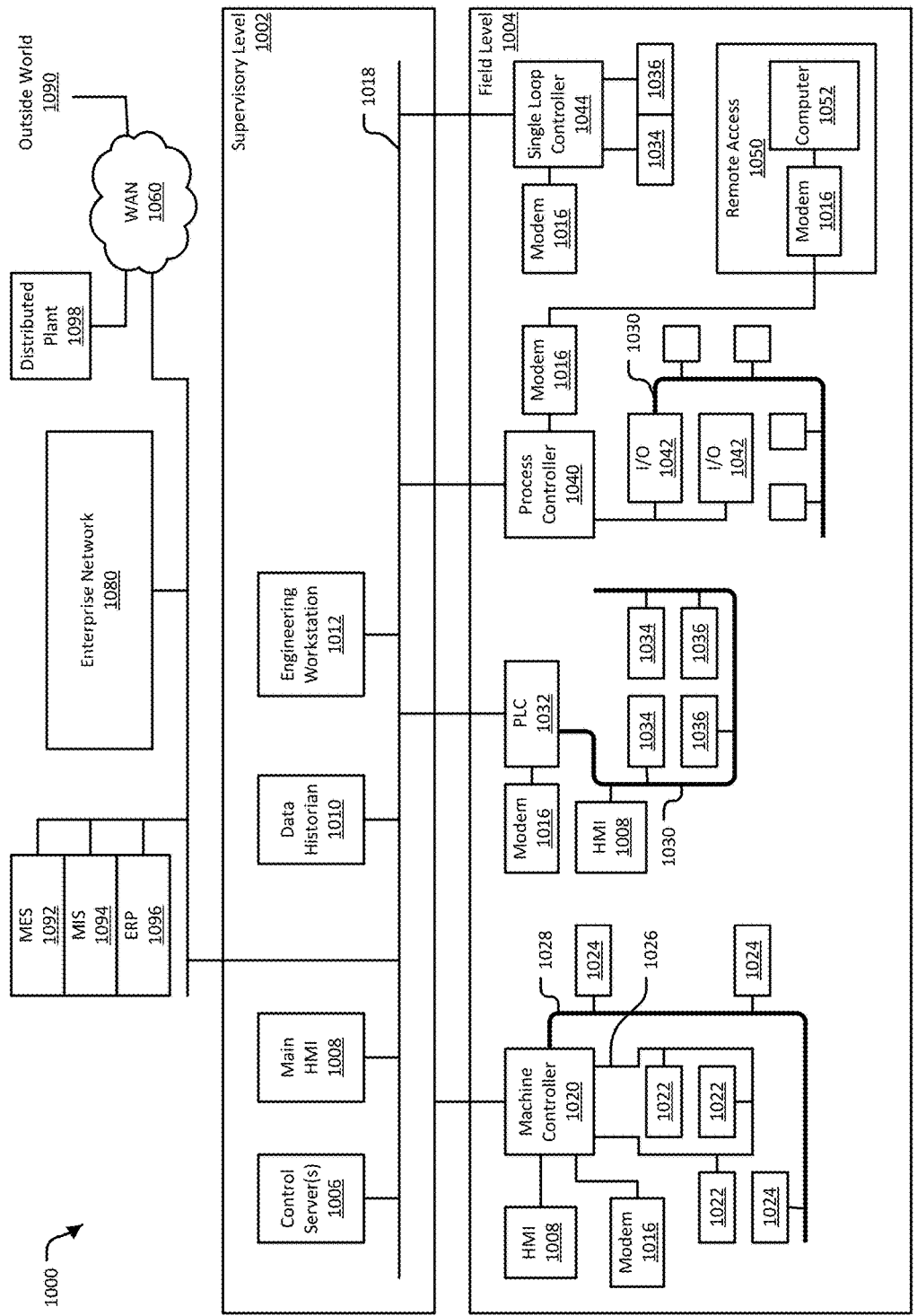
FIG. 10 illustrates an example of a distributed control.

FIG. 10 illustrates an example of a distributed control system 1000. This example distributed control system 1000 encompasses a production facility, including bottom-level production processes at a field level 1004, supervisory control systems at a supervisory level 1002, and a corporate or enterprise layer.

At the supervisory level 1002, a control server 1006, operating as a supervisory controller, may communicate with subordinate systems via a control network 1018. The control server 1006 may send set points to distributed field controllers, and may request data from the distributed field controllers. The supervisory level 1002 may include multiple control servers 1006, with one acting as the primary control server and the rest acting as redundant, back-up control servers. The supervisory level 1002 may also include a main human-machine interface 1008 for use by operators and engineers, a data historian 1010 for logging process information from the system 1000, and engineering workstations 1012.

At the field level 1004, the system 1000 may include various distributed field controllers. In the illustrated example, the distributed control system 1000 includes a machine controller 1020, a PLC 1032, a process controller 1040, and a single loop controller 1044. The distributed field controllers may each control local process actuators, based on control server 1006 commands and sensor feedback from local process sensors.

In this example, the machine controller 1020 drives a motion control network 1026. Using the motion control network 1026, the machine controller 1020 may control a number of servo drives 1022, which may each drive a motor. The machine controller 1020 may also drive a logic control bus 1028 to communicate with various devices 1024. For example, the machine controller 1020 may use the logic control bus 1028 to communicate with pressure sensors, pressure regulators, and/or solenoid valves, among other devices. One or more of the devices 1024 may be an intelligent electronic device. A human-machine interface 1008 may be attached to the machine controller 1020 to provide an operator with local status information about the processes under control of the machine controller 1020, and/or local control of the machine controller 1020. A modem 1016 may also be attached to the machine controller 1020 to provide remote access to the machine controller 1020.

The PLC 1032 in this example system 1000 uses a fieldbus 1030 to communicate with actuators 1034 and sensors 1036 under its control. These actuators 1034 and sensors 1036 may include, for example, direct current (DC) servo drives, alternating current (AC) servo drives, light towers, photo eyes, and/or proximity sensors, among others. A human-machine interface 1008 may also be attached to the fieldbus 1030 to provide operators with local status and control for the PLC 1032. A modem 1016 may also be attached to the PLC 1032 to provide remote access to the PLC 1032.

The process controller 1040 in this example system 1000 also uses a fieldbus 1030 to communicate with actuators and sensors under its control, one or more of which may be intelligent electronic devices. The process controller 1040 may communicate with its fieldbus 1030 through an input/output (I/O) server 1042. An I/O server is a control component typically responsible for collecting, buffering, and/or providing access to process information from control subcomponents. An I/O server may be used for interfacing with third-party control components. Actuators and sensors under control of the process controller 1040 may include, for example, pressure regulators, pressure sensors, temperature sensors, servo valves, and/or solenoid valves, among others. The process controller 1040 may be connected to a modem 1016 so that a remote access 1050 site may access the process controller 1040. The remote access 1050 site may include a computer 1052 for use by an operator to monitor and control the process controller 1040. The computer 1052 may be connected to a local modem 1016 for dialing in to the modem 1016 connected to the process controller 1040.

The illustrated example system 1000 also includes a single loop controller 1044. In this example, the single loop controller 1044 interfaces with actuators 1034 and sensors 1036 with point-to-point connections, instead of a fieldbus. Point-to-point connections require a dedicated connection for each actuator 1034 and each sensor 1036. Fieldbus networks, in contrast, do not need point-to-point connections between a controller and individual field sensors and actuators. In some implementations, a fieldbus allows greater functionality beyond control, including field device diagnostics. A fieldbus can accomplish control algorithms within the fieldbus, thereby avoiding signal routing back to a PLC for every control operation. Standard industrial communication protocols are often used on control networks and fieldbus networks.

The single loop controller 1044 in this example is also connected to a modem 1016, for remote access to the single loop controller.

In addition to the supervisory level 1002 and field level 1004 control loops, the distributed control system 1000 may also include intermediate levels of control. For example, in the case of a distributed control system controlling a discrete part manufacturing facility, there could be an intermediate level supervisor for each cell within the plant. This intermediate level supervisor could encompass a manufacturing cell containing a machine controller that processes a part, and a robot controller that handles raw stock and final products. Additionally, the distributed control system could include several of these cells that manage field-level controllers under the main distributed control system supervisory control loop.

In various implementations, the distributed control system may include a corporate or enterprise layer, where an enterprise network 1080 may connect to the example production facility. The enterprise network 1080 may be, for example, located at a corporate office co-located with the facility, and connected to the control network 1018 in the supervisory level 1002. The enterprise network 1080 may provide engineers and managers with control and visibility into the facility. The enterprise network 1080 may further include Manufacturing Execution Systems (MES) 1092, control systems for managing and monitoring work-in-process on a factory floor. An MES can track manufacturing information in real time, receiving up-to-the-minute data from robots, machine monitors and employees. The enterprise network 1080 may also include Management Information Systems (MIS) 1094, software and hardware applications that implement, for example, decision support systems, resource and people management applications, project management, and database retrieval applications, as well as basic business functions such as order entry and accounting. The enterprise network 1080 may further include Enterprise Resource Planning (ERP) systems 1096, business process management software that allows an organization to use a system of integrated applications to manage the business and automate many back office functions related to technology, services, and human resources.

The enterprise network 1080 may further be connected to a WAN 1060. Through the WAN 1060, the enterprise network 1080 may connect to a distributed plant 1098, which may include control loops and supervisory functions similar to the illustrated facility, but which may be at a different geographic location. The WAN 1060 may also connect the enterprise network to the outside world 1090, that is, to the Internet and/or various private and public networks. In some cases, the WAN 1060 may itself include the Internet, so that the enterprise network 1080 accesses the distributed plant 1098 over the Internet.

As described above, SCADA systems and distributed control systems use Programmable Logic Controllers (PLCs) as the control components of an overall hierarchical system. PLCs can provide local management of processes through feedback control, as described above. In a SCADA implementation, a PLC can provide the same functionality as a Remote Terminal Unit. When used in a distributed control system, PLCs can be implemented as local controllers within a supervisory scheme. PLCs can have user-programmable memory for storing instructions, where the instructions implement specific functions such as I/O control, logic, timing, counting, proportional-integral-derivative (PID) control, communication, arithmetic, and data and file processing.

Figure 11:
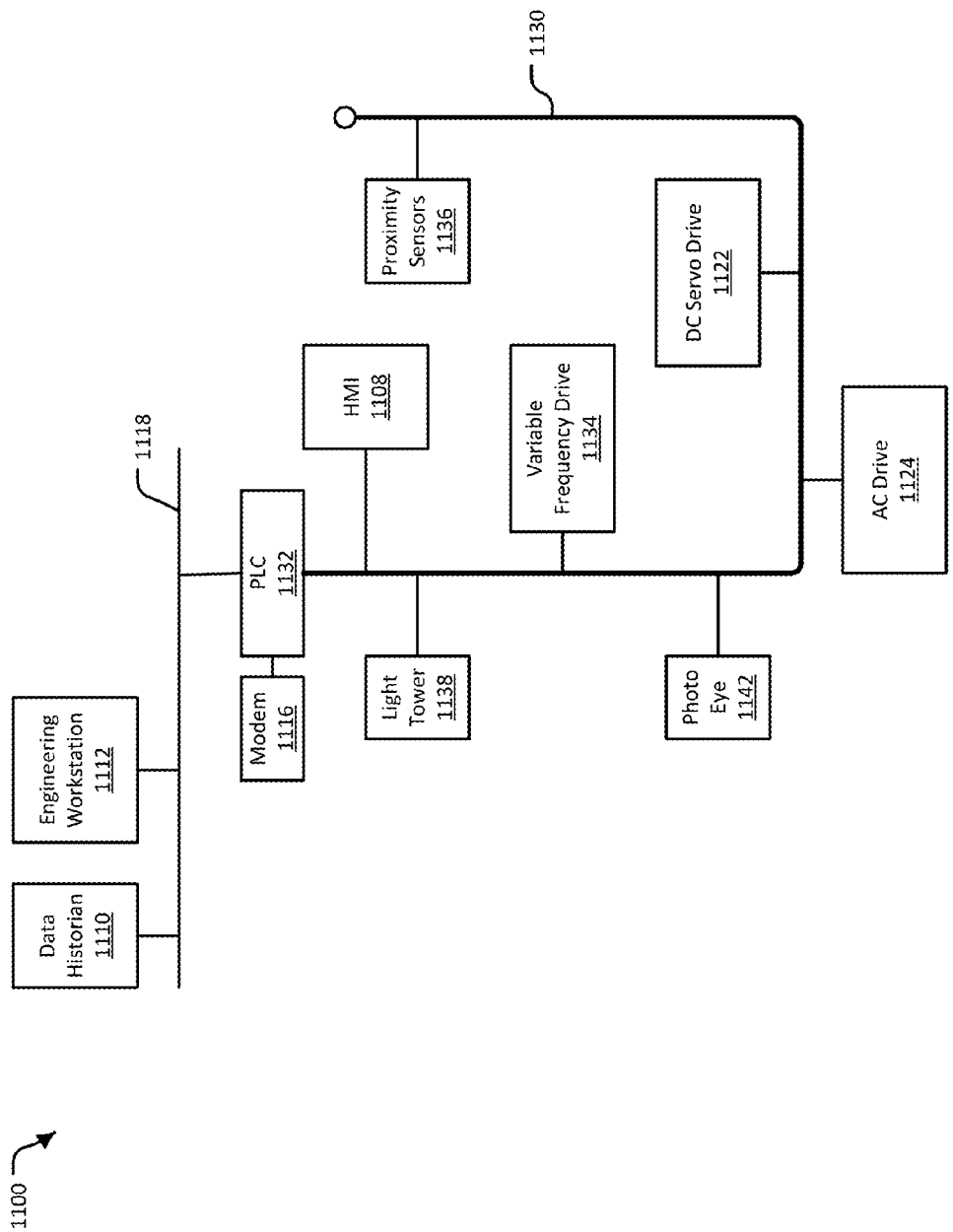
FIG. 11 illustrates an example of a PLC implemented in a manufacturing control process

FIG. 11 illustrates an example of a PLC 1132 implemented in a manufacturing control process 1100. The PLC 1132 in this example monitors and controls various devices over fieldbus network 1130. The PLC 1132 may be connected to a LAN 1118. An engineering workstation 1112 may also be connected to the LAN 1118, and may include a programming interface that provides access to the PLC 1132. A data historian 1110 on the LAN 1118 may store data produced by the PLC 1132. The PLC 1132 can also be connected to a modem 1116.

The PLC 1132 in this example may control a number of devices attached to its fieldbus network 1130. These devices may include actuators, such as a DC servo drive 1122, an AC drive 1124, a variable frequency drive 1134, and/or a light tower 1138. The PLC 1132 may also monitor sensors connected to the fieldbus network 1130, such as proximity sensors 1136, and/or a photo eye 1142. A human-machine interface 1108 may also be connected to the fieldbus network 1130, and may provide local monitoring and control of the PLC 1132.

Most industrial control systems were developed years ago, long before public and private networks, desktop computing, or the Internet were a common part of business operations. These well-established industrial control systems were designed to meet performance, reliability, safety, and flexibility requirements. In most cases, they were physically isolated from outside networks and based on proprietary hardware, software, and communication protocols that included basic error detection and correction capabilities, but lacked secure communication capabilities. While there was concern for reliability, maintainability, and availability when addressing statistical performance and failure, the need for cyber security measures within these systems was not anticipated. At the time, security for industrial control systems mean physically securing access to the network and the consoles that controlled the systems.

Internet-based technologies have since become part of modern industrial control systems. Widely available, low-cost IP devices have replaced proprietary solutions, which increases the possibility of cyber security vulnerabilities and incidents. Industrial control systems have adopted Internet-based solutions to promote corporate connectivity and remote access capabilities, and are being designed and implemented using industry standard computers, operating systems (OS) and network protocols. As a result, these systems may to resemble computer networks. This integration supports new networking capabilities, but provides less isolation for industrial control systems from the outside world than predecessor systems. Networked industrial control systems may be exposed to similar threats as are seen in computer networks, and an increased likelihood that an industrial control system can be compromised.

Industrial control system vendors have begun to open up their proprietary protocols and publish their protocol specifications to enable third-party manufacturers to build compatible accessories. Organizations are also transitioning from proprietary systems to less expensive, standardized technologies such as Microsoft Windows and Unix-like operating systems as well as common networking protocols such as TCP/IP to reduce costs and improve performance. Another standard contributing to this evolution of open systems is Open Platform Communications (OPC), a protocol that enables interaction between control systems and PC-based application programs. The transition to using these open protocol standards provides economic and technical benefits, but also increases the susceptibility of industrial control systems to cyber incidents. These standardized protocols and technologies have commonly known vulnerabilities, which are susceptible to sophisticated and effective exploitation tools that are widely available and relatively easy to use.

Industrial control systems and corporate networking systems are often interconnected as a result of several changes in information management practices, operational, and business needs. The demand for remote access has encouraged many organizations to establish connections to the industrial control system that enable of industrial control systems engineers and support personnel to monitor and control the system from points outside the control network. Many organizations have also added connections between corporate networks and industrial control systems networks to allow the organization's decision makers to obtain access to critical data about the status of their operational systems and to send instructions for the manufacture or distribution of product.

In early implementations this might have been done with custom applications software or via an OPC server/gateway, but, in the past ten years this has been accomplished with TCP/IP networking and standardized IP applications like File Transfer Protocol (FTP) or Extensible Markup Language (XML) data exchanges. Often, these connections were implemented without a full understanding of the corresponding security risks. In addition, corporate networks are often connected to strategic partner networks and to the Internet. Control systems also make more use of WANs and the Internet to transmit data to their remote or local stations and individual devices. This integration of control system networks with public and corporate networks increases the accessibility of control system vulnerabilities. These vulnerabilities can expose all levels of the industrial control system network architecture to complexity-induced error, adversaries and a variety of cyber threats, including worms and other malware.

Many industrial control system vendors have delivered systems with dial-up modems that provide remote access to ease the burdens of maintenance for the technical field support personnel. Remote access can be accomplished, for example, using a telephone number, and sometimes an access control credential (e.g., valid ID, and/or a password). Remote access may provide support staff with administrative-level access to a system. Adversaries with war dialers—simple personal computer programs that dial consecutive phone numbers looking for modems—and password cracking software could gain access to systems through these remote access capabilities. Passwords used for remote access are often common to all implementations of a particular vendor's systems and may have not been changed by the end user. These types of connections can leave a system highly vulnerable because people entering systems through vendor-installed modems are may be granted high levels of system access.

Organizations often inadvertently leave access links such as dial-up modems open for remote diagnostics, maintenance, and monitoring. Also, control systems increasingly utilize wireless communications systems, which can be vulnerable. Access links not protected with authentication and/or encryption have the increased risk of adversaries using these unsecured connections to access remotely controlled systems. This could lead to an adversary compromising the integrity of the data in transit as well as the availability of the system, both of which can result in an impact to public and plant safety. Data encryption may be a solution, but may not be the appropriate solution in all cases.

Many of the interconnections between corporate networks and industrial control systems require the integration of systems with different communications standards. The result is often an infrastructure that is engineered to move data successfully between two unique systems. Because of the complexity of integrating disparate systems, control engineers often fail to address the added burden of accounting for security risks. Control engineers may have little training in security and often network security personnel are not involved in security design. As a result, access controls designed to protect control systems from unauthorized access through corporate networks may be minimal. Protocols, such as TCP/IP and others have characteristics that often go unchecked, and this may counter any security that can be done at the network or the application levels.

Public information regarding industrial control system design, maintenance, interconnection, and communication may be readily available over the Internet to support competition in product choices as well as to enable the use of open standards. Industrial control system vendors also sell toolkits to help develop software that implements the various standards used in industrial control system environments. There are also many former employees, vendors, contractors, and other end users of the same industrial control system equipment worldwide who have inside knowledge about the operation of control systems and processes.

Information and resources are available to potential adversaries and intruders of all calibers around the world. With the available information, it is quite possible for an individual with very little knowledge of control systems to gain unauthorized access to a control system with the use of automated attack and data mining tools and a factory-set default password. Many times, these default passwords are never changed.

IV. Deception Center

The various customer networks described above may have some network security systems, or may have little network security. Each may be better protected by a network security system, such as the deception-based system discussed above.

Figure 12:
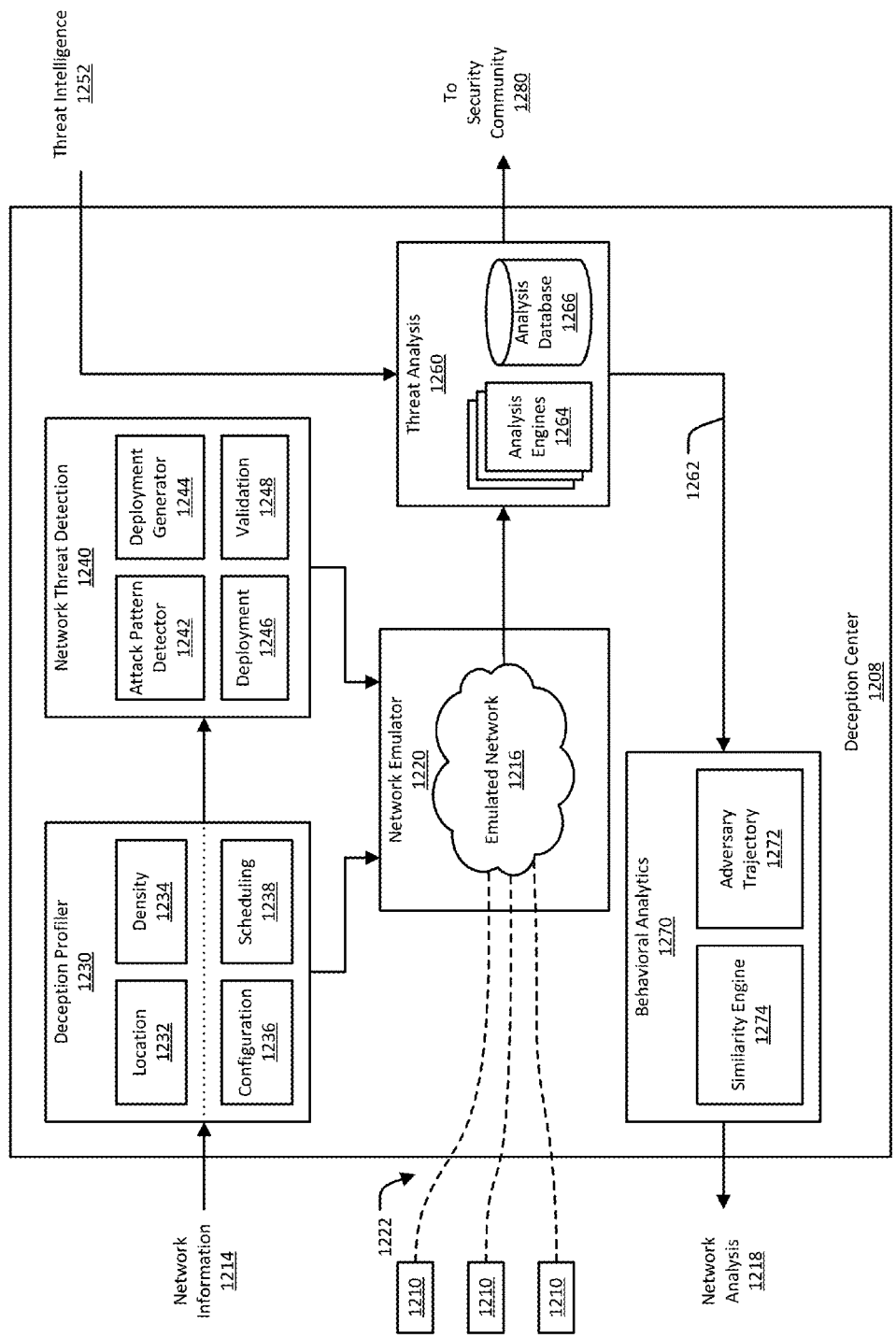
FIG. 12 illustrates an example of a deception center.

As discussed above, a network threat and analysis system may include a deception center that is configured to provide network threat detection, analysis of network threats, and defense against network threats. FIG. 12 illustrates an example of a deception center 1208. In this example, the deception center 1208 includes at least five major components: a network emulator 1220, a deception profiler 1230, a network threat detection engine 1240, a threat analysis engine 1260, and a behavioral analytics engine 1270. In various implementations, each of these components may be implemented using hardware, software, or a combination of hardware and software. In some implementations, one or more of the components may be combined. In some implementations, one or more of the components may be broken down into multiple components. In some implementations, the deception center 1208 may be implemented as a single appliance. In some implementations, the deception center 1208 may be implemented using a combination of computing systems. For example, one or more of the five example components may be implemented in a separate server. Alternatively or additionally, one or more of the components can be implemented as software processes. Alternatively or additionally, one or more of the components can be combined into one software process.

The network emulator 1220 may be a system configured to host an emulated network 1216. The emulated network 1216 may include one or more emulated network devices. An emulated network device is a hardware and/or software component configured to mimic some or all of the behavior of a network device that may be found in a site network. For example, an emulated network device may include at least a distinct MAC address and IP address. The emulated network devices in the emulated network 1216 may be used as deception mechanism in a site network. The emulated network devices may include, for example, address deception mechanisms, low-interaction deception mechanisms, and/or high-interaction deception mechanisms. In various implementations, the emulated network 1216 may be quickly reconfigured. For example, new emulated network devices can be launched or existing emulated network devices can be removed. Alternatively or additionally, emulated network devices can be reconfigured. For example, an address deception can be escalated to a low-interaction deception, and/or a low-interaction deception can be escalated to a high-interaction deception. In some implementations, the emulated network 1216 may be configured to act and respond as a fully functional network. In these implementations, the emulated network 1216 may be referred to as a high-interaction network.

The emulated network 1216 may be connected to one or more sensors 1210 installed in the site network over network tunnels 1222. The emulated network devices can be projected over the network tunnels 1222 and through the sensors 1210 into the site network, where they emulated network devices can function as deception mechanisms. The network emulator 1220 is described in further detail below.

The deception profiler 1230 may be configured to analyze the site network to determine which deception mechanisms to deploy into the site network, where to deploy them, and/or when to deploy them. The deception profiler 1230 may receive network information 1214 from the site network. This network information 1214 may include information such as subnet addresses, IP addresses in use, an identity and/or configuration of devices in the site network, and/or profiles of usage patterns of the devices in the site network. Using this information, the deception profiler 1230 may configure one or more deception mechanisms. For example, the deception profiler 1230 may instruct the network emulator 1220 to reconfigure the emulated network 1216.

The deception profiler 1230 in this example includes a location engine 1232, a density engine 1234, a configuration engine 1236, and a scheduling engine 1238. The location engine 1232 may determine where in the site network to deploy deception mechanisms. The density engine 1234 may determine how many deception mechanisms to deploy. The configuration engine 1236 may determine how each deception mechanism is to be configured, and may provide configurations to the network emulator 1220. The scheduling engine 1238 may determine when a deception mechanism should be deployed and/or activated. The components of the deception profiler 1230 are described in further detail below.

The network threat detection engine 1240 may be configured to monitor the site network and watch for possible attacks. For example, the network threat detection engine 1240 may detect an access to a deception mechanism. The network threat detection engine 1240 may further attempt to confirm that suspicious activity in the site network is an actual attack. To do so, in various implementations, the network threat detection engine 1240 may instruct the network emulator 1220 to reconfigure the emulated network 1216 to create deceptions that are more attractive to an attacker and/or to contain the possible attacker to the emulated network 1216.

In this example, the network threat detection engine 1240 includes an attack pattern detector 1242, a deployment generator 1244, a deployment engine 1246, and a validation engine 1248. The attack pattern detector 1242 may receive network information 1214 from various network devices in the site network, and analyze the network information 1214 to determine whether a network abnormality has occurred or is occurring. The deployment generator 1244 may analyzes suspected attack patterns from the attack pattern detector 1242 to determine what should be done to confirm that an attack has occurred or is in progress. The deployment engine 1246 may implement a deployment strategy generated by the deployment generator 1244. The deployment strategy may include instructing the network emulator 1220 to add, remove, and/or modify emulated network devices in the emulated network 1216, and/or to modify the deception mechanisms projected into the site network. The validation engine 1248 may analyze the deployment strategy and feedback data received from the site network and/or the emulated network 1216 to confirm whether an attack has occurred. The network threat detection engine 1240 is described in further detail below.

The threat analysis engine 1260 may receive data collected from the emulated network during the course of an incident that has been allowed to proceed within the emulated network 1216. Generally, when a suspected threat to the site network has been detected, the components of the deception center 1208 may redirect and contain suspect network traffic related to the attack to the emulated network 1216. Once contained to the emulated network 1216, the suspected attacked may be allowed to proceed. By allowing the suspected attack to proceed, information can be learned about the suspected attack, such as the manner of the attack, the motivation for the attack, network vulnerabilities that allow the attack to proceed, and so on. As the attack is allowed to proceed, information is collected by the emulated network 1216, such as log files, memory snapshots, packets, and any other information that may be generated by suspect network traffic and interacting with suspect network traffic.

In various implementations, the threat analysis engine 1260 may include one or more analysis engines 1264 for analyzing different types of data collected in the network emulator. To analyze the data, in some implementations the threat analysis engine 1260 may receive threat intelligence 1252 from, for example, the network security community. The threat intelligence 1252 may include, for example, descriptions of current (e.g. for a given day or hour or minute) known network threats. The threat analysis engine 1260 may also include an analysis database 1266 for storing data collected in the emulated network 1216 and/or analysis results from the analysis engines 1264.

In various implementations, the threat analysis engine 1260 may produce indicators 1262 that describe a particular incident that was analyzed using the emulated network 1216. These indicators 1262 may include, for example, digital signatures of malicious files, IP addresses of malicious sites, and/or descriptions of the course of events in the incident. In some implementations, the indicators may be provided to the network security community 1280. The indicators 1262 may also be provided to the behavioral analytics engine 1270. The threat analysis engine 1260 is described in further detail below.

The behavioral analytics engine 1270 includes two engines that may be used to analyze a site network for an attack or suspected attack: an adversary trajectory engine 1272 and a similarity engine 1274.

The adversary trajectory engine 1272 may analyze the various ways in which an attack may have occurred in a site network. Using this information, and possibly also the indicators 1262, the adversary trajectory engine 1272 may trace the possible path of a specific incident in the site network. This path may point to network devices in the site network that could have been affected by the incident. These network devices can be checked to determine whether they have, in fact, been affected.

The similarity engine 1274 may use the indicators 1262 to identify similar machines. For example, given emulated network devices in the emulated network 1216, the similarity engine 1274 may determine query items from, for example, the indicators 1262, and use the query items to identify similar network devices in the site network. Alternatively or additionally, the similarity engine 1274 may receive query items generated from network devices in the site network, and may use those query items to find similar network devices in the site network.

The adversary trajectory engine 1272 and the similarity engine 1274 are each described in further detail below.

Using the adversary trajectory engine 1272 and/or the similarity engine 1274, the behavioral analytics engine 1270 may produce a network analysis 1218. The network analysis 1218 may indicate, for example, whether the site network has been exposed to a particular attack, which (if any) network devices may have been affected by the attack, how the network devices were affected by the attack, and/or how the site network's security can be improved. The network analysis 1218 can be used to scrub the effects of an attack from the site network, and/or to increase the security of the site network.

I. Network Emulator

Figure 13:
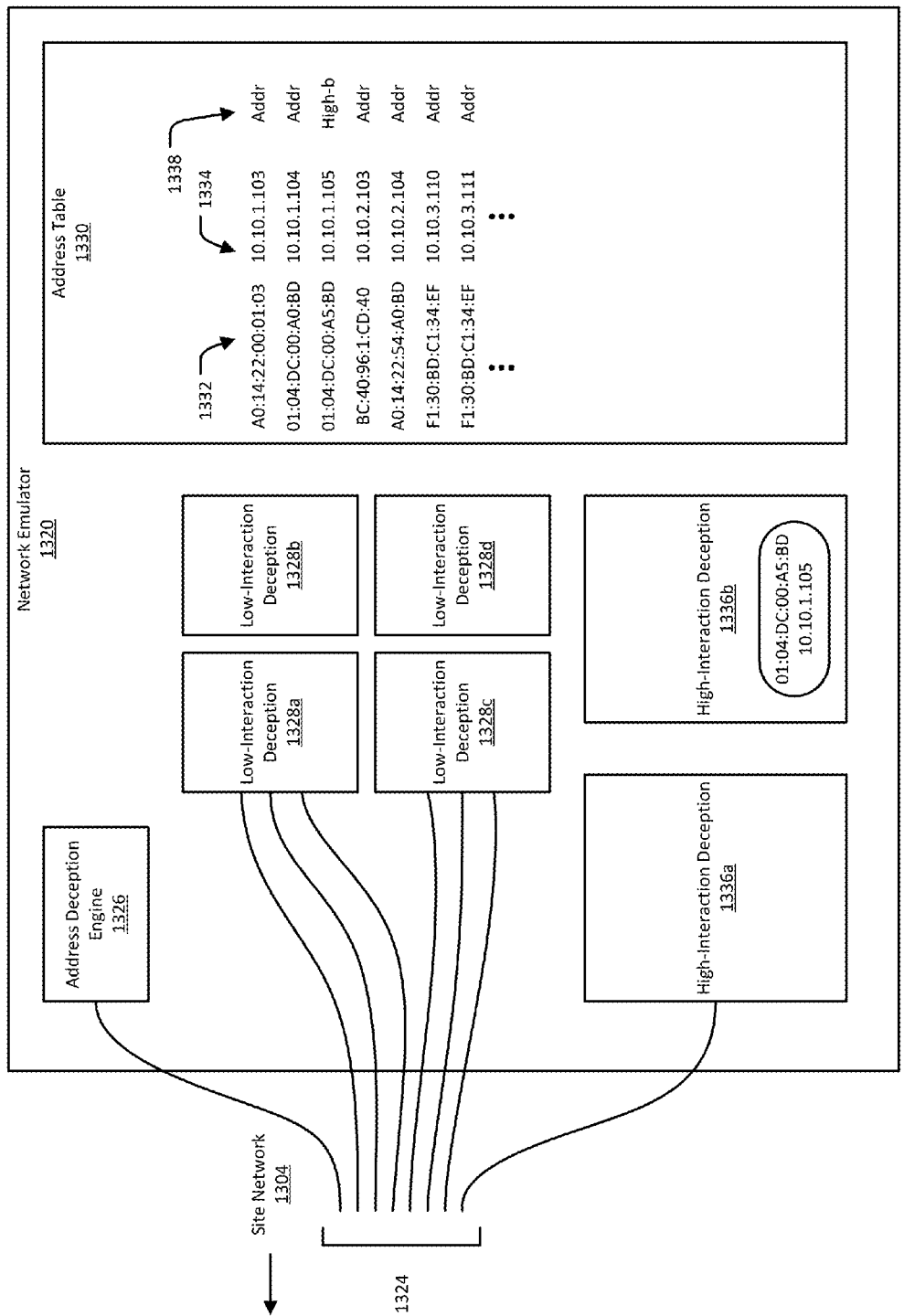
FIG. 13 illustrates an example of a network emulator.

FIG. 13 illustrates an example of a network emulator 1320. A deception center may be provided with a network emulator 1320 so that the network emulator 1320 can host deception mechanisms, which may be projected into a site network. Alternatively or additionally, the network emulator 1320 may itself be a deception mechanism, in the form of an emulated network, which can be used to contain a suspected attack on a site network. In some implementations, the network emulator 1320 may also be referred to as a high-interaction network. For example, when the network emulator 1320 has been configured to fully interact with suspect network traffic, the network emulator 1320 may be functioning as a high-interaction network.

In various implementations, the illustrated network emulator 1320 may include three types of deception mechanisms: an address deception engine 1326, low-interaction deception mechanisms 1328a-1328d, and high-interaction deception 1336a-1336b mechanisms. Low interaction deceptions and high-interaction deceptions may also be referred to as interactive deceptions. The network emulator 1320 may also include an address table 1330 that stores MAC 1332 and IP 1334 addresses. The network emulator 1320 may have multiple connections 1324 to a site network 1304. The multiple connections 1324 may connect the network emulator 1320 to the site network 1304 over multiple various communication mediums (e.g., cables, radio signals, optical cables, etc.). Alternatively or additionally, one or more of the multiple connections 1324 may be individual network conversations carried over one communication medium. Examples of network conversations include Transmission Control Protocol (TCP) sockets and exchanges of User Datagram Protocol (UDP) datagrams, among others.

The network emulator 1320 may be configured to emulate one or more network devices. Network devices may include network hardware, such as routers, switches, hubs, repeaters, and gateway devices, among others. Network devices can also include computing systems connected to the network, such as servers, desktop computers, laptop computers, netbooks, tablet computers, personal digital assistants, and smart phones, among others. Network device can also include other electronic devices with network interfaces, such as televisions, gaming devices, thermostats, refrigerators, and so on. Network devices can also be virtual, such as virtual machines. In various implementations, the network emulator 1320 may be implemented by one or more network devices. In some implementations, the network emulator 1320 may be implemented by a network device dedicated to providing security services for the site network 1304.

Deception mechanisms in the network emulator 1320 may each represent one or more emulated network devices. To aid the deceptions mechanisms in convincingly representing a network device, each deception mechanism may be assigned a realistic looking MAC address 1332. A MAC address, which may also be referred to as a physical address, is a unique identifier assigned to network interface of a network device. MAC addresses 1332 assigned to the deception mechanisms may be, for example, given recognizable Organizationally Unique Identifiers (OUIs), rather than fully random values, to increase the believability of the deception mechanisms. MAC addresses 1332 for the deception mechanisms may be programmed into the address table 1330 by a network administrator. Alternatively or additionally, MAC addresses 1332 may be provided by a configuration file, which may be provided by a network administrator and/or which may be downloaded from a security services provider on the Internet. Alternatively or additionally, an automated system within the network emulator 1320 may examine the site network 1304, and develop a profile describing the type and number of devices in the site network 1304. The network emulator 1320 may then generate MAC addresses 1332 based on the profile.

The network emulator 1320 may associate each MAC address 1332 with an IP address 1334, and store the associated IP addresses 1334 with their MAC addresses 1332 in the address table 1330. IP addresses are numerical strings that identify a network device on a network. IP addresses may be used in some contexts within network communications, while MAC addresses may be used in others. For example, MAC addresses are often not used once a packet leaves a local subnet. Furthermore, IP addresses, unlike MAC addresses, may be transient. For example, each time a laptop computer connects to the same network, it may be assigned a different IP address.

IP addresses are typically managed and assigned by a server running the Dynamic Host Configuration Protocol (DHCP). The network emulator 1320 may request IP addresses 1334 from a DHCP server operating in the site network 1304, and store these IP addresses 1334 in the address table 1330. By requesting IP addresses 1334 from the DHCP server in the site network 1304, the network emulator 1320 is able to obtain IP addresses 1334 that are within the domain of the site network 1304.

Additionally, the site network 1304 may have multiple broadcast domains. A broadcast domain is a logical division within a network, in which all the nodes can reach each other using broadcast packets. As an example, quite often all the network devices connected to the same repeater or switch are within the same broadcast domain. As a further example, routers frequently form the boundaries of a broadcast domain. When the site network 1304 has multiple broadcast domains, the network emulator 1320 may have deception mechanisms for each of one or more of the broadcast domains. For example, in the example of FIG. 13, the network emulator 1320 has obtained IP addresses in three broadcast domains: 10.10.1, 10.10.2, and 10.10.3.

The network emulator 1320 may also periodically request new IP addresses 1334, to mimic network devices disconnecting and reconnecting to the site network 1304. IP addresses 1334 may be refreshed intelligently. For example, the IP address 1334 for a MAC address 1332 that may be associated with a server may not be changed very frequently, if at all, since servers may be rarely taken offline, or may be assigned fixed IP addresses. As another example, a MAC address 1332 that may be associated with network interface cards typically found in laptop computers may be changed every morning, to simulate the laptop's owner arriving at work.

The address table 1330 may store the MAC addresses 1332 and associated IP addresses 1334, as well to which deception mechanism each MAC 1332 and IP 1334 address is currently assigned 1338. Initially, in various implementations, all the MAC 1332 and IP 1334 addresses may be assigned 1338 to the address deception engine 1326. In some implementations, a MAC 1332 and IP 1334 address may initially be assigned 1338 to a high-interaction deception 1336b, such as for example when the high-interaction deception 1336b is static. Other than for static deceptions, as discussed in further detail below, the MAC 1332 and IP 1334 addresses may be assigned 1338 to different deception mechanisms as engagement with a possible attacker escalates.

The address deception engine 1326 is deception mechanism that can emulate one or more address deceptions. An address deception includes at least MAC address 1332 and an associated IP address 1334. The address deception engine

1326 may have a local table or memory in which it stores address to which it may respond. The network emulator 1320 may assign one or more of the MAC 1332 and IP 1334 address pairs to the address deception engine 1326 by adding the MAC 1332 and IP 1334 addresses to the address deception engine's 1326 local table.

The address deception engine 1326 may respond to queries for MAC and/or IP address information. For example, the address deception engine 1326 may implement an address resolution protocol (ARP). An address resolution protocol may enable the address deception engine 1326 to respond to queries, where the queries include an IP address. In this example, when the address deception engine 1326 is queried for an IP address that is in the address deception engine's 1326 local table, the address deception engine 1326 may respond with a MAC address that is associated with the IP address.

Address queries may occur, for example, when an attacker is mapping a network and looking for possible points to attack. For example, an attacker may generate queries for all IP addresses in a broadcast domain (e.g., assuming a 32-bit netmask, IP addresses 10.10.1.0, 10.10.1.1, 10.10.1.2, and so on until 10.10.1.254). Devices that respond not only tell the attacker that the device exists, but may also provide the attacker with the device's MAC address. Once the attacker has a device's MAC address, the attacker may direct network traffic at the device, using the device's MAC address as the destination address.

When the network emulator 1320 receives suspect network traffic addressed to an address deception, the network emulator 1320 may initiate a low-interaction deception mechanism 1328a-1328d, to respond to the network traffic. Network traffic that may initiate an escalation to a low-interaction deception include, for example, TCP packets and UDP packets. The low-interaction deceptions 1328a-1328d are emulated systems that may be capable of receiving network traffic for multiple MAC and IP address pairs. The low-interaction deceptions 1328a-1328d may have a basic installation of an operating system, and typically have a full suite of services that may be offered by real system with the same operating system. In most implementations, the services are fully functional processes, and respond as would the same services running on a real network device. In some implementations, the services may be emulated. In some implementations the low-interaction deceptions 1328a-1328d may be implemented using one or more computers, servers, blade computers, or some other type of computing system hardware. In some implementations, the low-interaction deceptions 1328a-1328d may be implemented using virtual machines.

The network emulator 1320 may include multiple low-interaction deceptions 1328a-1328d, with each low-interaction deception 1328a-1328d running a different operating system. The network devices in the site network 1304 may be running a variety of different operating systems, such as Red Hat® Linux, Ubuntu® Linux, Windows 7, Windows 10, OS X®, and so on. To mimic network devices that may be found in the site network 1304, the network emulator 1320 may have low-interaction deceptions 1328a-1328d for some or all of the operating systems in use in the site network 1304. In this way, the low-interaction deceptions 1328a-1328d may resemble a typical system that can be found in the site network 1304.

The site network 1304, however, may further have multiple variations of the same operating system. For example, various network devices may have the same version of Linux but have different patch levels or installed packages. In most implementations, the network emulator 1320 may not have a low-interaction deception 1328a-1328d for each variation of each operating system, since to do so could potentially require a very large number of low-interaction deceptions 1328a-1328d. Instead, one low-interaction deception 1328a-1328d, executing one version of an operation system, can emulate multiple network devices by being able to receive network traffic addresses to different addresses, where each of these network devices appear to have at least the same version of the operating system.

Should an attacker connect to a low-interaction deception 1328a-1328d, however, the attacker may be able to determine that he has connected to a decoy. For example, the attacker may notice that many network devices (that is, the network devices emulated by one low-interaction deception 1328a-1328d) have identical operating systems and services. This may indicate to the attacker that he has found a decoy. The network emulator 1320 thus, in most cases, will not allow connections to low-interaction deceptions 1328a-1328d to complete. As discussed further below, the network emulator 1320 may redirect the connections to a high-interaction deception 1336a-1336b instead.

The network emulator 1320 may keep the low-interaction deceptions 1328a-1328d on standby, so that they are available as soon as suspect network traffic is received for any of the MAC 1332 or IP addresses 1334 being used for address deceptions. Alternatively or additionally, the configuration for a low-interaction deception 1328a-1328d may be kept ready, and a low-interaction deceptions 1328a-1328d may be launched when it is needed.

Because these addresses 1332, 1334 were generated for decoy network devices, network traffic should ordinarily not be addressed to these addresses 1332, 1334. Not all network traffic for these addresses 1332, 1334, however, is suspect. For example, as discussed below, network traffic that appears to be for a port scan may not be, by itself, an attack on the site network. Thus the network emulator 1320 may intelligently determine when received network traffic warrants escalating to a high-interaction deception 1336a-1336b. Such intelligence may include algorithms based on observations of network traffic behavior. Alternatively or additionally, the intelligence may include observation of the site network 1304 and, for example, data science-based algorithms that relate the activity seen in the site network 1304 to possible attacks. Once the network emulator 1320 identifies some particular network traffic received by a low-interaction deception 1328a-1328d as suspect, the network emulator 1320 may initiate a high-interaction deception 1336a-1336b to receive the suspect network traffic.

The high-interaction deceptions 1336a-1336b are emulated systems configured to respond to network traffic for a specific MAC 1332 and IP 1334 addresses. In some implementations, the high-interaction deceptions 1336a-1336b can be implemented using one or more computers, servers, or other computing system hardware. In some implementations, the high-interaction deceptions 1336a-1336b may be implemented using virtual machines.

In various implementations, the high-interaction deceptions 1336a-1336b may execute a specific installation of an operating system, including patches, packages, and other variations on the operating system that a network device in the site network 1304 may have. The specific configuration of the operating system may be based on a real network device in the site network 1304. Alternatively or additionally, the configuration of the operating system may be based on randomized list of available options. Generally, as discussed below, a high-interaction deception 1336a-1336b may be configured with the same basic operation system that is executing on a low-interaction deception 1328a-1328d, with variation added to enhance the believability of the high-interaction deception 1336a-1336b.

In some implementations, one or more high-interaction deceptions 1336a-1336b may be kept on standby. Initiating a standby high-interaction deceptions 1336a-1336b for use may involve booting and configuring an operating system. In some implementations, a standby high-interaction deception 1336a-1336b may already have an operating system running, and initiating the high-interaction deception 1336a-1336b only requires configuring the operating system. Initiating a high-interaction deceptions 1336a-1336b may also include starting various services that may be offered by a computing system running the particular operating system. In some implementations, a high-interaction deception 1336a-1336b may also be initiated with data including various log files that are typically generated when a network device is in use. Pre-initializing the high-interaction deception may help the high-interaction deception 1336a-1336b look like it has been an active system, rather than a system that has just been started.

Once an attack on the site network 1304 has, for one reason or another, ended, a high-interaction deception 1336a-1336b used to engage the attacker can be decommissioned, and the MAC 1332 and IP 1334 addresses it was using can be reassigned to the address deception engine 1326 or one of the low-interaction deceptions 1328a-1328d. Processing resources used by the high-interaction deception 1336a-1336b can thus be freed for other uses.

In some implementations, the network emulator 1320 may include a static high-interaction deception 1336b. The network emulator 1320 may include a static high-interaction deception 1336b, for example, to emulate a server that is always available on the site network 1304. For example, the static high-interaction deception 1336b may be configured with open ports and/or data that appear valuable. A static high-interaction deception 1336b may be available at any time, and be assigned a fixed MAC address 1332. Interaction with this MAC address 1332 (or an associated IP address 1334) may escalate from the address deception engine 1326 directly to the static high-interaction deception 1336b, without making use of a low-interaction deception 1328a-1328d.

In some implementations, an alternate method to implement low-interaction and high-interaction deceptions is to use a network address translation (NAT) mechanism. Network address translation enables a network device to translate network addresses to different network addresses. For example, a network address translation mechanism may present the one or more IP addresses 1334, and associated MAC addresses 1332, from the address table 1330 to the site network 1304, while other MAC and/or IP addresses are used by the high-interaction deceptions 1336a-1336b running in the network emulator 1320. Furthermore, the network address translation mechanism may present many addresses 1332, 1334 to the site network 1304, and map those many addresses to just a few high-interaction deceptions 1336a-1336b. A network address translation mechanism thus enables the network emulator 1320 to emulate many decoy systems without requiring a high-interaction deception 1336a-1336b for each decoy.

Once a possible attacker attempts to access an address presented by the network address translation mechanism, however, the attacker may discover that the address is only a deception. For example, should the attacker log in to the device represented by a MAC 1332 and IP 1334 combination, the attacker would be logged into a high-interaction deception 1336a-1336b running behind the network address translation. The high-interaction deception 1336a-1336b may likely have a different IP and/or MAC address than was presented to the attacker. The attacker may thus discover that he has been deceived, and stop his attack. A network address translation mechanism may thus server to divert and distract an attacker, but the low-interaction and high-interaction deceptions described above may be more effective for keeping the attacker engaged.

II. Deception Profiler

Figure 14:
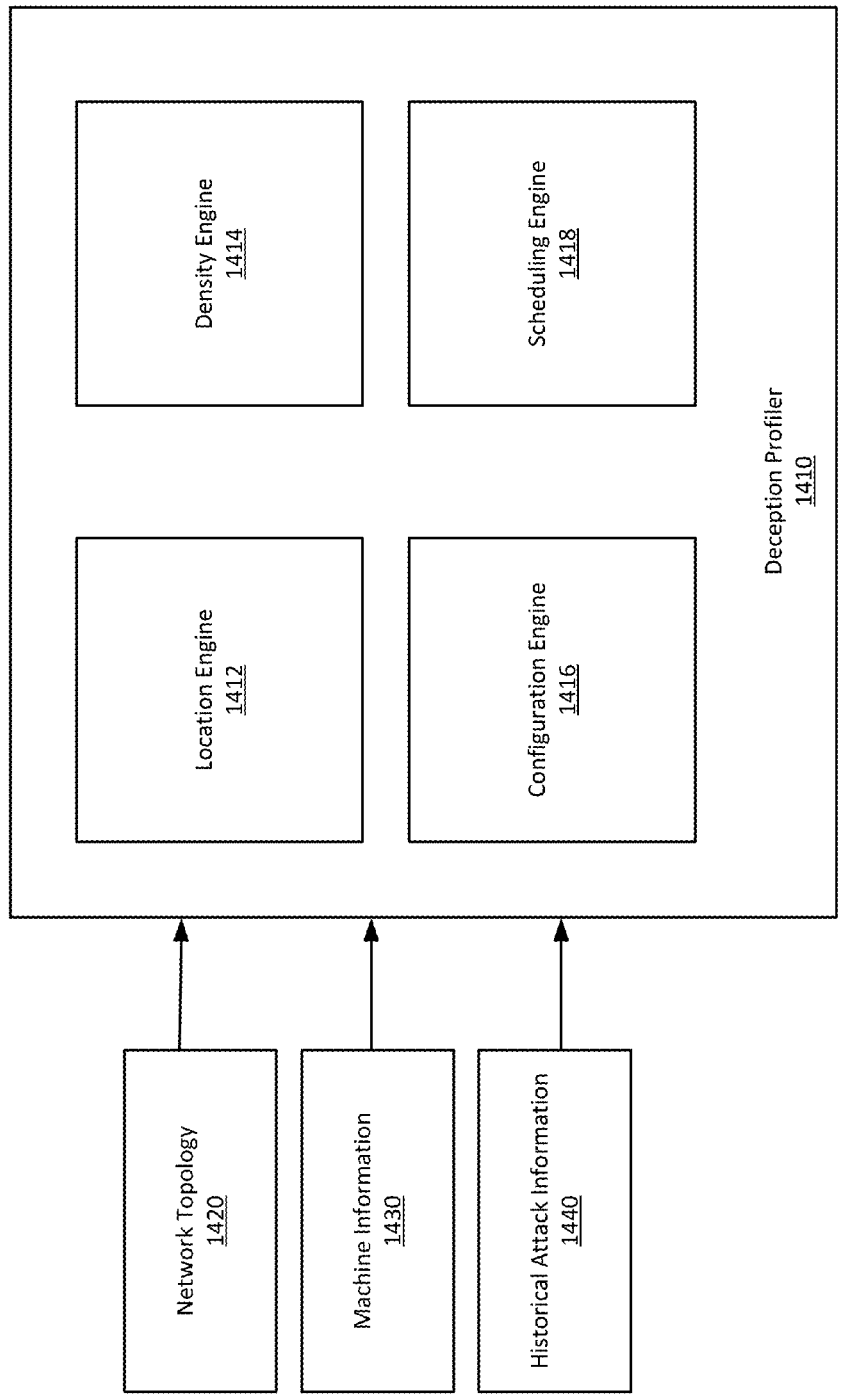
FIG. 14 illustrates an example of a deception profiler.

In some implementations, a deception center can manage the selection and deployment of one or more deception mechanisms. FIG. 14 illustrates an example of a deception profiler 1410, which may select and manage the deployment of deception mechanisms into a site network. In various implementations, the deception profiler 1410 may be able to communicate with the site network. For example, the deception profiler 1410 can be connected to the site network through a software tunnel. The software tunnel can connect the deception profiler 1410 to a sensor that is located on the site network. In such an example, the software tunnel can allow the deception profiler 1410 to create deception mechanisms that can be projected into the site network. By being projected onto the site network, the projected deception mechanisms can be visible to an attacker scanning the site network even though the projected deception mechanisms and the deception profiler 1410 would not be directly connected to the site network. In some implementations, the deception profiler 1410 can cause deception mechanisms to be deployed directly into the site network. For example, the deception profiler 1410 can configure a server in the site network to deploy a virtual machine that mimics a machine or a network device on the network.

The deception profiler 1410 can include at least one or more of a location engine 1412, a density engine 1414, a configuration engine 1416, a scheduling engine 1418. Though illustrated as separate engines here, in some implementations, one or more of these engines can be implemented in a single engine. The density engine 1414 can determine how many deception mechanisms to deploy for the site network. The configuration engine 1416 can determine a configurations for each of the deception mechanisms. A configuration for a deception mechanism can include a MAC address, an Internet Protocol (IP) address, an operating system type, a version for the operating system, one or more types of network services, or some other information that can be used to identify and/or profile a network device on a network. The location engine 1412 can determine where in the site network to deploy deception mechanisms (e.g., in a network, in a subnetwork, in a trunk, on one or more machines in the network, or in some other suitable location in a network). A trunk is a single transmission channel between two points that can carry communications for different networks. For example, a Virtual Local Area Network (VLAN) trunk can carry communications for multiple VLANS.

In some implementations, the deception mechanisms can be deployed directly in a site network, meaning that a deception mechanism can be initiated on a server or system in the site network. In other implementations, the deception mechanisms can be deployed in another network, and be projected into the site network. For example, the deception mechanisms can be configured in an emulated network, from which they can be projected into the site network.

The scheduling engine 1418 can determine when the deception mechanisms should be deployed. For example, the scheduling engine 1418 can determine a connect time and/or a disconnect time. The connect time can indicate when to connect a deception mechanism to the site network. The disconnect time can indicate when to disconnect a deception mechanism from the site network.

In some implementations, the deception profiler 1410 can receive information associated with the site network to use with the engines described above. For example, the deception profiler 1410 can receive a network topology 1420. The network topology 1420 can include network information associated with one or more network devices in the site network. For example, the network information can include number of subnetworks that are in the site network and the network devices that are in each subnetwork. The network information can also include a description for a subnetwork. Examples of types of descriptions include human resource, finance, privileged users, source code, user data, and data-backup systems. The network information can also include information associated with a difficulty level of deploying a deception mechanism for a subnetwork. The difficulty level can be based on the number of deception mechanisms in the network. For example, a larger number of deception mechanisms in a network can cause a higher difficulty level. In some examples, the number of deception mechanisms is relevant because the deception mechanisms must be maintained. For example, a list of deception mechanisms with their configurations and locations can be maintained. In addition, a need to refresh, alter, restart, or in some way remove a complication from a deception mechanism can arise when the deception mechanism is compromised.

The network information can also include a number and distribution of assets in a subnetwork in relation to the site network. The number and distribution of assets can be separated by category. Examples of categories can include server type (e.g., email server, DHCP server, database server, or others), device type (e.g., privilege user device, end-user device, security operations center device, an active directory device, or other type of device), and asset type (e.g., ordinary asset, critical asset, or other type of asset). In some implementations, the network topology 1420 can be determined using an active directory. In other embodiments, the network topology 1420 can be determined using a network discovery tool.

The deception profiler 1410 can also receive machine information 1430. The machine information 1430 can be associated with one or more machines (e.g., servers, desktop computers, laptop computers, hand-held devices, etc.) in the site network. The machine information 1430 for a machine can include one or more of a MAC address, an IP address, the machine's operating system type, a version of the operating system, one or more types of network services, or some other information for the specific machine.

The deception profiler 1410 can also receive historical attack information 1440. The source of the historical attack information 1440 can depend on the type of system implemented in the network. For example, historical attack information 1440 can be received from a security operations center (SOC), a computer security incident response team (CSIRT), an intrusion detection system (IDS), an intrusion prevention system (IPS), and/or some other network security tool or system. The SOC can be a centralized unit that monitors, assesses, and defends a network. The SOC can perform real-time monitoring and management of a network, including aggregating logs, aggregating data, and/or coordinating responses and remediation. The SOC can also report attacks and perform post-attack analysis. Post-attack analysis can include forensics and investigation to determine a source of an attacker. The CSIRT is a system that receives reports of security breaches (such as for example from the threat intelligence community), conducts an analysis of the reports, and may react to similar attacks. The IDS is a system that monitors network and system activities for malicious activities. The IPS also monitors network and system activities for malicious activity, and also actively prevents or blocks intrusions that are detected.

Other data sources for the historical attack information 1440 can include existing deception mechanism attack information, threat feeds, vulnerabilities, and privilege user management data. In some implementations, the existing deception mechanism attack information can be associated with attacks detected on one or more network devices in the site network. In other implementations, the existing deception mechanism attack information can be associated with one or more networks other than the site network. In some implementations, the historical attack information 1440 can include a distribution of attacks on a type of mechanism (e.g., a honeypot) using threat intelligence feeds of historical attack data. In other implementations, the historical attack information 1440 can include a distribution of threat intelligence for an industry. In some implementations, the deception profiler 1410 can receive a distribution of historical attacks for a data source. In other implementations, the deception profiler 1410 can determine a distribution of historical attacks for a data source.

As described above, the deception profiler 1410 can include the location engine 1412. In some embodiments, the location engine 1412 can identify a network, a subnetwork, a trunk, one or more machines, or a portion of a network as a location to deploy deception mechanisms. The location engine 1412 can identify a location to deploy a deception mechanism by computing a subnetwork importance score. The subnetwork importance score can use the network topology 1420, or a function of the network topology 1420, to compare subnetworks. In these cases, the location engine 1412 can compare asset densities, as described below, that are associated with subnetworks to identify the location with the highest score. For example, the location engine 1412 can identify a subnetwork that includes the most critical assets. In some embodiments, the subnetwork importance score can further use machine information associated with the network. For example, the subnetwork importance score can use the types of assets in a subnetwork.

In other implementations, the location engine 1412 can identify a location using a distribution of historical attacks on the network. For example, the location engine 1412 can identify a subnetwork that includes the most historical attacks on the network as a location for deploying a number of deception mechanisms.

In some implementations, the location engine 1412 can update the location of one or more deception mechanisms. For example, the location can be updated when an attack occurs on the site network. In such an example, when an attack occurs on the network, the deception profiler 1410 can determine the location where the attack occurred. In such examples, the deception profiler 1410 can detect a request to access a deception mechanism. In other implementations, the deception mechanism can send a notification to the deception profiler 1410 that a request has been received by the deception mechanism. In response to the request, the deception profiler 1410 can determine a location of the accessed deception mechanism in order to update the location of one or more of the deployed deception mechanisms using the location of the accessed deception mechanism.

In some implementations, the location engine 1412 can update the location of one or more deception mechanisms when a certain number of attacks occur on the network. For example, the location engine 1412 can determine a probability distribution of the attacks on the network. The probability distribution can statistically represent the number of attacks on a network over a time period. In some implementations, the probability distribution can include one or more types of attacks on the network. The location engine 1412 can use the probability distribution of the attacks on the network to determine a location that includes more attacks. For example, the location engine 1412 can determine that more attacks have occurred on a particular part of a network than another. In such an example, the location engine can determine to analyze the network to determine a number of deception mechanisms to deploy.

As described above, the deception profiler 1410 can include the density engine 1414. The density engine 1414 can determine the number of deception mechanisms to deploy for a site network using at least one or more of the network topology 1420, the machine information 1430, the historical attack information 1440, or a combination of this information. In some implementations, the density engine 1414 can analyze each subnetwork of the site network individually. In other implementations, the density engine 1414 can analyze a subnetwork identified by the location engine 1412. In some implementations, the density engine 1414 can use the network topology 1420, the machine information 1430, and/or the historical attack information 1440 to determine densities, summary statistics, or a combination of information.

In some implementations, the density engine 1414 can determine one or more asset densities. An asset density can be associated with a number of assets connected to the site network. In some implementations, an asset can be a critical asset. For example, the asset density can be a total number of critical assets in a portion of a site network (e.g., a subnetwork, a trunk, one or more machines, or other suitable location in the site network) divided by a total number of critical assets in the site network. The criticality of an asset can be measured in terms of information security. For example, a critical asset can include a machine that stores network data or a privileged user account that has broad access to the site network. In some implementations, a critical asset can be user-defined. In other implementations, a critical asset can be industry specific. In some implementations, an asset density can be a total number of assets (whether critical or not) in a portion of a site network (e.g., a subnetwork, a trunk, one or more machines, or other suitable location in the site network) divided by a total number of assets in the site network.

The density engine 1414 can also determine one or more summary statistics. A summary statistic can be associated with a number of historical attacks on the site network. In some implementations, the summary statistic can include a mean, median, or mode of a probability distribution of the number of historical attacks on the network. In some implementations, the probability distribution can be received by the deception profiler 1410. In other implementations, the deception profiler 1410 can determine the probability distribution. Because a summary statistic of a probability distribution is used, the probability distribution can be in a parametric form (e.g., normal distribution), a nonparametric form, or any other form that can be summarized using a mean, median, or mode.

Using the asset densities, the summary statistic, and/or some other information, the density engine 1414 can compute a mixture density model that is used to determine how many deception mechanisms to deploy. In particular the number of deception mechanisms to deploy in the network can be determined by the following equation:

$$N_i = w_1 * p_i^c(s) * N_s + w_2 * p_i(s) * N_s + \left( \frac{w_4 * p_t(h) * N_{h_t} + w_5 * p_t(ids) * N_{ids_t} + w_6 * p_t(ips) * N_{ips_t}}{N_s} \right)$$

The above equation can be described as follows.

$N_i$ is the number of deception mechanisms to deploy in a subnetwork i;

$N_s$ is the total number of subnetworks;

$N_{h_t}$ is the total number of historical attacks over time t as provided by an SOC or CSIRT;

$N_{ids_t}$ is the total number of historical attacks over time t as provided by an IDS;

$N_{ips_t}$ is the total number of historical attacks over time t as provided by an IPS;

$w = \{w_1, w_2, w_3, \ldots, w_n\}$ is a set of weights;

$$p_i^c(s) = \frac{a_{c_i}}{\sum_{i=1}^{N_s} a_{c_i}}$$

is the probability of placing a deception mechanism; in a subnetwork i based on critical assets, where $a_{ci}$ is the number of critical assets;

$$pi(s) = \frac{a_i}{\sum_{i=1}^{N_s} a_i}$$

is the probability of placing a deception mechanism in a subnetwork i based on a valuation of the assets in the subnetwork;

$$p_t(h) = \frac{f(\mu_h)}{N_{h_t}}$$

is the probability of an attack over a time t based on SOC or CISRT information;

$$p_t(ids) = \frac{f(\mu_{ids})}{N_{ids_t}}$$

is the probability of an attack over a time t based on IDS information;

$$p_t(ips) = \frac{f(\mu_{ips})}{N_{ips_t}}$$

is the probability of an attack over a time t based on IPS information;

μ is a summary statistic of a probability distribution of historical attacks over a time t, where the average can be a mean, a median, or a mode; and ƒ(x) is a math function, such as logarithm or square root.

In the above equations, it is assumed that all of the above data sources are available. If a data source is unavailable, a term associated with the data source can be dropped from the equation.

The equation above illustrates that the number of deception mechanisms to deploy in a portion of a site network (e.g., a subnetwork, a trunk, one or more machines, or other suitable location in the site network) can depend on information associated with that portion of the site network. For example, when there are more assets are on the portion of the site network, the number of deception mechanisms can increase. In another example, an increased number of attacks on one part of the network can increase the number of deception mechanisms in all portions of the site network, possibly in equal proportion to the number of attacks. In other examples, the probability distributions can be associated with a probability of an attack in a portion of a site network. In such examples, an increased number of attacks in the portion of the site network can increase the number of deception mechanisms to deploy in that portion of the site network.

The scheduling engine 1418 can determine a time to deploy a deception mechanism. In some implementations, the scheduling engine 1418 can use the historical attack information 1440 to determine the time. In other implementations, the scheduling engine 1418 can use the machine information 1430. In particular, the scheduling engine 1418 can analyze at least one or more of a connect time, a disconnect time, or a combination of times for a network devices in the network. The scheduling engine 1418 can determine a connect time and a disconnect time for a deception mechanism so as to blend a visible, or active, time of the deception mechanism with the active times of machines in the site network. The visible, or active, time of a deception mechanism can be the time that the deception mechanism is connected to the network. In some implementations, the visible time can include time that there is a threshold of activity on the network. For example, the scheduling engine 1418 can determine to connect a deception mechanism to the network before a network becomes particularly busy, and disconnect the deception mechanism after the network is has stopped being as busy.

While the connect time and disconnect time for the one or more machines on the network can be associated with an actual connect and disconnect from the network, the connect time and disconnect time for a deception mechanism can indicate when to have the deception mechanism appear to connect to and disconnect from the network. In some implementations, the deception mechanism can appear to connect and disconnect by becoming visible and invisible to a machine on the network. In other implementations, a deception mechanism can be connected to another network such that the deception mechanism is visible on the network. In such an implementation, the deception mechanism can remain connected to the other network when the deception mechanism appears to disconnect from the network.

III. Network Threat Detection

Figure 15:
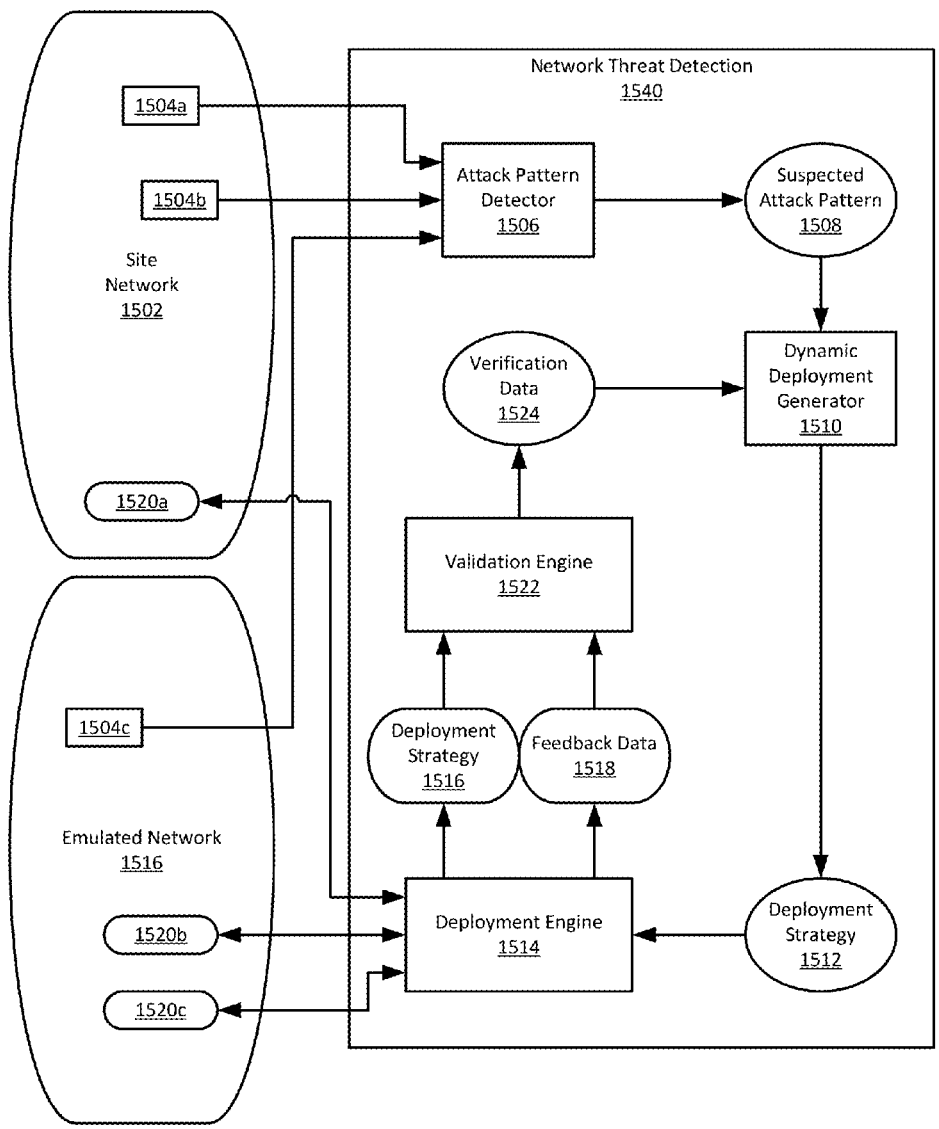
FIG. 15 illustrates an example of a network threat detection system.

FIG. 15 illustrates an example of a network threat detection system 1540 that may be included in various implementations of a deception center. The threat detection system 1540 can use dynamic security mechanisms to locate, identify, and confirm a threat to a site network. The various components of the network threat detection system 1540 may be implemented as discreet hardware components, as software components executing on different computing systems, as software components executing on one computing system, or as a combination of hardware components and software components in one or multiple computing systems.

The threat detection system 1540 may be monitoring a site network 1502. The site network 1502 may include various interconnected network devices, including both computers and network infrastructure equipment, as well as home appliances and electronics, tools and manufacturing equipment, and other non-traditional network devices. An attack pattern detector 1506 may collect data 1504a-1504c from the site network 1502 and/or an emulated network 1516. This collected data 1504a-1504c may come from various sources, such as servers, computers devices, and network infrastructure devices in the site network 1502, and from previously-deployed deception mechanisms in the site network 1502 or in the emulated network 1516. The collected data 1504a-1504c may be structured or unstructured. The collected data 1504a-1504c may be continuously updated.

The attack pattern detector 1506 may monitor and/or analyze the collected data 1504a-1504c to determine whether a network abnormality has occurred or is occurring. In many cases, a network abnormality may fall within acceptable network usage. In other cases, the network abnormality may indicate a potential network threat. One example of a network abnormality is an access detected at a deception mechanism in the site network 1502. In some implementations, emulated network devices in the emulated network 1516 may be projected into the site network 1502 as deception mechanisms. Because the emulated network devices are not part of the normal business of the site network 1502, any access to them is automatically suspect. In various implementations, the attack pattern detector 1506 may identify or isolate the pattern of network behavior that describes the network abnormality. This pattern of behavior may be provided as a suspected attack pattern 1508 to a dynamic deployment generator 1510.

The dynamic deployment generator 1510 may analyze the suspected attack pattern 1508 and determine what should be done to confirm that an attack occurred or is in progress. The dynamic deployment generator 1510 may have access to various deceptive security mechanisms, which emulate devices that may be found in the site network 1502. The dynamic deployment generator 1510 may determine which of these security mechanisms are most likely to be attractive to the potential threat. The dynamic deployment generator 1510 may further determine how and where to use or deploy one or more security mechanisms. In some cases, the security mechanisms may be deployed into an emulated network 1516, while in other cases the security mechanisms may be deployed into the site network 1502. For example, when the suspected attack pattern 1508 indicates that a production server may have been accessed for illegitimate reasons, the dynamic deployment generator 1510 may initiate an emulated server in the emulated network 1516 that appears to be particularly vulnerable and/or to have valuable data. The emulated server may further be projected into the site network 1502 to attract the attention of the possible attacker. As another example, when the suspected attack pattern 1508 indicates that a deception mechanism has been logged into, the dynamic deployment generator 1510 may initiate emulated network devices in the emulated network 1516 that mimic production servers in the site network 1502. In this example, should the user who logged into the deception mechanism attempt to log into a production server, the user may instead be logged into an emulated version of the production server. In this example, the user's activity may be contained to the emulated network 1516.

In some implementations, the dynamic deployment generator 1510 may contact an external service, possibly located in on the Internet, for assistance in determining which security mechanisms to deploy and where to deploy them. For example, the dynamic deployment generator 1510 may contact an external security services provider. The dynamic deployment generator 1510 may produce a deployment strategy 1512 that includes one or more security mechanisms to deploy, as well as how and where those security mechanisms should be deployed.

The deployment strategy 1512 may be provided to a deployment engine 1514. The deployment engine may deploy security mechanisms 1520a-1520c into an emulated network 1516 and/or into the site into the site network 1502. In various implementations, the emulated network 1516 may emulate one or more network devices, possibly configured to resemble a real configuration of inter-connected routers and/or switches and network devices in a subnetwork. The emulated network devices may be, for example, address deception mechanisms, low-interaction deception mechanisms, and/or high-interaction deception mechanisms. In various implementations, the security mechanisms 1520b-1520c deployed into the emulated network 1516 can be projected into the site network 1502. In these implementations, the security mechanisms 1520b-1520c may function as actual nodes in the site network 1502. In various implementations, the emulated network 1516 may be hosted by a network emulator.

In various implementations, the deployment strategy 1512 may indicate where in network topology of the emulated network 1516 and/or the site network 1502 the security mechanisms 1520a-1520c are to be deployed. For example the deployment strategy 1512 may indicate that a certain number of security mechanisms 1520b-1520c should be deployed into the subnetwork where an attack appears to be occurring. These security mechanisms 1520b-1520c may be deployed into the emulated network 1516, from which they may be projected into the site network 1502 Alternatively or additionally, the deployment strategy 1512 may call for placing a security mechanisms 1520a at a node in the site network 1502 where it are most likely to attract the attention of the potential threat. Once deployed, the security mechanisms 1520a-1520c may begin collecting data about activity related to them. For example, the security mechanisms 1520a-1520c may record each time that they are accessed, what was accessed, and, with sufficient information, who accessed them. The security mechanisms 1520a-1520c may provide this data to the deployment engine 1514.

In various implementations, the deployment strategy 1512 may alternatively or additionally indicate that one or more deceptions should be escalated. For example, the suspected attack pattern 1508 may indicate that a MAC or IP address for an address deception was scanned, and the deployment strategy 1512 may then indicate that the address deception should be escalated to a low-interaction deception. As another example, the suspected attack pattern 1508 may indicate that a connection attempt to a low-interaction deception was seen, and the deployment strategy 1512 may then indicate that the low-interaction deception should be escalated to a high-interaction deception.

The deployment engine 1514 may provide a deployment strategy 1512 and feedback data 1518 from the security mechanisms 1520a-1520c to a validation engine 1522. The validation engine 1522 may analyze the deployment strategy 1512 and the feedback data 1518 from the security mechanisms 1520a-1520c to determine whether an actual attack has occurred or is in progress. In some cases, the network abnormality that triggered the deployment of the security mechanisms may be legitimate activity. For example, a network bot (e.g., an automated system) may be executing a routine walk of the network. In this example, the network bot may be accessing each IP address available in the site network 1502, and thus may also access a security mechanism deployed to resemble a network device that is using a specific IP address. In other cases, however, a network abnormality may be a port scanner that is attempting to collect IP addresses for illegitimate purposes. The validation engine 1522 may use the feedback data 1518 to confirm that the activity is malicious. The validation engine 1522 may provide verification data 1524. The verification data 1524 may, in some cases, confirm that an attack has occurred or is occurring. In other cases, the verification data 1524 may indicate that no attack has happened, or that more information is needed.

The verification data 1524 may be provided to the dynamic deployment generator 1510. The dynamic deployment generator 1510 may use the verification data 1524 to dynamically adjust the deployment strategy 1512. These adjustments may be directed towards establishing more attractive traps for the potential threat, and/or towards obtaining more information about the potential threat. For example, the dynamic deployment generator 1510 may call for dynamically adjusting or changing the nature of an already deployed security mechanism 1520a-1520c. Alternatively or additionally, the dynamic deployment generator 1510 may determine that a security mechanism 1520a-1520c can be disabled or removed from the site network 1502. Alternatively or additionally, the dynamic deployment generator 1510 may cause different security mechanisms to be deployed. These changes may be reflected in the deployment strategy 1512, and may be implemented by the deployment engine 1514.

In some implementations, the adjustments to the deployment strategy 1512 may be directed towards containing an apparent threat within the emulated network 1516. For example, the verification data 1524 may indicate that an unexpected access has occurred at a security mechanism 1520a deployed into the site network 1502. Using this information, the deployment strategy 1512 may include deploying security mechanisms 1520b-1520c into the emulated network 1516 that mimic production systems in the site network 1502. Should an apparent attacker attempt a lateral movement from the deception mechanism 1520a where he was detected to a production system, the apparent attacker may instead be logged into a security mechanism 1520b-1520c that mimics that production server. The apparent attacker may not be aware that his activity has been contained to the emulated network 1516. Using this deployment strategy 1512, the apparent attacker may be kept away from production systems.

The threat detection system 1540 may, using the components and data described above, determine that a network abnormality is an acceptable and legitimate use of the site network 1502, or that the network abnormality is an actual threat to the site network 1502. In some implementations, the threat detection system 1540 may also be able to take action to stop a perceived threat.

Figure 16:
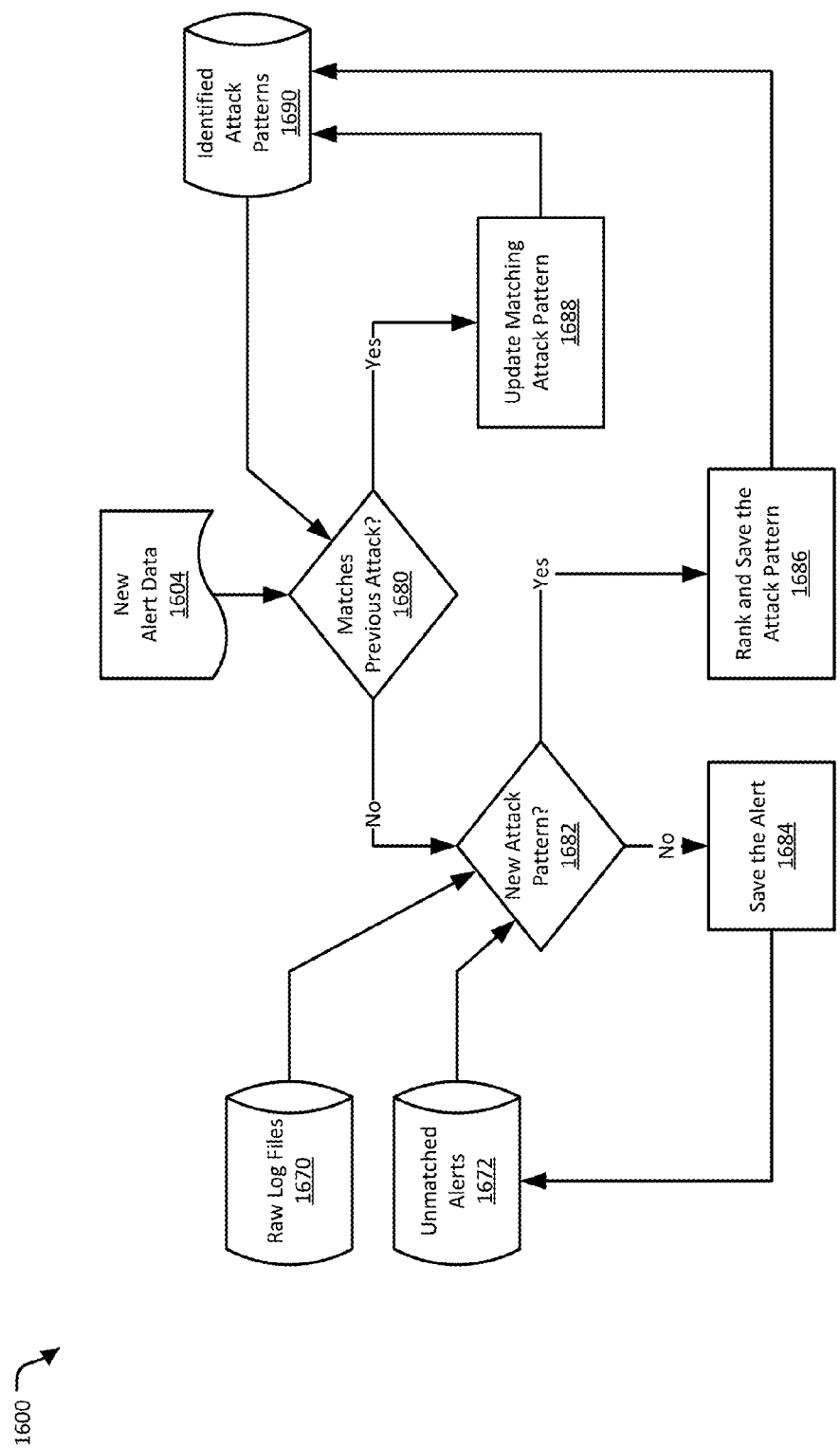
FIG. 16 illustrates an example of a process that may be implemented by an attack pattern detector to identify a pattern of behavior as a possible threat.

FIG. 16 illustrates an example of a process 1606 that may be implemented by an attack pattern detector to identify a pattern of behavior as a possible threat. The process 1606 may be implemented in hardware, software, or a combination of hardware and software. The attack pattern detector may include one or more integrated memory systems for storing data, or may be connected to external memory systems.

The process 1606 may receive new alert data 1604. The new alert data 1604 may include information about a network abnormality that may be a threat to the network. The new alert data 1604 may include information such as a possible identity of the source of the threat, what the nature of the threat appears to be, when the threat began or occurred, and/or where the threat occurred in the site network.

The new alert data 1604 may be examined, at step 1680, to determine whether the information provided by the new alert data 1604 matches a pervious attack. The new alert data 1604 may match a previous attack when the pattern of behavior indicated by the new alert data 1604 matches a pattern of behavior that is known to be a network threat. Previously identified attack patterns 1690 may be provided at step 1680 to make this determination. Alternatively or additionally, the new alert data 1604 may be related to a previously identified attack pattern 1690, and/or may describe behavior that is an extension of a known attack pattern.

When the new alert data 1604 matches an identified attack pattern 1690, and/or is related to an identified attack pattern, at step 1688, the matching attack pattern may be updated. Updating the matching attack pattern may include, for example, changing a ranking of the attack pattern. A ranking may indicate the seriousness of the attack pattern. For example, a more serious attack pattern may be more likely to be a real attack, and/or a higher ranking may indicate a greater need to address the attack. Alternatively or additionally, updating the matching attack pattern may include adding a location where the pattern of behavior was seen. Alternatively or additionally, updating the matching attack pattern may include, for example, describing variations on the attack pattern, alterations to the attack pattern, additional sources of this type of pattern, and so on.

When the new alert data 1604, at step 1680, does not match an identified attack pattern 1690, the process 1606 next attempts, at step 1682, to determine whether the new alert data 1604 describes a pattern of behavior that may be a new and previously unidentified threat to the network. To make this determination, various data may be provided at step 1682, such as, for example, raw log files 1670 and previously unmatched alerts 1672. Raw log files 1670 may provide additional information about the new alert data 1604 that can be used by the process 1606 to further determine whether an attack may be occurring. The previously unmatched alerts 1672 may be patterns of behavior that has previously been determined to not be an attack. The new alert data 1604 may be matched against these previously unmatched alerts 1672 to determine that the new alert data 1604 describes behavior already determined to not be an attack. Alternatively, the new alert data 1604 may indicate that a previous unmatched alert 1672 may, in fact, describe an actual attack.

Using the raw log files 1670, unmatched alerts 1672, and possibly other data, the process 1606 examine, for example, the seriousness of the behavior described by the new alert data 1604, the nature of the behavior, the source of the behavior, and so on. When it is determined, at step 1682, that the new alert data 1604 does not indicate a new attack pattern, the new alert data may be saved, at step 1684, with previously unmatched alerts 1672. When it is determined that the new alert data 1604 does, in fact, describe a new attack pattern, the new alert data may be saved, at step 1686, along with previously identified attack patterns 1690. In some cases, at step 1686, additional information may be stored with the new attack pattern data. For example, the new attack pattern may be given a rank, indicating the degree of seriousness, level of threat, and/or degree of immediacy.

Figure 17A:
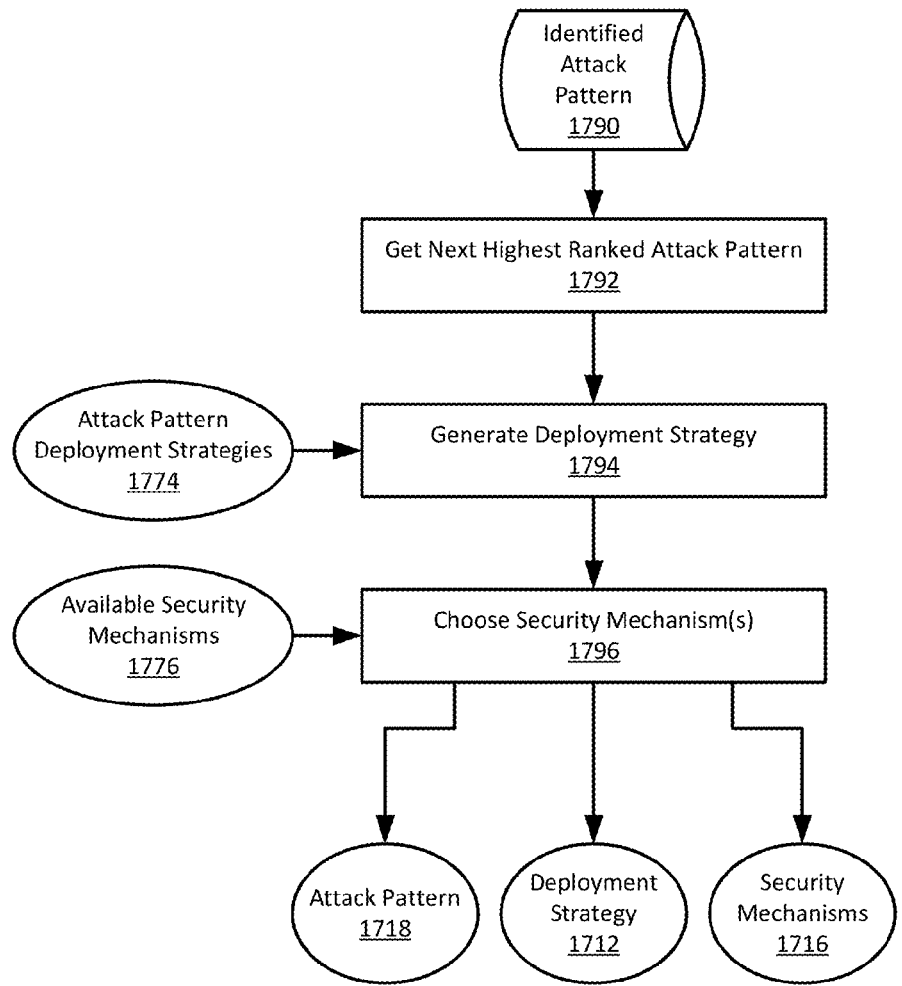
FIG. 17A-17B illustrate an example of two stages of a process for confirming that the pattern of behavior is an actual threat.
Figure 17B:
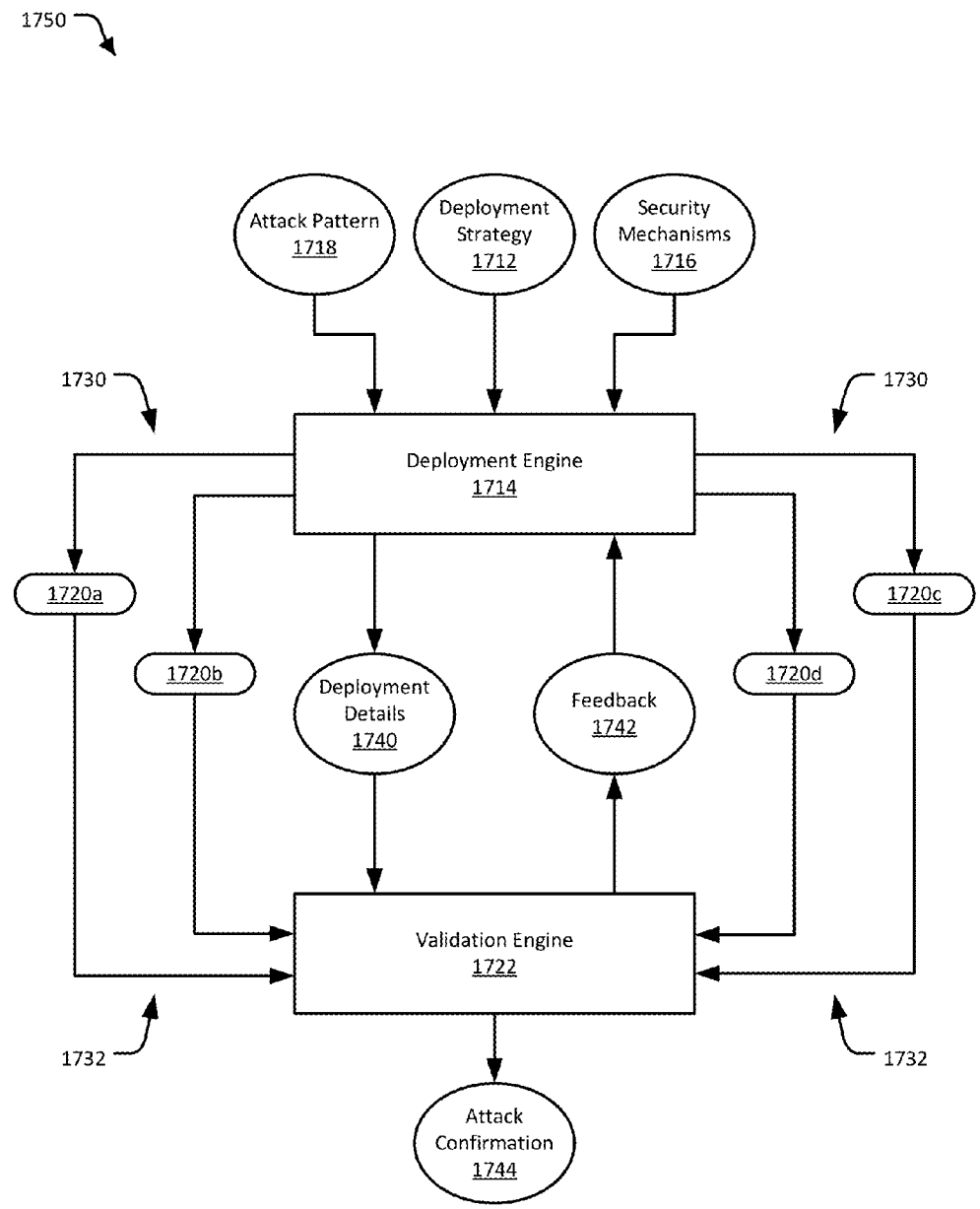

The process 1606 of FIG. 16 may identify a pattern of behavior that could be a threat to the network. The pattern, however, may only be a potential threat. FIG. 17A-17B illustrate an example of two stages of a process 1710, 1750 for confirming that the pattern of behavior is an actual threat. The process 1710 may be a first stage in an overall process for confirming a pattern as a threat, while the process 1750 may be a second stage. The process 1710 of FIG. 17A may be executed, for example, by a dynamic deployment generator. The process 1710 may be implemented in hardware, software, or a combination of hardware and software.

An identified attack pattern 1790 may be provided to the process 1710. The identified attack pattern 1790 may be produced, for example, by the process 1600 of FIG. 16. Additionally, in some cases, the process 1600 may identify multiple attack patterns simultaneously or successively, all of which may be provided to the process 1710 of FIG. 17A, or some of which may be provided while the rest are set aside for later processing. The process 1710 may, at step 1792, get the next highest ranked attack pattern. The ranking may indicate a seriousness, importance, urgency, or otherwise indicate an order in which the attack patterns should be addressed.

For the next highest ranked attack pattern, at step 1794, the process 1710 generates a dynamic deployment strategy. Pre-defined attack pattern deployment strategies 1774 may be provided at step 1794. The pre-defined attack pattern deployment strategies may include strategies that were effective against the same or similar attack patterns, or that were designed with certain attack patterns in mind. Alternatively or additionally, the process 1710 may, at step 1794 dynamically generate a deployment strategy based on prior attack pattern deployment strategies 1774, and/or the behavior described by the attack pattern. The process 1710 may not produce a deployment strategy exactly tailored for the attack pattern, and may instead produce a deployment strategy that is expected to be effective. Additionally, the process 1710 may produce more than one deployment strategy. Each of these deployment strategies may be ranked in various ways, such as their likelihood to be most attractive to the attack pattern, their impact on the network, how quickly they can be deployed, or resources required for their deployment. Each deployment strategy may be tried sequentially, or several deployment strategies, may be tried at the same time.

One example of a deployment strategy is a strategy for a port scanner attack. When the identified attack pattern 1790 indicates port scanning of a server, a deployment strategy may call for deploying one or more security mechanisms that emulate services provided by the server. One or more corresponding ports on the server may then be opened. A true port scanner attack may then attempt to access the emulated services through an open port. Alternatively or additionally, security mechanisms may be deployed outside of the server. These security mechanisms may also emulate services provided by the server, and attract the attention of the port scanner without the port scanner being able to enter the server.

Another example of a deployment strategy is a strategy for a network scanner attack. In this example, when the identified attack pattern 1790 indicates scanning of, for example, a subnet, a deployment strategy may call for deploying one or more emulated servers into the subnet. These emulated servers may resemble production servers in the subnet, and so may provide the same ports and servers as the production servers. The emulated servers, however, will monitor for network scanning activity.

Another example of a deployment strategy is a strategy for a database attack. When the attack pattern 1790 indicates unauthorized querying or copying of a database, the deployment strategy may include security mechanisms that mimic parts of the database, such as additional views or tables with artificial or artificially tainted data. The security mechanisms may report being accessed or copied, either of which indicates an attack on the database.

At step 1796, the process 1710 may select one or more security mechanisms from available security mechanisms 1776 that are called for by the deployment strategy or strategies generated at step 1796. Additionally or alternatively, at step 1796 the process 1710 may dynamically generate a security mechanism, and/or modify a security mechanism from among the available security mechanisms 1716.

The process 1710 may produce an attack pattern 1718, one or more deployment strategies 1712, and one or more security mechanisms 1716. The attack pattern 1718 may be the attack pattern that was selected at step 1792, and that is being confirmed as an actual threat. The deployment strategy or strategies 1712 may be one or more deployment strategies generated at step 1794. The security mechanisms 1716 may be the security mechanisms chosen at step 1796.

The outputs of the process 1710 may be provided to a second stage for confirming that a pattern of behavior is an actual threat. FIG. 17B illustrates an example of a process 1750 that may be used for the second stage. The process 1750 may be implemented in hardware, software, or a combination of hardware and software.

The process 1750 may receive an attack pattern 1718, one or more deployment strategies 1712, and one or more security mechanisms 1716. The attack pattern 1718, deployment strategies 1712, and security mechanisms 1716 may be provided by a first stage of the process to confirm an attack pattern as an actual threat, such as the process 1710 illustrated in FIG. 17A. In FIG. 17B, the attack pattern 1718 describes a pattern of behavior that is being verified to determine whether it is an actual attack. The deployment strategies 1712 describe one or more plans for verifying that the pattern is a threat, including a selection of one or more dynamic security mechanisms and a plan for where in the network to deploy them. The security mechanisms 1716 may be the processes and/or data that are to be deployed.

A deployment engine 1714 may receive the attack pattern 1718, deployment strategies 1712, and security mechanisms 1716, and may deploy 1730 one or more security mechanisms 1716, using one or more of the deployment strategies 1712. As noted above, the deployment engine 1714 may try different deployment strategies sequentially, or may try several deployment strategies concurrently. The deployment engine 1714 may also be configured to dynamically react to changing conditions in the network. For example, the attack pattern 1718 may describe a user whose credentials are suspect. In this example, the deployment engine 1714 may automatically deploy security mechanisms 1716 when the suspect user logs in. Furthermore, the deployment engine 1714 may also be configured to remove the security mechanisms 1716 when the user logs out. As another example, the deployment engine 1714 may launch additional security mechanisms configured to contain the suspect user within an emulated network. The deployment engine 1714 may provide deployment details 1740 to a validation engine 1722, where the deployment details 1740 may include, for example, the attack pattern 1718 and the deployment strategy 1712.

In some implementations, the validation engine 1722 may attempt to determine whether the attack pattern 1718 is, in fact, a real attack. Deployed security mechanisms 1720a-1720d may provide data 1732 about activity around them or related to them to the validation engine 1722. This data 1732 may indicate, for example, no activity, suspect activity, or confirmed activity. In some cases, the data 1732 may indicate that the deployment strategy may be more effective if adjusted. The validation engine 1722 may provide this feedback 1742 to the deployment engine. The deployment engine 1714 may take actions such as a real-time, dynamic modification of a deployed security mechanism 1720a-1720d, removing a deployed security mechanism 1720a-1720d, and/or deploying different security mechanisms.

In some cases, data from deployed security mechanisms 1720a-1720d may also be provided to one or more other systems. These other systems may be able to provide additional information about the attack pattern 1718. In some cases, these other systems may be able to address the threat, for example by blocking access to the network, revoking authentication, or terminating processes.

Ultimately, the validation engine 1722 may provide an attack confirmation 1744. An attack confirmation 1744 may confirm that the attack pattern 1718 is an actual attack. An attack confirmation 1744 may be brought to the attention of a human network administrator. Alternatively or additionally, an attack confirmation 1744 may be sent to network security systems that may be able to address the threat. In some cases, the validation engine 1722 may instead determine that the attack pattern 1718 was not an actual attack. Yet, in other cases, the validation engine 1722 may not come to a conclusion, in which case the attack pattern 1718 may be marked for continuing observation.

In some implementations, the network security system described above may also be configured to react to an attack confirmation 1744 by attempting corrective action against the attack. For example, the system may block the IP address that appears to be the source of the attack, or attempt to trace the attack to the source. Alternatively or additionally, the system may provide tainted data to the attacker, thereby possibly disabling the attacker's own system. Alternatively or additionally, the system may provide traceable data to the attacker. Traceable data may enable the system or others to track the attacker's movements in the network. In some implementations, tracking data may provide up-to-date information that may be used to dynamically change or modify an existing deployment strategy, or to deploy a new deployment strategy. Alternatively or additionally, the system may make information about the attacker public, such as for example in the anti-virus community, on anti-hacker forums, or through mass media outlets.

IV. Threat Analysis

In various implementations, a deception center may be provided with a targeted threat analysis engine to analyze suspect network traffic. When suspect network traffic is received by a emulated network in the deception center, the emulated network may record results from conducting static, dynamic, and/or network analysis of the suspect traffic. The emulated network may be configured to record data over the course of an incident. An "incident" is an attack or suspected attack on a network. The emulated network may be configured to record data for an incident from the time a suspected attack is detected until the suspected attack is terminated.

Figure 18:
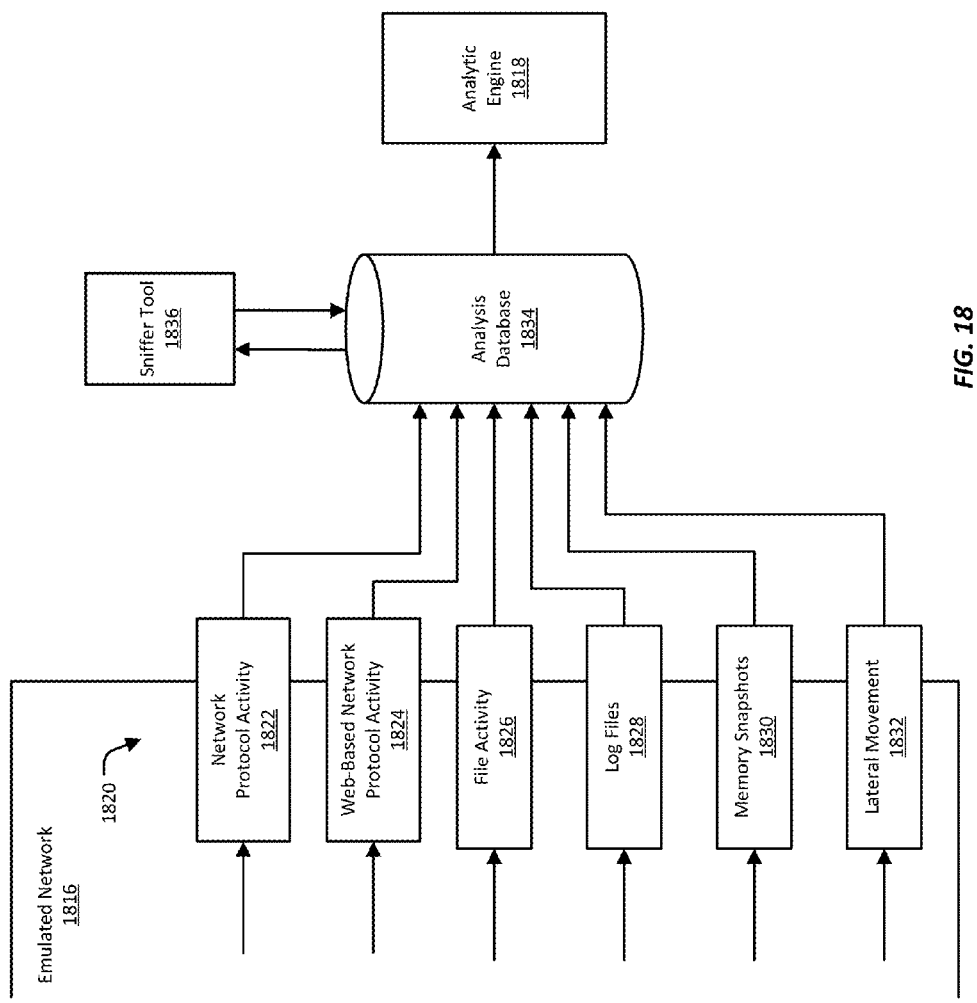
FIG. 18 illustrates examples of the data that may be collected over the course of an incident from processes and monitoring tools analyzing suspect network traffic in a emulated network.

FIG. 18 illustrates examples of the data 1820 that may be collected over the course of an incident from processes and monitoring tools analyzing suspect network traffic in a emulated network 1816. FIG. 18 further illustrates that, in some implementations, the threat intelligence engine may include an analysis database 1840 that serves as a repository for the data 1820 collected in the emulated network 1816. In some implementations, the threat intelligence engine may include a sniffer tool 1836, for prioritizing and filtering the data collected in the analysis database. The threat intelligence engine may provide data from the analysis database to the analytic engine 1818, where the data can be analyzed.

In various implementations, the data 1820 collected from the emulated network 1816 may include network protocol activity 1822, web-based network protocol activity 1824, file activity 1826, log files 1828, memory snapshots 1830, and captured lateral movement 1832. These types of data 1820 are provided as examples of the type of data that may be collected, and other types of data may be collected, based on what data is available and what data is desired.

Network protocol activity 1822 may include network traffic related to various networking protocols. Network traffic associated with network protocol activity 1822 may include network traffic coming into a customer network and/or network traffic going out of the customer network. This network traffic can include, for example, email, DNS requests for servers other than web servers, SMB traffic originating inside the customer network and accessing servers outside the customer network or originating outside the customer network and accessing servers inside the customer network, and/or FTP traffic that is unrelated to webpage content, among other things. Network protocol activity 1822 may be captured by, for example, network packet monitoring tools or in log files.

Web-based network protocol activity 1824 may include network traffic associated with accessing websites. The websites being accessed may be located on web servers located outside the customer network; that is, external web sites being accessed by a user inside the customer network. The websites being accessed may alternatively or additionally include websites hosted by the customer network itself, and being accessed by a user either inside or outside the customer network. Web-based network traffic may include, for example, DNS packets requesting the IP address of a website, Hyper-Text Transfer Protocol (HTTP) packets for transferring webpages, file transfer protocol (FTP) packets for transferring webpage content, such as image files, and/or packets exchanging user authentication information. Web-based network protocol activity 1824 may be captured by, for example, network packet monitoring tools or in log files.

In various implementations, web-based network protocol activity 1824 may be included within the network protocol activity 1822.

File activity 1826 may include information learned from static analysis of files found in the content of suspect network traffic. File activity 1826 can include, for example, the output of virus scans, a description of contents of files, components such as macros and scripts extracted from files, results from opening files, and/or results from deconstructing files (e.g., compiling or decompressing the file), among other things. File activity 1826 may be captured by processes executing the static analysis. File activity 1826 may also be captured by the testing device executing the static analysis, which may produce, for example, the output of virus scanners, de-compilers, emulators, and so on.

Log files 1828 include log files produced during dynamic analysis of the contents of suspect network traffic. These log files may be generated, for example, by the emulated system that is the release point for the contents of the suspect network traffic. These log files may include, for example, log files that are typically generated by an operating system. These log files capture information such as operating system kernel activity, user-level application programming interface activity, user log in attempts, and commands entered by a user, among many others. The log files 1828 may also include the output of processes specifically monitoring calls made from the release point to other devices in the emulated network 1816. These log files may capture information such as downloading of files from outside the customer network, uploading files from the customer network to an outside server, creating, deleting, copying, modifying, moving, decrypting, encrypting, decompressing, and/or compressing files, and network traffic to other devices, such as login attempts and port scanning. In various implementations, log files deemed interesting (which may include all log files generated by devices emulated in the emulated network 1816) are provided to the analysis database 1840.

Memory snapshots 1830 may be taken at various times over the course of an incident. For example, the emulated network 1816 may take before and after snapshots of emulated memory structures in the emulated network 1816. For example, real servers, workstations, routers, and other network devices typically include some memory. In some implementations, the emulated network 1816, when emulating these devices, may also emulate any memory that they include. The emulated network 1816 may further produce snapshots of each memory before suspect network traffic is analyzed, as well as after. A memory snapshot is a copy of the contents of a memory. In some implementations, the emulated network 1816 may alternatively or additionally produce memory snapshots of the test devices being used to create the emulated network 1816. As discussed above, the emulated network 1816 is built from physical equipment, such as a rack of servers, which has its own memory. This memory may be captured in snapshots at various intervals, particularly during the analysis of suspect network traffic. Alternatively or additionally, the emulated network 1816 may take memory snapshots 1830 during the course of dynamic analysis of files. For example, the emulated network may take a memory snapshot 1830 during the execution of a file. This memory snapshot may provide some insight into the contents of the file.

Lateral movement 1832 is, as described above, the movement of an attack from one network device to another. Lateral movement 1832 may be captured, for example, as a trace of activity among multiple devices emulated in the emulated network 1816. In some implementations, lateral movement 1832 may be extracted from network protocol activity 1822, web-based network protocol activity 1824, file activity 1826, and/or log files 1828. For example, file activity 1826 may show downloading of malware and log files 1828 may capture login attempts. Lateral movement 1832 data may put this information together and provide a cohesive description of an attack.

As noted above, the data 1820 extracted from the emulated network 1816 may be accumulated in an analysis database 1840. In some implementations, the threat intelligence engine may include a sniffer tool 1836. In these implementations, the sniffer tool 1836 may prioritize and filter the data stored in the analysis database 1840. For example, the sniffer tool 1836 may generate alerts upon finding particularly suspect information (e.g., by finding a digital signature for the information on a blacklist). As another example, the sniffer tool 1836 may identify data known to be safe (e.g., because a digital signature for the data or a domain extracted from the data can be found on a whitelist), and remove this data from the analysis database 1840. As another example, the sniffer tool 1836 may extract files out of network packets. As another example, the sniffer tool 1836 may generate digital signatures for files, packets, or other data in the analysis database 1834. As another example, the sniffer tool 1836 may trim routine information from log files, so that the log files record primarily suspect activity. As another example, the sniffer tool 1836 may organize related information together, such as for example putting together network traffic and log files related to lateral movement. In some implementations, the sniffer tool 1836 may thus serve to reduce the volume of data that may need to be analyzed. The sniffer tool 1836 may also be referred to as a network protocol parser. One example of a sniffer tool 1836 is the Bro Network Security Monitor.

Figure 19:
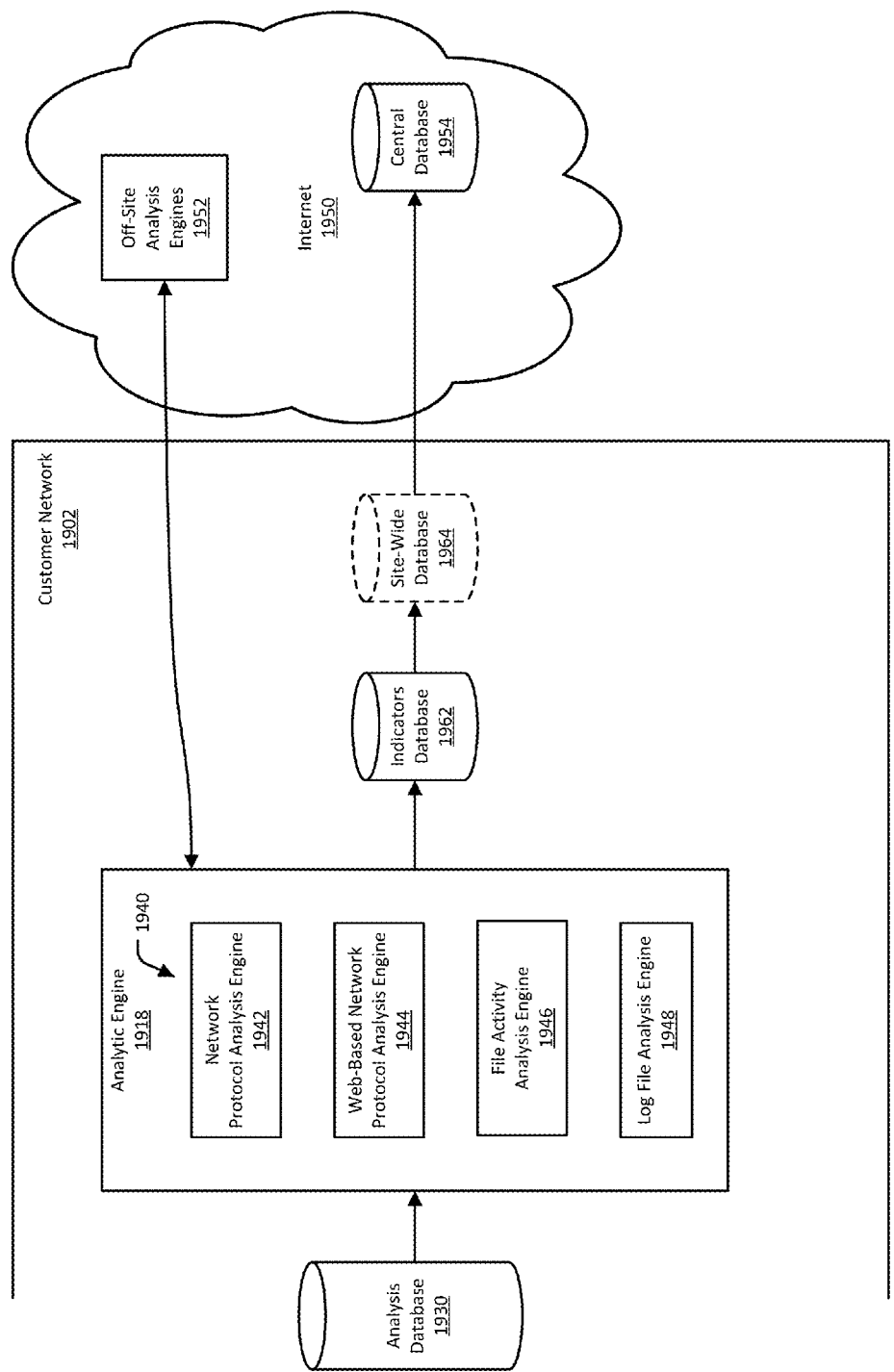
FIG. 19 illustrates an example of the operations of an analytic engine.

The contents of the analysis database 1840 may be provided to the analytic engine 1818 for detail analysis. FIG. 19 illustrates an example of the operations of an analytic engine 1918. In various implementations, the analytic engine 1918 may include multiple analysis engines 1940. Each analysis engine 1940 may analyze a different type of data stored in an analysis database 1930. Generally, each analysis engine 1940 may apply one or more of heuristic algorithms, probabilistic algorithms, machine learning algorithms, and/or pattern matching algorithms, in addition to emulators, to detect whether data (e.g., files, email, network packets, etc.) from the analysis database 1930 is malicious. Each analysis engine 1940 may further include sub-modules and plugins, which are also able to apply heuristic, probabilistic, machine learning, and/or pattern matching algorithms, as well as emulators, to determine whether some data is malicious. In various implementations, the analysis engines 1940 may be configured to operate in parallel, such that the analytic engine 1918 is able to analyze many types of data at the same time. In some implementations, the analytic engine 1918 may have additional analysis engines 1940 not illustrated here. In some implementations, the analytic engine 1918 may have fewer analysis engines 1940, depending on what is required for a particular implementation.

In this example, the analytic engine 1918 includes a network protocol analysis engine 1942, a web-based network protocol analysis engine 1944, a file activity analysis engine 1946, and a log file analysis engine 1948. As discussed in further detail below, each of these analysis engines 1940 processes a different type of data from the analysis database 1930. The network protocol analysis engine 1942 processes results from network and dynamic analysis of network traffic. The web-based network protocol analysis engine 1944 processes results from network analysis of network traffic related to access of websites. The file activity analysis engine 1946 processes data captured during static analysis of the content of suspect network traffic. The log file analysis engine 1948 processes log file data. In some implementations, the analysis engines 1940 may, also work together to analyze data from the analysis database 1930. For example, file activity analyzed by the file activity analysis engine 1946 may be correlated against network activity analyzed by the web-based network protocol analysis engine 1944 and the network protocol analysis engine 1942 to produce a network history of lateral movement of an attack. As further example, information provided by the network analysis may be searched for, by the log file analysis engine 1948, to provide an activity trace of lateral movement. In some implementations, the various analysis engines 1940 may be combined into fewer analysis engines, or may be divided into additional sub-engines. For example, in some implementations, the network protocol analysis engine 1942 may also analyze web-based network traffic.

In various implementations, analysis engines 1940 may each produce indicators that describe the data that each analyzes, which may be stored in an indicators database 1962. Indicators describe the suspect network associated with data analyzed by the analysis engines 1940. For example, the network protocol analysis engine 1942 may produce indicators that the describe the source and destination of HTTP-based packets, a description of the webpages associated with the packets, as well as any malicious content downloaded as a result of the HTTP packets. As another example, the network protocol analysis engine 1942 may produce indicators describing SMB packets that uploaded files that should not have left the customer network 1902. As another example, the file activity analysis engine 1946 may provide indicators describing files storing credentials that where modified. As another example, the log file analysis engine 1948 may produce indicators that describe repeated, and thus suspect, login attempts.

In various implementations, the analysis engines 1940 produce static, file, and network indicators that describe and/or identify an threat posed by suspect network traffic, or lack of a threat, if no threat is found. For example, in some implementations, a threat associated with specific suspect network traffic may be identifiable by a name, which is included in an indicator. The indicators may further include information such as timestamps, indicating a start and/or end of the attack, and/or a weight, indicating the severity of the attack, and/or contextual information about the attack, such as the type of network exchanges made during the attack. In some implementations, suspect network traffic that is harmless may also be provided with indicators. In these implementations, the indicators may include a weight value that indicates that the network traffic is harmless.

In some implementations, the analytic engine 1918 may also provide data from the analysis database 1930 to off-site analysis engines 1952, located outside the customer network 1902. Off-site analysis engines 1952 are additional analysis engines that are hosted by a central service located on the Internet 1950. The central service may have analysis engines that the analytic engine 1918 does not have, or does not yet have. For example, central server may have off-site analysis engines 1952 that are more up-to-date, and/or may have off-site analysis engines 1952 that are newer. In some cases, newer off-site analysis engines 1952 may be in a testing phase, prior to being provided to the customer network 1902. The off-site analysis engines 1952 may provide indicators back to the analytic engine 1918. The analytic engine 1918 may add these indicators to the indicators database 1962.

In some implementations, the indicators database 1962 may further provide indicators to a site-wide database 1964. As noted above, the customer network 1902 may include a site-wide database 1964 when the customer network 1902 includes more than one site network. Each site network may be provided with their own threat intelligence engine. Each threat intelligence engine may provide indicators for their analytic engines to the site-wide database 1964.

In some implementations, the indicators database 1962 may provide indicators to a central database 1954, located on the Internet 1950. In implementations that include a site-wide database 1964, the site-wide database 1964 may provide indicators for all of the customer network 1902 to the central database 1954. The central database 1954 is a central repository for indicators that describe suspect network traffic. The central database 1954 may collect indicators from multiple customer networks. The central database 1954 may also share indicators between customer networks. Sharing indictors between customer networks may make all of the customer networks more secure. For example, another customer network may have seen an attack that the illustrated customer network 1902 has not yet experienced. The customer network 1902 may use indicators from the other customer network to improve its network security infrastructure, and thereby possibly improving is defenses against the same attack.

Figure 20:
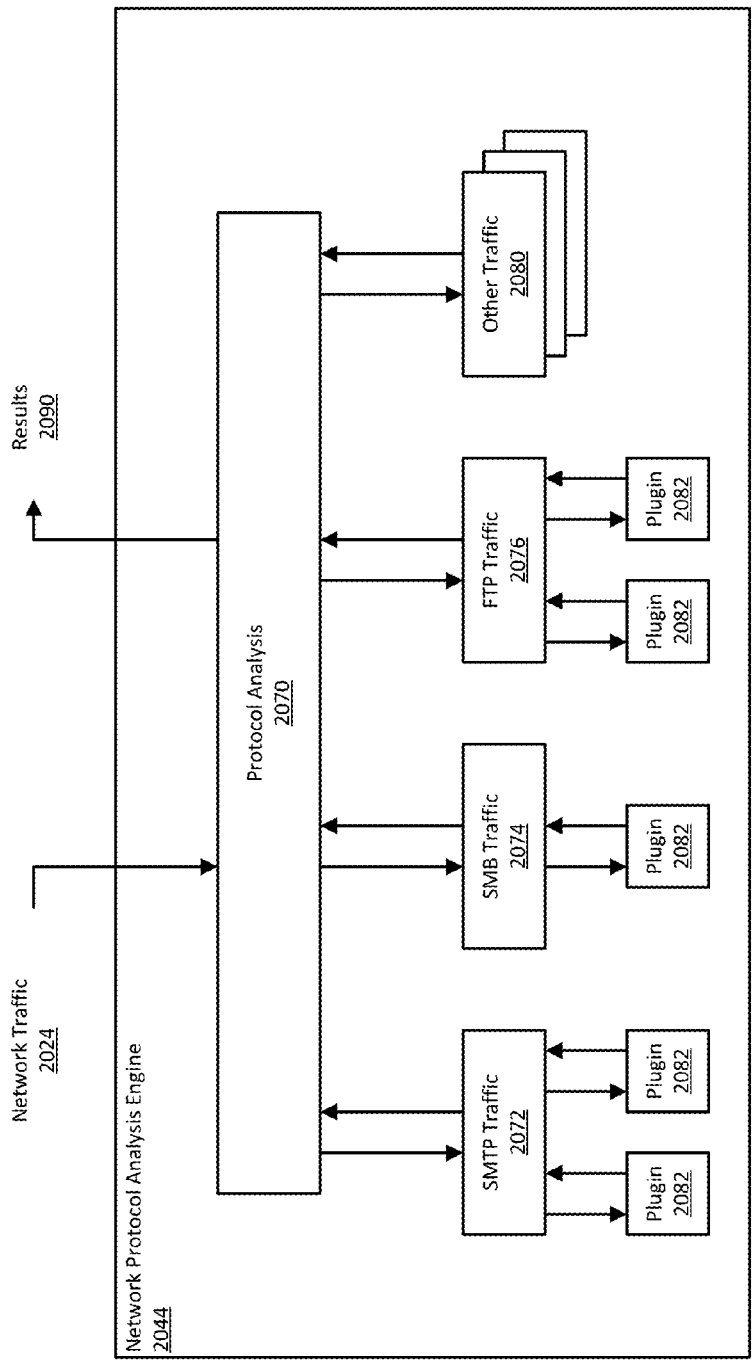
FIG. 20 illustrates an example of a network protocol analysis engine.
Figure 21:
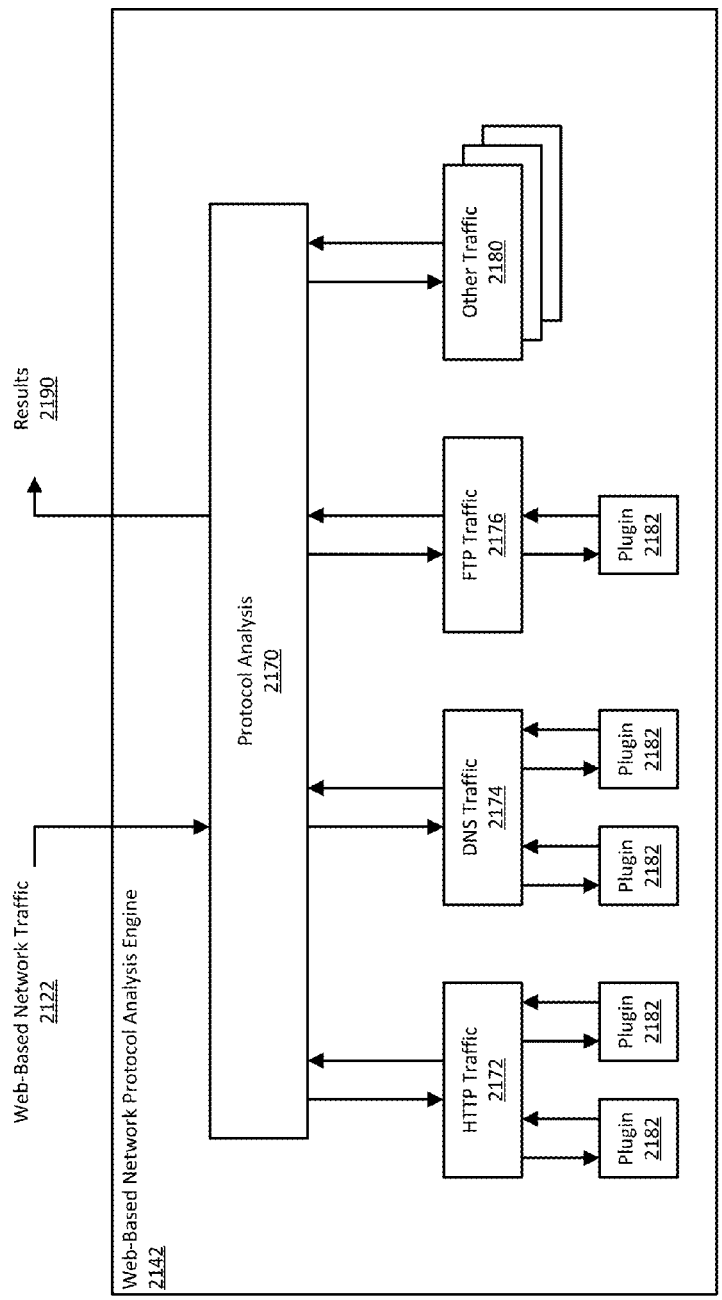
FIG. 21 illustrates an example of a web-based network protocol analysis engine.
Figure 22:
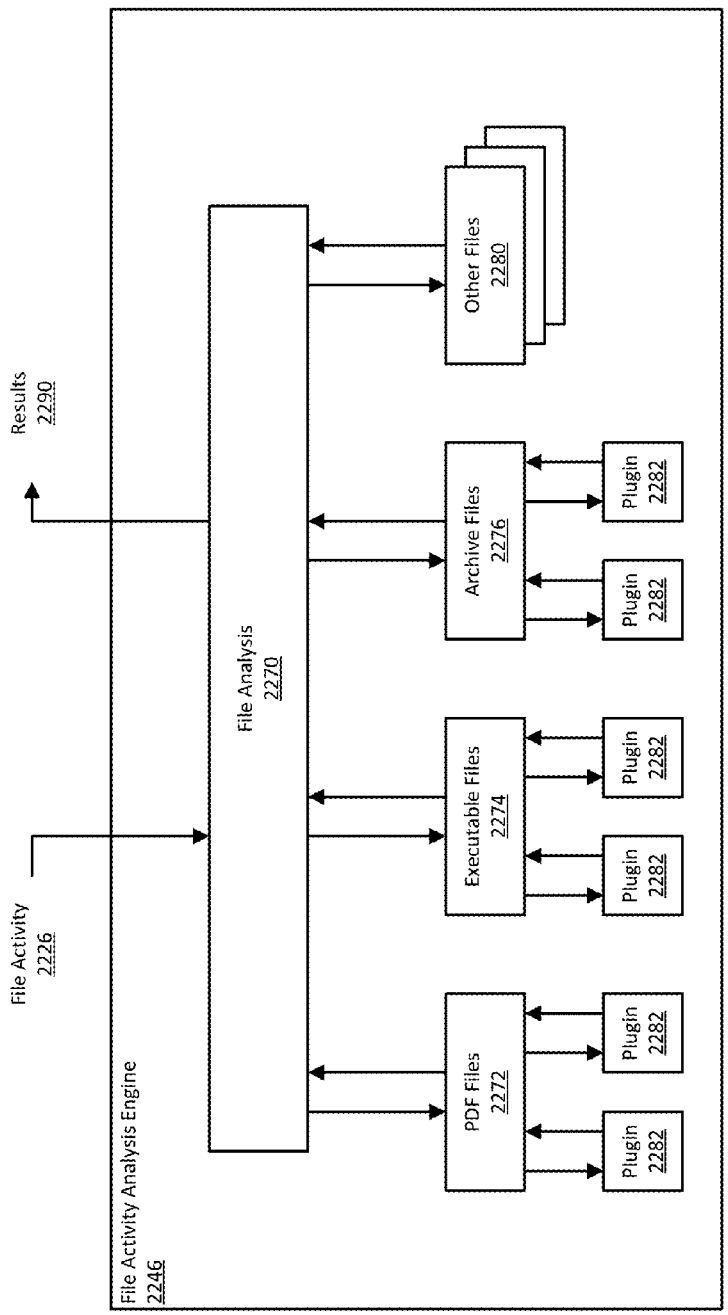
FIG. 22 illustrates an example of a file activity analysis engine.
Figure 23:
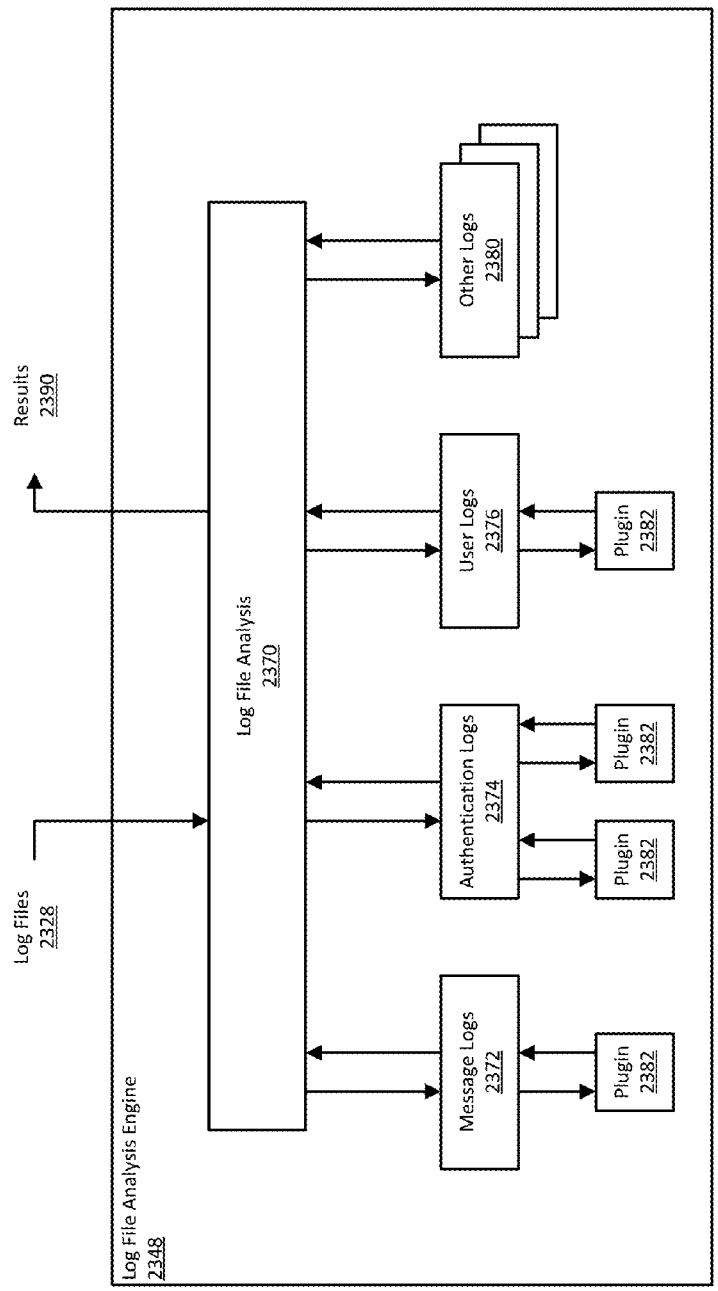
FIG. 23 illustrates an example of a log file analysis engine.

FIGS. 20-23 illustrate examples of the structure and processes of the analysis engines 1940 illustrated in the example of FIG. 19. FIG. 20 illustrates an example of a network protocol analysis engine 2044; FIG. 21 illustrates an example of a web-based network protocol analysis engine 2142; FIG. 22 illustrates an example of a file activity analysis engine 2246; and FIG. 23 illustrates an example of a log file analysis engine 2348.

FIG. 20 illustrates an example of a network protocol analysis engine 2044. The network protocol analysis engine 2044 may analyze network traffic associated with network protocols, in some cases including web-based network protocols. Analyzing non-web-based network traffic separately from web-based network traffic may be beneficial because non-web-based network traffic may use network protocols unrelated to web-based network traffic. Additionally, non-web-based network traffic may be received at different rates, may be used differently, and may harbor different kinds of threats. In various implementations, however, web-based network traffic is analyzed by the network protocol analysis engine 2044, along with non-web-based network traffic. In these implementations, the network protocol analysis engine 2044 can provide comprehensive analysis of the network traffic.

This example network protocol analysis engine 2044 is also arranged modularly and hierarchically. A protocol analysis 2070 receives other network traffic 2024, and may conduct a first stage analysis of the network traffic 2024. For example, the protocol analysis 2070 may identify a network protocol associated with a packet or stream of packets. The protocol analysis 2070 may then invoke a sub-module designed to analyze packets for the identified network protocol. In this example, the network protocol analysis engine 2044 includes sub-modules for Simple Mail Transfer Protocol (SMTP) traffic 2072 (e.g., email), Server Message Block (SMB) traffic 2074 (e.g. resource sharing packets), and FTP traffic 2076. The sub-modules may each be assisted by one or more plugins 2082. The network protocol analysis engine 2044 may also include sub-modules for other traffic 2080 (e.g. FTP, Trivial File Transfer Protocol (TFTP), Remote Desktop Protocol (RDP), Internet Message Access Protocol (IMAP), DNS, DHCP, Transparent Network Substrate (TNS), Lightweight Directory Access Protocol (LDAP), etc.). These other sub-modules may analyze traffic for other network protocols, including ones that are currently known and not illustrated here, and ones that will be developed in the future.

The SMTP traffic 2072 sub-module analyzes suspect email. The SMTP traffic 2072 sub-module may, for example, examining email headers to look for patterns known to be associated with malicious email. The SMTP traffic 2072 sub-module may also examine email content to look for malicious attachments and/or links. The SMTP traffic 2072 sub-module may provide a determination to the protocol analysis 2070 that indicates whether some email was malicious or not, or whether it could not make a determination. The determination from the SMTP traffic 2072 sub-module may be based on its own analysis, or on the analysis of one or more plugins 2082, or on a combined analysis.

The SMB traffic 2074 sub-module analyzes packets associated with shared access to files, printers, ports, and miscellaneous communications between devices in a network. SMB packets may also provide an authenticated inter-process communication mechanism. The SMB traffic 2074 sub-module may examine SMB packets and look for unauthorized accesses to shared resources or unauthorized communications. The SMB traffic 2074 sub-module may provide a determination to the protocol analysis 2070 as to whether some SMB traffic was malicious, not malicious, or possibly malicious. The SMB traffic 2074 sub-module's determination may be based on its own analysis, or on the analysis of one or more plugins 2082, or on a combined analysis.

The FTP traffic 2076 module analyzes network traffic associated with the transfer of data using FTP. Communications using FTP typically involve establishing a communication channel between a client machine and a server machine. The client machine can issue commands to the server machine, and upload files to the server machine or download files from the server machine. The FTP traffic 2076 sub-module may analyze FTP-related network traffic, and attempt to determine whether any of the traffic uploaded files that were not authorized to be uploaded or downloaded malicious files. The FTP traffic 2076 module also attempt to determine whether the FTP communication channel was validly established. Some FTP servers may allow users to connect anonymously, while others require a username and password to establish a connection. The FTP traffic 2076 sub-module may provide a determination to the protocol analysis 2070 that indicates whether some FTP traffic was malicious, was not malicious, was harmless, or that the traffic's maliciousness could not be determined. The FTP traffic 2076 sub-module's determination may be based on its own analysis, the analysis of one or more plugins 2082, or a combined analysis.

The protocol analysis 2070 may use the determinations made by the sub-modules and/or their attached plugins 2082 and generate indicators 2090 that describe the other network traffic 2024. These indicators 2090 may be referred to as network indicators. These indicators 2090 may describe the behavior of the other network traffic 2024, may identify network traffic associated with a particular behavior, and/or may indicate whether some network traffic is or is not a threat. For example, the indicators 2090 generated by the other network protocol analysis engine 2044 may include source and destination addresses for the other network traffic 2024, descriptions of any files found in the network traffic, and/or any usernames associated with the network traffic, among other things. In some implementations, the indicators 2090 may indicate that some other network traffic 2024 is or is not a threat. In some implementations, the indicators 2090 may include a weight value that indicates a probability that some other network traffic 2024 is a threat.

FIG. 21 illustrates an example of web-based network protocol analysis engine 2142 implemented in a modular fashion. A modular implementation may provide both flexibility and scalability. Flexibility is provided because the web-based network protocol analysis engine 2142 can be reconfigured based on the web-based network traffic 2122 that is received Scalability is provided because modules for new types of web-based network traffic can be added, in some cases without needing to rebuild the web-based network protocol analysis engine 2142.

In this example, the web-based network protocol analysis engine's 2142 modules are arranged hierarchically. The first level of analysis is protocol analysis 2170. The protocol analysis 2170 gets or receives web-based network traffic 2122. The protocol analysis 2170 may get data (a "push" data model) or fetch data (a "pull" data model). In some implementations, the web-based network traffic 2122 may already be organized into packet streams. A packet stream is a series of related packets that have the same source and destination. For example, the packets that form a video being streamed from a host to a viewer's device would be considered a packet stream.

The protocol analysis 2170 may make an initial examination of the web-based network traffic 2122. Among other things, the protocol analysis 2170 may determine the web-based network protocol that each packet or packet stream is associated with. The protocol analysis 2170 may then invoke the appropriate sub-module for the network protocol type, and direct packets associated with that protocol to the sub-module. In this example, the web-based network protocol analysis engine 2142 has at least three sub-modules: one for HTTP traffic 2172, one for DNS traffic 2174, and one for FTP traffic 2176. The web-based network protocol analysis engine 2142 may have additional sub-modules for other traffic 2180, where these sub-modules are focused on packets that use network protocols not explicitly illustrated here. The functionality of the web-based network protocol analysis engine 2142 can also be expanded by adding more sub-modules for yet more web-based network protocols.

Each of the sub-modules analyze packets associated with their protocol type and attempt to determine whether the packets can cause harm to a network. For example, the HTTP traffic 2172 sub-module may match website addresses against "black lists" and "white lists." Black lists include lists of websites and/or website content that is known to be malicious, compromised, or are otherwise associated with web content known to cause harm. Black lists may include website domain names, IP addresses, Uniform Resource Locators (URLs), and/or hashes of malicious files. The HTTP traffic 2172 sub-module may also match web site content (such as files and images) against black lists. White lists include lists of websites and/or website content that is known to be safe and uncompromised. Black lists and white lists may change dynamically, as when a previously safe website becomes compromised, or as a compromised website is recovered, or as websites are shut down and removed from the Internet. HTTP traffic associated with a website on a black list may be marked as malicious, while HTTP traffic associated with a white list may be marked as clean.

As another example, the DNS traffic 2174 sub-module may also match domain names against black lists and white lists. DNS traffic typically includes requests to translate domain names to IP addresses. A DNS request may be for a domain that is hosted by the customer network, or may be for a domain that is outside the customer network but that the customer network's DNS server knows about. A malicious DNS request may, for example, be attempting to obtain an IP address for an internal website that is not publicly available. The DNS traffic 2174 sub-module attempts to determine whether suspect DNS requests may be malicious or are acceptable.

As another example, the FTP traffic 2176 sub-module may examine packets that contain website content that were transferred using FTP. FTP provides one way to transfer images, files, and/or multi-media content associated with webpages. The FTP traffic 2176 sub-module may examine web-based FTP traffic and determine whether the traffic includes any malicious content, or whether the content is innocuous.

The functionality of the sub-modules may also be expanded with plugins 2182. A plugin is a module that can be added to or removed from a sub-module without having to rebuild the sub-module and often while the sub-module is running. Here, plugins provide the ability to quickly add functionality to a sub-module. For example, in some implementations, the HTTP traffic 2172 sub-module may be unable to determine whether some packets are malicious or safe. In these implementations, the HTTP traffic 2172 module may invoke one or more plugins 2182, which may each operate on the packet in a different way. For example, one plugin 2182 may access black lists located on the Internet. These black lists may be public black lists, or may be black lists maintained along with off-site analysis engines. As another example, another plugin 2182 may access a public database of known bad websites, such as one hosted by Google®. The DNS traffic 2174 sub-module and FTP traffic 2176 sub-module may also have plugins to expand their functionality. Plugins also provide a way to add new or up-to-date functionality to the sub-modules. The sub-modules can also be updated by providing an updated web-based network protocol analysis engine 2142, which may require rebuilding the web-based network protocol analysis engine 2142. Plugins, however, may provide for faster, less intrusive, and/or intermediate updates between updates of the web-based network protocol analysis engine 2142 itself.

The plugins 2182 may each produce a determination of whether a packet or group of packets is malicious or clean. A plugin 2182 may also indicate that it was unable to make a determination. In this example, the sub-modules receive the results from their associated plugins 2182. The sub-modules provide a determination, either their own or one made by their plugins 2182, to the protocol analysis 2170. The protocol analysis 2170 may use the determination from a sub-module to produce indicators 2190. These indicators 2190 may be referred to as network indicators. As noted above, these indicators 2190 may describe and/or identify network traffic associated with a threat. For example, the indicators 2190 generated by the web-based network traffic may include the domain names, URLs, and/or IP addresses of web sites accessed, a description of the websites, a description of content downloaded from the websites, and/or the IP address of the computer that requested the website content, among other things. The indicators 2190 may indicate definitively that some network traffic is a threat or may indicate definitively that some network traffic is not a threat. Alternatively or additionally, the indicators 2190 may provide a weight value that indicates the probability that some network traffic is a threat. For example, a weight value of "100" may indicate a 100% probability that some network traffic is a threat, while a weight value of "0" may indicate that the network traffic is not a threat. Furthermore, any weight value between "0" and "100" may indicate the relatively probability that some network traffic is a threat.

FIG. 22 illustrates an example of a file activity analysis engine 2246. The file activity analysis engine 2246 analyzes the result of static analysis of the contents of suspect network activity. For example, the file activity analysis engine 2246 may examine results from opening the contents, applying virus scans to the content, and/or deconstructing the content, among other things. By examining these results, the file activity analysis engine attempts to determine whether the content can cause harm to a network.

This example file activity analysis engine 2246 is also arranged modularly and hierarchically. A file analysis 2270 receives file activity 2226, and may conduct a first stage analysis of the file activity 2226. For example, the file analysis 2270 may include black lists for files known to be malicious. In some implementations, the black lists may store digital signatures of malicious files. These digital signatures may be generated by, for example, the MD5 algorithm, Secure Hash Algorithm 1 (SHA-1), or SHA-2, among others. The file analysis 2270 may compare files found in suspect network traffic against signatures in the black lists. The file analysis 2270 may also check files against white lists. White lists may include files that are known to be safe. White lists may also store digital signatures of files. Files found in suspect network traffic that match signatures in white lists can be assumed to be safe.

The file analysis 2270 may also or alternatively determine the file type for a file extracted from suspect network traffic, and invoke a sub-module for analyzing files of that type. In this example, the file activity analysis engine 2246 includes sub-modules for analyzing portable document format (PDF) files 2272, executable files 2274, and archive files 2276. The sub-modules may each be assisted by one or more plugins 2282. The file activity analysis engine 2246 may include sub-modules for analyzing other files 2280 of types not illustrated here, and also for analyzing activity related to certain files, such as password files and sensitive data files.

The PDF files 2272 sub-module analyzes files formatted in PDF or that appear to be formatted in PDF. PDF is a popular format for transferring documents across networks. Thus sending PDF files in network traffic is fairly common. Hacking tools, however, can be embedded into seemingly innocent PDF files. The PDF files 2272 sub-module may attempt to determine whether a PDF file is malicious or harmless. For example, the PDF files 2272 sub-module may be able to detect malicious obfuscation in a PDF file, and/or whether a PDF file includes a shell script. The PDF files 2272 sub-module may provide its determination, or the determination made by a plugin 2282, or a combined determination, to the file analysis 2270.

The executable files 2274 sub-module analyzes executable files and files that appear to be executable. Executable files are programs that can be run on a computer. Viruses and other malware can be delivered into a network using executable files. Once launched, an executable file may have some privileges to make changes to a computer that it is launched on. Malware may take advantage of these privileges, and once launched, may exploit vulnerabilities in a computer's security infrastructure. The executable files 2274 sub-module may attempt to identify an executable file, and/or identify what an executable file does. Using this and other information, the executable files 2274 sub-module may attempt to determine whether the executable file is malicious. The executable files 2274 sub-module may provide its determination, or a determination of one of or more of its plugins, or a combined determination to the file analysis 2270.

The archive files 2276 sub-module analyzes archive files. Archive files are containers for other files, and provide a convenient way to transfer groups of files and/or large files. The files contained in an archive file may have been compressed and/or encrypted. The archive files 2276 sub-module may attempt to determine what is contained in an archive file, and whether the contents are malicious. The archive files 2276 sub-module may decompress and/or decrypt an archive file. In some cases, the archive files 2276 sub-module may pass the contents of an archive to the file analysis 2270, which may pass the contents to another sub-module. The archive files 2276 sub-module may provide its determination (or that of one or more of its sub-modules) to the file analysis 2270.

The file analysis 2270 may use the determinations made by the sub-modules and/or their attached plugins 2282 to generate indicators 2290 that describe the file activity 2226. These indicators 2290 may be referred to as file indicators. These indicators 2290 may describe and/or identify the analyzed files. For example, the indicators 2290 may include file types, components extracted from files, results from applying virus scanning and other tools to the files, results from opening or executing a file, results from deconstructing and analyzing the deconstructed contents of file, where a file came from and when, and/or a digital signature, which may be used to identify a file. The indicators 2290 may further indicate whether a file is malicious. In some implementations, the indicators 2290 may include a weight value that indicates the probability that a file is malicious.

FIG. 23 illustrates an example of a log file analysis engine 2348. The log file analysis engine 2348 analyzes log files generated by operating systems, applications, and devices in the emulated network. For example, the log file analysis engine 2348 can analyze log files generated by emulated network devices form the emulated network. In various implementations, the emulated network devices can be implemented using virtual machines.

This example log file analysis engine 2348 is also arranged modularly and hierarchically. A log file analysis 2370 receives log files 2328 and may conduct a first stage analysis of the log files 2328. For example, the log file analysis 2370 may sort log files by their type, and invoke an appropriate sub-module for analyzing each log file by its type. In this example, the log file analysis engine 2348 includes sub-modules for analyzing message logs 2372, authentication logs 2374, and user logs 2376. The sub-modules may each be assisted by one or more plugins 2382. The log file analysis engine 2348 may include sub-modules for analyzing other logs 2380, including any of the many logs that may be generated by network devices but that are not illustrated here.

The message logs 2372 sub-module analyzes message logs. Message logs contain global system messages, often including messages that are also found in other message logs, such as mail and authentication logs. Analyzing message logs may provide a comprehensive view of the activity seen by a emulated device in the emulated network. The message logs 2372 sub-module may also analyze message logs based on information provided by other analysis engines. For example, message logs may be searched for activity related to a suspect IP address or username, found through network analysis.

The authentication logs 2374 sub-module analyzes log files related to user authentication. Authentication logs include information such as a history of logins (including usernames, login times, and logout times) and the authentication mechanism used. Examining log files may be useful for finding, for example, repeated login attempts, password scanning (e.g., multiple login attempts with the same username and different passwords), and/or logins using deliberately released usernames and passwords. Authentication logs can also be searched for activity related to, for example, a suspect username or around a specified time. The key words or search strings may be provided by other analysis engines.

The user logs 2376 sub-module analyzes log files that record user-level activity. User logs may capture the actions of one user. For example, a user log may include commands entered by a user, files opened or closed by the user, applications launched by the user, other systems accessed by the user, and so on. Examining user logs may be useful, for example, when an outside actor has gained access to the emulated network using stolen or leaked credentials. Hence, user logs may be examined for information related to a specific user, which may be identified by another analysis engine.

The sub-modules may each make a determination as to whether a log file being analyzed indicates malicious activity. The sub-modules may make this determination with the assistance of one or more attached plugins 2382. The sub-modules may provide their determinations to the log file analysis 2370. The log file analysis 2370 may use the determinations made by the sub-modules to generated indicators 2390 that describe and/or identify activity seen in the log files 2328. These indicators 2390 may be referred to as dynamic indicators. For example, indicators 2390 generated by the log file analysis engine 2348 may include a list of login attempts, usernames associated with log in attempts, commands entered by a user that has infiltrated the emulated network, and/or changes made within the emulated network, among other things. The indicators 2390 may indicate that no malicious activity was found, or that malicious activity was definitely found. In some implementations, the indicators may alternatively or additionally provide a weight value that indicates the probability of malicious activity.

Figure 24:
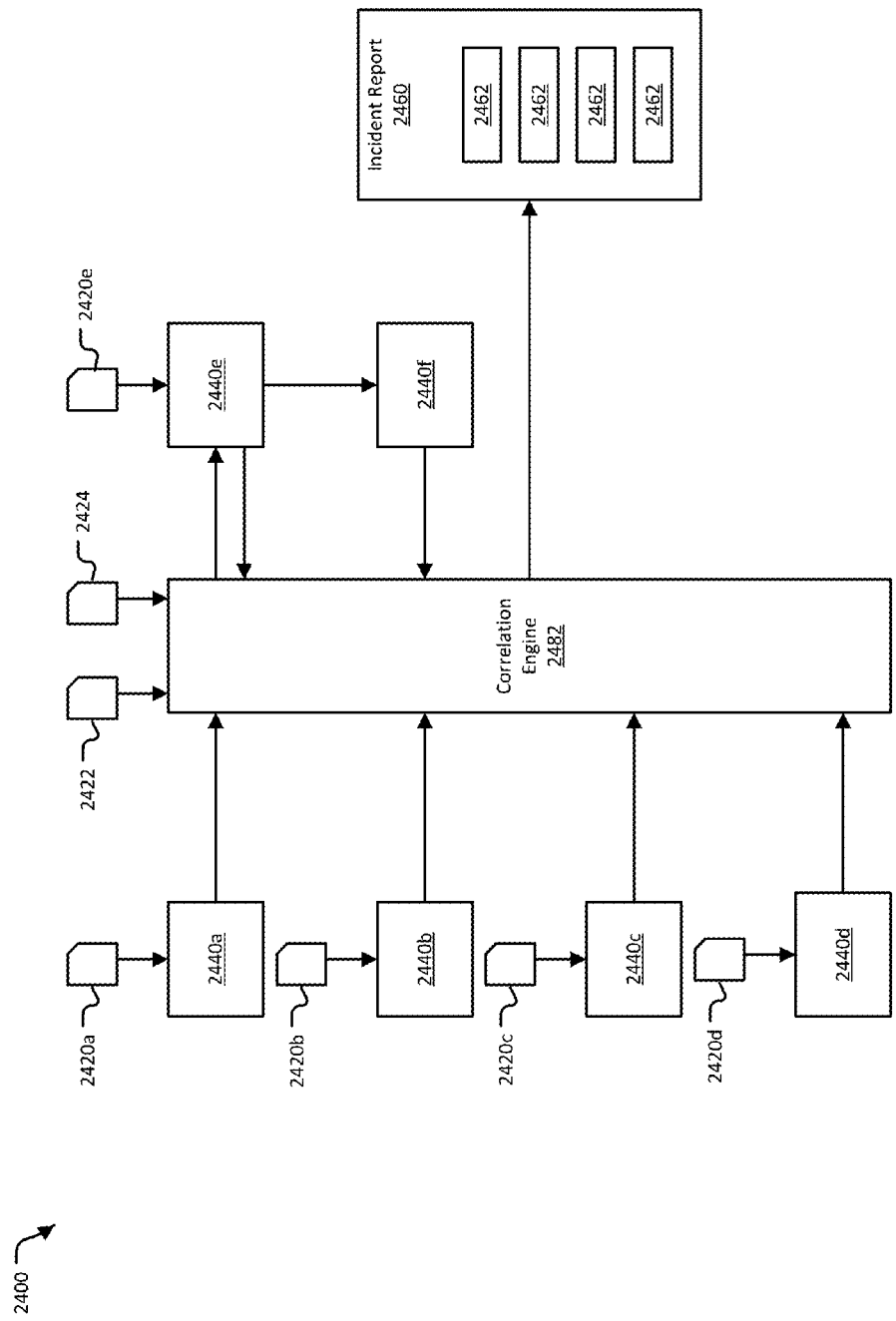
FIG. 24 illustrates an example of the order or sequence in which analysis engines can be run, as well as a correlation engine for correlating the results from the various analysis engines.

In various implementations, the analysis engines described in FIGS. 20-23 may be launched by the analytic engine in a predetermined sequence. FIG. 24 illustrates an example of the order or sequence in which analysis engines 2440a-2440f can be run, as well as a correlation engine 2482 for correlating the results from the various analysis engines 2440a-2440f In various implementations, the analytic engine executes the analysis engines 2440a-2440f in a predetermined order, which can be modified. The execution order may be based on current threat intelligence from the network security community. For example, the security community may learn that certain malware has been released on a particular date, or that several websites have suffered denial of service (DoS) attacks. In this example, the threat intelligence engine can be configured to watch particularly for denial of service attacks that look similar to the attacks seen at those websites. For example, the network protocol analysis engine can be placed first or early in the execution order, so that the network protocol analysis engine can catch streams of packets that appear to be related to a denial of service attack. New threat intelligence may be received once a day or several times a day, and analytic engine may adjust the execution of the analysis engines 2440a-2440f accordingly.

In some implementations, the analytic engine can also determine the order in which to execute the analysis engines from what can be learned from suspect network traffic. For example, an attack may take the form of a large amount of irrelevant or inappropriate email (e.g., spam email) being received by a network. The nature of this email as spam may be identified by the network's security infrastructure, and the analytic engine may use this information to invoke an email analysis engine first. The email analysis engine may conduct an analysis of the headers of the suspicious email, and determine, for example, that the email does not have a valid header (e.g., the sender's email address is invalid or has been spoofed). The result of the email header analysis can be provided to a file analysis engine and/or a log file analysis engine to determine whether attachments included in the suspect email are malicious. In contrast, should the email header analysis engine find nothing wrong with the email, then the file and log file analysis engines need not be run.

In various implementations, the analytic engine may also be able to add new analysis engines to the sequence, remove analysis engines from the sequence, and/or add or remove plugins for an analysis engine. The analytic engine may make these changes to new or different network threats and/or to update the functionality of the analytic engine. In some implementations, updates and changes to the analytic engine can be provided over the Internet. In some implementations, the analytic engine can be updated without needing to shut it down or take it off line.

In the example illustrated in FIG. 24, four analysis engines 2440a-2440d are initially launched in parallel. These four analyses engines 2440a-2440d can be one of the web-based network protocol analysis engine, other network protocol analysis engine, file activity analysis engine, log file analysis engine, or some other analysis engine included in the analytic engine. The four initial analysis engines 2440a-2440d receive as input incident data 2420a-2420d of an appropriate type (e.g., a web-based network protocol analysis engine receives web-based network traffic data; a file analysis engine receives files, etc.) The initial analysis engines 2440a-2440d can be run in parallel or sequentially; in this particular example, there is no requirement that they be run in a specific order. In some cases, there may be a requirement that the result from one analysis engine 2440a-2440d be provided to another analysis engine 2440a-2440d. In various implementations, additional or fewer analysis engines 2440a-2440f can be run initially.

Each of the initial analysis engines 2440a-2440d may produce results. These results may indicate whether a particular piece of data from the incident data 2420a-2420d is malicious, is safe, or has an undetermined status. Results that indicate particular data is safe and some results that indicate an undetermined status may be discarded, or are otherwise set aside. Results that indicate particular data is malicious, and thus very likely related to an actual attack, may be provided to the correlation engine 2482.

The correlation engine 2482 correlates the results from the various analysis engines to produce an incident report 2460. One or more of the results may indicate that the site network has, in fact, suffered an attack. For example, one or more servers in the emulated network may have crashed. The correlation engine 2482 attempts to reconstruct the sequence of events that led up to the harm caused by the attack. The analysis engines 2440a-2440f may identify events in the incident data 2420a-2420e that, by themselves, are probably malicious (e.g., downloading of a malware file). Many events in the incident data 2420a-2420e may, alone, appear innocent (e.g., receiving an email). The correlation engine 2482 attempts to connect these events, which may appear to be unrelated, and thereby reconstruct the course of the attack. Furthermore, the correlation engine 2482, in most implementations, has access to all of the data captured for the incident, and thus may be able to relate single events to events that happened both before and after. In many cases, having reconstructed the course of the attack, the report from the correlation engine 2482 can be used to identify malicious activity related to the attack.

For example, one analysis engine 2440a may indicate to the correlation engine 2482 that a malware file was downloaded to a server in the emulated network. Another analysis engine 2440b may indicate that servers in the emulated network crashed because their memory was flooded with garbage data. The correlation engine 2482 may search the incident data 2420*a*-2420*e* for a connection between these events. To continue the example, the correlation engine 2482 may find that the malware file launched a process on each of the servers that crashed. The correlation engine 2482 may further find that the servers' memory started to fill once these processes were started.

The correlation engine 2482 can also be in identify and deconstruct attacks that can otherwise be difficult to trace. One example of an attack that is difficult to trace is a "dropper" attack. A dropper is a malware installer that surreptitiously carries viruses, back doors, or other malicious software. A dropper file by itself does not cause harm directly, and cannot be identified by simple checks such as examining its file extension. Once on a computing system, the dropper file can be inadvertently activated by a user attempting to open the file, or may exploit a security vulnerability to activate itself. Once activated, the dropper file unpacks and executes its contents, which is often a malware file.

A dropper can be detected in various ways by correlating the dropper's contents—which, for purposes of the following examples, will be referred to as the contents file—back to the dropper. For example, the contents file may be executed on an emulated network device, and its malicious behavior may be both exposed and captured in log files generated by the emulated network device. As another example, a static scan of the contents file may reveal its malicious nature. As another example, the contents file, once invoked, may make calls to a command and control server located on the Internet. A command and control server (C&C server) is a centralized computer that issued commands to a botnet, and receives reports back from coopted computing systems. This malicious behavior may be captured in log files generate an emulated network device on which the contents file is launched.

In each of the above examples, the correlation engine 2482 may look for the contents file (e.g., by looking for a digital signature generated for the contents file) in other log files, and find it in a log file generated when the dropper file was itself executed. The dropper file's relationship with the contents file will thus cause the otherwise benign-seeming dropper file to be classified as malicious. Additionally, the correlation engine 2482 may be able to identify how the dropper file itself came to be on the network. For example, the correlation engine 2482 may look for the dropper file in email attachments (e.g., using a digital signature generated for the dropper file), and/or may look for the dropper file in network packets that were part of a download from the Internet. In this way, the correlation engine 2482 may be able to trace the events in the dropper attack independently from when the various events in the attack occurred.

Before being able to produce an incident report 2460, the correlation engine 2482 may require additional results for additional analysis engines 2440*e*-2440*f*. For example, to continue to previous example, the correlation engine 2482 may have determined that a malware file causes the servers to crash, but so far does know where the malware file came from or how it came to be placed in the network. The analysis engine may, in this example, invoke additional analysis engines 2440*e*-2440*f* to obtain more information. For example, one analysis engine 2440*e* may be invoked to search log files for a time at which the malware file was downloaded. Another analysis engine 2440*f* may be invoked to search network packets for the malware file. From the results from these analysis engines 2440*e*-2440*f*, the correlation engine 2482 may be able to identify where the malware file came from (e.g., an IP address of the sender) and when it was downloaded to the emulated network.

The correlation obtained so far, however, may not yet describe the whole incident. In some cases, the incident data 2420*a*-2420*e* may be incomplete. For example, suspect network traffic may be diverted to the emulated network when some network traffic is identified as suspect. The attack on the network, however, may have started before the suspect network traffic is identified, and may have escaped detection. Activity resulting from this network traffic may thus not have been captured in the incident data 2420*a*-2420*e*. In some implementations, the correlation engine 2482 thus may also receive additional data 2422, 2424, such as log files, from the site network. This additional data 2422, 2424 may include data 2422 captured by network packet monitors and data 2424 captured by computing systems in the site network, among other data available from the site network. In these implementations, the correlation engine 2482 may correlate events in the incident with events recorded in the additional data 2422, 2424. To continue the previous example, the correlation engine 2482 may learn from the additional data that a user in the site network received an email from a trusted source with an apparently innocent link, and that by following the link to a website, the user triggered downloading of the malware file.

In some implementations, the correlation engine 2482 may be able to iteratively search the incident data 2420*a*-2420*e*, repeatedly trying different searches to make connections between different events. In some implementations, the correlation engine 2482 may be able to replay the events in an incident to determine if it has found the events related to the attack, and/or to determine what resulted from a particular series of events. For example, the threat intelligence engine may receive a sequence of events, and may execute each event in the sequence.

Once the correlation engine 2482 has made a best attempt at determining the events in an attack, the correlation engine 2482 may produce an incident report 2460. The incident report 2460 includes one or more indicators 2462, each of which describe an event.

V. Adversary Trajectory

In the information security industry, it can be difficult to determine where an attack may have occurred on a network. When the attack is discovered, it can be even more difficult to determine the trajectory of the attack. An adversary trajectory engine can be configured to use network flow information of a network to determine the trajectory of an attack. In various implementations, the trajectory of an attack (or attack trajectory), describes the path taken from node to node across a network by malicious network activity, and/or seemingly harmless network activity related to malicious network activity. In some implementations, an adjacency data structure can be generated for a network. The adjacency data structure can include a first machine of the network that has interacted with a second machine of the network, where a machine may be, for example, a network device. In the adjacency data structure, the first machine can be associated with the second machine when an interaction has occurred between the first machine and the second machine. The adjacency data structure can be updated as new interactions occur on the network.

In some implementations, the network can further include one or more deception mechanisms, as described above and herein. A deception mechanism can indicate that an attack is occurring when a machine interacts with the deception mechanism. When, or after, the attack has occurred, an attack trajectory data structure can be generated. In the attack trajectory data structure, an attack trajectory path can be determined. When there are multiple possible attack trajectory paths, a probability can be computed for each attack trajectory path to determine the likelihood that the attack trajectory path is associated with a particular adversary.

Figure 25:
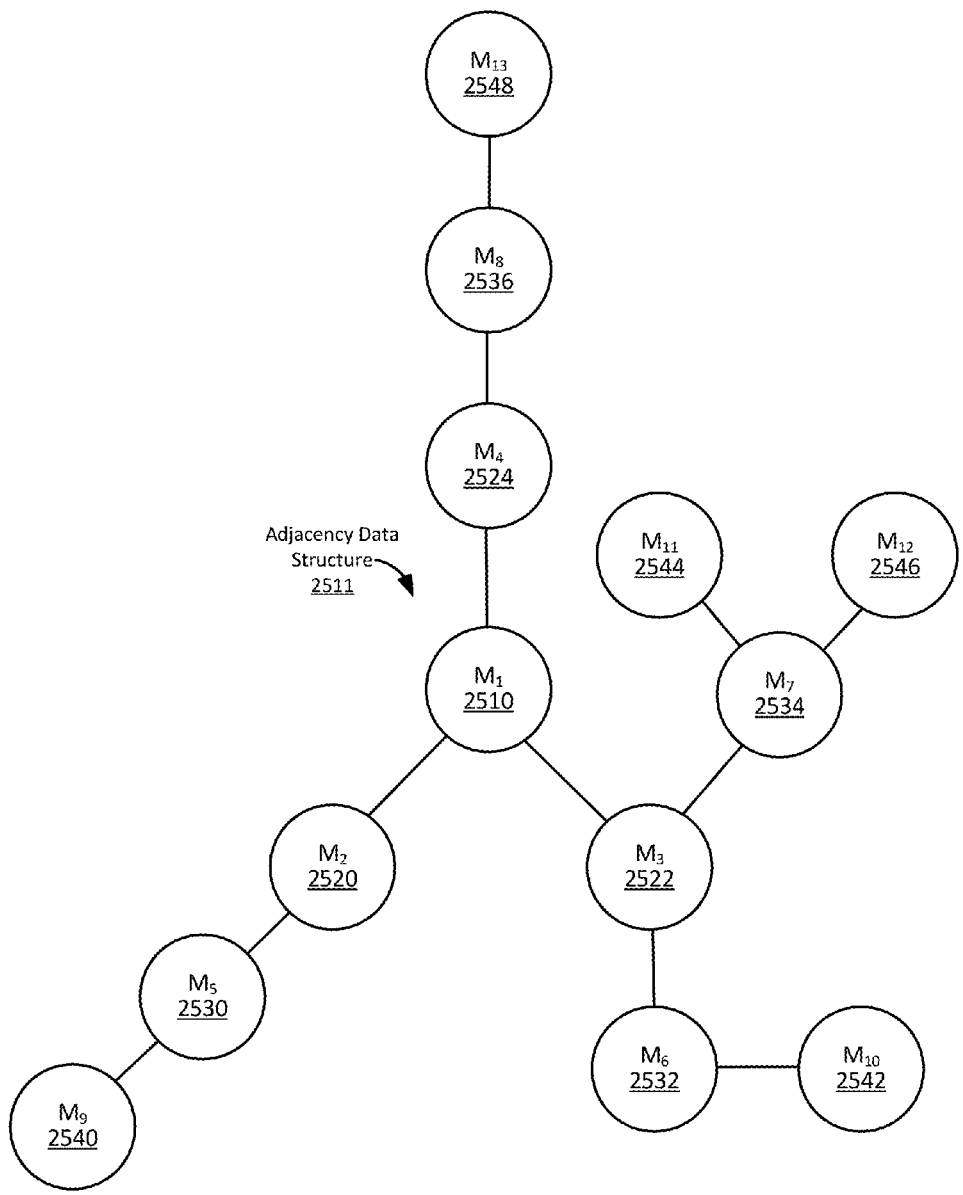
FIG. 25 is an example of an illustration of an adjacency data structure.

FIG. 25 is an example of an illustration of an adjacency data structure 2511 for a plurality of interactions in a network. In some implementations, the adjacency data structure 2511 can be an adjacency list or an adjacency matrix. In various implementations, the adjacency data structure 2511 can otherwise be any type of data structure that can organize interactions.

The adjacency data structure 2511 can be generated by correlating interactions. In some embodiments, correlating interactions can include establishing a mutual relationship or connection between two or more machines based on interactions in the network. In some embodiments, interactions can be determined by analyzing interaction information and machine information.

The interaction information can include a time stamp of an interaction, a source Internet Protocol (IP) address, a source host name, a user, a destination IP address, a destination host name, an action, a protocol type that was used for an interaction (e.g., Secure Shell, Telnet, etc.), a number of packets sent, or any combination thereof. In some examples, the action can include whether the interaction was a success or a failure. For example, a login attempt to a machine can succeed or fail. A machine can include authentication logs. Authentication logs can report a time of a login attempt, a type of protocol used for a login attempt, a username used for a login attempt, a password used for a login attempt, and any other information associated with logging in and out of the machine.

The machine information can include information associated with a machine. Examples of machine information can include a category of the machine, a city in which the machine is located, a country in which the machine is located, a domain name system (DNS) for the machine, an IP address of the machine, a latitude in which the machine is located, a longitude in which the machine is located, a media access control (MAC) address of the machine, a Microsoft Windows® machine name of the machine (e.g., nt_host), a name of the user who owns or uses the machine, and/or a Peripheral Component Interconnect (PCI) domain of the machine. Examples of a category of a machine can include a domain controller, an active directory, a server machine, and/or an end-user machine. The machine information for a machine can also include authentication logs.

In some implementations, one or more servers (e.g., a deception center) can be in communication with one or more machines on the network. In some implementations, the deception center can be in communication with a machine that is in communication with the one or more machines on the network. The deception center can include an adversary trajectory engine, configured to determine an attack trajectory, as described below. In some implementations, the deception center can coordinate other servers or machines to perform one or more of the techniques described herein.

The deception center can receive, directly or indirectly, the machine information from a machine log forwarder associated with each machine. In particular, a machine log forwarder associated with a machine can send machine information associated with the machine from the machine. The machine log forwarder can send the machine information to the deception center directly. In other embodiments, the machine log forwarder can send the machine information to a security information and event management (SIEM) system or a centralized database. In such implementations, the deception center can communicate with the SIEM or the centralized database to receive the machine information.

The machine information can be used to identify a particular machine in an adjacency data structure. For example, the host names can be used to identify each machine. In FIG. 25, the host names of the machines are in a format of $M_x$, x being a real number. For illustration purposes, a machine is represented as a circle. For example, machine $M_1$ 2510 can be a laptop computer. In addition, an interaction between two machines is illustrated in FIG. 25 as a line between two machines. Examples of interacts include a laptop computer logging into a desktop computer using a virtual private network.

In the example adjacency data structure 2511, an interaction has occurred between $M_1$ 2510 and each of $M_2$ 2520, $M_3$ 2522, and $M_4$ 2524. For example, the interaction between $M_1$ 2510 and $M_2$ 2520 may have occurred at 9:40 AM, and may have included an email exchange from $M_1$ 2510 to $M_2$ 2520 using Simple Mail Transfer Protocol (SMTP). As another example, the interaction between $M_1$ 2510 and $M_3$ 2522 may have occurred at 9:45 AM, and may have included a successful login attempt from $M_1$ 2510 to $M_2$ 2520 using Secure Shell (SSH). In this example authentication logs associated with $M_2$ 2520 can include information associated with the successful login attempt. In another example, the interaction between $M_1$ 2510 and $M_3$ 2524 may have occurred at 9:50 AM, and may have included a file transfer from $M_1$ 2510 to $M_3$ 2524 using File Transfer Protocol (FTP).

The interactions in the example adjacency data structure 2511 further include an interaction between $M_2$ 2520 and each of $M_1$ 2510 and $M_5$ 2530. In this example, the interaction between $M_2$ 2520 and $M_1$ 2510 is the same interaction described above as between $M_1$ 2510 and $M_2$ 2520. Hence, in this example, the interaction between $M_2$ 2520 and $M_1$ 2510 is not illustrated separately. The interaction between $M_2$ 2520 and $M_5$ 2530, however is a different interaction. This interaction may have, for example, occurred at 9:35 AM and may have included an email exchange from $M_2$ 2520 to $M_5$ 2530 using SMTP.

The interactions in the adjacency data structure 2511 can further include an interaction between $M_3$ 2522 and each of $M_1$ 2510, $M_6$ 2532, and $M_7$ 2534. Because the interaction between $M_1$ 2510 and $M_7$ 2534 is the same interaction described above but shown with respect to $M_3$ 2522, the adjacency data structure 2511 can forgo including the same interaction. In one illustrative example, the interaction between $M_3$ 2522 and $M_6$ 2532 occurred at 9:30 AM and included a file transfer from $M_3$ 2522 to $M_6$ 2532 using Secure Copy (SCP). In another example, the interaction between $M_3$ 2522 and $M_7$ 2534 occurred at 9:35 AM and included a successful login attempt to $M_7$ 2534 using SSH. The authentication logs associated $M_7$ 2534 can include information associated with the successful login attempt.

The interactions in the adjacency data structure 2511 can further include an interaction between $M_4$ 2524 and each of $M_1$ 2510 and $M_8$ 2536. Because the interaction between $M_1$ 2510 and $M_4$ 2524 is the same interaction described above but shown with respect to $M_4$ 2524, the adjacency data structure 2511 can forgo including the same interaction. In one illustrative example, the interaction between $M_4$ 2524 and $M_8$ 2536 occurred at 9:40 AM and included connecting $M_4$ 2524 to $M_8$ 2536 using hypertext transfer protocol (HTTP).

The interactions in the adjacency data structure 2511 can further include an interaction between $M_5$ 2530 and each of $M_2$ 2520 and $M_9$ 2540. Because the interaction between $M_2$ 2520 and $M_5$ 2530 is the same interaction described above but shown with respect to $M_5$ 2530, the adjacency data structure 2511 can forgo including the same interaction. In one illustrative example, the interaction between $M_5$ 2530 and $M_9$ 2590 occurred at 9:30 AM and included an email exchange from $M_5$ 2530 to $M_9$ 2590 using SMTP.

The interactions in the adjacency data structure 2511 can further include an interaction between $M_6$ 2532 and each of $M_3$ 2522 and $M_{10}$ 2542. Because the interaction between $M_3$ 2522 and $M_6$ 2532 is the same interaction described above but shown with respect to $M_6$ 2532, the adjacency data structure 2511 can forgo including the same interaction. In one illustrative example, the interaction between $M_6$ 2532 and $M_{10}$ 2542 occurred at 9:25 AM and included a file transfer from $M_6$ 2532 to $M_{10}$ 2542 using SCP.

The interactions in the adjacency data structure 2511 can further include an interaction between $M_7$ 2534 and each of $M_3$ 2522, $M_{11}$ 2544, and $M_{12}$ 2546. Because the interaction between $M_3$ 2522 and $M_7$ 2534 is the same interaction described above but shown with respect to $M_7$ 2534, the adjacency data structure 2511 can forgo including the same interaction. In one illustrative example, the interaction between $M_7$ 2534 and $M_{11}$ 2544 occurred at 9:10 AM and included a file transfer from $M_7$ 2534 to $M_{11}$ 2544 using SCP. In another example, the interaction between $M_7$ 2534 and $M_{12}$ 2546 occurred at 9:10 AM and included a successful login attempt from $M_7$ 2534 to $M_{12}$ 2546 using SSH. The authentication logs associated with $M_{12}$ 2546 can include information associated with the successful login attempt.

The interactions in the adjacency data structure 2511 can further include an interaction between $M_8$ 2536 and each of $M_4$ 2524 and $M_{13}$ 2548. Because the interaction between $M_4$ 2524 and $M_8$ 2536 is the same interaction described above but shown with respect to $M_8$ 2536, the adjacency data structure 2511 can forgo including the same interaction. In one illustrative example, the interaction between $M_8$ 2536 and $M_{13}$ 2548 occurred at 9:12 AM and included a file transfer from $M_8$ 2536 to $M_{13}$ 2548 using FTP.

The example adjacency data structure 2511, after correlating interactions among the different machines, can be described as follows, where arrows illustrate the machines with which a particular machine has had interactions with: $M_1 \rightarrow [M_2, M_3, M_4]$; $M_2 \rightarrow [M_5]$; $M_5 \rightarrow [M_9]$; $M_3 \rightarrow [M_6, M_7]$; $M_6 \rightarrow [M_{10}]$; $M_7 \rightarrow [M_{11}, M_{12}]$; $M_4 \rightarrow [M_8]$; $M_8 \rightarrow [M_{13}]$. The adjacency data structure 2511 can include interactions from a source to a destination. In FIG. 25, the interactions from a viewpoint of the destination to the source are omitted. In other implementations, the adjacency data structure can include all interactions, including interactions from the viewpoint of the destination to the source. In such implementations, both $M_1 \rightarrow [M_2]$ and $M_2 \rightarrow [M_1]$ would be included as well as the other destination to source interactions.

Because the number of interactions in a network can become large as time progresses, an adjacency data structure can limit the amount of network flow information from a network that is maintained. In some implementations, the limit can be based on a time frame (e.g., one hour, one day, and one week). The time frame can be some amount of time before the current time. The adjacency data structure can then include all interactions in the time frame. In some implementations, the limit can be a number of machine interactions. The limit can be implemented on a machine. For example, a machine can only store a particular number of limitations between the machine and another machine. In some implementations, the limit can be one or more types of protocols. For example, the adjacency data structure can maintain only interactions that are SSH. In some implementations, the adjacency data structure can maintain interactions of a type of protocol and also interactions of other types of protocols that are similar to the type of protocol. For example, if the adjacency data structure is maintaining interactions that use SSH, the adjacency data structure can also maintain interactions that use Telnet. In some implementations, the adjacency data structure can maintain interactions of a type of protocol and machines that include an interaction of the type of protocol. For example, if a machine used SSH for one interaction and HTTP for another interaction, both interactions can be maintained in the adjacency data structure because of the common SSH use from the machine. In some implementations, the limit can be based on any combination of the factors mentioned above, such as limiting the interactions based on any combination of time frame, number of interactions, and type of protocol.

Figure 26A:
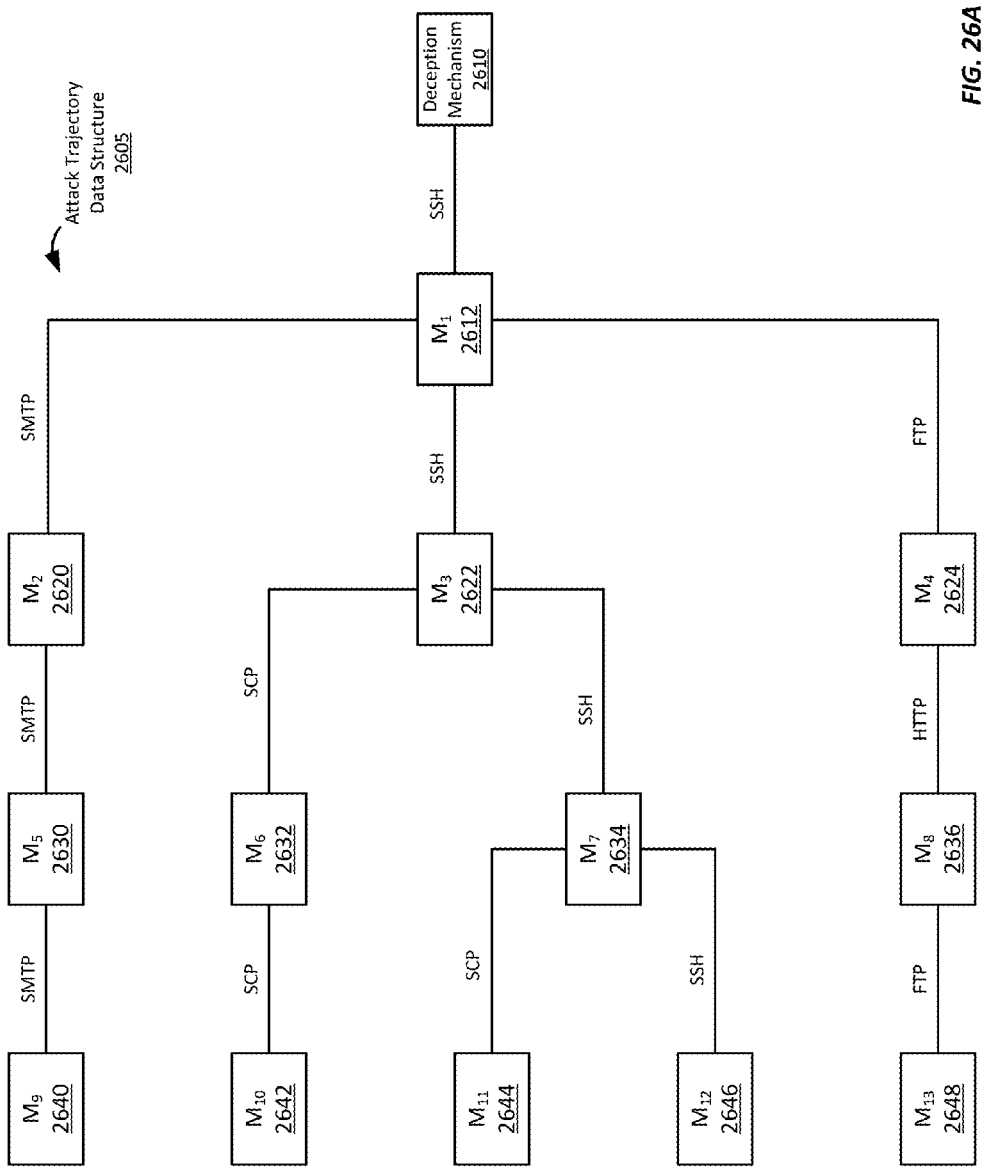
FIG. 26A is an example illustrating an attack trajectory data structure for a network.

FIG. 26A is an example illustrating an attack trajectory data structure 2605 for a network. The attack trajectory data structure 2605 can be generated using an adjacency data structure (e.g., adjacency data structure 2511) and deception mechanism interaction information.

In the example illustrated in FIG. 26A, the network can include a deception mechanism 2610, as previously discussed. The deception mechanism 2610 can be deployed with an unused IP address, meaning that the deception mechanisms 2610 is assigned an IP address that is not used by any node in the site network being analyzed. In some implementations, because the deception mechanism 2610 is deployed with an unused IP address, normal network traffic would not attempt to access the deception mechanism 2610. The deception mechanism 2610 can emulate a service on a port to lure adversaries to interact with the port. An adversary can be any person, machine, program, or other entity that attacks or attempts to attack a machine or system on a network. In some examples, an adversary can be an individual that is logging into a machine. In some examples, an adversary can be malware. By interacting with the deception mechanism 2610, an interaction by a machine can be identified as being associated with an adversary or attacker because the deception mechanism 2610 would not be accessed otherwise.

In addition, deception mechanism interaction information can be received regarding any interaction with the deception mechanism 2610. The deception mechanism interaction information can be used to determine the trajectory of the adversary. The deception mechanism interaction information can include, for example, machine information, as discussed above, about the machine that interacted with the deception mechanism 2610. The deception mechanisms information can also include information about an interaction. Interaction information can, for example, include a network protocol type, among other things. The deception mechanism information can include other information, such as information that is gathered based on the network protocol type. For example, if the network protocol type is SSH, the deception mechanism interaction information can include a username, a password, and/or number of failed attempts.

The adjacency data structure 2511 of FIG. 25 can be used to generate the attack trajectory data structure 2605 of FIG. 26A. The attack trajectory structure 2605 describes each of the possible paths that can occur, given the adjacency data structure 2511. The attack trajectory data structure 2605 can be generated by following the various paths in the adjacency data structure 2511. In particular, once the deception mechanism 2610 has interacted with by $M_1$ 2612, an adversary trajectory engine can generate the attack trajectory data structure 2605 by stepping through the adjacency data structure 2511, starting at $M_1$ 2510, to determine the possible trajectories of the adversary.

In this example, an interaction has occurred between $M_1$ 2612 and a deception mechanism 2610, where the interaction involved SSH. Referring to the adjacency data structure 2511, the adversary trajectory engine can determine that $M_1$ 2510 interacted with $M_2$ 2520, which in turn interacted with $M_5$ 2530, which in turn interacted with $M_9$ 2540. Given these interactions, the attack trajectory data structure 2605 this includes a path from $M_1$ 2612 to $M_2$ 2620 to $M_5$ 2630 and ending at $M_9$ 2640. The attack trajectory structure 2605 may also note that the interactions along this path involved SMTP data exchanges.

Similarly, the adjacency data structure 2511 indicates that $M_1$ 2510 interacted with $M_3$ 2522, which interacted with $M_6$ 2532, which in turn interacted with $M_{10}$ 2542. The attack trajectory data structure 2605 thus contains a path from $M_1$ 2612 to $M_3$ 2622 to $M_6$ 2632 and terminating at $M_{10}$ 2642. The attack trajectory data structure 2605 may further indicate that the interaction between $M_1$ 2612 and $M_3$ 2622 involved an SSH communication, while the interactions between $M_3$ 2622, $M_6$ 2632, and $M_{10}$ 2642 involved SCP communications.

The adjacency data structure 2511 also indicates that $M_3$ 2522 interacted with $M_7$ 2534, which in turn interacted with $M_{11}$ 2544. The attack trajectory data structure 2605 may thus include a path from $M_3$ 2622 to $M_7$ 2634 to $M_{11}$ 2644. The attack trajectory data structure 2605 may further indicate that the interaction between $M_3$ 2622 and $M_7$ 2634 involved SSH, while the interaction between to $M_7$ 2634 and $M_{11}$ 2644 involved SCP.

The adjacency data structure 2511 further indicates that $M_7$ 2534 interacted with $M_{12}$ 2546. The attack trajectory structure 2605 may thus include a path from $M_7$ 2634 to $M_{12}$ 2646. The attack trajectory structure 2605 may further indicate that the interaction between $M_7$ 2634 and $M_{12}$ 2646 involved SSH.

The adjacency data structure 2511 also indicates that $M_1$ 2510 interacted with $M_4$ 2524, which in turn interacted with $M_8$ 2536, which in turn interacted with $M_{13}$ 2548. The attack trajectory structure 2605 may thus include a path from $M_1$ 2612 to $M_3$ 2624 to $M_8$ 2636 and ending at $M_{13}$ 2648. The attack trajectory data structure 2605 can further indicate that the interactions between $M_1$ 2612, $M_3$ 2624, $M_8$ 2636, and $M_{13}$ 2648 involved FTP communications.

The attack trajectory data structure 2605 can be generated by using a modified depth first search algorithm. The modified depth first search algorithm can analyze all of the machine interactions from each machine before stepping deeper into the adjacency data structure 2511. Other search algorithms can be used, including breadth first search and Monte Carlo tree search.

The adversary trajectory engine can determine an attack trajectory path using an attack trajectory data structure. In some embodiments, the attack trajectory path can be determined based on interaction information between a machine and a deception mechanism. For example, the deception center can determine one or more interactions in the attack trajectory data structure that are connected (directly or indirectly) to the deception mechanism and include one or more common elements to the interaction information between the machine and the deception mechanism. The one or more common elements can include a type of protocol, a common username, a number of login attempts, or a combination thereof.

In some embodiments, the attack trajectory path can be determined based on a user-specified machine. The user-specified machine can be a machine in the network that a user determines is a point of origin of an attack. In such an embodiment, the attack trajectory path can be determined from a deception mechanism to the user-specified machine. For example, a user can specify that the attacker accessed the system through an e-mail server. The attack trajectory path can then determine an attack trajectory path from a deception mechanism to the e-mail server. In such an example, the attack trajectory path can illustrate that the attacker accessed the e-mail server, one or more other machines, and the deception mechanism. By providing a user-specified machine, the attack trajectory path can isolate the attack trajectory paths that include the user-specified machined (e.g., an email server, a password database, a database with personal information, a DHCP server, or other user-specified machine).

In some embodiments, the attack trajectory path can be determined from a machine rather than the deception mechanism. For example, a user can specify a machine that is known to include a vulnerability or malware. The adversary trajectory engine can determine an attack trajectory path from that machine as if the machine interacted with a deception mechanism.

Figure 26B:
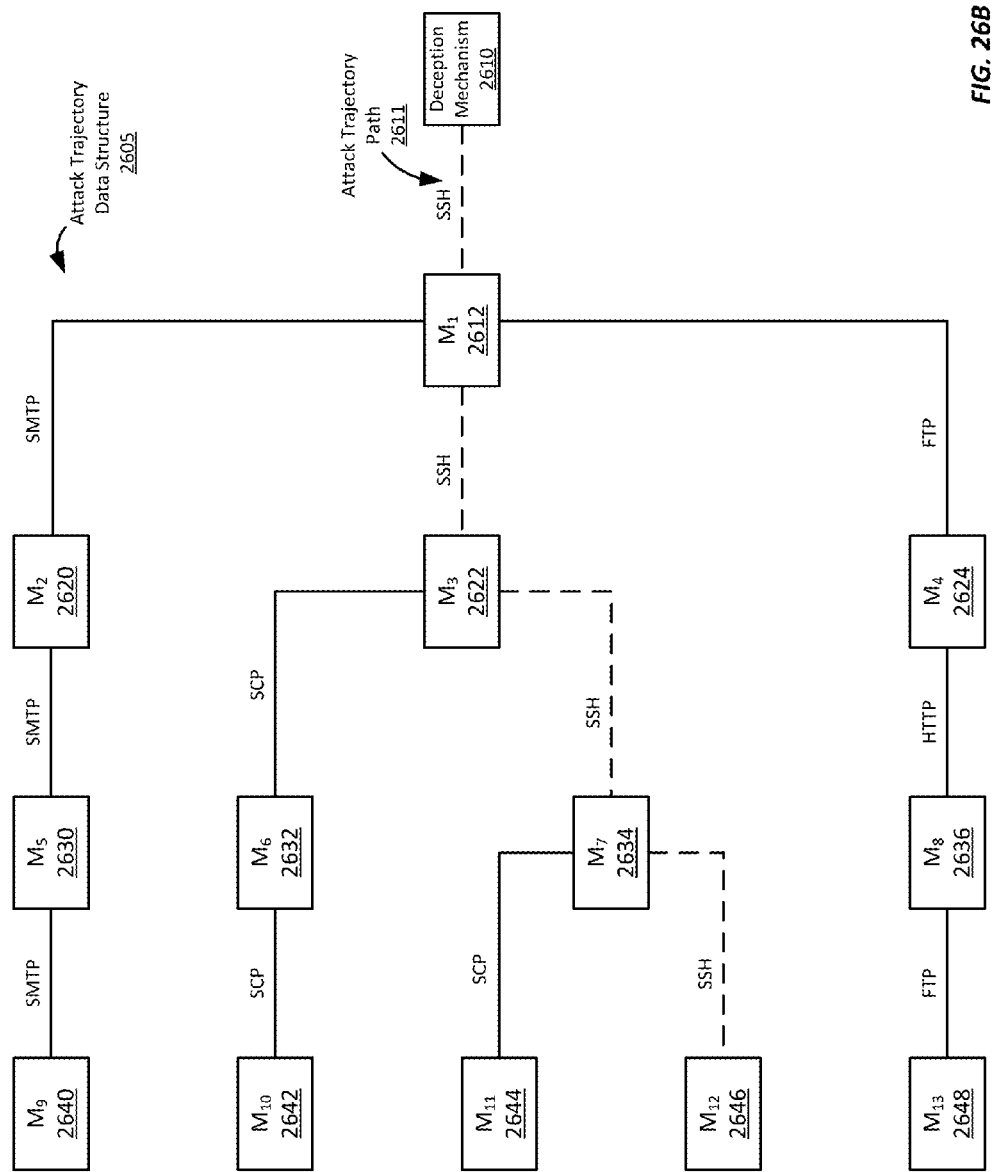
FIG. 26B is an example illustrating an attack trajectory path that is highlighted in the attack trajectory data structure of FIG. 26A.

FIG. 26B is an example illustrating an attack trajectory path 2611 that is highlighted in the attack trajectory data structure 2605 of FIG. 26A. The adversary trajectory engine can use the attack trajectory data structure 2605 to determine the attack trajectory path 2611 of FIG. 2B. For example, the adversary trajectory engine can search the attack trajectory data structure 2605 for a path that uses a particular protocol. For example, the protocol can include an SSH protocol. In this example, SSH can be used as the protocol because the interaction between $M_1$ 2612 and the deception mechanism 2610 used SSH, indicating that the adversary used the SSH protocol. In this example, the attack trajectory path 2611 can include $M_1$ 2612, $M_3$ 2622, $M_7$ 2634, and $M_{12}$ 2646 for the network, as shown in FIG. 26B.

Figure 27:
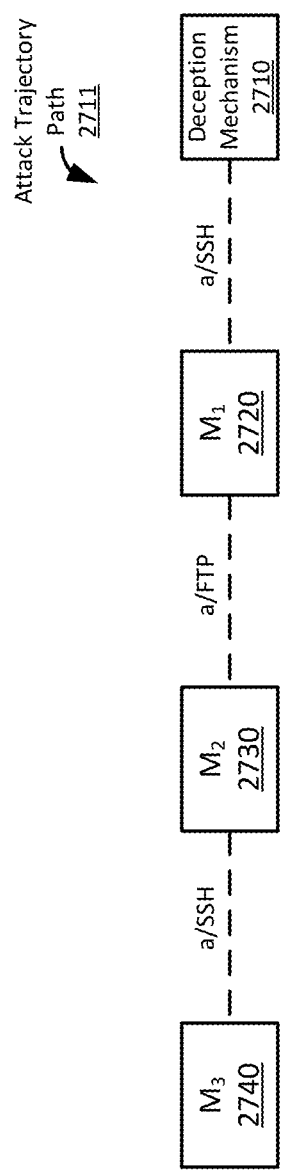
FIG. 27 is an example illustrating an attack trajectory path using username to determine a path of an adversary in a network.

FIG. 27 is an example illustrating an attack trajectory path 2711 using username to determine a path of an adversary in a network. The network can include a deception mechanism 2710, $M_1$ 2720, $M_2$ 2730, and $M_3$ 2740. In one example, a first interaction occurred between the deception mechanism 2710 and $M_1$ 2720 at 9:00 AM and included a successful login attempt from $M_1$ 2720 to the deception mechanism 2710 with a username "a," and using SSH. In another example, a second interaction occurred between $M_1$ 2720 and $M_2$ 2730 at 8:50 AM and included a successful login attempt from $M_2$ 2730 to $M_1$ 2720 with the username "a," and using FTP. In another example, a third interaction occurred between $M_2$ 2730 and $M_3$ 2740 at 8:40 AM and included a successful login attempt from $M_3$ 2740 to $M_2$ 2730 with the username "a," and using SSH. If the attack trajectory path 2711 is using a common username to determine the path of the adversary, the attack trajectory path 2711 can include $M_1$ 2720, $M_2$ 2730, and $M_3$ 2740.

Figure 28:
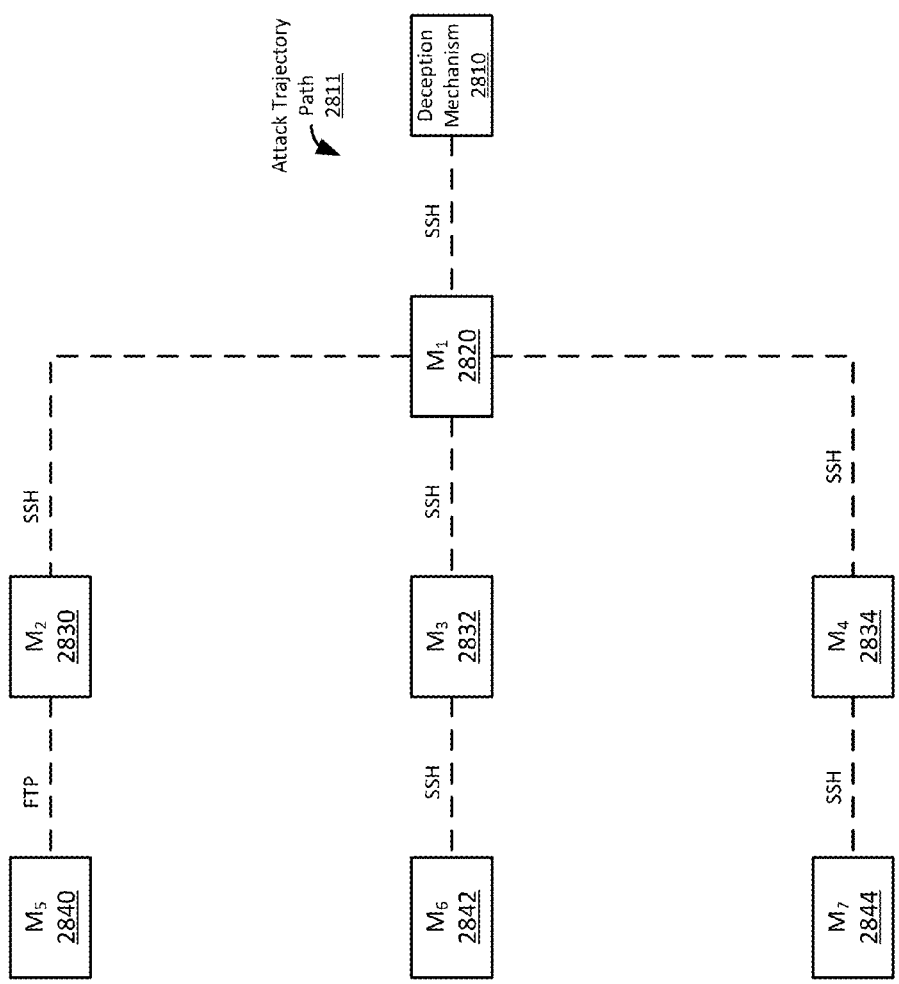
FIG. 28 is another example of illustrating an attack trajectory path for a network.

FIG. 28 is another example of illustrating an attack trajectory path 2811 for a network. The network can include a deception mechanism 2810, $M_1$ 2820, $M_2$ 2830, $M_3$ 2832, $M_4$ 2834, $M_5$ 2840, $M_6$ 2842, and $M_7$ 2844. In this example, $M_1$ 2820 and $M_3$ 2832 can be end-user machines; $M_2$ 2830, $M_4$ 2834, and $M_5$ 2840 can be server machines; $M_6$ 2842 can be an active directory; and $M_7$ 2844 can be a domain controller. In one example, a first interaction occurred between the deception mechanism 2810 and M$_1$ 2820 at 9:00 AM and included a successful login attempt from M$_1$ 2820 to the deception mechanism 2810 with a username "a," and using SSH. In another example, a second interaction occurred between M$_1$ 2820 and M$_2$ 2830 at 8:50 AM and included a successful login attempt from M$_2$ 2830 to M$_1$ 2820 with the username "a," and using SSH. In another example, a third interaction occurred between M$_1$ 2820 and M$_3$ 2832 at 8:49 AM and included a successful login attempt from M$_3$ 2832 to M$_1$ 2820 with a username "b," and using SSH. In another example, a fourth interaction occurred between M$_1$ 2820 and M$_4$ 2834 at 8:48 AM and included a successful login attempt from M$_4$ 2834 to M$_1$ 2820 with the username "b," and using SSH. In another example, a fifth interaction occurred between M$_2$ 2830 and M$_5$ 2840 at 8:40 AM and included a successful login attempt from M$_5$ 2840 to M$_2$ 2830 with the username "a," and using FTP. In another example, a sixth interaction occurred between M$_3$ 2820 and M$_6$ 2842 at 8:39 AM and included a successful login attempt from M$_6$ 2842 to M$_3$ 2820 with the username "b," and using SSH. In another example, a seventh interaction between M$_4$ 2820 and M$_7$ 2844 at 8:38 AM and included a successful login attempt from M$_7$ 2844 to M$_4$ 2820 with the username "b," and using SSH.

For the network of FIG. 28, the attack trajectory path 2811 can include three at least partially separate paths. A first separate path can include M$_1$ 2820, M$_2$ 2830, and M$_5$ 2840. A second path can include M$_1$ 2820, M$_3$ 2832, and M$_6$ 2842. A third path can include M$_1$ 2820, M$_4$ 2834, and M$_7$ 2844. Each separate path can include a probability that an attack used each of the particular paths. One way to compute the probability includes summing the weight of each machine in the path, multiplied by a weight of each protocol used in the interactions between the machines. In some implementations, a path weight can be computed using the following equation:

$$\text{PathWeight}(M(x) \to M(y)) = MWeight(M(1)) + \sum_{i=2}^{n} [MWeight(i) * PWeight(M(i) \to M(i-1))]$$

In the above equation, MWeight(x) is a function that returns a number based on the machine information of M$_x$. In some implementations, the function for MWeight(x) can be based on the category of the machine. Each category can have a predetermined weight value. For example, a domain controller can be defined as having a weight of 4; an active directory can be defined as having a weight of 3; a server machine can be defined as having a weight of 2; and an end-user machine can be defined as having a weight of 1. Alternatively or additionally, the function for MWeight(x) can be based on one or more elements of machine information. The function for MWeight(x) can also be based on number of failed attempts at some action by one or more machines. The function for MWeight(x) can also be based on the number of file system changes or malware installations on the machine.

In the above equation, PWeight(x→z) is a function that returns a number based on a protocol type used for an interaction between machines. In some implementations, the number returned by PWeight(x→z) is a predetermined weight value. For example, SSH can be defined as having a weight of 5 and FTP can be defined as having a weight of 2. The PathWeight value can then be converted into a probability by dividing each PathWeight by the total number of PathWeights.

Using the PathWeight equation above for FIG. 28 and the example weight values provide above, the path weight for each of the three example paths can be computed as follows:

Path Weight(M(1)→M(5))=MWeight(M1)+MWeight(M(2))*PWeight(M(2)→M(1))+MWeight(M(5))*PWeight(M(5)→M(2))=1+2*5+2*2=15;

PathWeight(M(1)→M(6))=17; and

PathWeight(M(1)→M(7))=31.

The PathWeight can then be converted into a probability. Using the example values above, the results are: Probability of M$_1$→M$_5$=15/63=0.238; probability of M$_1$→M$_6$=17/63=0.269; and probability of M$_1$→M$_7$=31/63=0.492. In some implementations, after computing the probabilities, the adversary trajectory engine can remove the paths that are below a specified threshold. Alternatively or additionally, the adversary trajectory engine can remove all paths except for the highest probability path. In some implementations, the adversary trajectory engine can keep all the paths along with the associated probability for presenting the results.

In various implementations, other functions can be used to compute the PathWeight. In some implementations, the PathWeight can be based on the weights of machines (e.g., MWeight(x)). For example, PathWeight(M(1)→M(5))= MWeight(M1)+MWeight(M(2))+MWeight(M(5)). In some implementations, the PathWeight can be based on a number of login failures. For example, PathWeight(M(1)→M(5))= LoginFailures(M1)+LoginFailures (M(2))+LoginFailures (M(5)). In some implementations, the PathWeight can be based on most suspicious number of login failures. These implementations can modify LoginFailures(x) to ignore login failures that may not be suspicious. For example, login failures that end in a success within less than three tries can be determined not to be suspicious and able to be ignored by LoginFailures(x).

VI. Similarity Engine

As discussed above, a behavioral analytics engine in a deception center may include an adversary trajectory engine and/or a similarity engine. The behavioral analytics engine may receive indicators from a threat analysis engine, where these indicators describe an incident captured by the deception center. In various implementations, the indicators may describe network device emulated in the emulated network that were affected by a network attack. In various implementations, the similarity engine may provide a system for identifying similar machines in a site network.

Figure 29:
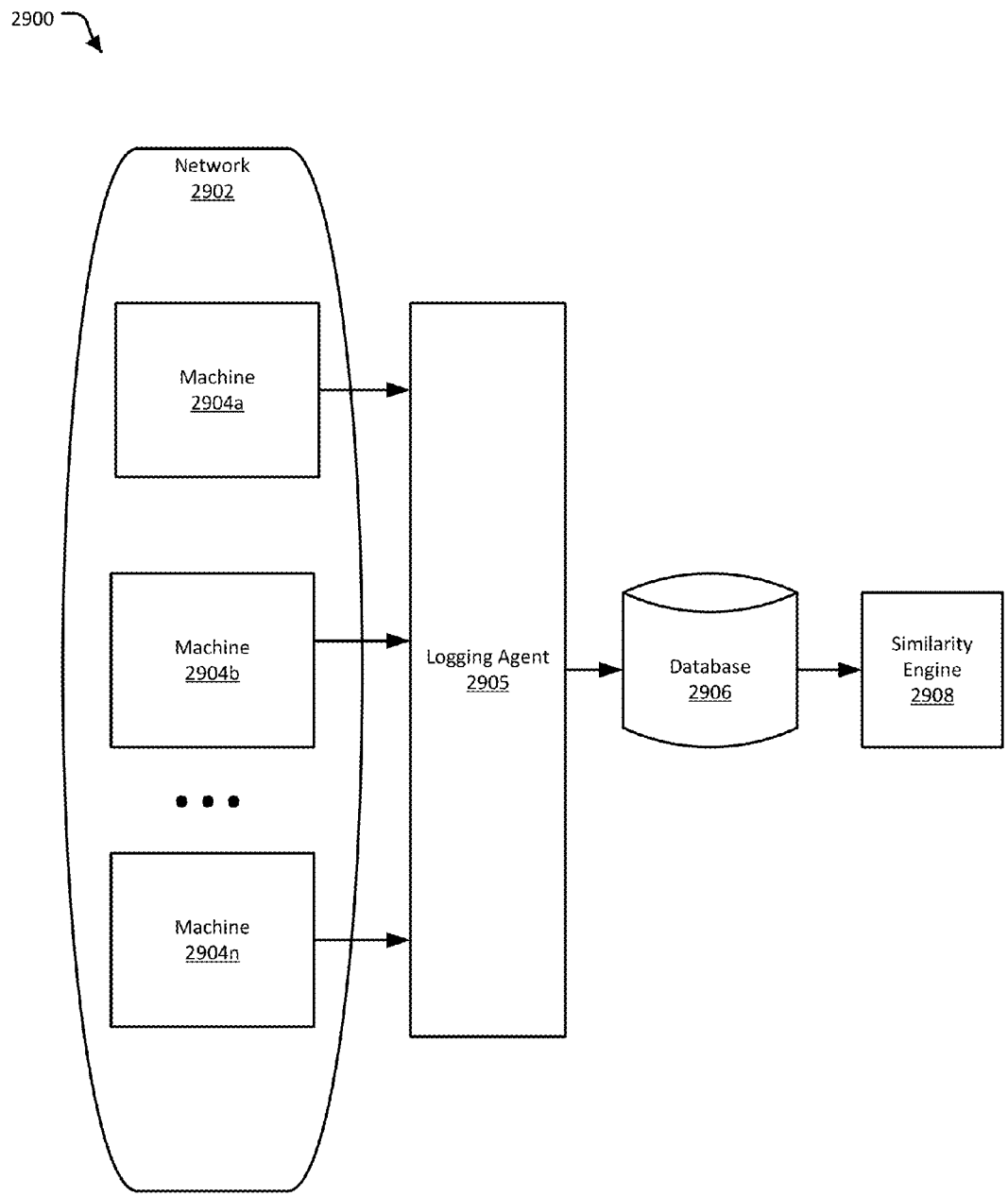
FIG. 29 illustrates an example of a system or identifying similar machines.

FIG. 29 illustrates an example of a system 2900 for identifying similar machines. System 2900 includes a plurality of machines 2904a-2904n on a network 2902, a logging agent 2905, a database 2906, and a similarity engine 2908. The plurality of machines 2904a-2904n may include a query item (e.g., a compromised machine or population centroid of a plurality of compromised machines), as well as one or more candidate items to be compared to the query item. Although illustrated as having three machines 2904a-2904n on network 2902, it is contemplated that any number n of machines may be present on the network 2902. Further, although illustrated as existing outside of the network 2902, it is contemplated that the logging agent 2905, database 2906, and/or similarity engine 2908 may also reside on the network 2902. In various implementations, the network 2902 may be, for example, a site network and/or an emulated network.

In this example, each of the machines 2904a-2904n is in communication with a logging agent 2905. In some implementations, the logging agent 2905 is in a scanner (not shown), and all of the data collected by the scanner is stored in a database. The logging agent 2905 monitors the machines 2904a-2904n and creates logs of collected data from the machines 2904a-2904n. The logs are stored in database 2906. The collected data may include any data regarding the machines 2904a-2904n, such as attribute data. Attribute data may include machine data, vulnerability data, malware data, authentication data, file system changes, and/or intrusion detection data, as described further herein.

Attribute data collected by the logging agent 2905 and stored in the database 2906 may be provided to the similarity engine 2908. The similarity engine 2908 uses the attribute data of a query item of the machines 2904a-2904n and compares it to the attribute data of one or more candidate items of the machines 2904a-2904n to identify similar items, as described further below.

Although illustrated as being separate from the machines 2904a-2904n, it is contemplated that a logging agent can instead be present internally on each of the machines 2904a-2904n. Further, although a single logging agent 2905 is illustrated, it is contemplated that multiple similar or different logging agents can be present externally from or internally on each machine 2904a-2904n. An example of one such implementation is described with respect to FIG. 30.

Figure 30:
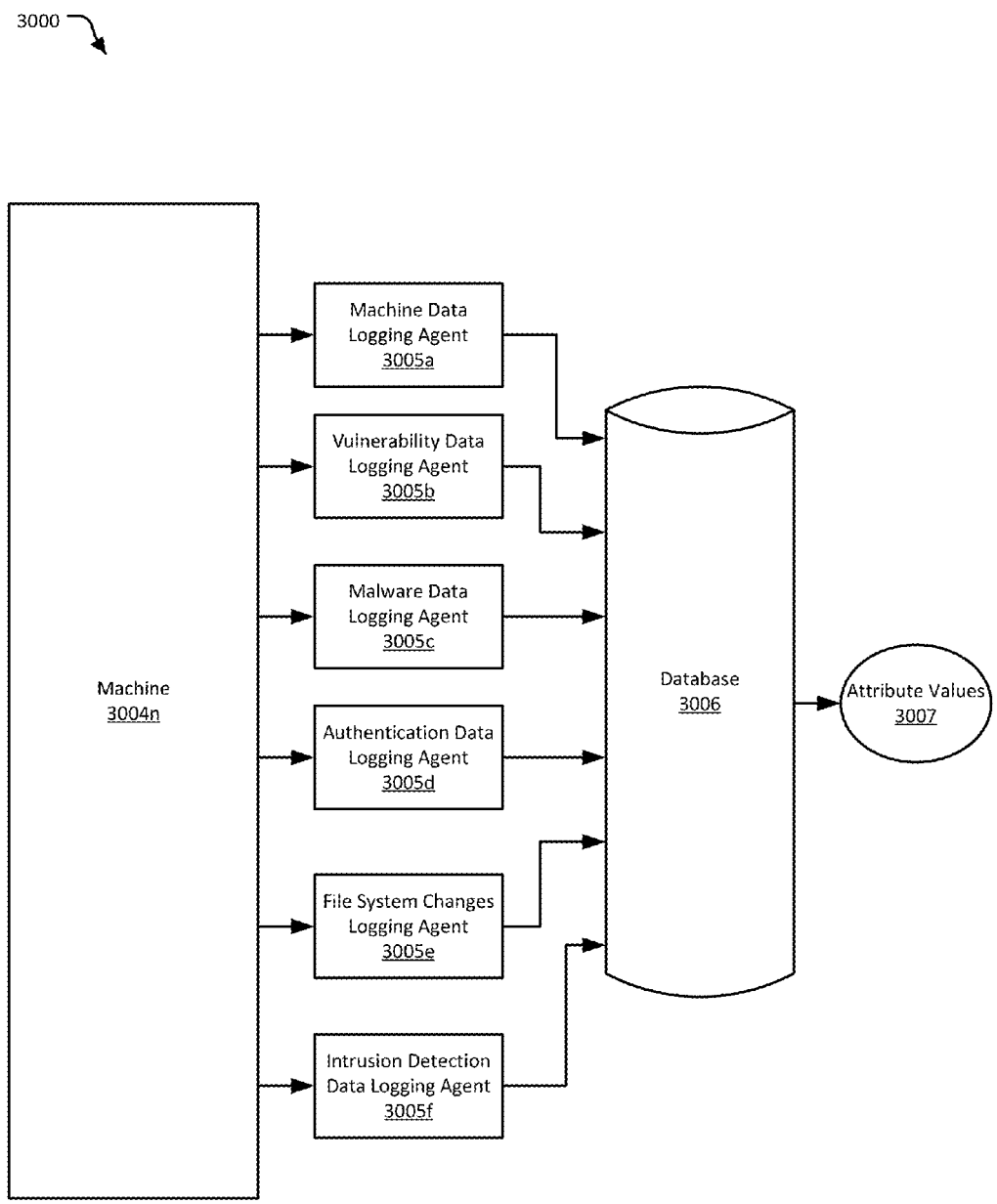
FIG. 30 illustrates an example of a machine in a system for identifying similar machines.

FIG. 30 illustrates an example of a machine 3004n in a system 3000 for identifying similar machines. The machine 3004n may be similar to any or all of the machines 2904a-2904n of FIG. 29. The machine 3004n may be, for example, a network device. The machine 3004n is in communication with logging agents 3005a-3005f. The logging agents 3005a-3005f may be similar to the logging agent 2905 of FIG. 29.

The machine 3004n of FIG. 30 provides a plurality of attribute data 3010a-3010f relating to the machine 3004n to the logging agents 3005a-3005f. For example, the machine 3004n may provide machine data to a machine data logging agent 3005a; vulnerability data to a vulnerability data logging agent 3005b; malware data to a malware data logging agent 3005c; authentication data to an authentication data logging agent 3005d; file system change data to a file system changes logging agent 3005e; and/or intrusion detection data to a intrusion detection logging agent 3005f. Although shown and described as having six types of logging agents 3005a-3005f for six types of data, it is contemplated that any number of types and combinations of attribute data may be provided by the machine 3004n to any number of types and combinations of logging agents, including additional types of attribute data and/or logging agents that are not shown. Further, it is contemplated that the logging agents 3005a-3005f may be combined into fewer or broken down into a greater number of logging agents. Although illustrated as being separate from the machine 3004n, it is contemplated that the logging agents 3005a-3005f can instead be present internally on the machine 3004n.

Machine data provided to the machine data logging agent 3005a can include information associated with the machine 3004n. Examples of machine data include a category of the machine, a type of operating system of the machine, a city in which the machine is located, a country in which the machine is located, a domain name system (DNS) for the machine, an IP address of the machine, a latitude in which the machine is located, a longitude in which the machine is located, a media access control (MAC) address of the machine, a Microsoft Windows® machine name of the machine (e.g., nt_host), a name of the user who owns or uses the machine, a host name associated with the machine, and a Peripheral Component Interconnect (PCI) domain of the machine. Examples of a category of a machine can include a domain controller, an active directory, a server machine, and an end-user machine.

Vulnerability data provided to the vulnerability data logging agent 3005b can include information associated with detected the vulnerabilities of machine 3004n. Exemplary types of vulnerability data include a category of a detected vulnerability and a severity of a detected vulnerability. Examples of attributes within a category of a detected vulnerability can include DOS and hardware. Examples of attributes within severity of a detected vulnerability can include critical, high and informational.

The following table provides examples of attribute values that could represent the number of times the associated vulnerability attributes were detected on the machine 3004n.

| Vulnerability Attribute | Attribute Value |
| --- | --- |
| DOS | 12 |
| Hardware | 4 |
| Critical | 8 |
| High | 3 |
| Informational | 5 |

Thus, the vulnerability data of machine n 3004n could be represented as:

| | DOS | Hardware | Critical | High | Informational |
| --- | --- | --- | --- | --- | --- |
| Machine n | 12 | 4 | 8 | 3 | 5 |

Malware data provided to the malware data logging agent 3005c can include information associated with detected malware on the machine 3004n. Examples of malware data include a signature (i.e., a name of the malware infection detected) and an action (i.e., an action taken by the machine in response to the malware). Examples of signatures can include key logger and LeakTest. Examples of actions can include allowed, blocked, and deferred.

The following table provides examples of attribute values that could represent the number of times the associated malware attributes were detected on the machine 3004n.

| Malware Attribute | Attribute Value |
| --- | --- |
| Allowed | 12 |
| Blocked | 4 |
| Deferred | 8 |
| Key Logger | 18 |
| LeakTest | 6 |

Thus, the malware data of machine n 3004n could be represented as:

| | Allowed | Blocked | Deferred | Key Logger | LeakTest |
| --- | --- | --- | --- | --- | --- |
| Machine n | 12 | 4 | 8 | 18 | 6 |

Authentication data provided to the authentication data logging agent 3005d can include information regarding log-in and log-out activities involving the machine 3004n. Examples of authentication data include an action (i.e., the action performed on the resource on the machine), app (i.e., the application involved in the activity), src (i.e., the source machine involved in the authentication), and dest (i.e., the destination machine involved in the authentication). Examples of actions can include success, failure and unknown. Examples of apps include ssh and splunk.

The following table provides an example of attribute values that could represent the number of times the associated authentication attributes were detected on the machine 3004n.

| Authentication Attribute | Attribute Value |
|---|---|
| Success | 5 |
| Failure | 6 |
| Unknown | 4 |
| ssh | 10 |
| Splunk | 5 |

Thus, the authentication data of the machine 3004n could be represented as:

|  | Success | Failure | Unknown | ssh | Splunk |
|---|---|---|---|---|---|
| Machine n | 5 | 6 | 4 | 10 | 5 |

File system changes provided to the file system changes logging agent 3005e can include information associated with file system changes on the machine 3004n. Examples of file system changes can include actions and change types. Examples of actions can include created, read, modified, and deleted. Examples of change types can include filesystem and AAA.

The following table provides examples of attribute values that could represent the number of times the associated file system change attributes were detected on the machine 3004n.

| File System Change Attribute | Attribute Value |
|---|---|
| Created | 5 |
| Read | 6 |
| Modified | 3 |
| Deleted | 8 |
| filesystem | 17 |
| AAA | 5 |

Thus, the file system change data of the machine 3004n could be represented as:

|  | Created | Read | Modified | Deleted | filesystem | AAA |
|---|---|---|---|---|---|---|
| Machine n | 5 | 6 | 3 | 8 | 17 | 5 |

Intrusion detection data provided to the intrusion detection logging agent 3005f can include information associated with detected attacks on machine 3004n. Intrusion detection data may be gathered by one or more applications on the machine 3004n, or may be gathered by other network monitoring devices. Examples of intrusion detection data can include intrusion detection system type (i.e., the type of intrusion detection system that generated the event) and severity. Examples of intrusion detection system types can include network, host and application. Examples of severity include critical, high, medium and low.

The following table provides examples of attribute values that could represent the number of times the associated intrusion detection attributes were detected on the machine 3004n.

| Intrusion Detection Attribute | Attribute Value |
|---|---|
| Network | 12 |
| Host | 4 |
| Application | 8 |
| Critical | 8 |
| High | 7 |
| Medium | 5 |
| Low | 4 |

Thus, the intrusion detection data of the machine 3004n could be represented as:

|  | Network | Host | Application | Critical | High | Medium | Low |
|---|---|---|---|---|---|---|---|
| Machine n | 12 | 4 | 8 | 8 | 7 | 5 | 4 |

As described further herein, the attribute data including machine data, vulnerability data, malware data, authentication data, file system changes, and intrusion detection data is collected by the logging agents 3005a-3005f. Logging agents 3005a-3005f store the attribute data in a database 3006. The database 3006 can be accessed by the similarity engine (not shown) to obtain attribute values 3007.

Figure 31:
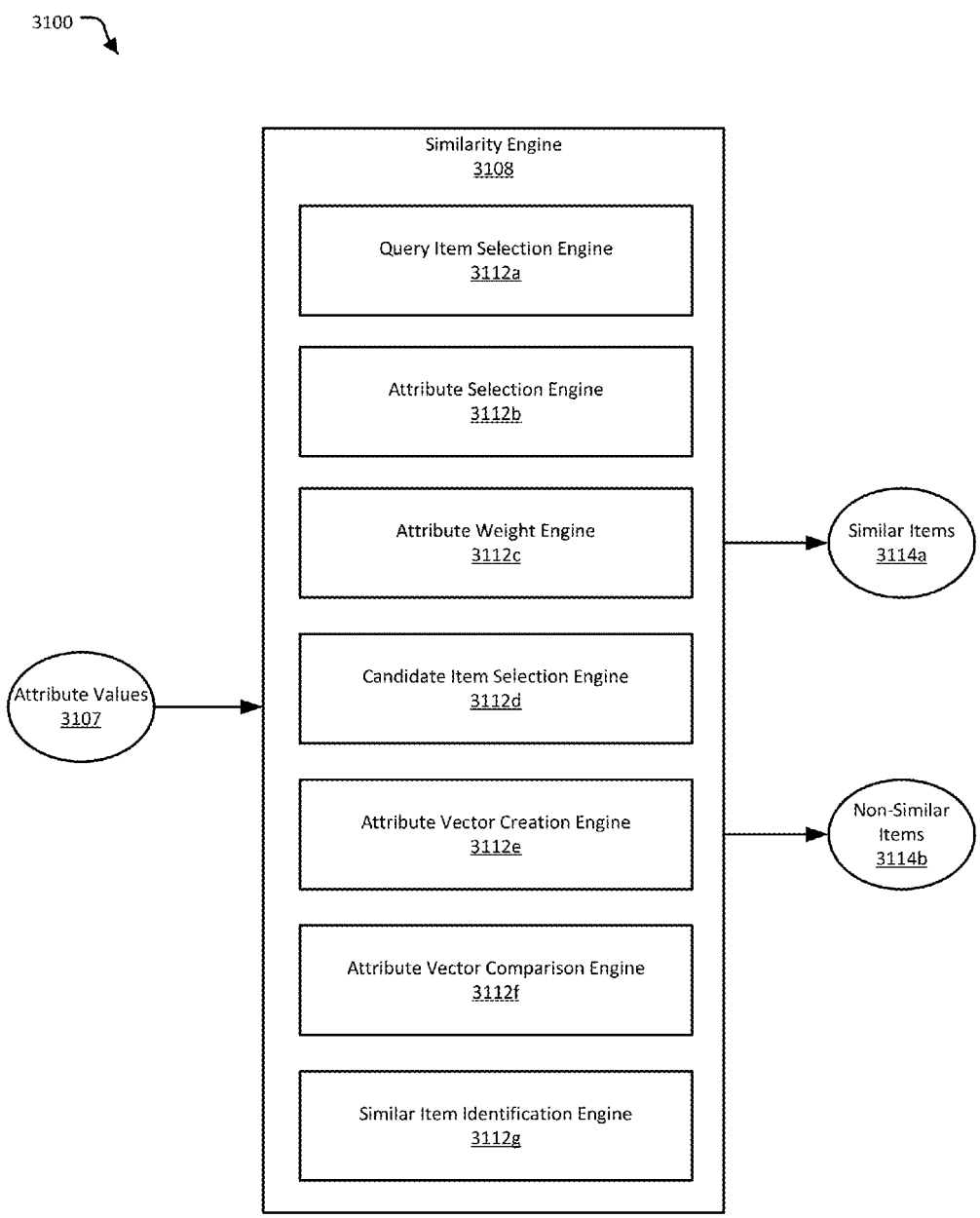
FIG. 31 illustrates an example of a similarity engine in a system for identifying a similar item.

FIG. 31 illustrates an example of a similarity engine 3108 in a system 3100 for identifying a similar item 3114. The similarity engine 3108 may be similar to similarity engine 2908 of FIG. 29. The similarity engine 3108 of FIG. 31 receives attribute values 3107. The attribute values 3107 may be similar to the attribute values 3007 of FIG. 30. Similarity engine 3108 of FIG. 31 outputs similar items 3114a and/or non-similar items 3114b.

The similarity engine 3108 includes a plurality of engines 3112a-3112g for determining the similar items 3114a. The engines include a query item selection engine 3112a, an attribute selection engine 3112b, an attribute weight engine 3112c, a candidate item selection engine 3112d, an attribute vector creation engine 3112e, an attribute vector comparison engine 3112f, and a similar item identification engine 3112g. Although shown and described as having seven engines 3112a-3112g, it is contemplated that any number and combination of engines may be provided by the similarity engine 3108, including additional engines performing additional functions that are not shown. It is contemplated that the engines 3112a-3112g may be implemented on one or multiple servers associated with the similarity engine 3108. Further, it is contemplated that some or all of the data needed to perform the functions of the engines 3112a-3112g may be provided or determined automatically by the similarity engine 3108, or may be specified by a user.

The query item selection engine 3112a is configured to determine a query item from which to compare candidate items to determine if they are similar. The query item is associated with a compromised machine of a plurality of machines. In some implementations, the query item may be a compromised machine. In other implementations, the query item may not be a particular machine, but may be an item defined by a set of attributes associated with one or more compromised machines. In other implementations, the query item may be a population centroid of a plurality of compromised machines.

The attribute selection engine 3112b is configured to select one or more attributes associated with the query item for comparison to similar attributes of candidate items. Any or all of the attributes of the query item may be selected for comparison. In the implementations in which the query item is associated with more than one compromised machine, the selected attributes may be common attributes across multiple or all compromised machines. For example, if a majority of compromised machines of a population centroid were running an application that detected a critical intrusion, the "application" and "critical" attributes of the intrusion detection data (e.g., intrusion detection data described with respect to FIG. 30) may be selected for comparison. In some implementations, the attribute selection engine 3112b of FIG. 31 selects attributes based on domain knowledge. The attribute selection engine 3112b may update or change the selected attributes for future iterations as similar items are characterized and confirmed.

The attribute weight engine 3112c is configured to assign initial attribute weights to the one or more attributes, and to update the attribute weights for future iterations as similar items are characterized and confirmed. The attribute weights assigned may be any value (e.g., between 0 and 1, between 0 and 100, etc.). In some implementations, the attribute weight engine 3112c assigns attribute weights equally, and updates the attribute weights after similar items are determined. In some implementations, the attribute weight engine 3112c assigns attribute weights based on domain knowledge. For example, if the selected attributes include both an operating system type (e.g., in machine data described with respect to FIG. 30) and a deleted file in the file system (e.g., in file system changes), it may be determined that the "deleted" attribute of the file system change data is more significant than the "OS" attribute of the machine data. This may be, for example, because the operating system type may not be as critical to the attack, because the same deleted file attack has occurred across multiple different operating systems, etc. Thus, in this example, the "deleted" attribute may be assigned a weight (e.g., 0.75) that is higher than the weight assigned to the "OS" attribute (e.g., 0.25).

The attribute weight engine 3112c of FIG. 31 is configured to weigh the received attribute values 3107 (for both a query item and candidates items) according to their assigned weights, for example, by multiplying the attribute value by its associated attribute weight. The attribute weight engine 3112c is also configured to update the attribute weights for future comparisons of the query item to candidate items, as similar items are characterized and confirmed (e.g., through feedback).

The candidate item selection engine 3112d is configured to select one or more candidate items (e.g., machines on a network) with which to compare the determined query item. The candidate items may include all of the machines on a network, a subset of machines on the network, or a single machine on the network. A subset of machines may be selected as candidate items randomly or by using domain knowledge. For example, a subset of machines may be selected as candidate items based on their colocation with the query item within the network.

The attribute vector creation engine 3112e is configured to construct attribute vectors for the one or more selected attributes using the attribute values 3107. The attribute vector creation engine 3112e constructs the vectors for both the query item and the one or more candidate items. For example, if the "success", "failure", "unknown", "ssh", and "splunk" attributes of authentication data described with respect to FIG. 30 are selected, an attribute vector, U, may be created as follows:

$$U=\{u_1,u_2,u_3,u_4,u_5\}=\{u_{success},u_{failure},u_{unknown},u_{ssh},u_{splunk}\}$$

By assigning each of these attributes the exemplary attribute values discussed above with respect to FIG. 30, the following vector would result:

$$U=\{5,6,4,10,5\}$$

The attribute vector creation engine 3112e of FIG. 31 may further be configured to normalize the attribute vector to remove the bias from high or low attribute values. In some implementations, this is accomplished by converting the values in the vector to values between 0 and 1. In one example, the values may be converted to a scale between 0 and 1 by dividing each attribute value by the total number of logged events for a given attribute type. For the authentication attribute type in the example above, fifteen authentication events were logged (i.e., five successes, six failures, and four unknowns; ten involving the "ssh" application, and five involving the "splunk" application). Thus, the normalized attribute vector would be as follows:

$$U=\{(5 \div 15),(6 \div 15),(4 \div 15),(10 \div 15),(5 \div 15)\}=\{0.33, 0.4,0.27,0.67,0.33\}$$

In some implementations, individual attribute values of this vector would further be weighted by the attribute weight engine 3112c before being compared by the attribute vector comparison engine 3112f.

The attribute vector comparison engine 3112f is configured to determine a distance between the attribute vector of a query item and a random vector ("query item distance"), to determine a distance between the attribute vector or one or more candidate items and the random vector ("candidate item distance"), and to determine a distance between the query item distance and the candidate item distance ("comparison value"). In some implementations, a hash function is applied to the attribute vectors to determine Euclidian distances between those vectors and the random vector. The random vector may be of the same dimension as the attribute vectors. In some implementations, the query item distance is compared to each candidate item distance to generate a comparison value.

In various implementations, the hash function computation is performed on many or all of the candidate items to generate their candidate item distances, before comparing them to the query item distance. The candidate item distances are used to create buckets of candidate items based on their candidate item distances as compared to the query item distance. The individual candidate item distances of the candidate items in the bucket closest to the query item distance can be compared to the query item distance to generate comparison values.

The similar item identification engine 3112g is configured to determine whether the comparison values are within a threshold value. If they are within a threshold value, those candidate items may be characterized as similar items 3114a to the query item. Other candidate items not within the threshold value may be characterized as non-similar items 3114b. The threshold value may be selected randomly or based on domain knowledge. Once similar items 3114a are identified, one or more can be used as a host for deception mechanisms, can be taken off the network as being likely compromised or likely to become compromised, or can be quarantined.

VII. Sensor

As discussed above, a deception center may be in communication with one or more sensors that have been installed in a site network. In various implementations, a sensor may be a hardware and/or software appliance that can be installed as a node in a site network. For example, a desktop computer, a laptop computer, a blade computer, or a mini computer (such as a Raspberry Pi) can be configured as a sensor. As another example, a sensor can be an application running on a network device, such as a server, router, or computer.

Typically, a sensor is assigned to a specific deception center. In various implementations, sensors provide its assigned deception center with visibility into, and presence on, a site network. For example, because a sensor is a node one a network, using its connection to the sensor, the deception center may be able to transmit queries to other nodes on the same network, while the deception center itself is located on another network. As another example, the deception center may be able to present or project emulated network devices on the network to which a sensor is connected. In some implementations, sensors may provide a deception center with visibility and presence in more than one site network.

Figure 32:
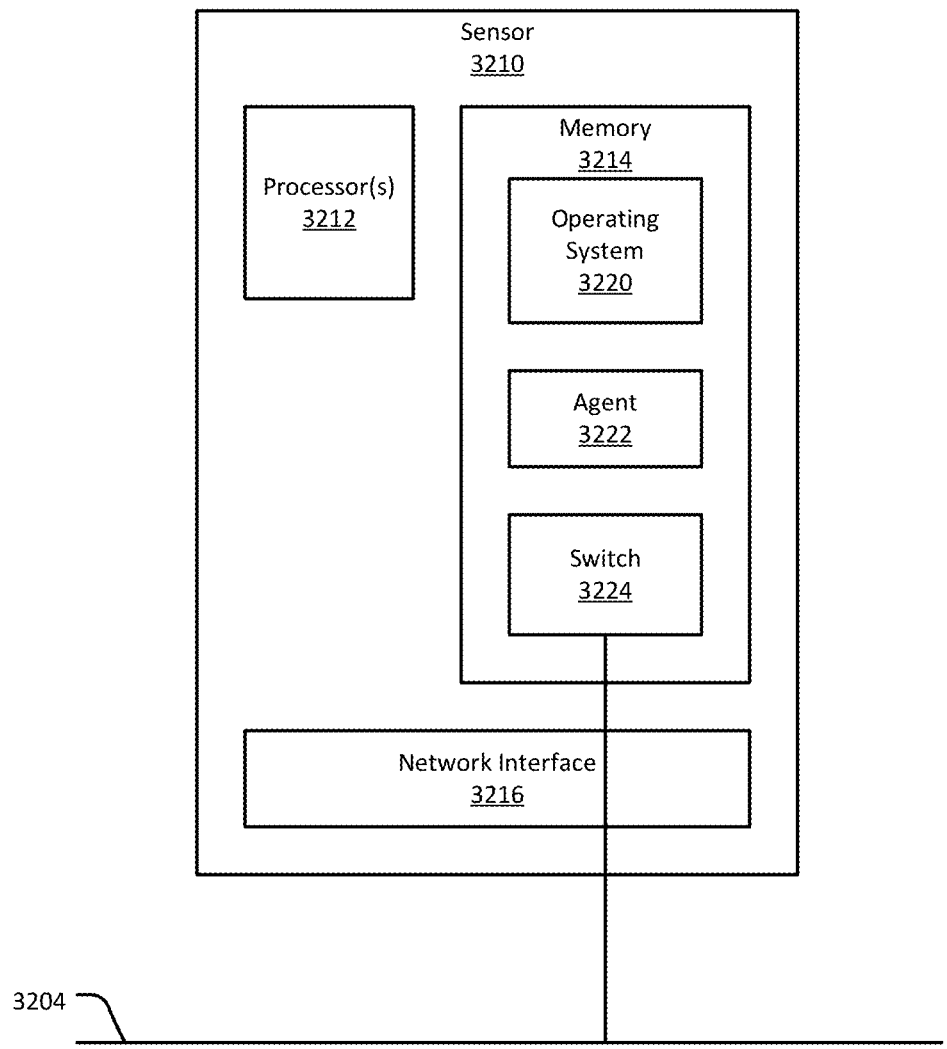
FIG. 32 illustrates an example implementation of a sensor implemented in a combination of hardware and software.

FIG. 32 illustrates an example implementation of a sensor 3210 implemented in a combination of hardware and software. In this example, the example sensor 3210 may be a computing device that includes one or more processors 3212, a memory 3214, and a network interface 3216. In other implementations, the sensor 3210 may be implemented using an Application Specific Integrated Circuit (ASIC), Field Programmable Gate Array (FPGA), or System-on-a-Chip (SoC) configured to perform the operations described below.

The sensor 3210 is typically connected to a network 3204. The network 3204 is one of possibly multiple networks that is being monitored and protected by a deception center. The network 3204 may be, for example, a subnetwork in a site network. The deception center itself may be connected to the same network 3204, or may be connected to a different network that can communicate with the illustrated network 3204.

In various implementations, the memory 3214 on the sensor 3210 may store code for an operating system 3220, an agent 3222, and a switch 3224. In various implementations, the operating system 3220 may be a fully functional operating system, a minimized or reduced size operating system, or a custom operating system. For example, the operating system 3220 can be a Linux-based operating system. When executing, the operating system 3220 may manage basic functionality for the sensor 3210, such as network operations. For example, the operating system 3220 may manage connecting the sensor 3210 to a network 3204, including, for example, learning the subnet address of the network 3204, obtaining an IP address for the sensor 3210, and/or learning about other network devices on the network 3204.

In various implementations, the agent 3222 may manage communications with and instructions from the deception center. The agent 3222 may be an application running, for example, in the kernel or user space of the operating system 3220. The agent 3222 may manage operations such as obtaining the network location of a deception center for the network 3204, establishing a communication channel with the deception center, and/or (as discussed further below) hiding the IP address of the sensor 3210. In some implementations, the functions and operations of the agent 3222 may be included in the operating system 3220.

To obtain the network location of its assigned deception center, the agent 3222 may automatically communicate with, for example, a security services provider. The security services provider may have a registry of deception centers and the sensors assigned to each deception center. Alternatively or additionally, the agent 3222 may obtain the network location of the deception center from information pre-programmed into the memory, such as for example from a configuration file. Alternatively or additionally, the agent 3222 may be manually configured, for example by a network administrator, with the location of its deception center.

Establishing a communication channel with the deception center may include, for example, configuring a network tunnel. The network tunnel may provide a private and/or secure communication channel, over the network 3204 and possibly other intervening networks, between the sensor 3210 and its deception center. The agent 3222 may be configured to use one of various tunneling protocols, such as HTTP, ICMP, SSH, GRE, or a similar tunnel protocol.

The agent 3222 may be assisted in establishing and managing a tunnel to the deception center by a switch 3224. In various implementations, the switch 3224 may be a hardware device. In this example, the switch 3224 is a software switch. For example, the switch 3224 may be an Open vSwitch (OVS) distributed multi-layer switch. A software switch may provide the same functionality as is provided by a hardware switch, including connecting computing devices (including virtual computing devices) to a network. In this example, the switch 3224 uses the sensor's 3210 network interface 3216 to connect to the network 3204. In various implementations, the switch 3224 may host the endpoint for the tunnel to the deception center. For example, the switch 3224 may include a Virtual eXtensible LAN (VXLAN) tunnel endpoint (VTEP).

Once the agent 3222 has established a communication channel with the deception center, the switch 3224 may then act as a portal between the network 3204 and the deception center. For example, through the switch 3224, the deception center can present or project emulated network devices as deception mechanisms on the network 3204. The deception center may host a number of emulated network devices. These emulated network devices may include as few as a handful of servers or desktops, or may include entire networks of devices. The emulated network devices may include address deceptions mechanisms, low-interaction deception mechanisms, and/or high-interaction deception mechanisms, or a combination of deception mechanisms. The emulated network devices are intended to serve as decoys on the network 3204, where the emulated network devices can distract and/or divert possible attacks away from the actual devices on the network 3204.

To make the emulated network devices appear on the network 3204, the endpoint of the tunnel may be connected in the deception center to a emulated network in the deception center, where the network emulated hosts the emulated network devices. In some implementations, the emulated network may include a switch, which may be a software switch, that is able to host the tunnel endpoint. In some applications, network tunnels provide a way to transparently connect network devices and/or networks together, so that the network devices and/or network function as one seamless network. Thus, once the tunnel is connected between the sensor 3210 and the deception center, the emulated network devices hosted by the deception center may seamlessly appear on the network 3204. Stated another way, the emulated network devices are presented as if they are devices on the network 3204. Stated yet another way, the emulated network devices are projected through the tunnel and onto the network 3204.

Once the presence of the emulated network devices have been established on the network 3204, the tunnel may act as a portal between the site network and the emulated network devices. For example, packets addressed to the emulated network devices may be received by the sensor's 3210 switch 3224, and be automatically sent over to the tunnel to the deception center. Similarly, any network traffic originated by the emulated network devices may be automatically sent over the tunnel to devices attached to the network 3204.

In reality, however, network traffic directed to the emulated network devices is received by the sensor 3210. Should an attacker on the network 3204 be able to detect the sensor's 3210 presence on the network 3204, the attacker may be able to determine that the emulated network devices are only decoys, and not real network devices. In order to hide the presence of the sensor, the agent 3222 and/or the switch 3224 may be configured to prevent the sensor 3210 from responding to both specific and routine network packets. Specific packets may include, for example, network traffic addressed to the sensor's 3210 own IP address. Routing packets may include multicast and broadcast network traffic, such as address resolution protocol requests, domain host configuration packets, or routing table updates. By not responding to any packets, it may appear that the sensor 3210 is not present on the network.

VIII. Deception Center Example

Figure 33:
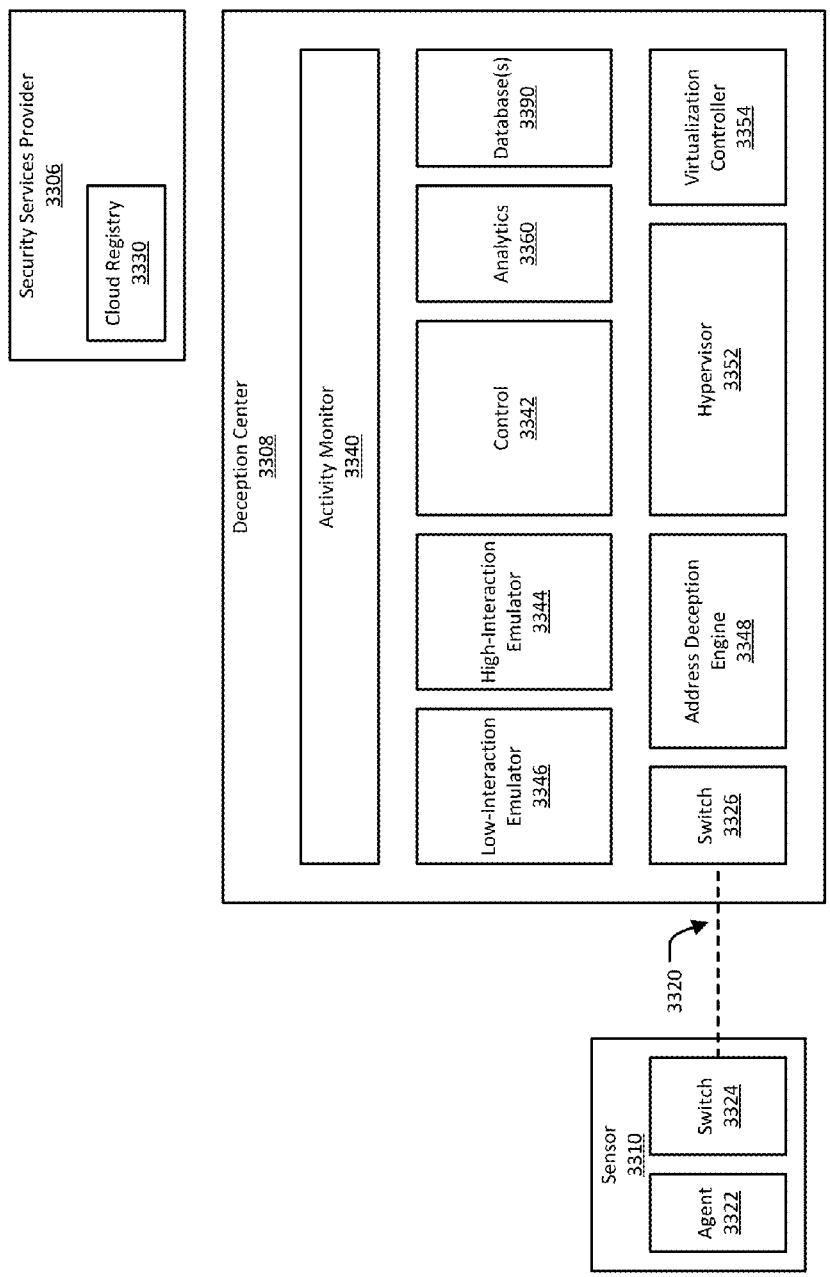
FIG. 33 illustrates an example implementation of a deception center.

FIG. 33 illustrates an example implementation of a deception center 3308. As discussed above, a deception center may include various engines for profiling a site network, monitoring threats to the site network, analyzing threats that have been allowed to proceed within an emulated network, determine the trajectory of an attack, and/or to locate network devices similar to those that may have been affected by an attack. The deception center 3308 of FIG. 33 illustrates an example of hardware and/or software that may be used to implement these engines. In various implementations, the deception center 3308 may include systems and services, including hardware and/or software systems and services, configured to support communication with a sensor 3310, to support emulation of network devices, for control and analytics, and to store data.

In various implementations, to communicate with one or more sensors 3310, the deception center 3308 may include a switch 3326. The switch 3326 may be a software or a hardware switch. For example, the switch 3326 may be implemented using OVS. In various implementations, the switch 3326 may host an endpoint for a tunnel 3320 to the sensor 3310. For example, the switch 3326 may include a VTEP. In various implementations, the switch 3326 may have a corresponding switch 3324. The switch 3324 on the sensor 3310 may host the other endpoint for the tunnel 3320. The sensor 3310 may also have a hardware and/or software agent 3322 that may manage the tunnel for the sensor 3310.

To establish the tunnel between the deception center 3308 and the sensor 3310, in various implementations the deception center 3308 an the sensor 3310 may be in communication with a security services provider 3306. The security services provider 3306 may be co-located with either the sensor 3310, the deception center 3308, or both the sensor 3310 and the deception center 3308, where "co-located" means in the same geographic location and/or in the same network. Alternatively, the security services provider 3306 may be located at a different geographic location and on a different network from either the sensor 3310 or the deception center 3308. The security services provider 3306 may include a cloud registry 3330, which may be used to track the sensors that are assigned to each of possibly multiple deception centers. The deception center 3308 and the sensor 3310 may communicate with the security services provider 3306. Using the cloud registry 3330, the security services provider 3306 may inform the sensor 3310 of the network location of its assigned deception center 3308. The security services provider 3306 may also inform the deception center 3308 of the network location of each of its assigned sensors 3310. Once the deception center 3308 and sensor 3310 have each other's network location, the deception center 3308 and sensor 3310 can establish the network tunnel 3320.

In various implementations, the sensor 3310 and/or deception center 3308 do not communicate with the security services provider 3306, In these implementations, the deception center 3308 and the sensor 3310 may learn of each other's network location in some other manner. For example, the deception center 3308 and the sensor 3310 may send queries into their local network. Alternatively or additionally, the deception center 3308 and the sensor 3310 may be provided with a configuration file. Alternatively or additionally, the deception center 3308 and the sensor 3310 may be configured by a network administrator.

In various implementations, to support the emulation of network devices, the deception center 3308 may include an address deception engine 3348, one or more a low-interaction emulators 3346, and one or more high-interaction emulators 3344. To supported the address deception engine 3348, low-interaction emulators 3346, and high-interaction emulators 3344, the deception center 3308 may also include a hypervisor 3352, and a virtualization controller 3354.

The address deception engine 3348 may host one or more address deceptions. For example, the address deception engine 3348 may include an address resolution protocol (ARP), and may be capable of responding to requests for address information originating in the network where the sensor 3310 is located.

The low-interaction emulators 3346 may host one or more low-interaction deceptions. For example, each low-interaction emulator 3346 may host one or more virtual machines, where each virtual machine is configured as a low-interaction deception. In this example each virtual machine may include a guest operating system, various emulated services, a virtual network interface, and/or an agent configured to manage deception operations. In various implementations, the guest operation system may be a basic installation of an operating system that can be found in the site network that is being monitored by the deception center 3308. The emulated services may mimic the kind of services that may be provided by network devices in the site network that are running a variation of the guest operating system. The virtual network interface may be configured with multiple IP addresses, where each IP address is associated with a distinct MAC address. Using the IP and MAC address pairs, the virtual machine may be able to emulate multiple network devices, each of which can be projected through the sensor 3310 into a site network.

The high-interaction emulators 3344 may host one or more high-interaction deceptions. For example, each high-interaction emulator 3344 may host one or more virtual machines, where each virtual machine is configured as a high-interaction deception. In this example, each virtual machine may include a specific variation of a guest operating system and a virtual network interface. The guest operating system may, in a high-interaction deception, include specific patches, libraries, services, or update, among other variations, that may be found in a specific network device in the site network. Because a high-interaction deception is intended to provide only one deception mechanism, the virtual network interface is typically configured with one IP and one MAC address. In various implementations, the virtual machine may also have a unique identifier that helps the virtual machine to look like a production network device. For example, the virtual machine may have a distinct network name, serial number, or network tag, among other things. Generally, the virtual machine for a high-interaction deception can be quickly reconfigured to resemble a distinct network device in the site network, and/or to resemble a specific network device in the site network. The network device being emulated can be projected through the sensor 3310 into site network.

To support the virtual machines being hosted by the low-interaction emulator 3346 and the high-interaction emulator 3344, the deception center 3308 may include a hypervisor 3352 and a virtualization controller 3354. A hypervisor is a piece of computer software, firmware, or hardware that creates and runs virtual machines. Hypervisors may manage virtual machines' access to the hardware resources of the host system (which here is the deception center 3308). The virtualization controller 3354 is a service (such as a daemon) and management tool for managing computer hardware virtualization. Computer hardware virtualization is the virtualization of computers as complete hardware platforms, certain logical abstractions of their componentry, or only the functionality required to run various operating systems. Virtualization hides the physical characteristics of a computing platform from the user applications, presenting instead another abstract computing platform.

To manage the operations of the deception center 3308, the deception center 3308 may include a control module 3342. The control module 3342 may manage operations such as messaging between the various components of the deception center 3308 and/or between the deception center 3308 and the sensors 3310; configuration of the deception center 3308 and its components, scheduling of the various activities of the deception center 3308; orchestration of the operations of the deception center 3308; administration of the hardware and/or software operations of the deception center 3308; and/or the operation of one or more web servers.

For network threat detection and analysis, in various implementations the deception center 3308 may include an analytics module 3360 and a database 3390. The analytics module 3360 may conduct operation such as detecting possible attacks, determine which deceptions are needed, and/or analyzing data captured by the low-interaction emulator 3346 and the high-interaction emulator 3344. Data captured by the low-interaction emulator 3346 and the high-interaction emulator 3344 may be stored in the database 3390. In various implementations, the database 3390 may also store information such as threat intelligence, and/or information about the site network, such as the configuration of the site network and the various network devices in the site network.

To oversee the operations of the deception center 3308 and its various sensors 3310, the deception center 3308 may include an activity monitor 3340. In various implementations, the activity monitor 3340 may maintain a global view of the operations of the deception center 3308 and its sensors 3310. For example, the activity monitor 3340 may track communications between the deception center 3308 and the sensors 3310, may track the status of the tunnel 3320 (e.g., disconnects and/or reconnects), and/or the activity level of the deception center 3308 (e.g. the number and/or type of attacks detected, idle time and busy time, uptime and downtime, etc.).

IX. Multiphase Threat Analysis and Correlation

Understanding the course of events in an attack that lead to harm on network may be useful in better defending a network. As discussed above, a network threat detection and analysis system may include a targeted threat intelligence engine that can analyze data collected over the course of an attack, and correlate seemingly unrelated events to reconstruct how the attack occurred.

Figure 34:
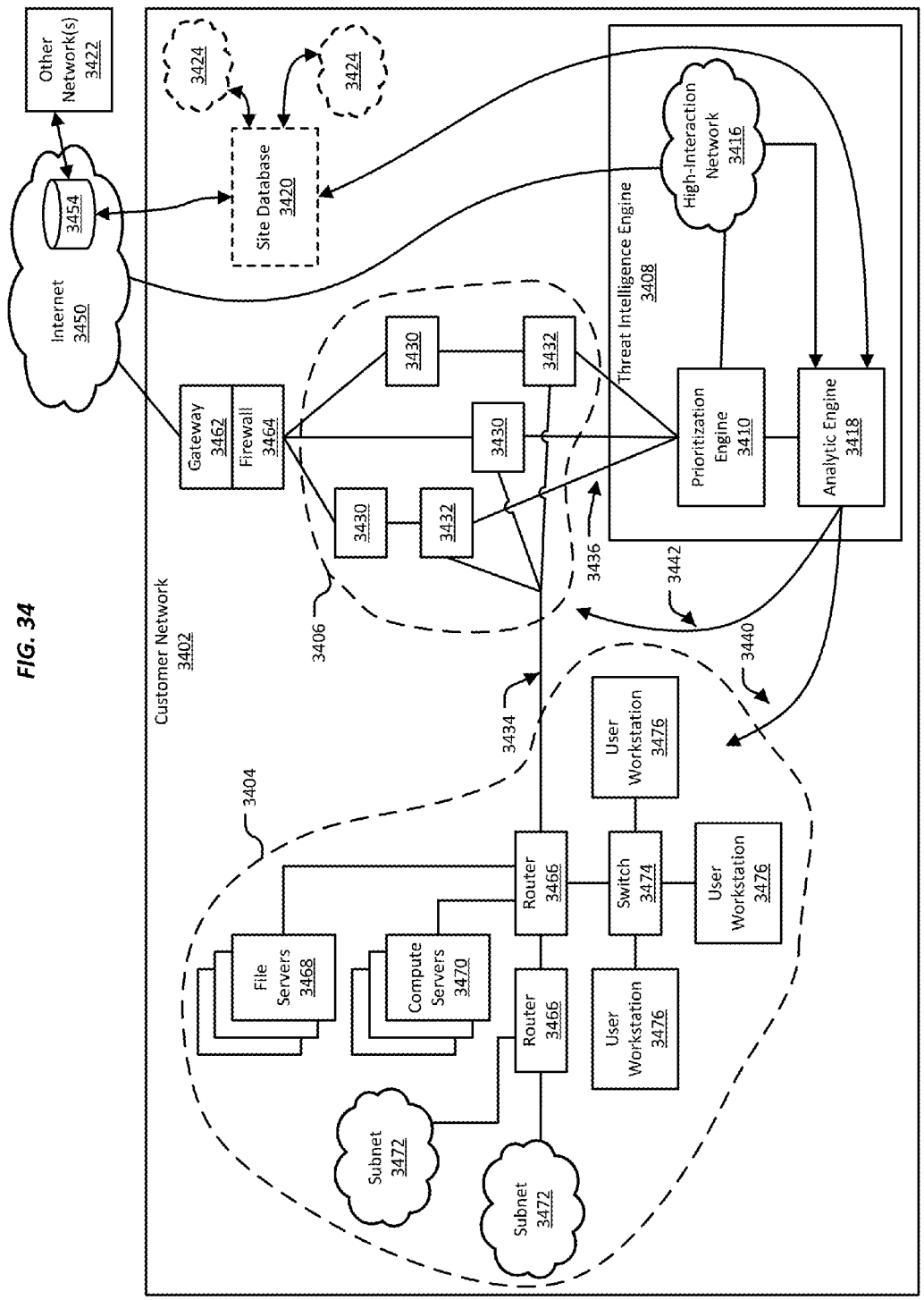
FIG. 34 illustrates an example of a customer network that includes a targeted threat intelligence engine.

FIG. 34 illustrates an example of a customer network 3402 that includes a targeted threat intelligence engine 3408. A customer network is a network that may be found at a large or small business, at a school campus, in a government building, or in a private home. A customer network may be described as a local area network (LAN) or a group of LANs. A customer network may include network infrastructure devices, such as routers, switches, hubs, repeaters, and controllers, among others. A customer network may also include various computing systems, such as servers, desktop computers, laptop computers, tablet computers, personal digital assistants, and smart phones, among others. A customer network may also include other electronic devices with network interfaces, such as televisions, entertainment systems, thermostats, and refrigerators, among others.

In this example, the customer network 3402 includes a gateway device 3462 that connects the customer network 3402 to other networks, such as the Internet 3450. The gateway device 3462 may be, for example, a modem used to connect to telephone, cable, digital subscriber line (DSL), satellite, optical fiber lines. In some cases, a gateway device 3462 may include integrated router functionality. The gateway device 3462 may include a firewall 3464, or may be connected to a firewall 3464 device. Generally, all network traffic coming into or going out of the customer network 3402 passes through the gateway device 3462 and the firewall 3464. Some customer networks may have multiple gateways to outside networks, where each gateway functions as a point of entry for outside network traffic to enter the customer network 3402. Each of these gateways typically includes a firewall.

The customer network 3402 of this example also includes a network security infrastructure 3406. The network security infrastructure 3406 adds additional monitoring and filtering for network traffic that survives filtering by the firewall. The network security infrastructure 3406 may include network security tools 3430, 3432, such as for example anti-virus tools, IPS, IDS, email filters and spam detectors, and file transfer protocol (FTP) filters, among others. Some network security tools 3430, 3432 may be multi-layered, such that network packets that survive analysis by a first security tool 3430 are then analyzed by a second security tool 3432. For example, email traffic may first be filtered for viruses, and then be filtered for spam.

The network security infrastructure 3406 identifies network traffic that appears to be legitimate and safe, and forwards this probably legitimate network traffic 3434 to the customer site's network 3404.

The site network 3404 is where the hardware, software, and internal users of the customer network 3402 can be found, and where the operations of the customer network 3402 occur. In this example, the site network 3404 includes several routers 3466 that connect a switch 3474, multiple servers 3468, 3470, and several subnets 3472 together. The site network 3404 may receive apparently legitimate network traffic 3434 through one of the routers 3466. The switch 3474 further connects user workstations 3476 to the site network 3404. The customer network's 3402 users may access the site network 3404 using the user workstations 3476, and/or other wired or wireless devices.

The servers in this example include a group of file servers 3468. The file servers 3468 may provide storage for files used by the customer network's 3402 users and/or for data stored and/or operated on by the customer network 3402. For example, the file servers 3468 may store product and customer data when the customer network 3402 belongs to an online merchant, or may store financial data when the customer network 3402 belongs to a financial institution. The servers in this example also include a group of compute servers 3470. The compute servers 3470 may provide processing resources for software used by the customer network's 3402 users and/or for the operation of the customer network 3402. For example, the compute servers 3470 may provide hosting for the customer network's 3402 website or websites, and/or may provide databases for volumes of data stored and/or operated on by the customer network 3402, and/or may provide distributed computing resources when the customer network 3402 is part of an engineering firm.

The site network 3404 may further include subnets 3472. A subnet or "subnetwork" is a separate part of a network. Generally, a subnet is logically or physically distinct from other parts of a network. A subnet may include additional routers, switches, user workstations, and/or servers.

The site network 3404 described here is provided as an example. A customer site's network may be less complex or more complex than is illustrated by this example, and may include network infrastructure not described here.

As noted above, the network security infrastructure 3406 may separate apparently legitimate network traffic 3434 from suspect network traffic 3436. Suspect network traffic 3436, which ordinarily may be discarded by the network security infrastructure 3406, is forwarded to the targeted threat intelligence engine 3408. In some cases, some network packets may be flagged for inspection but otherwise look legitimate. In these cases, the network traffic may be both forwarded to the site network 3404 and also forwarded to the threat intelligence engine 3408. The threat intelligence engine 3408 attempts to determine what harm, if any, the suspect network traffic 3436 may cause to the site network 3404. The threat intelligence engine 3408 may subsequently produce indicators that identify and/or describe any harm caused by the suspect network traffic 3436. In various implementations, the threat intelligence engine 3408 may include a prioritization engine 3410, a high-interaction network 3416, and an analytic engine 3418.

The prioritization engine 3410 analyzes the suspect network traffic 3436 and attempts to identify whether the suspect network traffic 3436 represents a known threat. Known threats include, for example, previously identified malware, packets from IP addresses known to send malicious network traffic, and authentication requests previously associated with unauthorized users, among many others. Because these threats were previously identified, in most cases the network security infrastructure 3406 likely has already been configured to identify and block network traffic associated with these threats. Alternatively or additionally, the prioritization engine 3410 may determine that the threat posed by the suspect network traffic 3436 is one that the site network 3404 is not vulnerable to. For example, the suspect network traffic 3436 may include a virus designed to exploit a vulnerability version 1.0 of a standard operating system, while none of the computers in the site network 3404 are running that particular operating system or that version of the operating system. Because the site network 3404 is not vulnerable to this attack, in some cases suspect network traffic 3436 associated with the attack need not be analyzed.

The prioritization engine 3410 may include a database of indicators describing network threats that the threat intelligence engine 3408 has previously identified. In some implementations, the prioritization engine's 3410 database may also include indicators received from a central database 3454 located outside of the customer network 3402. When the suspect network traffic 3436 is a known threat, and/or is a threat the site network 3404 is not vulnerable to, then the prioritization engine 3410 may take note of the identity of the threat and then discard the suspect network traffic 3436.

When the prioritization engine 3410 determines that the suspect network traffic 3436 is associated with an unknown threat, then the threat intelligence engine 3408 may direct the suspect network traffic 3436 to the high-interaction network 3416 for detailed analysis.

The high-interaction network 3416 is a self-contained, closely monitored network that can be quickly reconfigured, repaired, brought up, or taken down. The high-interaction network 3416 is not a part of the site network 3404, and exists within a physically and/or virtually isolated, contained space. The high-interaction network 3416, however, appears and behaves just as does a real network, including having a connection to the Internet 3450. Additionally, the high-interaction network 3416 may be configurable, so that it may resemble the site network 3404 or only a part of the site network 3404, as explained in further detail below. The high-interaction network 3416 can be configured to resemble another network entirely, should the need arise. In most cases, however, the threat intelligence engine 3408 is configured to detect threats to the site network 3404, thus high-interaction network 3416 will more often emulate the site network 3404.

The high-interaction network 3416 may be built using a number of testing devices, such as physical routers, switches, and servers. Alternatively or additionally, the high-interaction network 3416 may exists as a fully emulated network residing on one or more servers. In a fully emulated network, the testing devices may be software processes configured to resemble routers and servers. Alternatively or additionally, the high-interaction network 3416 may be constructed using a combination of physical devices and emulated devices. In some implementations, the high-interaction network 3416 may reside at a cloud service provider, and thus be located outside of the customer network 3402.

The high-interaction network 3416 provides a controlled space for conducting static, dynamic, and network analysis of the suspect network traffic 3436. In the high-interaction network 3416, the suspect network traffic 3436 may be free to engage in whatever activity it may be capable of, including doing harm. Doing harm is specifically allowed so that how the suspect network traffic 3436 caused the harm, and the nature of the harm, may be captured. Additionally, the high-interaction network 3416 may include automated processes that respond to activity initiated by the suspect network traffic 3436; for example, automated processes may respond just as would a human network user. Any activity initiated by the suspect network traffic 3436 within the high-interaction network 3416 is closely monitored and recorded.

The threat intelligence engine 3408 sends activity logs, memory snapshots, and any other information generated by analyzing the suspect network traffic 3436 in the high-interaction network 3416 to the analytic engine 3418. As discussed in further detail below, the analytic engine 3418 may process data collected in the high-interaction network 3416 to determine whether the suspect network traffic 3436 was truly malicious or was, in fact, harmless. In either case, the analytic engine 3418 may produce indicators that describe the suspect network traffic 3436. As described in further detail below, the indicators may include characteristics that uniquely identify the suspect network traffic 3436, any effect that resulted from interacting with the contents of the suspect network traffic 3436, and/or any activity triggered by the suspect network traffic 3436 within the high-interaction network 3416.

In some implementations, the indicators generated by the analytic engine 3418 may be used to verify 3440 whether the site network 3404 has already suffered the attack identified by the indicators. For example, the threat intelligence engine 3408 may identify an email that contained a virus. The email may have been flagged as suspect because it was addressed to a user that does not exist within the customer network 3402. The threat intelligence engine 3408 may, using the high-interaction network 3416, allow the virus to affect a simulated user work station, and see what effect the virus has on the simulated workstation. For example, the virus may modify operating system settings in the simulated workstation to make the simulated workstation more vulnerable to attack. The analytic engine 3418 may subsequently generate indicators that identify the malicious email and describe the effect of the virus. The threat intelligence engine 3408 may then use these indicators to verify 3440 whether any user workstations 3476 in the site network 3404 has already received the malicious email and been infected by this virus.

In some implementations, threat intelligence engine 3408 may also use the indicators to update 3442 the security infrastructure 3406. For example, the threat intelligence engine 3408 may identify new malware that should be blocked by an anti-virus tool, new external IP addresses that should be blocked by the firewall, or user accounts that have been compromised, among others.

In some implementations, the threat intelligence engine 3408 can also analyze suspect network traffic 3436 associated with a known threat. In these implementations, rather than discarding this suspect network traffic 3436, the prioritization engine 3410 may be configured to send this suspect network traffic 3436 to the high-interaction network 3416. The high-interaction network 3416 can then, for example, be used to see how susceptible the site network 3404 may be to the threat posed by the suspect network traffic 3436. The analytic engine 3418 may produce indicators that describe how the high-interaction network 3416 reacted to the threat. These indicators can then be used to improve the network security infrastructure 3406.

In some implementations, the threat intelligence engine 3408 may also send indicators generated by the analytic engine to a site database 3420. The customer network 3402 may have a site database 3420 when the customer network 3402 has additional site networks 3424. For example, a business occupying a campus with multiple buildings may have a separate network in each building. These separate networks may or may not be able to communicate with each other, but share a common owner and have common control. Each of these separate networks (which may be described as subnets) may be considered a site network 3404, 3424. Each additional site network 3424 may have its own threat intelligence engine. Each threat intelligence engine may send indicators that they generate to the site database 3420.

Each threat intelligence engine may also receive indicators generated by the additional site networks 3424 from the site database 3420. By distributing threat indicators across the customer network 3402, the customer network 3402 as a whole may be made more secure.

In some implementations, the threat intelligence engine 3408 may also send indicators to a central database 3454 located outside the customer network 3402. In some implementations, the threat intelligence engine 3408 may send its indicators directly to the central database 3454. In implementations that include a site database 3420, the site database 3420 may send indicators for all the site networks 3404, 3424 to the central database 3454. The central database 3454 may also receive indicators from other networks 3422. These other networks 3422 may also include their own threat intelligence engines for analyzing suspect network traffic and generating indicators describing suspect network traffic. The central database 3454 may also share indicators between the other networks 3422 and the illustrated customer network 3402. That is, the customer network 3402 may receive indicators generated at the other networks 3422. By sharing indicators across networks 3402, 3422, all the networks 3402, 3422 may be made more secure.

Figure 35:
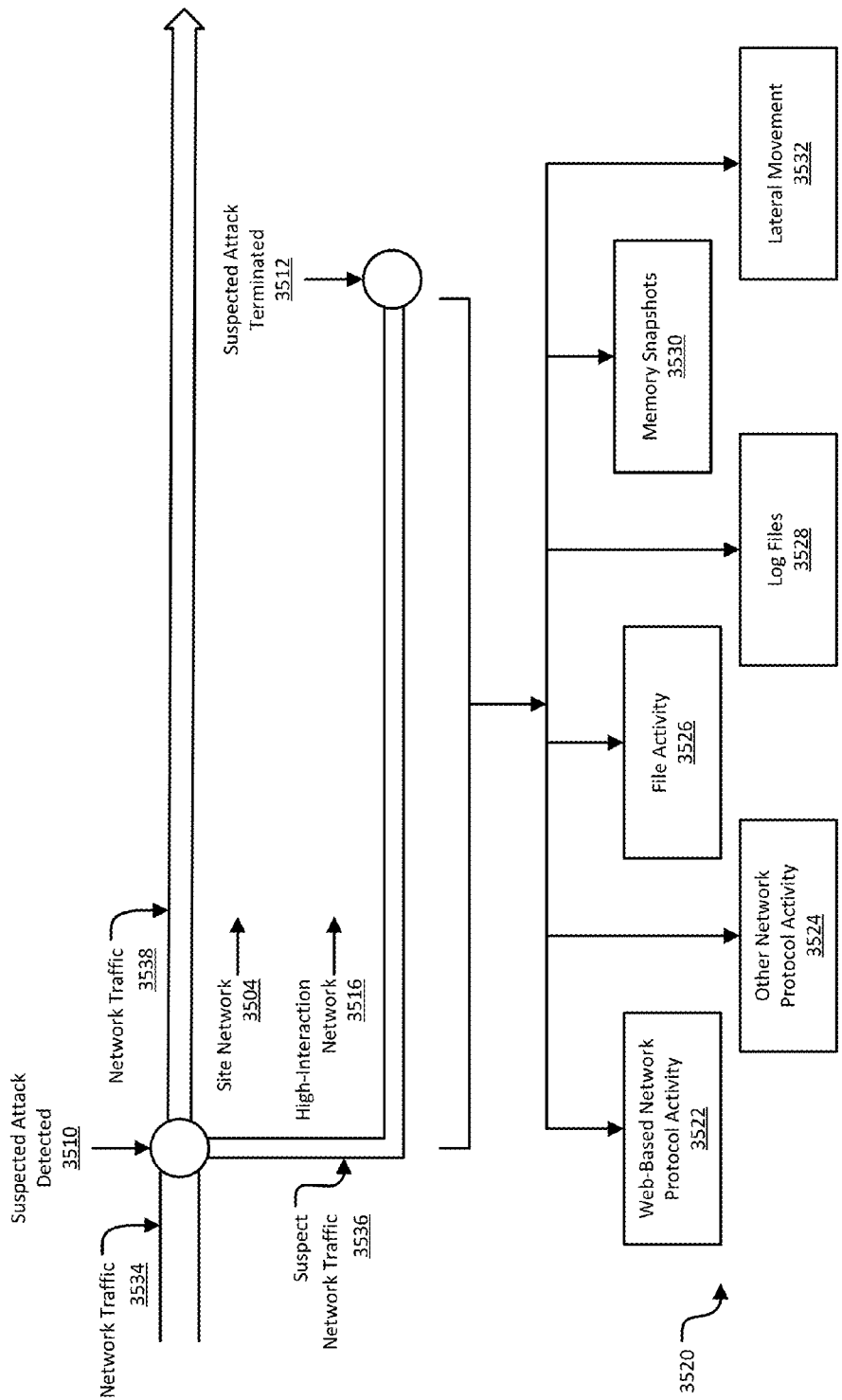
FIG. 35 illustrates examples of the data that may be captured by a high-interaction network as the high-interaction network interacts with and analyzes suspect network traffic.

FIG. 35 illustrates examples of the data 3520 that may be captured by a high-interaction network 3516 as the high-interaction network 3516 interacts with and analyzes suspect network traffic 3536. In various implementations, a threat intelligence engine may be configured to capture data 3520 over the course of an incident. An "incident" is an attack or suspected attack on a site network. Using the high-interaction network 3516, the threat intelligence engine may be able to capture data 3520 of various types as the attack or suspected attack progresses within the high-interaction network 3516. As discussed further below, once data 3520 for the majority of the incident has been captured, the threat intelligence engine may analyze the data 3520 and determine the course of events in the incident.

Before a suspected attack is detected 3510, a large amount of network traffic 3534 may be flowing through the site network 3504. As discussed above, once a suspected attack is detected 3510, suspect network traffic 3536 may be redirected to a high-interaction network 3516, while non-suspect network traffic 3538 continues to the site network 3504. The high-interaction network 3516 may thus capture data 3520 primarily for network traffic that appears to be related to the incident, rather than for all network traffic 3534 that may be flowing through the site network 3504 during the course of the incident. A large amount of the network traffic 3534 flowing through the site network 3504 during the incident may not be relevant to the incident, and thus need not be analyzed. Some unrelated network traffic may still be redirected to the high-interaction network 3516, but by attempting to segregate suspect network traffic 3536 from other network traffic 3538, the probability that the high-interaction network 3516 receives network traffic related to the incident is increased.

Some relevant network traffic may also be missed. For example, in some cases, the suspected attack may only be detected 3510 after some events related to the attack have occurred. In these cases, the events occurring before the suspected attacked is detected 3510 may be found during correlation of events relating to the incident, which is discussed further below.

As the suspect network traffic 3536 flows through the high-interaction network 3516, in various implementations, the threat intelligence engine may not yet attempt to ascertain what the suspected attack is attempting to do and/or how it is attempting to accomplish its goal. Events occurring in real time may be difficult to relate to events that have already occurred or have not yet occurred. Furthermore, many events may be themselves may appear harmless, and can be identified as harmful only once the entire course of events can be seen. Thus the threat intelligence engine captures as much data 3520 as possible during the course of the incident, and, as discussed below, attempts to analyze the course of the incident as a whole.

The incident may occur over the course of seconds, minutes, or hours. For example, an attack may involve visiting various webpages, logging into a website, downloading content, and/or uploading content. These events may require up to several minutes. During this time, the high-interaction network 3516 may capture data 3520 of various types. This data may include web-based network protocol activity 3522, other network protocol activity 3524, file activity 3526, log files 3528, memory snapshots 3530, and lateral movement 3532. Each of these data types are described in further detail below.

The threat intelligence engine may stop capturing data once a suspected attacked has terminated 3512. The suspected attack may be considered terminated 3512 when the suspected attack has accomplished its goal, such as stealing data, installing malware, or crashing the network. Alternatively or additionally, the suspected attack may be considered terminated 3512 when it appears that the suspected attacker has left the network. Alternatively or additionally, the suspected attack may be considered terminated 3512 when a suspected attacker's access to the high-interaction network 3516 is terminated by, for example, a network administrator. Additionally, in some implementations, the threat intelligence system may continue to capture data 3520 as the effects of the suspected attack on the high-interaction network 3516 are repaired or corrected, to put the high-interaction network 3516 back into the state it was in before the suspected attack was detected 3510.

Figure 36A:
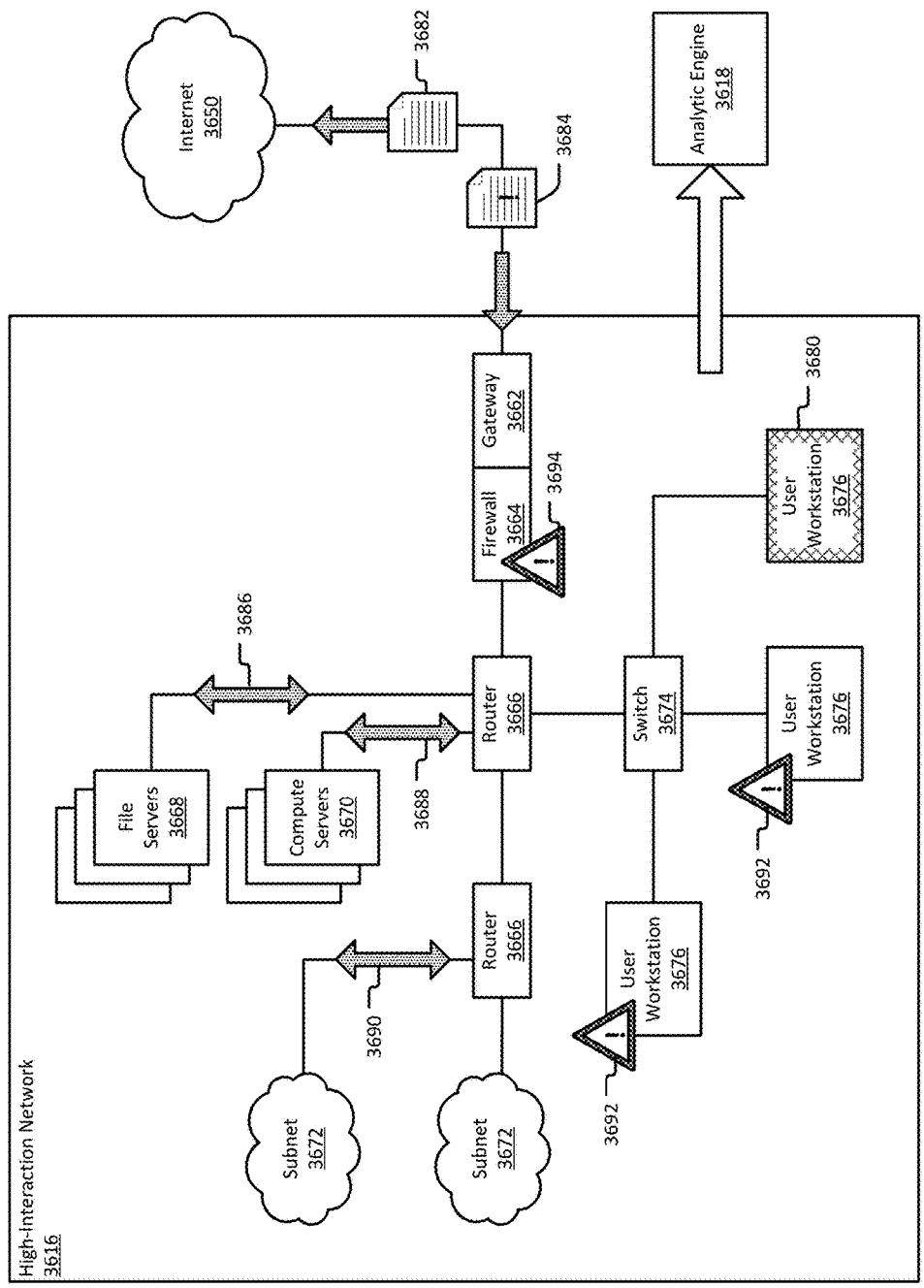
FIG. 36A-36C illustrate example configurations of a high-interaction network.

As noted above, the threat intelligence engine's high-interaction network can be configured to emulate all or part of a customer site's network. FIG. 36A illustrates one example of the configuration of a high-interaction network 3616. In this example, the high-interaction network 3616 has been configured to emulate nearly all of a site's network. Emulating all or nearly all of a site network may be useful when, for example, suspect network traffic has a potentially broad effect, or when the behavior of suspect network is particular unpredictable, or when the suspect network traffic is driven based on being fooled into believing it has infiltrated the site's real network.

In this example, the high-interaction network 3616 has been configured to emulate the site network, such as the site network illustrated in FIG. 34. As such, the high-interaction network 3616 of FIG. 36A includes test devices configured as routers 3666, a switch 3674, user workstations 3676, multiple servers 3668, 3670, and several subnets 3672. These user workstations 3676 may be configured just as are the user workstations in the site network, and may further include automated processes that emulate the activity of the site network's users. The servers include a group of file servers 3668 that emulate the files stored by the file servers in the site network. The servers also include a group of compute servers 3670 that provide the same processing resources provided by the compute servers in the site network. The high-interaction network 3616 may further include subnets 3672 that emulate the subnets found in the site network. The high-interaction network 3616 may further include a gateway 3662 that connects the high-interaction network 3616 to the Internet 3650, just as the site network has a gateway that connects it to the Internet. The gateway 3662 is attached to a firewall 3664, or may have an integrated firewall 3664, just as does the site network.

In this example, the high-interaction network 3616 does not include the network security infrastructure that protects the site network. In this example, the high-interaction network 3616 is being used to analyze the effect of suspect network traffic within the site network. In other words, the suspect network traffic is being released into what appears to be the site network as if it was not caught by any network security tools. Since the suspect network traffic has already been filtered by the network security infrastructure, the network security infrastructure is not needed in this instance. In other cases, the high-interaction network 3616 may include the network security infrastructure, for example when analyzing suspect network traffic's effect on the network security infrastructure as well as the site network.

Absence of the network security infrastructure also may make the high-interaction network 3616 more vulnerable to an attack. When suspect network traffic that constitutes a real attack is received at the site network, it is desirable to stop the attack as soon as possible, and mitigate or repair any damage it caused. But when an actual attack is stopped right away, it may not be possible to learn what the intent of the attack was and what harm may have resulted. Having this information may be useful for, for example, gaining a better understanding network vulnerabilities, finding new or existing vulnerabilities in the site network, and possibly tracking down attackers, among other things. Thus making the high-interaction network 3616 more vulnerable to attack may encourage an attack, and by encouraging an attack more may be learned about it.

Processes in the high-interaction network 3616 may analyze suspect network traffic in several ways, including conducting static, dynamic, and network analysis. Static analysis involves extracting the contents of the suspect network traffic and applying various tools to the content to attempt to identify the content, determine what the content does (if anything), and/or determine whether the content is harmless or malicious. The content of the suspect network traffic may include, for example, webpages, email, and files such as formatted documents (e.g., Microsoft® Word, Excel, or PowerPoint documents or Portal Document Format (PDF) documents), text files documents, images (e.g. Joint Photographic Experts Group (JPEG) files or Graphic Interchange Format (GIF) files), audio, video, archives (e.g., "zip," tape archive (tar), Java archive (jar) files, etc.), or executable files, among others.

Static analysis of the content of suspect network traffic may include, for example, applying virus scanning to the content, extracting components from the content such as macros or scripts and then scanning the content, and/or opening the content using an appropriate application. Opening an executable file may trigger execution of the file, which may be conducted in a contained, emulated environment. Additionally, macros and/or scripts extracted from a file may be executed in an emulated environment. In some cases, static analysis may alternatively or additionally include deconstructing the content, including decompressing, decrypting, un-encoding, decompiling, and/or converting the content into another format, as appropriate. Subsequent to being deconstructing the content may be further analyzed to attempt to discover any hidden purpose behind the content. Malicious intent may be indicated, for example, by instructions to access password files, instructions to connect to input devices such as a keyboard or a screen, or code that attempts to exploit a vulnerability in a software application, among others. The result of the static analysis may be provided to the analytic engine 3618. The analytic engine may generate indicators describing the content, which may be referred to as static indicators. Static indicators may include, for example, the content's type (e.g., webpages, email, documents, or programs), a description of anything questionable found in the content, and/or identification information that uniquely identifies the content. In some implementations, the identification information may be a digital signature, generated, for example, by applying the MD5 algorithm, Secure Hash Algorithm 1 (SHA-1), or SHA-2 to the content. The static analysis results may also be used to drive dynamic analysis.

Dynamic analysis of the suspect network traffic involves interacting with content extracted from the suspect network traffic and monitoring and recording any activity that results from interacting with the content. For example, in some implementations, the high-interaction network 3616 may launch a virtual machine that emulates a user workstation 3676. This emulated user workstation 3676 may hereafter be referred to as the release point 3680, because it serves as the point from which the content is released. At the release point, the content may be downloaded, opened, and/or executed, as appropriate for the specific content. For example, when the content includes webpages, the webpages maybe downloaded, including downloading any graphic or executable files included in the webpages. Automated processes may then interact with the webpages, including selecting links and causing additional webpages, graphics, and/or executable files to be downloaded. Any executable files, if not automatically launched, may be launched by an automated process.

In some cases, depending on the nature of the content found in the suspect network traffic, the high-interaction network 3616 may release the content elsewhere, such as at a compute 3670 or file server 3668, or at the firewall 3664. For example, suspect network traffic that is attempting to open ports at the firewall 3664 may be more effectively released at the emulated firewall 3664.

Monitoring tools may track any calls made by programs launched by executing files found in the suspect network traffic, including calls made to an emulated operating system and/or to emulated hardware. In some cases, these calls may be harmless, while in other cases the calls may be malicious. For example, the high-interaction network 3616 may see questionable file activity. Questionable file activity may include uploading 3682 of files from the high-interaction network 3616 to the Internet 3650. Files may be uploaded 3682 from the release point 3680 by a process triggered by interacting with the content of the suspect network traffic. Questionable file activity may also include downloading 3684 of files from the Internet 3650. For example, the content may trigger downloading 3684 of malware, key logging or screen capture tools, or some other program intended to infiltrate or attack the high-interaction network 3616. Questionable file activity may also include creating, copying, modifying, deleting, moving, decrypting, encrypting, decompressing, and/or compressing files at any device in the high-interaction network 3616.

Any activity triggered by interacting with the content of suspect network traffic is recorded and delivered to the analytic engine 3618. The analytic engine may produce indicators that describe the activity and/or uniquely identify the content that triggered the activity. These indicators may be referred to as file indicators. File indicators may include, for example, a list of modified files and/or directories, a list of content uploaded 3682 to or downloaded 3684 from the Internet, and/or a digital signature identifying the content from the suspect network traffic.

The high-interaction network 3616 may also conduct network analysis of the suspect network traffic. Network analysis may include analyzing and/or interacting with network protocol-related packets in suspect network traffic, and attempting to ascertain what effect the suspect network traffic is trying to achieve. For example, the suspect network traffic may include packets attacking 3694 the firewall 3664 by attempting to use a closed port at the firewall 3664. The high-interaction network 3616 may open the closed port to allow the packets into the high-interaction network 3616, and analyze these packets as suspect network traffic. As another example, the suspect network traffic may include domain name system (DNS) packets attacking 3690 one of the subnets by attempting to ascertain IP addresses the subnets 3672. The high-interaction network 3616 may provide IP addresses of the subnet 3672, and see if any suspect network traffic is received at those IP addresses. As another example, the user workstations 3676 may be attacked 3692 by packets making repeated login attempts. The high-interaction network 3616 may allow the login attempts to succeed.

Network analysis may occur in conjunction with dynamic analysis of the contents of suspect network traffic. For example, the contents may include tools for attacking 3692 the user workstations 3676 to steal credentials. Automated processes may provide credentials, and then watch for login attempts that use those credentials. Attacks 3690, 3692, 3694 may be encouraged so that as much information as possible can be learned about, for example, how the attack is initiated, what entity is behind the attack, and/or what effect each attack has, among other things. To encourage the attacks 3690, 3692, 3694, the high-interaction network 3616 may lower security barriers, and/or may deliberately provide information for infiltrating the high-interaction network 3616.

Network analysis also looks for lateral movement that may result from suspect network traffic. Lateral movement occurs when an attack on the high-interaction network 3616 moves from one device in the network to another. Lateral movement may involve malware designed to spread between network devices, and/or infiltration of the network by an outside entity. For example, an attack 3692 on the user workstations 3676 may result in user credentials being stolen and uploaded 3682 to an outside entity on the Internet 3650. The attack 3692 may also inform the outside entity about files available on the file servers 3668 and services provided by the compute servers 3670. The high-interaction network 3616 may subsequently see an attack 3686 on the file servers 3668 that uses the stolen credentials to gain access and ransom the files. The high-interaction network 3616 may also see an attack 3688 on the compute servers 3670, using the stolen credentials, to take the compute servers 3670 offline. Each of these attacks 3686, 3688 may be considered lateral movement of an attack 3692 that started at the user workstations 3676. The lateral movement can be captured and traced, for example, through log files generated by the user workstations 3676, the gateway 3662 and firewall, and the servers 3668, 3670, and/or memory snapshots of any of these devices.

The results of the various network analysis methods are provided to the analytic engine 3618. The analytic engine 3618 may produce indicators, which may be referred to as network indicators. Network indicators may include, for example, network protocols used by the suspect network traffic and/or a trace of the network activity caused by the suspect network traffic. The network indicators may alternatively or additionally uniquely identify the suspect network traffic. The identification may include, for example, a source of the suspect network traffic, particularly when the source is distinctive (e.g., the source is not a proxy that was used to obfuscate the true source of the suspect network traffic). The identification may also include a destination within the high-interaction network that received the suspect network traffic. The source information can be used to track down the sender of the suspect network traffic. The destination information can be used to locate machines in the real network that may have been affected by the suspect network traffic. The network indicators may also describe any effect caused by the suspect network traffic, such as stolen credentials, files held for ransom, or servers being taken offline.

In some cases, suspect network traffic may be innocent. For example, the suspect network traffic may include an email with an attached image file that was poorly named (e.g. a file named "pleaseopenthis" with no extension, that is, in fact, a harmless photograph). Static analysis may identify that the attachment as an image file, where opening the file shows that the image file is, in fact, only an image file, and not hidden malware. Dynamic analysis of the email and the attached file may result in nothing happening. Network analysis of the email may result in determining that the email was from an innocent sender. The information generated from the static, dynamic, and network analysis may also be sent to the analytic engine 3618, so that the innocent network traffic can be identified as such.

Figure 36B:
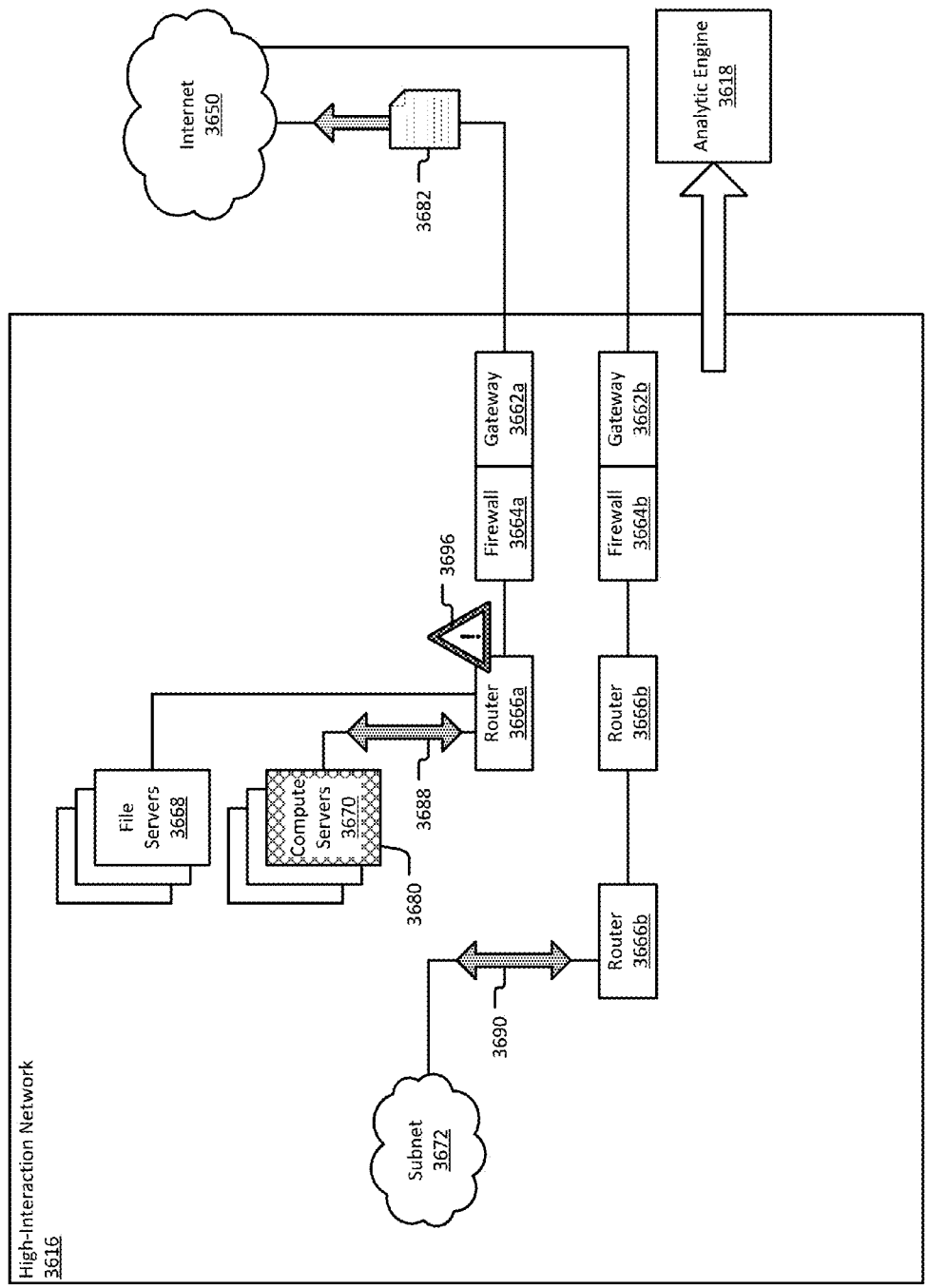

FIG. 36B illustrates another example of a possible configuration of the high-interaction network 3616. In this example, the high-interaction network 3616 has been configured with only a part of the site network. This example also illustrates that the high-interaction network 3616 can be used to emulate multiple parts of the site network at the same time.

In the illustrated example, the high-interaction network 3616 has been configured with test devices emulating the file servers 3668 and the compute servers 3670. Test devices are also emulating a gateway 3662a, firewall 3664a, and one router 3666a, so that the file servers 3668 and compute servers 3670 are accessible to the Internet 3650. The high-interaction network 3616 may have been configured with only the file servers 3668 and compute servers 3670 because suspect network traffic appears to be a direct attack 3688 on the servers 3668, 3670. For example, the suspect network traffic may include an attack 3688 in the form of an exceptionally large volume of database queries to a database hosted by the compute servers 3670, accompanied by database data being uploaded 3682 to the Internet. Since the suspect network traffic in this example constitutes database queries, the release point 3680 for this suspect network traffic is an appropriate compute server 3670. Furthermore, since the attack 3688 in this example is not likely to transition to other parts of the site network, such as the user workstations, the other parts of the site network have not been emulated.

In this example, the high-interaction network 3616 is also emulating a subnet 3672, along with separate routers 3666b and a separate a firewall 3664b and gateway 3662b to provide the subnet 3672 with access to the Internet 3650. The subnet 3672 and its routers 3666b, firewall 3664b, and gateway 3662b are, in this example, not connected to the emulated hardware for the file 3668 and compute 3670 servers. The subnet 3672 and its accompanying infrastructure may be emulated separately so that suspect network traffic directed specifically at the subnet 3672 may be analyzed separate from suspect network traffic directed at the file 3668 and compute 3670 servers. Suspect network traffic directed to the subnet 3672 may constitute an attack 3690 that is unrelated to suspect network traffic directed to the file 3668 and compute 3670 servers. Hence, separate analysis may be more efficient. Separate analysis may also provide a more precise description of each stream of suspect network traffic.

Separate analysis may also lead to more efficient use of available resources. When only part of the site network is emulated, the high-interaction network 3616 may have idle resources, such as unused test devices and/or computing power. By using these resources to emulate another part of the site network, the high-interaction network 3616 can analyze more suspect network traffic at the same time. The result of the analysis provided by each individually emulated network part are provided to the analytic engine 3618 for analysis.

Figure 36C:
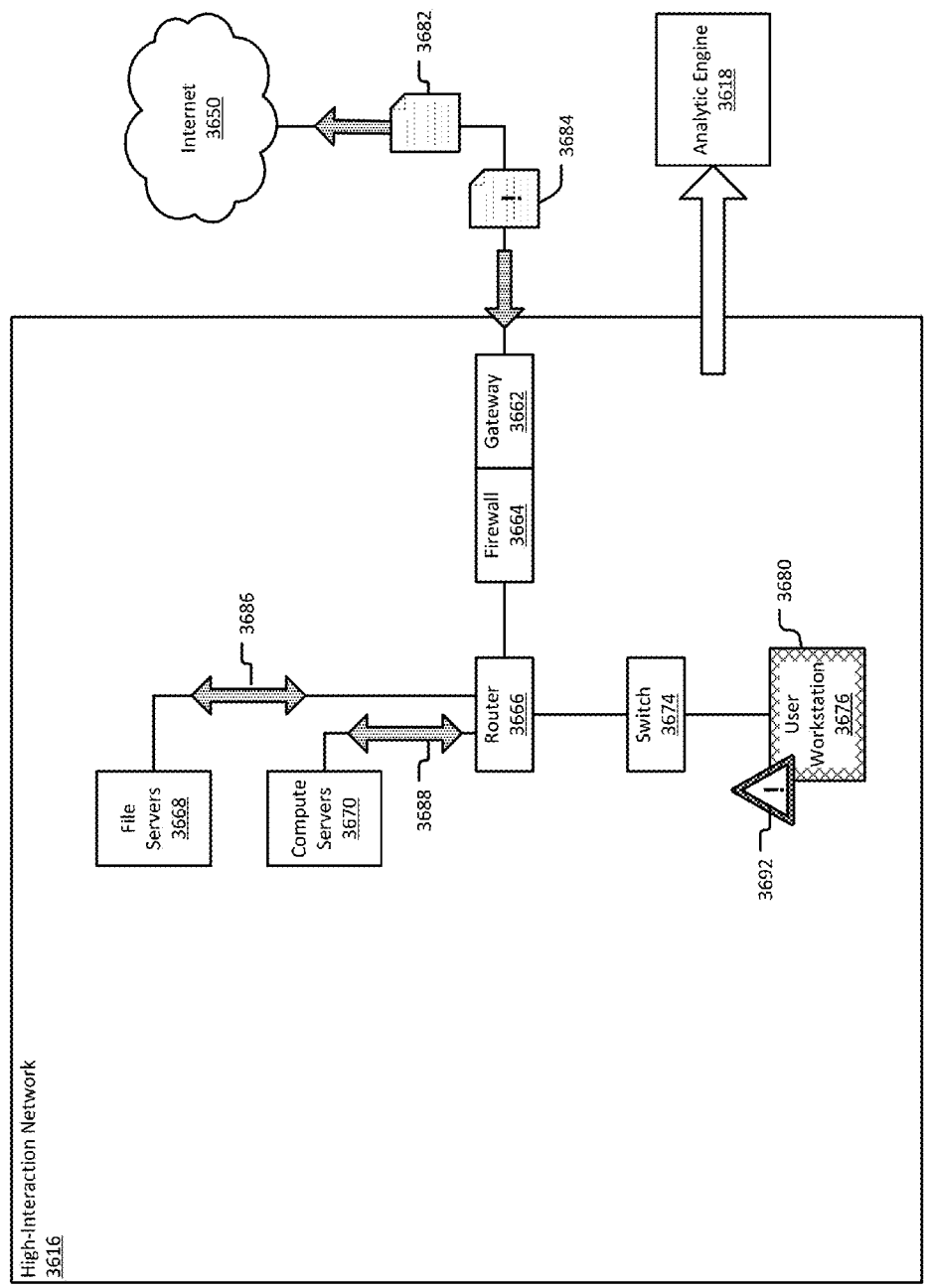

FIG. 36C illustrates another example of a possible configuration for the high-interaction network 3616. In this example, the high-interaction network 3616 has been configured to emulate the part of the site network that is accessible to a specific user. A user of the site network may have authorization to access only specific parts of the site network. Thus in this example, the high-interaction network 3616 has been configured with test devices emulating the specific user's workstation 3676, as well as the switch 3674, router 3666, firewall 3664, and gateway 3662 that connect the user's workstation 3676 to the Internet 3650. The high-interaction network 3616 may further be configured to with test devices emulating the one file server 3668 and one computer server 3670 that the user of this example is authorized to use.

Emulating only the part of the site network that is accessible to one user may be useful when suspect network traffic is directed at a specific user, or takes advantage of one user. For example, the user may be the target of a spoofing attack 3692. A spoofing attack 3692 may take the form of the user receiving email that appears to be from a person that the users knows, but that is, in fact, malicious email that is "spoofing," or pretending, to be from a known person. The spoof email may further have a malicious attachment, such as a key logger. The user's workstation 3676 is treated as the release point 3680 for the spoof email: an automated process, acting as would the user, opens the email and causes the key logger to be downloaded 3684. The automated process may subsequently enter key strokes, including the user's credentials, for capture by the key logger. The key logger may then upload 3682 the user's credentials to a malicious actor on the Internet 3650. Now armed with one user's credentials, an outside actor may attack 3688 the compute server 3670 or attack 3686 files on the file server 3668, using the user's stolen credentials. All of this activity, including downloading 3684 of the key logger, uploading 3682 of the user's credentials, and lateral movement of the attack to the file 3668 and compute 3670 server may be captured and sent to the analytic engine 3618 for analysis.

In each of the various examples illustrated in FIGS. 36A-36C, the high-interaction network 3616 may collect data about the an attack that was released into the high-interaction network 3616. For example, the high-interaction network 3616 may collect web-based network protocol activity, other network protocol activity, file activity log files, memory snapshots, and/or records of lateral movement within the high-interaction network 3616. This data may include a large number of routine events, events related to the attack, and events that are unrelated to the attack. Events related to the attack may also appear to be to be harmless on their own. Thus a threat analysis engine may analyze the data, determine which events were related to the attack, and how the events relate to each other. To do this analysis, the threat analysis engine may use a correlation process.

Figure 37:
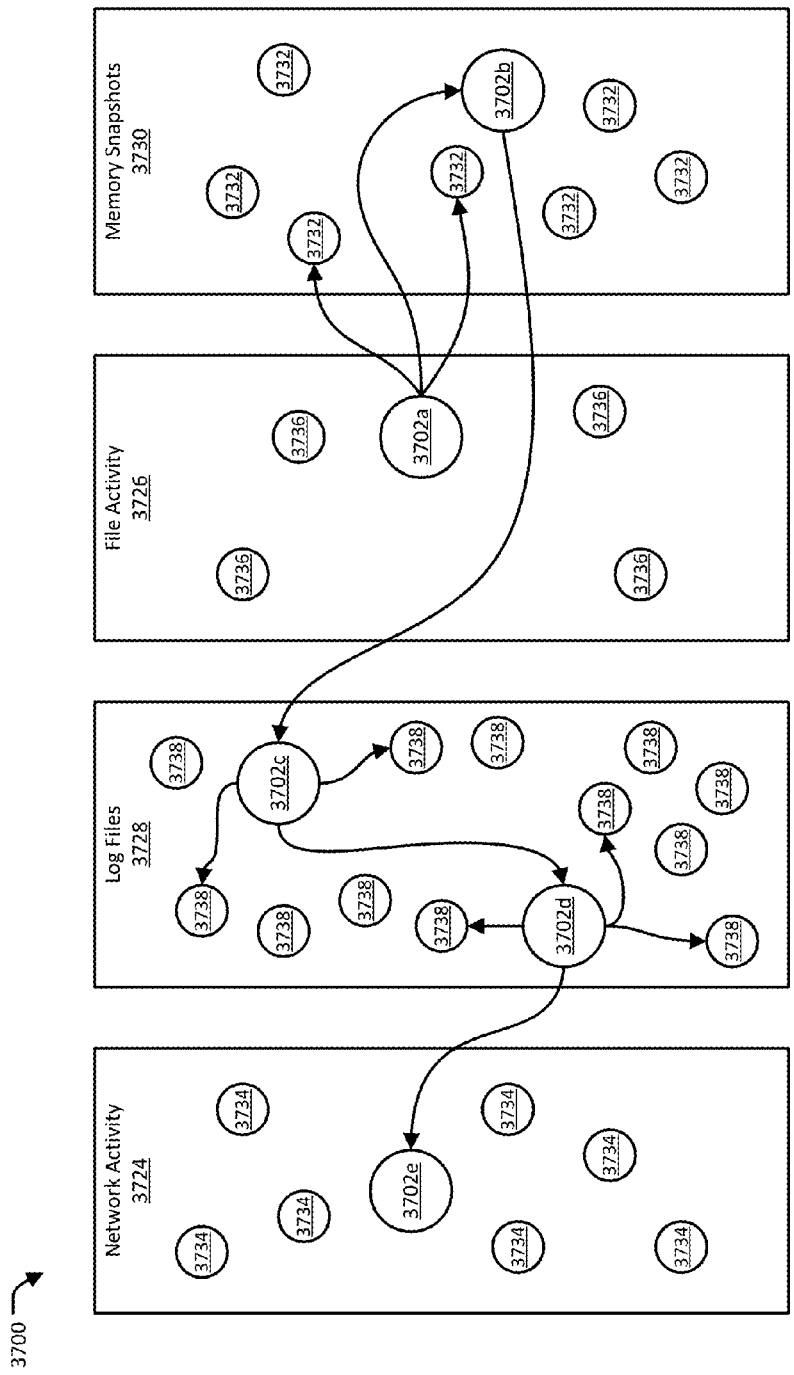
FIG. 37 illustrates an example of a correlation process.

FIG. 37 illustrates an example of a correlation process 3700. As discussed above, an analytic engine may receive, for a given incident, data 3724, 3728, 3726, 3730 of various types. In this example, the data includes network activity 3724, log files 3728, file activity 3726, and memory snapshots 3730.

The data 3724, 3728, 3726, 3730 of each type may further include many events 3734, 3738, 3736, 3732. Events are various things that occurred in the high-interaction network or on a particular emulated network device. For example, events may include files downloaded from the Internet, individual memory snapshots from a particular emulated network device, the entries in a log file, and/or packets received or sent. The data 3724, 3728, 3726, 3730 may include all the events that could be captured by the high-interaction network. Alternatively, the data 3724, 3728, 3726, 3730 may have been filtered to remove routine events, such as those related to maintenance of an emulated network device. Alternatively or additionally, the data 3724, 3728, 3726, 3730 may have been filtered to remove events known to be harmless. Even after filtering, the data 3724, 3728, 3726, 3730 may include a large number of events, many of which are probably unrelated to the attack. Additionally, many events may have been triggered by the attack, but may not have affected the ultimate outcome of the attack.

The various events 3734, 3738, 3736, 3732 may or may not be related to the attack. Some events may be malicious, but not have anything to do with the attack. Some events may be harmless by themselves, but be a direct cause of the harm intended by the attack. The correlation process 3700 attempts to connects events to each other to reconstruct the course of the attack, and ultimately to describe how the attack happened.

In the illustrated example, an attack may have resulted in servers crashing. A file analysis engine may have identified a malicious file event 3702a in the file activity 3726 data, specifically, downloading of a file identified as malware. The correlation process 3700 may thus attempt to find a connection between the malware file and the servers crashing.

In this example, the correlation process 3700 may look at memory snapshots 3730 of a crashed server. The correlation process 3700 may find that, between one snapshot and another, the crashed server suddenly ran out of memory, an event that occurred after the malware file was downloaded. The correlation process 3700 may further identify a memory event 3702b—specifically, the starting of a process that generated data—that occurred when the server started running out of memory. It may appear, at this point in the analysis, that the file event 3702a (downloading of the malware) lead to the memory event 3702b (launching of a process that consumed the memory of server), which lead to the server crashing.

The correlation process 3700 of this example may thus have determined how the servers crashed, but has not yet determined how the malware file came to be on the network in the first place. The malware may have gotten onto the network through a network vulnerability, which should be identified.

To determine how the malware file came to be on the network, the correlation process 3700, in this example, may generate a digital signature for the malware file, as an identifier for the file. The correlation process 3700 may next search log file 3728 data for the digital signature, and find a web event 3702c, here showing that the malware file was downloaded from a particular website. The website by itself may generally be safe, and the log file 3728 data may show many events 3738 related to the website. Thus, the correlation process 3700, in this example, may next search the log files for events related to both the website and the malware file. This search may locate a user event 3702d, here showing that a particular user visited the website and caused the malware file to be downloaded.

Now it may be desirable, in this example, to determine why the particular user visited the website and caused the malware file to be downloaded. While it may be possible to simply ask the particular user, the user may not be available, may not recall, may not have herself visited the website, may be a compromised account, or may be a non-existent account. Thus, as a next step in this example, may search network activity 3724 data for activity related to the particular user. In some cases, the network activity 3724 data may not have been captured as part of the incident, and may instead come from regular activity in the site network. In this example, the correlation process 3700 may identify a network event 3702e for this specific user, here identifying an email received by the use that contained a link to the website from which the malware was downloaded. The email may have been received by a trusted sender, and otherwise not have been flagged as suspect.

The correlation process 3700 may now have sufficient information to describe how the attack happened: first, a user received an innocent email with a link; second, the user followed the link to an otherwise legitimate website; third, following the link caused the malware file to be downloaded; fourth, the malware file launched processes that overloaded the memory of several servers, causing the servers to crash. The correlation process 3700 can further generate an incident report for this example attack. The incident report may include an indicator that describes each of the events in the attack.

Another example of a correlation process may include analysis of incident data collected from releasing suspect network traffic in a high-interaction network and data collected from the site network itself. In this example, the site network may have received an email, where the address of the sender of the email is a decoy email address. A decoy email address is an email address configured by a network security system to resemble an email address that could be used by a user of the site network, but which is, in fact, not presently in use. For example, decoy email addresses can be configured using the names of past employees, or variations of the names of present employees. In various implementations, decoy email addresses may be added to the email address books of legitimate users. Alternatively or additionally, decoy email addresses can be added to address books on emulated network devices that are acting as deceptions.

Generally, decoy email addresses are not used by legitimate users or processes in a site network. Thus, receiving an email that includes a decoy email address as the sender address automatically makes the email suspect. The email may be particularly suspect when it includes links and/or attachments. A suspect email with a decoy email address as the sender address may thus be routed to the threat intelligence system for analysis.

The threat intelligence system may generate incident data for the suspect email by detonating the email in the high-interaction network. Detonating the email may include following a link, executing an attachment, and/or analysis of a header part of the email. The incident data may show, for example, that detonating the email caused the user workstation at which the email was detonated to send emails to each address in an address book stored on the user workstation, where these emails each included the same suspect link and/or attachment. In other words, the incident data may show that the suspect email replicated and distributed itself, sending itself to each of the addresses in the address book.

Having learned the manner and mode of attack that could be triggered by the suspect email, the threat analysis engine may next attempt to correlate the events that lead to the initial receipt of the suspect email. For example, the threat analysis engine may determine which network devices in the site network had address books that included the decoy email address. Alternatively or additionally, the threat analysis engine may examine the path information in the suspect email's header to identify where the suspect email came from. The threat intelligence engine may next determine whether any network device in the site network received an email similar to the suspect email, and/or whether any network device sent a similar email to each of the addresses in the network device's own address book. From this information, the threat intelligence engine may be able to determine which specific network device or devices were the source of the suspect email. The threat intelligence engine may then produce an incident report, describing the manner of the attack and possibly also identifying where the suspect email came from initially.

Figure 38:
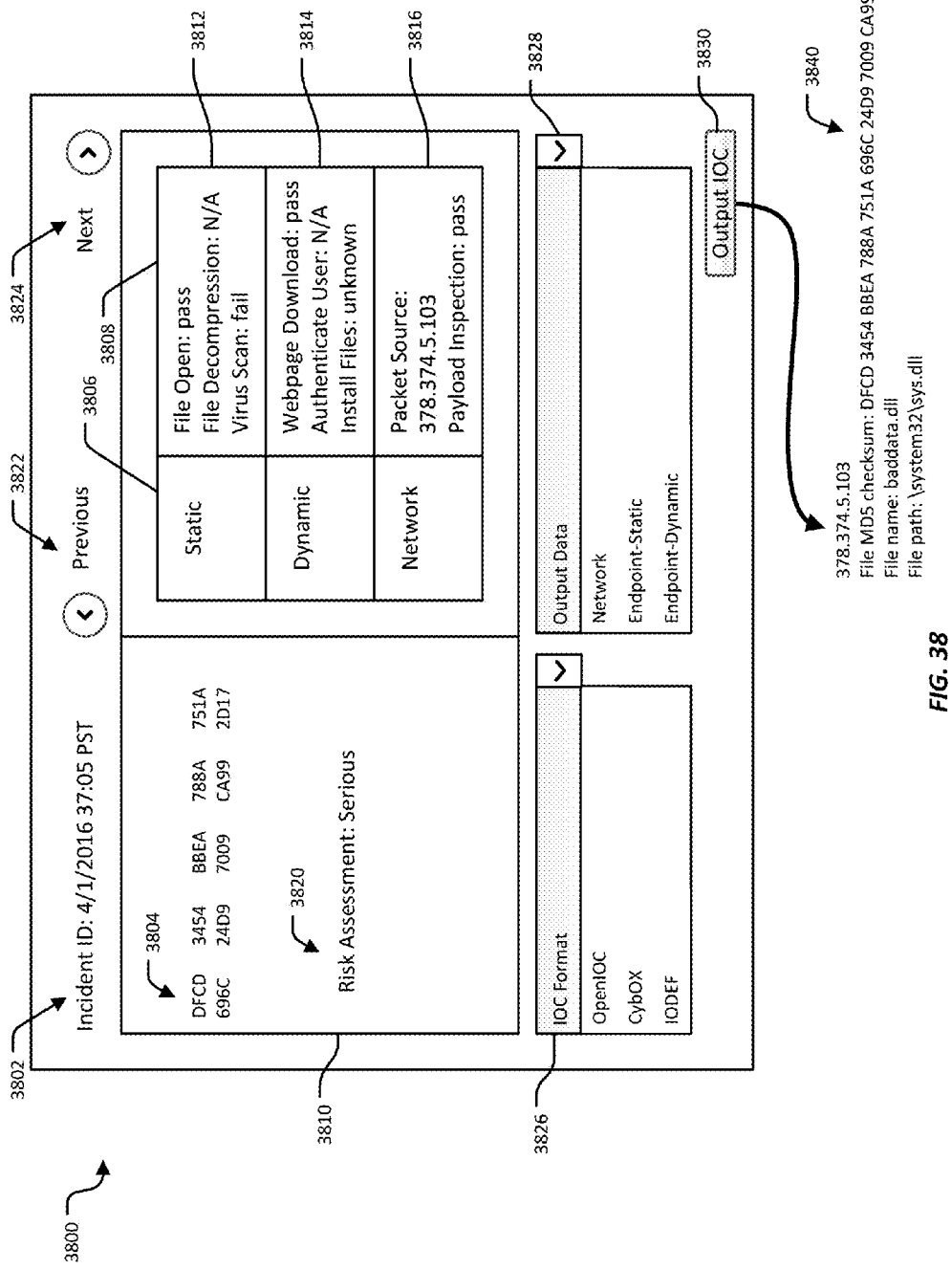
FIG. 38 illustrates an example of the information that may be available in an incident report, and how the information may be provided to a network administrator.

FIG. 38 illustrates an example of the information that may be available in an incident report, and how the information may be provided to a network administrator. FIG. 38 illustrates an example of a user interface 3800. The user interface 3800 may provide a way to display an incident report, search and view an incident report, and to produce indicators of compromise, which may be used to defend a network from a similar attack.

An incident report may include an incident identifier 3802. The incident identifier 3802 may be a time and/or date stamp, and/or a string (e.g. "michaelangelo") that can be used to identify and/or describe the attack. The incident identifier 3802 may be used by the network security community to identify the attack should it appear in other networks.

The user interface 3800 in this example includes a display area 3810 for displaying the incident timeline, and individual events in the incident. In this example, the display area 3810 displays, on the left-hand side, an event identifier 3804, which may uniquely identify a particular event. In this example, an MD5 hash is used as the event identifier 3804. The left side of the display area 3810 also displays a risk assessment 3820 for the event. In various implementations, the user interface 3800 may also display a risk assessment for the whole incident.

The right-hand side of the user interface 3800 of this example displays tests 3808 run for each analysis type 3806, possibly also with each test's result. As discussed above, the threat analysis engine may conduct static 3812, dynamic 3814, and network 3816 analysis on a particular piece of data from suspect network traffic. Each analysis type 3806 may further various tests 3808. The user interface 3800 may display the results of each of these tests.

The user interface 3800 of this example may also provide a "Previous" button 3822 to display a preceding event and a "Next" button 3824 to display the next event.

The user interface 3800 of this example may also enable a network administrator to obtain indicators of compromise 3840 that describe one or multiple events. In this example, the user interface 3800 includes a dropdown menu 3826 that allows the network administrator to select a format for the indicators of compromise 3840. The formats may be those used by various network security companies, such as McAfee® and Symantec™, or various open source formats. The user interface 3800 may also include a dropdown menu 3828 that allows the network administrator to select which data to include in the indicators of compromise 3840. The user interface 3800 may further include a button 3830 that will cause the indicators of compromise 3840 to be generated.

As noted, the indicators of compromise 3840 may be formatted to include information used by antivirus tools, malware detectors, spam filters, and other network security tools. In this example, the indicators of compromise include an identity of the threat actor (here, the IP address of a website), and data related to a malicious file (here, a digital signature for the file, the name of the file, and where the file was found at the conclusion of the attack).

Figure 39:
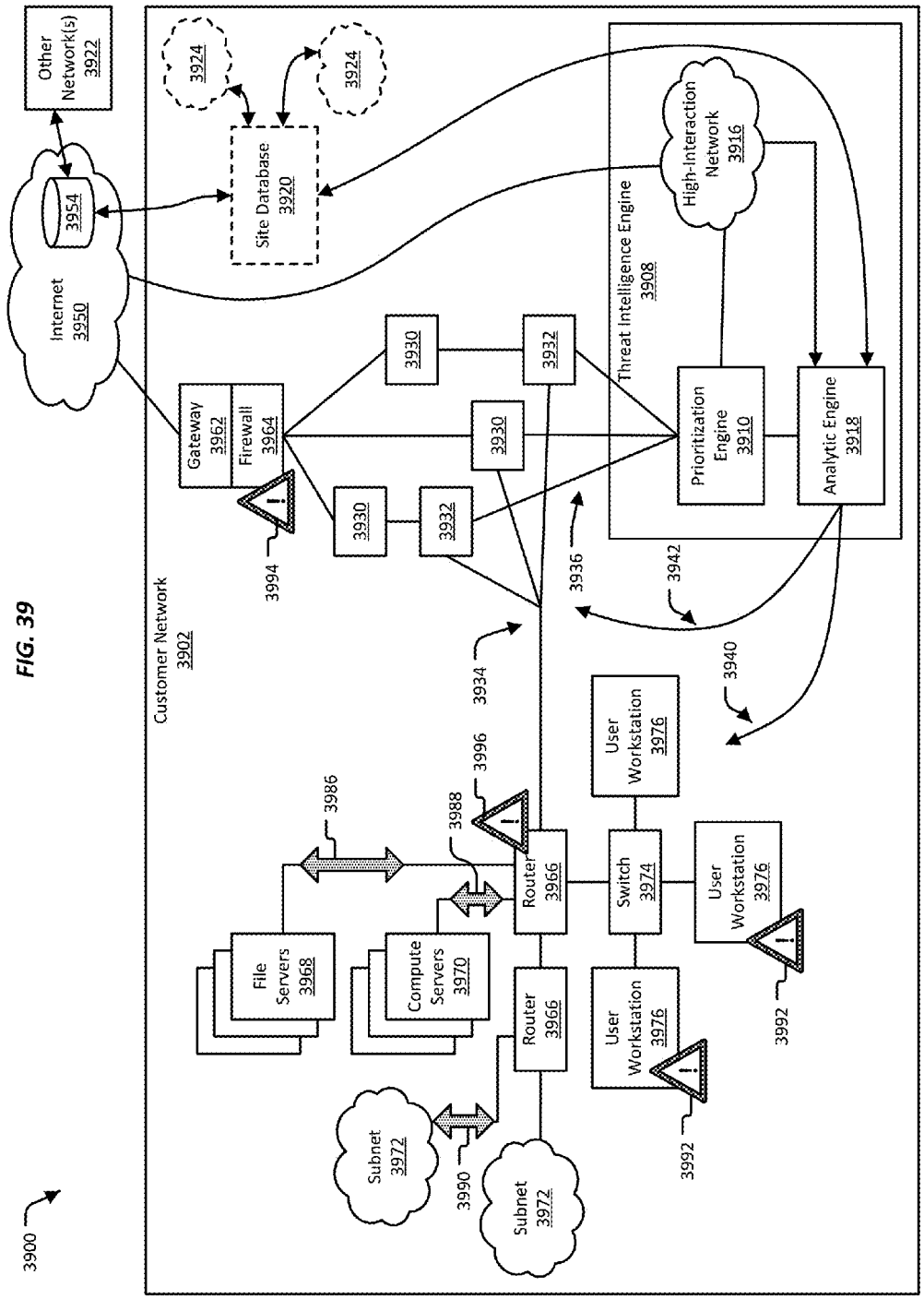
FIG. 39 illustrates examples of ways in which the threat intelligence engine may use indicators generated by its analytic engine.

In addition to being provided to a network administrator, the indicators generated for an incident may be added to an indicators database. A threat intelligence engine may use the indicators in the indicators database in various ways. FIG. 39 illustrates examples of ways in which the threat intelligence engine 3908 may use indicators generated by its analytic engine 3918. FIG. 39 illustrates an example of a customer network 3902 that includes a threat intelligence engine 3908. The customer network 3902 in this example includes a gateway 3962 for communicating with other networks, such as the Internet 3950. The gateway 3962 may include an integrated firewall 3964, or may be attached to a firewall 3964 device. Generally, all network traffic coming into or going out of the customer network 3902 passes through the gateway 3962 and firewall 3964.

The firewall 3964 generally controls what network traffic can come into and go out of the customer network 3902. The customer network 3902 in this example includes additional network security tools 3930, 3932, such as anti-virus scanners, IPS, IDS, and others. The network security tools 3930, 3932 may examine network traffic coming into the customer network 3902, and allow network traffic that appears to be legitimate 3934 to continue to the site's network. The network security tools 3930, 3932 may direct suspect network traffic 3936 to the threat intelligence engine 3908.

The site network is where the hardware, software, and internal users of the customer network 3902 can be found, and where the operations of the customer network 3902 occur. In this example, the site network includes several routers 3966 that connect together a switch 3974, a group of file servers 3968, a group of compute servers 3970, and several subnets 3972. The switch 3974 further connects several user workstations 3976 to the site network.

As discussed above, the threat intelligence engine 3908 examines suspect network traffic and attempts to determine whether the suspect network traffic may, in fact, be malicious. The threat intelligence engine 3908 in this example includes a prioritization engine 3910, a high-interaction network 3916, and an analytic engine 3918. The prioritization engine 3910 analyzes suspect network traffic 3936 and attempts to determine whether the suspect network traffic 3936 represents a known threat. When the suspect network traffic 3936 is associated with a known threat, then the threat intelligence engine 3908 may log the occurrence of the suspect network traffic 3936, and do nothing more. In some implementations, the threat intelligence engine 3908 may be configured to provide suspect network traffic 3936 associated with a known threat to the high-interaction network 3916 for analysis. Doing so may be useful, for example, to see how well the customer network 3902 can handle the known threat.

Suspect network traffic 3936 that is not associated with a known threat may be provided to the high-interaction network 3916 to attempt to determine if the suspect network traffic 3936 constitutes a threat, and if so, what the nature of the threat is. Within the high-interaction network 3916, the suspect network traffic 3936 may be allowed to do whatever harm it was designed to do. The suspect network traffic 3936, or an entity that is driving the suspect network traffic 3936, may further be encouraged to act, for example by lowering security barriers within the high-interaction network 3916 and/or surreptitiously leaking credentials to the entity.

Any activity triggered by the suspect network traffic 3936 inside the high-interaction network 3916 may be recorded and provided to the analytic engine 3918. The analytic engine 3918 may analyze the recorded activity and generate indicators to describe and/or identify the suspect network traffic 3936, as described above.

The threat intelligence engine 3908 may use the indicators in several ways. For example, in some implementations, the threat intelligence engine 3908 may use the indicators to verify 3940 whether the site network has already been compromised. The site network may already be compromised if it has previously received suspect network traffic 3936 that has been analyzed by the threat intelligence engine 3908. For example, the threat intelligence engine 3908 may find that a virus 3992 has been downloaded to the user workstations 3976. Indicators may inform the threat intelligence engine which workstations 3976 to check, and where to find the virus. The indicators may further show that the virus was downloaded through interactions by the workstations' 3976 users, for example, with a malicious website.

As another example, the threat intelligence engine 3908 may find that ports at the firewall 3964 have been opened 3994. The threat intelligence engine 3908 may further find that a router's 3966 configuration has been changed 3996, making the site network accessible to an outside actor. Indicators may inform the threat intelligence engine 3908 to check the firewall 3964 and router 3966 for these changes.

As another example, the threat intelligence engine 3908 may be able to use indicators to trace lateral movement that was captured in the high-interaction network 3916. For example, the threat intelligence engine 3908 may, based on theft of credentials at a user workstation 3976, look for unauthorized access 3988 to resources provided by the compute servers 3970. The threat intelligence engine 3908 may also look for unauthorized access to the file servers 3968, and unauthorized downloading 3986 of files from the file servers 3968. The threat intelligence engine 3908 may further look for unauthorized logins 3990 into a subnet 3972.

Another way in which the threat intelligence engine 3908 may use the indicators is to update 3942 the network security tools 3930, 3932. For example, the threat intelligence engine 3908 may identify malware that is not known to an anti-virus tool, may find malicious IP addresses or websites that should be blocked by the firewall, or may identify attached files that should be removed from incoming network traffic.

In some implementations, the threat intelligence engine 3908 may also send its indicators to a site database 3920. The customer network 3902 may have a site database 3920 when the customer network 3902 has multiple additional site networks 3924. Each of these site networks 3924 may be provided with its own threat intelligence engine. The individual threat intelligence engines may also provide indicators to the site database 3920. Indicators from different site networks 3924 may be shared between the site networks 3924. Each site network may thereby be defended against attacks that it has not yet experienced.

In some implementations, the threat intelligence engine 3908 may also send its indicators to a central database 3954 located on the Internet 3950. In implementations that include a site database 3920, the site database 3920 may send indicators for all of the customer network 3902 to the central database 3954. The central database 3954 may also receive indicators from other networks 3922. The central database 3954 may share the indicators from the other networks 3922 with the customer network's 3902 threat intelligence engine 3908. By sharing indicators between the other networks 3922 and the customer network 3902, all of the networks 3902, 3922 may be made more secure.

X. Identifying a Threat Source

The systems discussed above, including the high-interaction network and the multiphase threat analysis and correlation platform, can be used to derive intelligence about a threat encountered by a network. Such intelligence can be used to thwart future threats that are similar in nature.

Intelligence that can be determined from a network threat can include, among other things, a source of the threat. For example, a threat source may be malware, that is, a program that can autonomously cause harm to a network. Though the malware may have entered the network through an act of a person, once released into the network, the malware is able to do harm without any further input from a person. Another example of a threat source is a human actor, who may be using programs or other tools to do harm to a network, but who interacts with these program or tools through the course of causing the harm. A human actor may be acting in his own interests, in the interests of a group, and/or on behalf of a government.

In various implementations, a high-interaction network can be employed to identify whether the source of a network threat is an automated source, such as malware, or a manual source, such as a person actively attacking the network. In various implementations, data provided by the high-interaction network can be processed by a threat analysis and correlation platform to determine whether a threat source is automated or manual.

Figure 40:
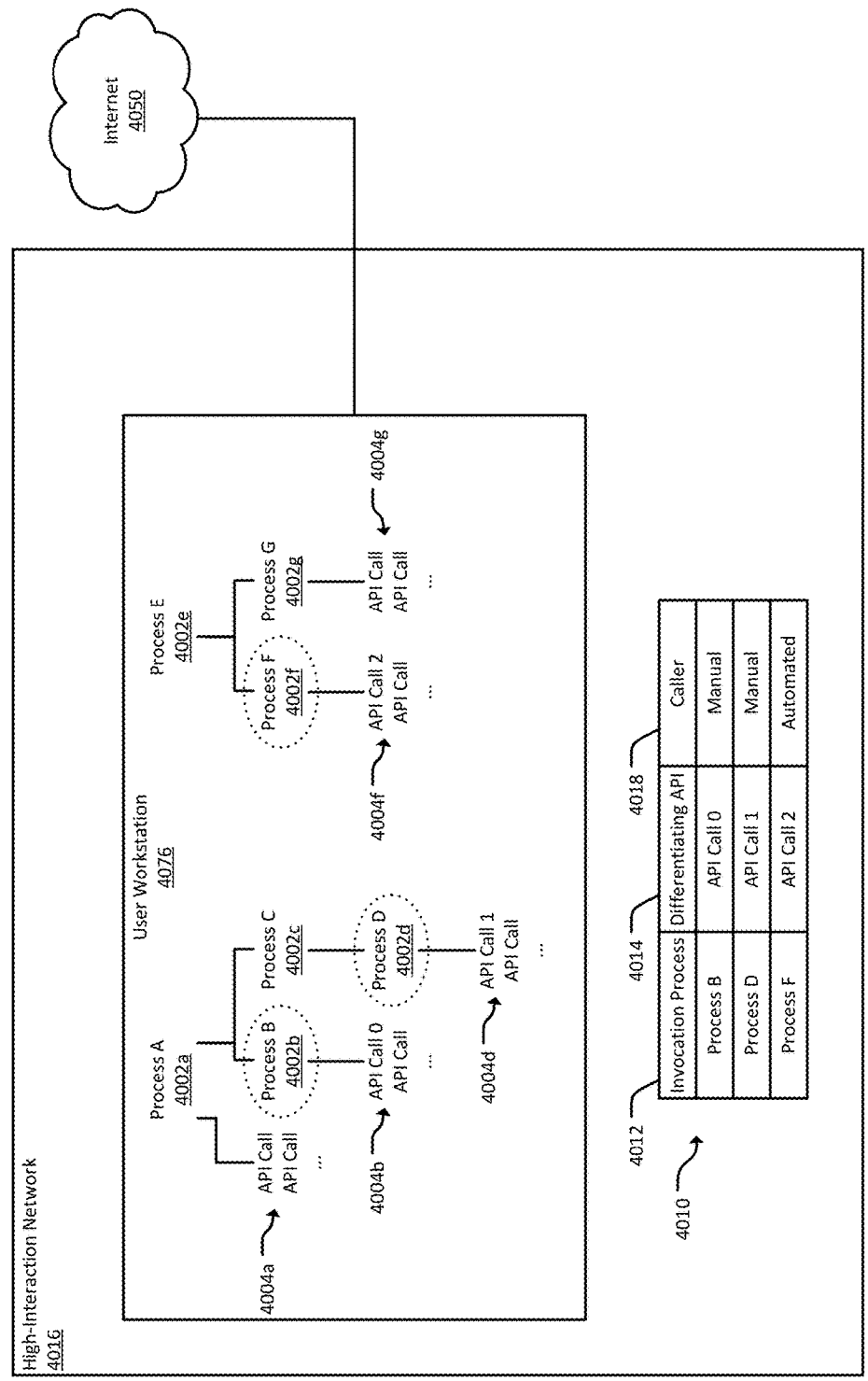
FIG. 40 illustrates an example of a high-interaction network that has been configured to identify the source of a threat to a network.

FIG. 40 illustrates an example of a high-interaction network 4016 that has been configured to identify the source of a threat to a network. As discussed above, network communications that have been identified as suspect can be redirected to the high-interaction network 4016 for analysis. In the high-interaction network 4016, the suspect network communications can be interacted with, in order to determine whether the contents of the network communications pose a threat to the network. The network from which communications have been redirect is not illustrated here.

As discussed above, the high-interaction network 4016 can be configured to emulated parts of a network, and/or systems that could be found in the network. In the example illustrated in FIG. 40, the high-interaction network 4016 has been configured to include at least one user workstation 4076. A communication channel with the Internet 4050 has further been enabled for the user workstation 4076, so that malicious activity released on the user workstation 4076 can access the Internet 4050. The high-interaction network 4016 can include other emulated systems, including routers, gateway devices, and other user workstations, as needed for the analysis techniques discussed below.

In the illustrated example, suspect network communications have been redirected to the user workstation 4076. The suspect network communications can include, for example, email, webpages, file downloads, or streaming data (e.g., streaming video and/or audio) among other things. The suspect network communications can also include communication channels, such as TCP sockets, Remote Desktop Protocol (RDP) exchanges, or File Transfer Protocol (FTP) links, among other things. Once redirected to the user workstation 4076, the suspect network communications can be interacted with using automated tools, such as scripts. Interacting the with suspect network communications can include opening email or files contained by the communications, decompressing or decompiling files, following Internet 4050 links, and/or responding to requests received over a communication link, among other things.

In the illustrated example, interacting with suspect network communications caused processes to be launched. In one case, a network communication caused Process A 4002a to be launched, while in another case another network communication caused Process E 4002e to be launched. These processes 4002a, 4002e can have be launched, for example, by opening an email attachment, following an Internet 4050 link, downloading a file from the Internet 4050, or as a result of some other data contained in the suspect network communications.

In the illustrated example, Process A 4002a made several Application Programming Interface (API) calls 4004a, and also launched two additional processes, Process B 4002b and Process C 4002c. An API is a set of subroutine definitions, protocols, and/or tools that define communication between software components. APIs can be used to access, for example, web-based systems, operating systems, database systems, the hardware components of a computing system, and/or software libraries available on a computing system. In the illustrated example, Process A 4002a may have made API calls 4004a to access functionality provided by an operating system and/or by other applications executing on the user workstation 4076, such as drivers.

Processes B 4002b and C 4002c, having been launched or "forked" by Process A 4002a, are consider "child" processes of Process A 4002a, which is considered the "parent" of Processes B 4002b and C 4002c. Processes B 4002b and C 4002c may execute some operations on behalf of Process A 4002a, and, in some cases, may return some data to Process A 4002. In contrast, Process E 4002e was launched independently of Process A 4002a, and thus has no direct relationship with Process A 4002. In the illustrated example, Process B 4002b also makes some API calls 4004b, and Process C 4002c launches its own child process, Process D 4002d, which also makes some API calls 4004d.

In the illustrated example, Process E 4002e launches Process F 4002f, which makes several API calls 4004f. Process E 4002e also launches Process G 4002g, which also makes several API calls 4004g. In this example, the process tree initiated by Process E 4002e is unrelated and independent of the process tree initiated by Process A 4002a, though the various processes tree may make the same API calls.

As noted above, Processes A 4002a and Process E 4002e were each initiated as a result of interactions with suspect network communications. Assuming that both Process A 4002a and Process E 4002e directly or indirectly caused malicious activity on the user workstation 4076 or some other system in the high-interaction network, techniques can be used to determine whether the source of the malicious activity was an automated source or a manual source. In one example, such techniques include monitoring particular processes. For example, the user workstation 4076 (or a system within the high-interaction network 4016 that is monitoring the user workstation 4076) may be configured with a predetermined list of processes, referred to herein as the invocation process list 4012. The invocation process list 4012 can be included in a table 4010 that is available to the user workstation 4076 and/or a system that is monitoring the user workstation 4076. Processes in the invocation process list 4012 may be, for example, processes invoked by frequently used programs (e.g., file browsers, web browsers, document editors), processes often invoked by administrative programs (e.g., shell programs), and/or processes that can readily be associated with an automated or manual source. Processes may further be added to the invocation process list 4012 based on other criteria.

In various implementations, once a process from the invocation process list 4012 is executed on the user workstation 4076, the user workstation 4076 can monitor the running process. For example, in the illustrated example, Process B 4002b, Process D 4002d, and Process F 4002f are in the invocation process list 4012. Monitoring these processes 4002b, 4002d, 4002f can include monitoring the API calls 4004b, 4004d, 4004f made by the monitored processes 4002b, 4002d, 4002f. Monitoring the API calls 4004b, 4004d, 4004f can be accomplished, for example, using a dynamic-link library (DLL) injection technique. DLL injection is a technique that can be used to run code in the address space of another process by forcing the other process to load a DLL. In the example of FIG. 40, DLL injection can be used to executing a process that records the API calls 4004b, 4004d, 4004f made by each monitored process 4002b, 4002d, 4002f.

Once the API calls 4004b, 4004d, 4004f made by the monitored processes 4002b, 4002d, 4002f have been recorded, these API calls 4004b, 4004d, 4004f can be compared against a list of API calls, referred to herein as the differentiating API list 4014. Each process in the invocation process list 4012 can be associated with one or more APIs in the differentiating API list 4014. Such associations can be captured in the illustrated table 4010. Each differentiating API can further be associated with a caller 4018, which identifies whether the API can only be called by a manual source or can only be called by an automated source. For example, should Process B 4002b make API Call 0, it can be determined that the source of the invocation of API Call 0 was a manual source, meaning that a human actor caused API Call 0 to be invoked. Alternatively or additionally, Process B 4002b, by association, may also have been invoked by the same human actor. Similarly, Process A 4002a may alternatively or additionally have been invoked by the human actor.

As another example, should Process E 4002e make API Call 1, it can also be determined that API Call 1, or Process E 4002e, were invoked by a human actor. In some cases, this information can be used to corroborate the indication that a human actor is behind all of the process tree that started with Process A 4002a.

As a further example, should Process F 4002f make API Call 2, it can be determined that API Call 2 was made by an automated source, meaning that a malware program caused API Call 2 to be invoked. Alternatively or additionally, Process F 4002f may have been invoked by the automated source, and/or Process E 4002e may have been invoked by the automated source.

Differentiating API calls and their associated callers can be identified using, for example, heuristic and/or probabilistic techniques. For example, malware programs can be observed (using, for example, the high-interaction network 4016) to identify API calls frequently made by such programs. Similarly, activities of malicious human actors can be recorded using the high-interaction network 4016, and then analyzed to determine API calls made by such human actors. In each of these examples, probabilities can then be determined that identify a likelihood that, when invoked by a particular process, a particular API was called by an automated source or a manual source.

For example, "URLDownloadtoFileA," is an API used to download a file using an Internet 4050 connection. When URLDownloadtoFileA is invoked by an Internet Explorer process, then, in most cases, the threat source is a manual source. Internet Explorer is a file and web browser program, generally provided so that users can browse a file system or the World Wide Web. In contrast, when URLDownloadtoFileA is invoked by a shell program, then it is more likely that the threat source is an automated source. Shell programs can provide direct access to an operating system, and thus are not typically invoked by users.

A similar example is the "CreateFileA" API, which can be used to create files in a file system. When the CreateFileA API is called by Internet Explorer, then likely the threat source is a manual source. When CreateFileA is called by a shell program, then likely the threat source is an automated source.

As another example, the "Win32_Process" API can be invoked to launch a client application on a 32-bit Windows® system, and "Win32_StartupCommand" is an API that can be called whenever a user logs into a 32-bit Windows® system. Should either of these APIs be called by the "Invoke-WMIMethod" process, then it is very likely that the threat source is a manual source.

In some cases, when a particular API is invoked by a particular process there may not be a higher likelihood that the invocation was by an automated source or by a manual source. In these cases, the API and process may be excluded for the invocation process list 4012 and the differentiating API list 4014.

In various implementations, differentiating APIs can alternatively or additionally be added to the differentiating API list 4014 because the APIs are known to be vulnerable. For example, a function called "Collab.getIcon( )" can be used to cause a buffer overflow condition in Adobe Reader and Adobe Acrobat. By creating a Portable Document Format (PDF) file with a malformed Collab.getIcon( ) call, the PDF file can be made to execute arbitrary code. The Collab.getIcon( ) function may thus be associated with an Adobe Reader or Adobe Acrobat process, and—because the threat triggers automatically upon the PDF file being opened—can be associated with an automated source.

Identification of a threat source as automated (e.g., malware) or manual (e.g., a human actor) can be included as an indicator that describes a particular threat. Knowledge of the threat source can be used, for example, to more quickly identify and defend against the same threat or a similar threat. For example, when a human actor is identified as the threat source, counter-measures can be taken to block the human actor from being able to access the network. As another example, when a threat source is malware, the malware can be dissected to determine how the malware operates, how the malware was developed, and possibly even who developed the malware.

Figure 41:
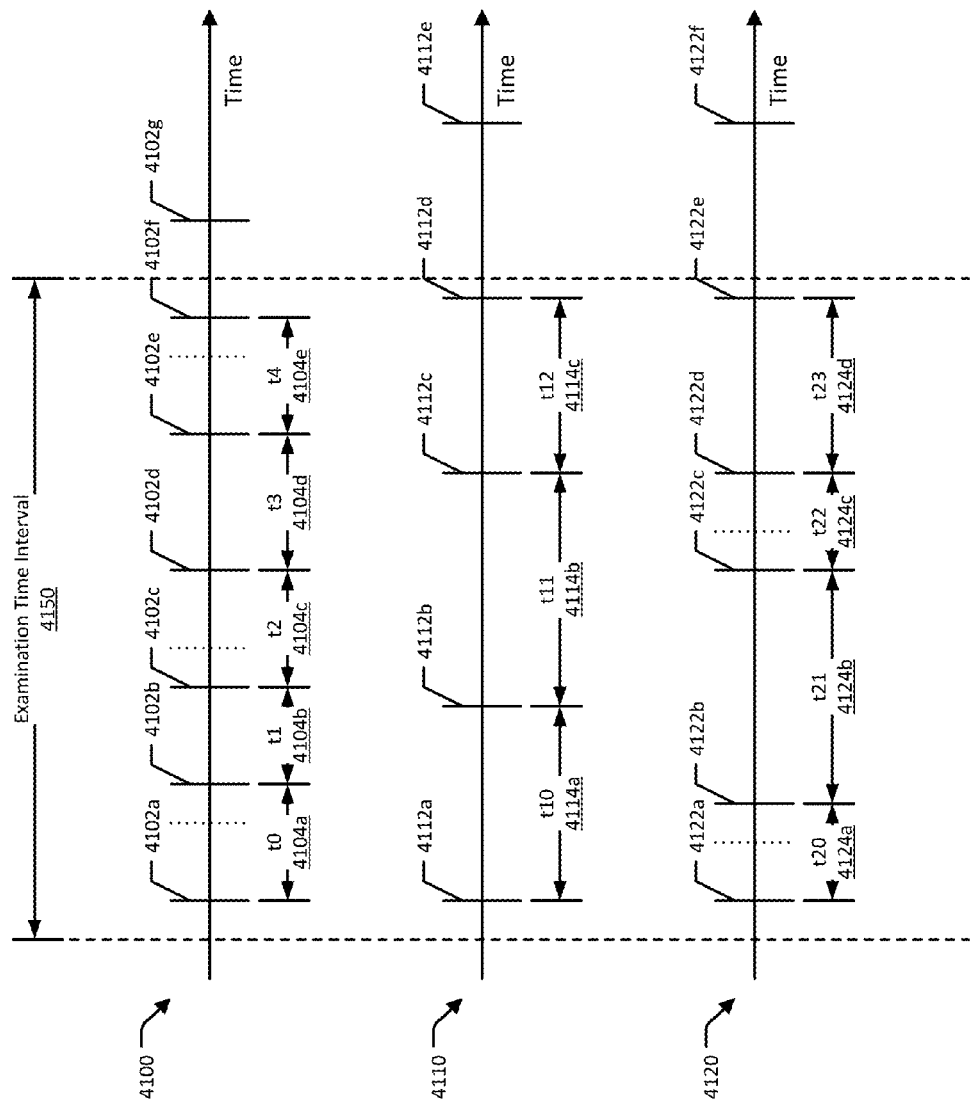
FIG. 41 illustrates another example of a technique that can be used to determine whether the source of a threat is being driven automatically or manually.

FIG. 41 illustrates another example of a technique that can be used to determine whether the source of a threat is being driven automatically or manually. As discussed above, suspect network communications can be redirected into a high-interaction network, where the contents of the suspect network communications can be interacted with using automated tools. As also discussed above, interacting with the suspect network communications can cause processes to be launched and API calls to be made. For example, a file contained in the communications may be a malware program. As another example, opening a file contained in the communications may cause a backdoor to be opened, through which a malicious actor can access the network. In each of these examples, the malware program or malicious actor may launch a succession of processes that may make various API calls. These processes and API calls, being related to the same threat, may be referred to as belonging to the same incident.

In various implementations, the technique illustrated by FIG. 41 can track the time interval between events (e.g., process invocations and/or API calls) within the same incident. The time interval can then be used to determine whether the threat source behind the incident was automated source or a manual source. For example, a malware program is typically capable of launching process much faster than a person is able to type and execute commands. Hence, the time between events in an incident can be a good indicator of the source behind the incident.

FIG. 41 illustrates examples of three timelines 4100, 4110, 4120, where each indicates points in time at which processes and/or API calls from the same incident were invoked. For example, the incident illustrated by the first timeline 4100 included seven events 4102a-4102g, where each event was the launch of a process or an API being called. As another example, the incident illustrated by the second timeline 4110 also included five events 4112a-4112e. As a final example, the incident illustrated by the third timeline 4120 included six events 4122a-4122f. Recording the sequence of events, including a relative or absolute time at which the event occurred can be accomplished by monitoring tools in a high-interaction network. For example, DLL injection, such as discussed above, can be used to record the events.

To determine whether the incident illustrated in each example timeline 4100, 4110, 4120 were driven by an automated source or a manual source, a tools such as a threat analysis engine can determine an examination time interval 4150, that is, a time period over which to examine events in an incident. In some cases, the examination time interval 4150 can span the time period of the entire incident. In some cases, the threat analysis platform can be configured to examine multiple time intervals, which may include different or overlapping periods within the time span of the incident. In some implementations, the length and/or the start point of the examination time interval 4150 can be determined randomly, can be fixed values, or can be dynamically adjusted based one, for example, information determined from an incident.

Having determine the examination time interval 4150, the threat analysis engine can next identify events within the incident to examine. Some events, illustrated in FIG. 41 using dotted lines, may be eliminated from consideration. For example, sleep API calls, processes that check or make use of the system clock, or processes or API calls for making an Internet connection may be ignored.

For the events that will be considered, the threat analysis engine can next determine the time interval between the events. For example, for the first timeline 4100, the threat analysis engine can calculate the time between the first event 4102a and the second event 4102b (t0 4104a). As a further example, the threat analysis engine can calculate the time between the second event 4102b and the third event 410c (t1 4104b), and so on for each of the other events 4102d-4102f within the examination time interval 4150. The threat analysis engine may next take the calculated times, t0 4104*a*, t1 4014*b*, t2 4104*c*, t3 4104*d*, and t4 4104*e*, and determine an average time. The threat analysis engine may then compare the average time against a threshold. When the average time is less than or equal to a threshold, then there is a high degree of likelihood that the source behind the incident was a manual source. When the average time is greater than the threshold, then it is more likely that the source behind the incident was a manual source.

In the example illustrated by the first timeline 4100, the events 4102*a*-4102*f* in the examination time interval 4150 occurred relatively quickly. For this example, the average time between the events 4102*a*-4102*f* is less than the threshold. The source behind the incident is thus most likely an automated source.

In the second example timeline 4110, the examination time interval 4150 included four events 4112*a*-4112*d*, encompassing three time spans, t10 4114*a*, t12 4114*b*, and t2 4114*c*. In the second timeline 4110, the events 4112*a*-4112*d* occurred relatively slowly, and the average time between the events is greater than the threshold. The source behind the incident is thus most likely a manual source.

In the third example timeline 4112, the examination time interval 4150 included five events 4122*a*-4122*e*, as well as a few events that were removed from consideration. The five events encompassed four time spans, t20 4124*a*, t21 4124*b*, t22 4124*c*, and t23 4124*d*. In this example, the events 4122*a*-4122*e* occurred in short bursts with longer delays in between the bursts. This pattern may have occurred, for example, because a malicious actor maybe using tools that are capable of quickly executing processes or commands, but is launching those tools manually. As another example, the pattern may have occurred because a malware program may have been configured to delay or wait for something to occur before proceeding. In the third example timeline 4120, selection of the examination time interval 4150 and the threshold may determine whether the threat source can be classified. For example, the examination time interval 4150 may be increased to capture a larger pattern of behavior. As another example, the threshold may be more finely tuned to capture more accurately the fastest rate at which a human can execute commands on a computing system.

Figure 42:
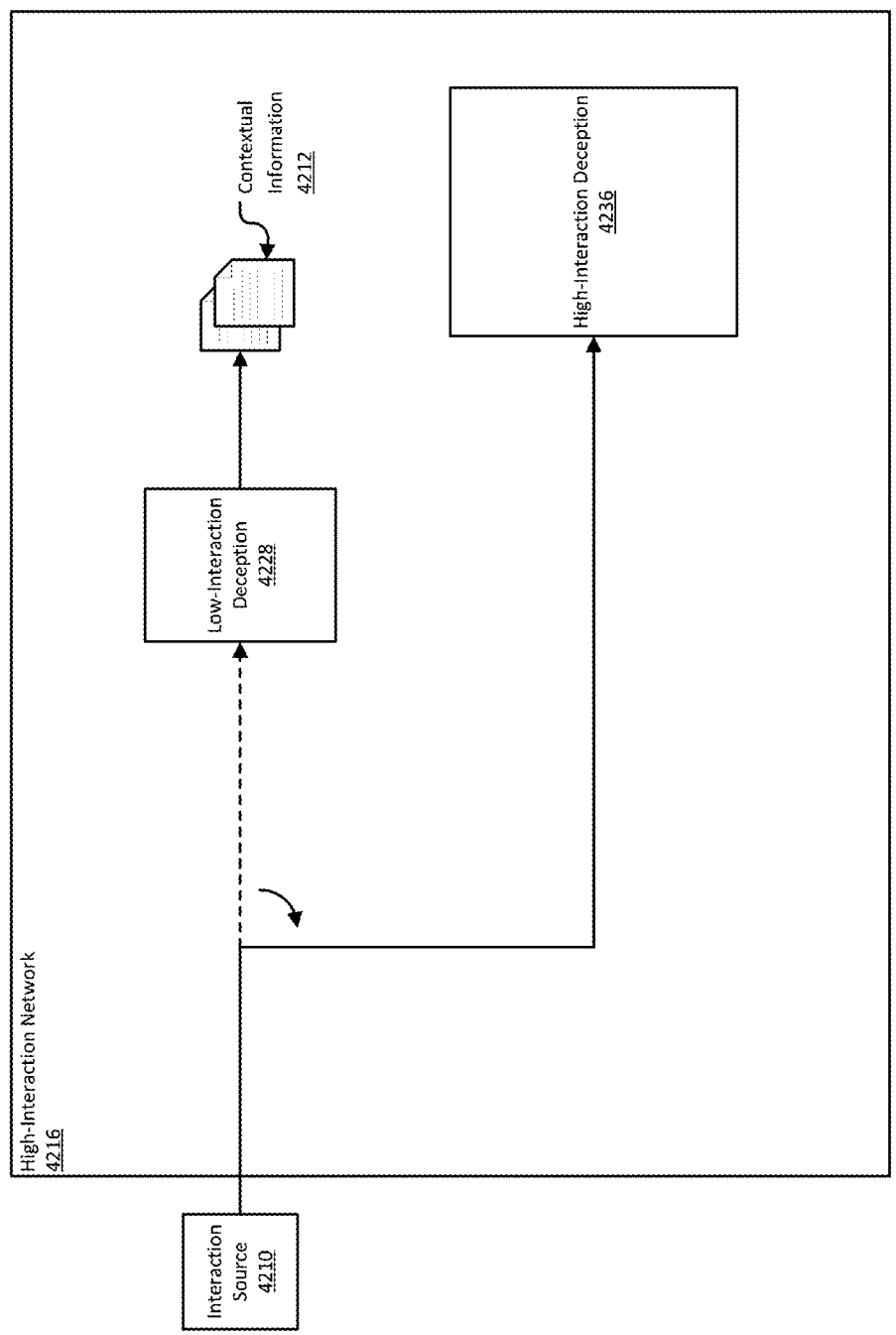
FIG. 42 illustrates another example of a technique that can be used to distinguish a manual threat source from an automated threat source.

FIG. 42 illustrates another example of a technique that can be used to distinguish a manual threat source from an automated threat source. FIG. 42 illustrates a high-interaction network 4216 that includes at least a low-interaction deception 4228 and a high-interaction deception 4236.

As discussed above, the low-interaction deception 4228 is an emulated system with a basic installation of an operating system and a full suite of services that can be offered by the operating system. In various implementations, the low-interaction deception 4228 may be capable of receiving network traffic for multiple MAC and IP address pairs. The low-interaction deception 4228 can be implemented using, for example, a dedicated computing system and/or using a virtual machine.

As also discussed above, the high-interaction deception 4236 is an emulated system with a specific installation of an operating system, including, for example, a particular version, particular patches, and/or particular updates. The high-interaction deception 4236 generally has a single MAC and IP address, and is configured to closely resemble an actual system that can be found in a site network. The high-interaction deception 4236 may be implemented using, for example, a computing system and/or a virtual machine.

As discussed above with respect to FIG. 13, an interaction source 4210 of FIG. 42 may initially be in communication with the low-interaction deception 4228. The interaction source 4210 can be, for example, a compromised system within a site network or a system located outside the site network (e.g., somewhere on the Internet). In some cases, the interaction source 4210 may be another emulated system within the high-interaction network 4216. In each of these examples, the interaction source 4210 may be communicating with the low-interaction deception 4228 in order to perpetrate a threat. For example, the interaction source 4210 may be infected with malware, which is attempting to spread itself to the low-interaction deception 4228. As another example, a malicious actor may be in control of the interaction source 4210, and may be attempting to infiltrate the low-interaction deception 4228.

As also discussed above, an interaction between the interaction source 4210 and the low-interaction deception 4228 may cause an escalation to the high-interaction deception 4236. Specifically, communications between the interaction source 4210 and the low-interaction deception 4228 may be redirected to the high-interaction deception 4236, so that any further communications from the interaction source 4210 are received by the high-interaction deception 4236 and are responded to by the high-interaction deception 4236. In order to give the appearance that the interaction source 4210 is only communicating with one device, the high-interaction deception 4236 may be selected and/or reconfigured to have the same operating system and services as are provided by the low-interaction deception 4228. The high-interaction deception 4236 typically also adopts the MAC and IP address with which the interaction source 4210 was communicating.

Various interactions between the interaction source 4210 and the low-interaction deception 4228 may have caused the interaction source 4210 to be redirected to the high-interaction deception 4236. For example, the interaction source 4210 may have attempted to log into the low-interaction deception 4228, may have attempted to make a remote desktop connection to the low-interaction deception 4228, may have followed a link or file path to that appears to lead to the file system of the low-interaction deception 4228, or may have attempted to fetch or load a file (such as a web page) from the low-interaction deception 4228, among other things.

When the interaction source 4210 has been redirected from the low-interaction deception 4228 to the high-interaction deception 4236, the high-interaction network 4216 can capture contextual information 4212 from the low-interaction deception 4228. The contextual information 4212 describes the interaction or interactions that caused escalation to the high-interaction deception 4236. For example, the contextual information 4212 can include commands and/or packets received from the interaction source 4210, files and/or directories the interaction source 4210 attempted to access, and/or network or communication protocols used by the interaction source 4210 in interacting with the low-interaction deception 4228, among other things.

In various implementations, the contextual information 4212 can be used to determine whether the interaction source 4210 is an automated source or a manual source. For example, the contextual information 4212 may indicate that escalation was caused by the interaction source 4210 logging into a remote desktop, using a password that was extracted from a cache. In this example, entering the password is generally a manual operation, and thus it is likely that the threat source is a manual source. In various implementations, a context can be labeled; in the prior example, the context can be labeled "RDP password from cache."

As another example, the contextual information 4212 may indicate that escalation occurred when a hidden SMB share directory was accessed. In this example, because the SMB share directory was hidden, it is likely that it was found by an automated process, possibly walking the directory tree and looking for such directories. In this example, the context can be labeled "fake SMB share."

In various implementations the contextual information 4212 and/or aspects of the contextual information 4212 can be assigned a weight, where the weight indicates a likelihood that the context is associated with a manual source or an automated source. For example, in some implementations, a high weight can be assigned to contexts (or aspects of contexts, such as processes or files) that are more likely to be associated with a manual source than an automated source. Conversely, in this example, a low weight ca be assigned to contexts (or aspects of contexts) that are more likely to be associated with an automated source. In these implementations, a weight or combination of weights can be used to determine whether the interaction source 4210 was a manual source or an automated source. For example, the weights of various aspects of a context can be summed, and the sum can be used to identify the interaction source 4210.

In various implementations, the contextual information 4212 can be combined with the output of analysis engines of a threat analysis engine. Examples of analysis engines are illustrated in FIGS. 20-23. As discussed above, the analysis engines can examine the contents of suspect network communications, and attempt to determine whether the contents are malicious. In various implementations, the output of the analysis engines can be combined with the contextual information 4212 illustrated in FIG. 42 to determine whether the interaction source 4210 is a manual source or an automated source.

Figure 43:
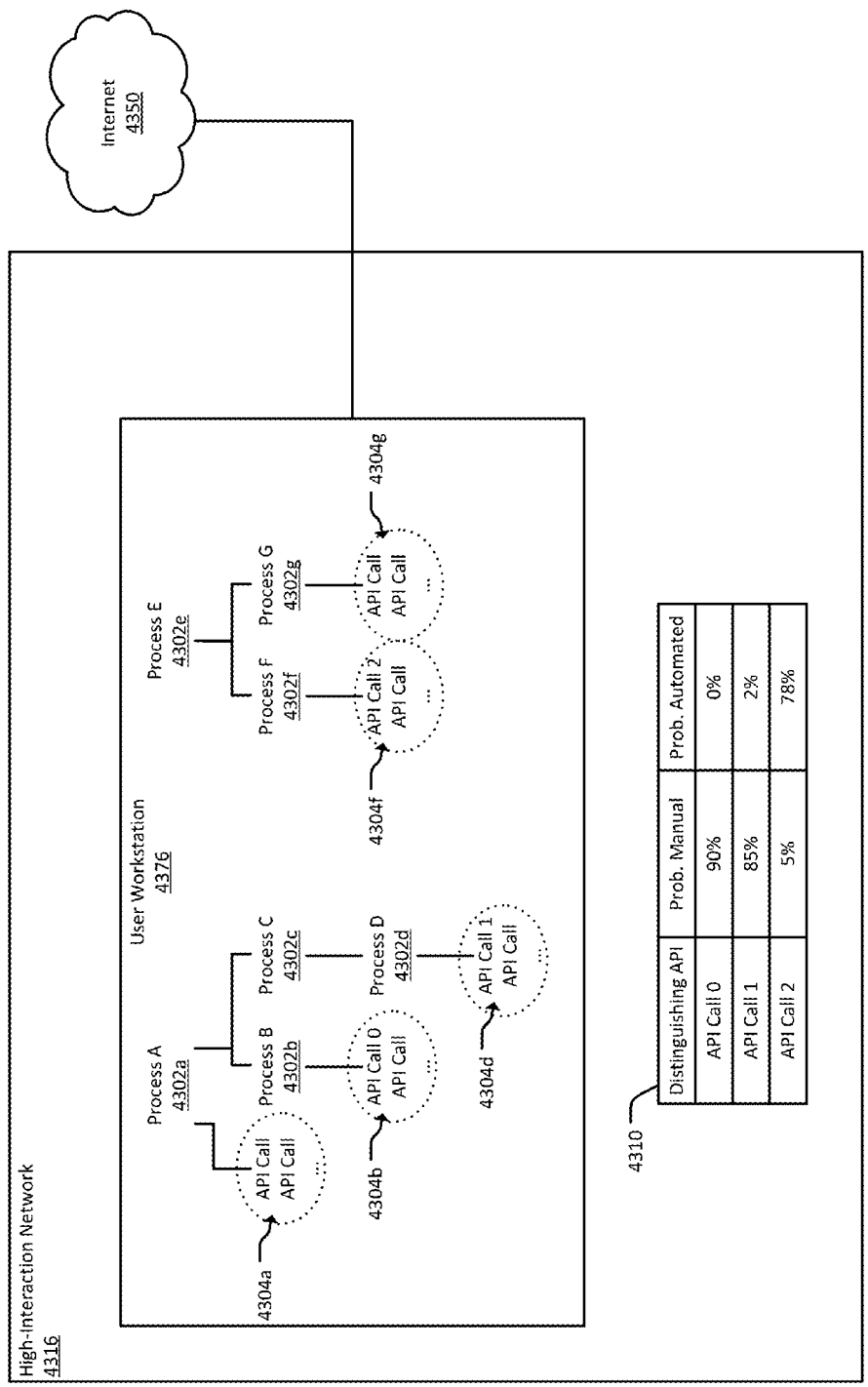
FIG. 43 illustrates another example of a technique that can be used to determine whether a threat source is a manual source or an automated source.

FIG. 43 illustrates another example of a technique that can be used to determine whether a threat source is a manual source or an automated source. In some cases certain events can only be caused by a human actor while other events can only be caused by an automated source. For example, mouse movement and keyboard input can only be caused by a human actor. As another example, kernel-level functions can only be called by malware that has infiltrated the operating system kernel. API calls that can only be invoked by a human actor or by a malware program are referred to herein as distinguishing APIs. In some cases, an API can be called by either a manual or an automated source. These types of APIs are not considered distinguishing APIs.

The example of FIG. 43 illustrates a high-interaction network 4316 that includes at least one user workstation 4376. A communication channel with the Internet 4350 has been enabled for the user workstation 4376, so that malicious activity released on the user workstation 4376 can access the Internet 4350. The high-interaction network 4316 can include other emulated systems, including routers, gateway devices, and other user workstations, as needed.

In the illustrated example, suspect network communications have been rerouted to the user workstation 4076, and the contents of communications have been interacted with (e.g., files were opened or downloaded, links were followed, etc.) As a result of these interactions, Process A 4302a and Process E 4302e were launched. Process A 4302a made several API calls 4304a and also launched Process B 4302b and Process C 4302c. Process B 4302 made several API calls 4304b, while Process C 4302c launched Process D 4302d. Process D 4302d itself made some API calls 4304d. Meanwhile, Process E 4302e independently launched Process F 4302f and Process G 4302g. Process F 4302f, in turn, made several API calls and Process G 4302g also made several API calls 4304g.

In various implementations, determining whether the process trees started by Process A 4302a and Process E 4302e were driven by a manual source or an automated source involves monitoring the APIs called by the various processes in each process tree. These monitored APIs can be compared against a table 4320, which may be available to the user workstation 4376 or to a system that is monitoring the user workstation 4376. The table 4310 can include a list of distinguishing APIs and probabilities for each distinguishing API that indicate the likelihood that the distinguishing API was called by a manual source or an automated source. For example, Process B 4302b made API Call 0, which has a 90% probability of being only called by a manual source and a 0% chance of being called by an automated source. As a further example, Process D 4302d called API Call 1, which has an 85% chance of being called by a manual source and a 2% chance of being called by an automated source. Hence, there is a high degree of likelihood that the threat source behind Process A 4302a is a manual source.

For any other API calls made by Process A 4302a, Process B 4302b, or Process D 4302d it may not be possible to determine definitively whether these API calls are more likely to be called by an automated or a manual source, and thus these API calls are not included in the distinguishing API list.

As another example, Process F 4302f made API Call 2. The example table 4310 indicates that there is a 5% chance that API Call 2 was made by a manual source, and a 78% chance that API Call 2 was made by an automated source. Other API calls made by Process F 4302f or Process G 4304f were not found in the distinguishing API list. Based on API Call 2, however, there is a high degree of likelihood that the threat source behind Process E 4302e was an automated source.

In various implementations, the list of distinguishing APIs and their associated probabilities can be developed using heuristic, probabilistic, and machine learning techniques. For example, such techniques can include examining processes invoked during normal and legitimate use of a user workstation, as well as processes invoked by malware. Using a large data set, APIs can be identified that are only likely to be called manually, or are only likely to be called by an autonomous program. The data set can further be used to compute probabilities for each of these sets of APIs.

Figure 44:
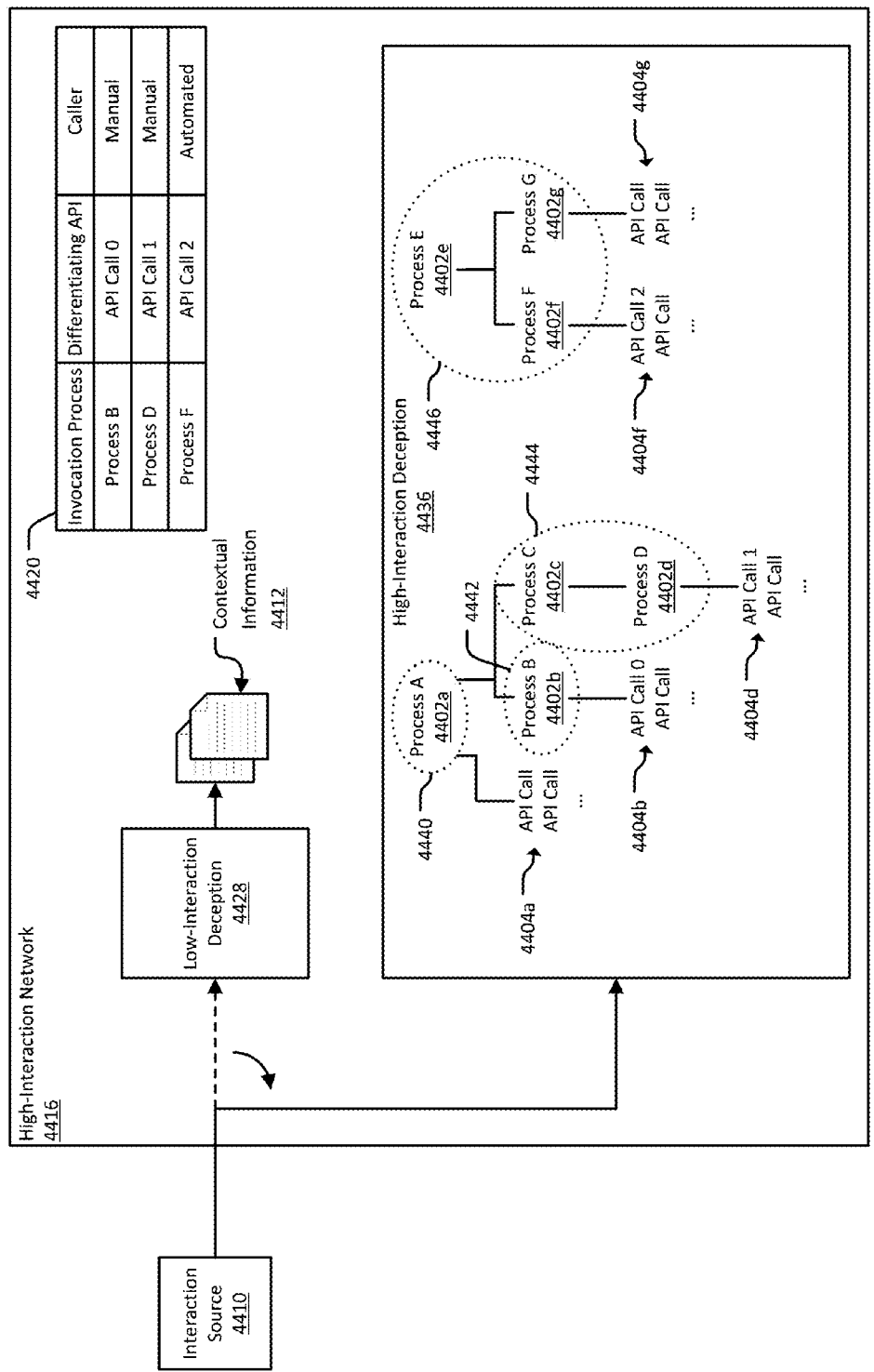
FIG. 44 illustrates another example of a technique that can be used to determine whether activity in a high-interaction network is being driven by an automated or a manual source.

FIG. 44 illustrates another example of a technique that can be used to determine whether activity in a high-interaction network 4416 is being driven by an automated or a manual source. In the example of FIG. 44, a table 4420 with differentiating APIs can be used in conjunction with contextual information 4412 extracted from a low-interaction deception 4428, as well as contextual information derived from a high-interaction deception 4436. This information together can be used to determine whether activity within the high-interaction deception 4436 was driven by a manual source or an automated source.

In the example of FIG. 44, the high-interaction network 4416 includes at least a low-interaction deception 4428 and a high-interaction deception 4436. An interaction source 4410 may have been communicating with the low-interaction deception 4428. The communication may have included a particular event that caused the interaction with the interaction source 4410 to be escalated to the high-interaction deception 4436. That is, communications between the interaction source 4410 and the low-interaction deception 4428 can be redirected to the high-interaction deception 4436, which more accurately emulates a real system than does the low-interaction deception 4428. Further communications with the interaction source 4410 are, thereafter, with the high-interaction deception 4436.

When the interaction source 4410 is redirected to the high-interaction deception 4436, the high-interaction network 4416 can extract contextual information 4412 from the low-interaction deception 4428. The contextual information 4412 describes the interaction or interactions that caused escalation to the high-interaction deception 4436, including, for example, commands or packets received from the interaction source 4410, files and/or directories accessed by the interaction source 4410, and so on.

Once redirected to the high-interaction deception 4436, the interaction source 4410 may cause Process A 4402a and Process E 4402e to be launched. In the illustrated example, Process A 4402a made several API calls 4404a and also launched Process B 4402b and Process C 4402c. Process B 4402 made several API calls 4404b, while Process C 4402c launched Process D 4402d. Process D 4402d itself made some API calls 4404d. Meanwhile, Process E 4402e independently launched Process F 4402f and Process G 4402g. Process F 4402f, in turn, made several API calls 4404f and Process G 4402g also made several API calls 4404g.

In various implementations, the high-interaction deception 4436, or a system that is monitoring the high-interaction deception 4436, can determine contexts 4440, 4442, 4444, 4446 for one or more the processes initiated by the interaction source 4410. A context can include, for example, a protocol being executed by a process, child-processes launched by a process, files and/or directories accessed by a process, network communications launched by a process, and so on. For example, Process A 4402a may have been launched as a result of the interaction source 4410 establishing a remote desktop connection with the high-interaction deception 4436. The context 4440 of Process A 4402a may thus include the RDP protocol. As another example, Process B 4402b may be a web browser session, initiated from within the RDP window. The context 4442 of Process B 4402b may thus include a web browsing, the websites being visited, and files downloaded from those websites. As another example, Process C 4402c may be a directory walking tool launched from within the RDP window. Process C 4402c may use Process D 4402d to assist in the directory walk. The context 4444 of Processes C 4402c and D 4402d may thus include directory walking, and the directories that were touched by the walk.

As another example, Process E 4402e may have launched Process F 4402f in order to encrypt files in the file system of the high-interaction deception 4436, and Process G 4402g to find an open port that can provide access to another network system. In some implementations, Processes E 4402e, F 4402f, and G 4402g may be considered as having one context 4446, which may be describe as a ransomware attack.

In various implementations, the contexts 4440, 4442, 4444, 4446 can be determined using analysis engines of a threat analysis and correlation engine. Examples of analysis engines are in FIGS. 20-23. The analysis engines can control and monitor the executing of the process trees illustrated in FIG. 44. The output of the analysis engines can identify the data types with which the various processes and API calls in the process trees are associated. The analysis engines can identify specific contexts, and further determine whether activity occurring within each context was malicious.

In various implementations, the information provided by the differentiating API table 4420, the contextual information 4412 from the low-interaction deception 4428, and the contexts 4440, 4442, 4444, 4446 determined from activity within the high-interaction deception 4436 can be used to determine whether the interaction source 4410 was driven by a manual source or an automated source. These various pieces of information can provide a complete picture where each piece individually may be inconclusive. For example, the contextual information 4412 from the low-interaction deception 4428 may indicate that the escalation to the high-interaction deception 4436 could have occurred because of either a manual or an automated event. As another example, API calls made within the high-interaction deception 4436 may not be on the differentiating API list. As another example, contexts identified in the high-interaction deception 4436 may be consistent with both automated and manual activity. By examining each of these pieces of information together, it may be possible to resolve inconclusive data, or to confirm marginally conclusive data.

Figure 45A:
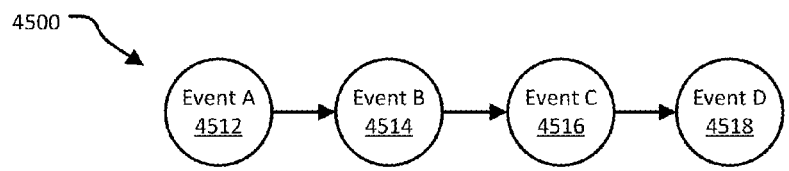
FIG. 45A illustrates an example of sequence of events in an incident.

FIG. 45A illustrates an example of sequence of events 4500 in an incident, as an example that will be explained further with respect to FIGS. 45B-45D. In the example of FIG. 45A, the illustrated events 4512, 4514, 4516, 4518 can have been captured in a high-interaction network. Event D 4518 was found to be malicious. For example, Event D 4518 may have included encrypting files, exporting data to a site on the Internet, or corrupting a file system, among other things. Using a tool such at a threat analysis and correlation engine, it can be determined that Event D 4518 was caused by Event C 4516. Event C 4516, in turn was caused by Event B 4514, which itself was caused by Event A 4512. Events A 4512, B 4514, and C 4516 may not, by themselves, have been malicious, but in this example the threat analysis engine has determined that one led to another and eventually led to Event D 4518.

In various implementations, by examining the relationship between the events in sequence 4500, including the processes that caused these events, a tool such as the threat analysis engine can determine whether the sequence 4500 was driven by an automated source or by a manual source. FIGS. 45B-45D illustrated examples of different ways in which the events 4512, 4514 4516 4518 illustrated in FIG. 45A could be related. As illustrated by FIGS. 45B-45D, the relationship between the events 4512, 4514, 4516, 4518 may be direct, may be indirect, or the events may not be directly related. By examining a degree of relationship between Events A 4512, B 4514, C 4516 and malicious Event D 4518, it may be possible to identify a source behind the threat.

Figure 45B:
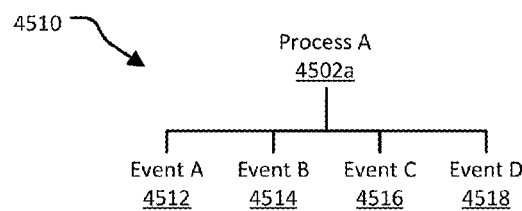
FIGS. 45B-45D illustrated examples of different ways in which the events illustrated in FIG. 45A could be related.

FIG. 45B illustrates a first possible relationship 4510 between the events 4512, 4514, 4516, 4518. In this example, each of the events 4512, 4514, 4516, 4518 was launched by the same process, Process A 4502a. All of the events 4512, 4514, 4516, 4518 are thus related to the same process, and can be said to have a degree of relationship of one. This small degree of relationship indicates that the sequence of events 4500 was most likely caused by an automated source.

Figure 45C:
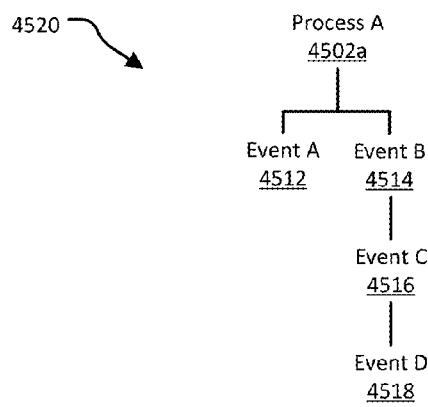

FIG. 45C illustrates a second possible relationship 4520 between the events 4512, 4514, 4516, 4518. In this example, one process, Process A 4502a, caused Event A 4512 and Event B 4514. Event B 4514 subsequently caused Event C 4516, which then caused Event D 4518. In this example, the events 4512, 4514, 4516, 4518 are also related to the same process, though in this case Event D 4518 has varying degrees of relationship with the other events. In this example, it may not be clear whether the sequence of events 4500 was caused by an automated or a manual source.

Figure 45D:
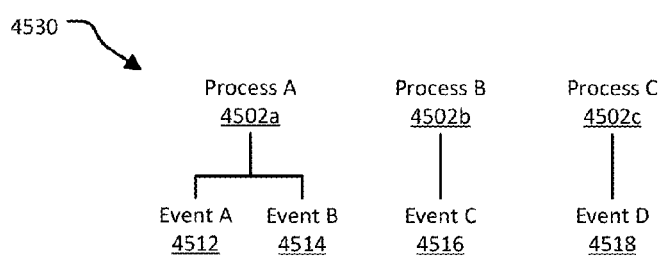

FIG. 45D illustrates a third possible relationship 4530 between the 4512, 4514, 4516, 4518. In this example, Process A 4502*a* caused Events A 4512 and B 4514, Process B 4502*b* caused Event C 4516, while Process C 4502*c* caused Event D 4518. In this example, the events 4512, 4514, 4516, 4518 have no direct relationship with each other, other than having occurred in the same incident. Thus in this example, it is most likely that the threat source was a manual source.

XI. Identifying Malicious Email

Figure 46:
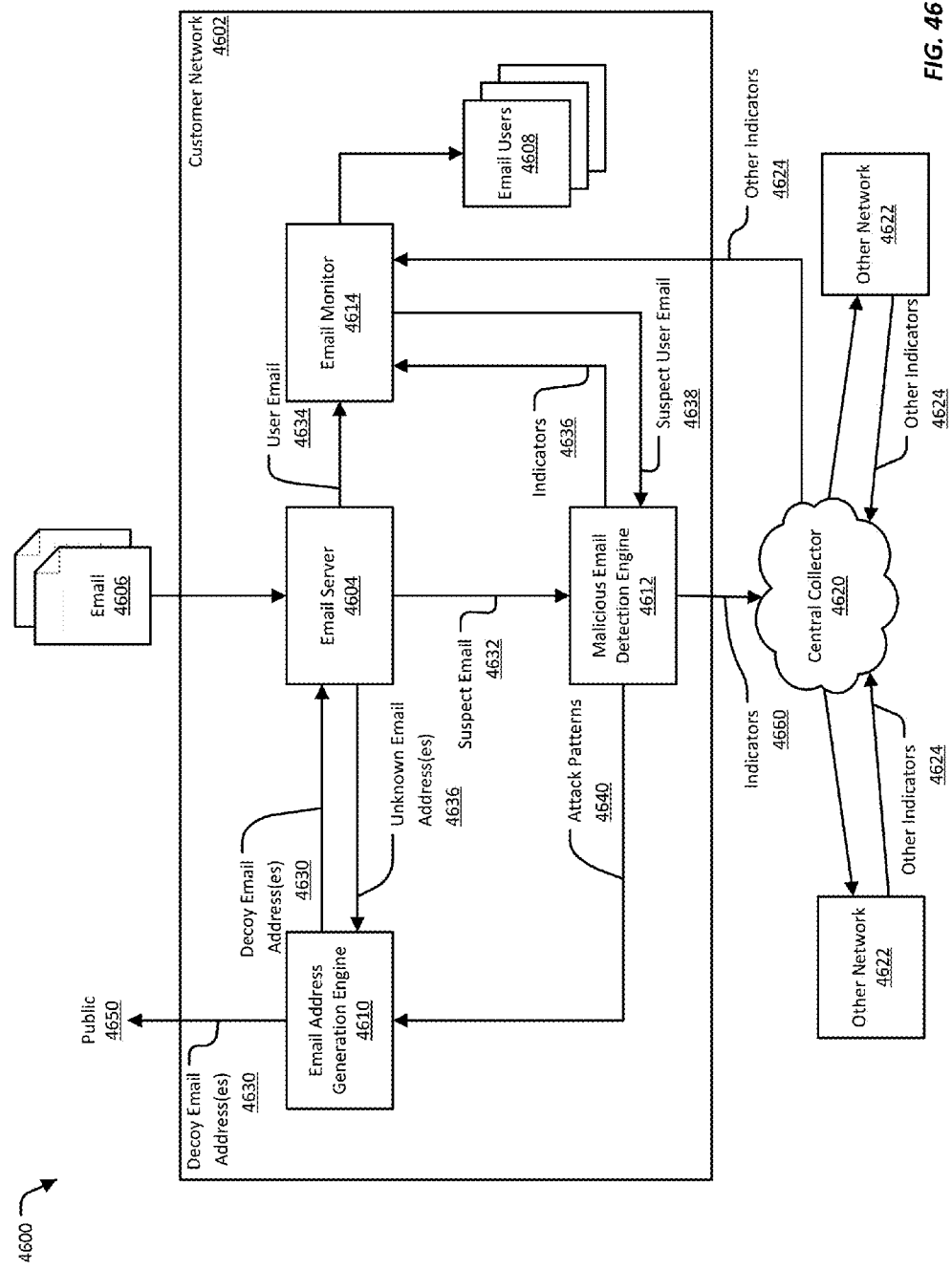
FIG. 46 illustrates an example of a system for identifying malicious email.

FIG. 46 illustrates an example of a system 4600 for identifying malicious email. The system 4600 includes a customer network 4602 that has some number of email users 4608. The customer network 4602 may include an email server 4604 for managing transmission and receipt of email for the email users 4608. The system 4600 may also include an email address generation engine 4610, a malicious email detection engine 4612, and an email monitor 4614. Though illustrated as separate units, the email address generation engine 4610 and the malicious email detection engine 4612 may be combined into a single unit. This single unit may also include the email monitor 4614. Alternatively or additionally, the email monitor 4614 may be a third party email monitor that provides an application program interface (API). One or more of the email address generation engine 4610, the malicious email detection engine 4612, and the email monitor 4614 may be provided as hardware appliances that can be connected to the customer network 4602. Alternatively or additionally, one or more of these three components may be a software program that can be installed on the customer network 4602. Alternatively or additionally, one or more of the three components can be a combination of hardware and software. Alternatively or additionally, the services provided by the email address generation engine 4610, the malicious email detection engine 4612, and/or the email monitor 4614 may be provided by a cloud service provider.

The email address generation engine 4610, the malicious email detection engine 4612, and the email monitor 4614 are configured to interact with the customer network's 4602 email server 4604. The email server 4604, also called a mail server, manages the email for the custom network's 4602 email users 4608. The email server 4604 can be a physical device within the customer network 4602, or can be a process running on a computer within the customer network 4602. Typically, the email users 4608 compose emails on their own computer or device. Once sent, the email is transmitted from the email users' 4608 devices to the email server 4604, usually using the simple mail transfer protocol (SMTP). The email server 4604 then transmits the email either to other email users 4608 in the customer network 4602, or out of the customer network 4602 to email users elsewhere. Similar to other network traffic, an email may hop from node to node in a network until it reaches its destination. When receiving an email, the email server 4604 may determine whether the email is addressed to valid email address, and if so, delivers the email to the email user's 4608 mailbox, or sometimes directly to the email user's 4608 computer or device.

In some implementations, the email server 4604 may not be part of the customer network 4602, and may instead by hosted by another network. For example, the customer network 4602 may use an email service provider, such as Gmail®, Hotmail®, or Yahoo!®, or may use an email service provided by its Internet service provider (ISP). The email service provider may itself have one or more email servers that provide email services for one or more customer networks. In these implementations, the customer network's email users 4608 may read and compose emails through a website. In some cases, the email is delivered to the customer network 4602, where it may be received by an email service or process instead of an email server. This service or process may communicate with the email service provider, and manage transmission and receipt of email for the customer network's 4602 email users 4608. This service or process may house local mailboxes for the email users 4608, and/or may deliver email directly to email users' 4608 computers or devices.

The email server 4604 is typically configured with email accounts for each of the email users 4608. An email account typically consists of an email address and some storage space for emails. An email address identifies an individual email user, who is a sender and/or receiver of email. An email address typically consist of a username, followed by an "@" symbol, followed by a domain name (e.g., "John.Doe@receiverdomain.com"), where the domain name is the name of a network from which the email user is sending and receiving email. An email user 4608 can be an individual person, a group of people, or an entity, among others. An email address can also be an email alias, which is an email address that points to one or more other email accounts. Email sent to an email alias is usually forwarded to the accounts that are pointed to by the email alias.

As noted above, malicious email may have identifiable characteristics, and so by examining email 4606 received by the customer network 4602 it may be possible to identify suspect email. As also noted, however, it may be difficult to examine each email received by all of the customer network's 4602 email users 4608.

The system 4600 may reduce the amount of email examined for potential danger to the customer network 4602, and may also improve the identification of malicious email. To do so, the email address generation engine 4610 may configure one or more decoy email addresses 4630. These decoy email addresses 4630 are configured with the malicious email detection engine 4612 as the email user. That is, all email sent to the decoy email addresses 4630 will be received by the malicious email detection engine 4612, rather than by any legitimate email user 4608. As explained in further detail below with respect to FIG. 47, decoy email addresses 4630 can be created and removed from the customer network 4602 as needed. Decoy email addresses may also be called "honey email addresses" or "honey email IDs" (identifiers).

Returning to FIG. 46, the usernames for the decoy email addresses 4630 are typically generated to resemble legitimate email addresses that may be used by the customer network 4602. For example, the username can be based on a common name or pattern. For example, the customer network 4602 may commonly use the names of mountains for usernames, hence the email address generation engine 4610 may produce decoy email addresses 4630 such as "denali@receiverdomain.com," "shasta@receiverdomain.com," and "k2@receiverdomain.com." Alternatively or additionally, the decoy usernames may be based on the names of past or present email users 4608. For example, the customer network 4602 may have or had an email user named John Doe, and the email address generation engine 4610 may produce decoy email addresses 4630 such as "jdoe@receiverdomain.com," "johndoe@receiverdomain.com," and "jdoe46981@recieverdomain.com." The decoy email addresses' 4630 domain name is typically one that is used by the customer network 4602, so that the decoy email addresses 4630 further resemble actual email addresses that may be used by the customer network 4602.

In some implementations, the usernames for the decoy email addresses 4630 may also be generated based heuristic, probabilistic, and/or machine learning algorithms. These algorithms may examine past patterns of attack 4640 on email, and generate decoy email addresses that are likely to be attacked. The malicious email detection engine 4612 may provide attack patterns 4640 to the email address generation engine 4610. These attack patterns 4640 may, for example, identify email addresses that are frequently targeted, the format of email addresses that are often attacked, statistical information about email addresses that have been targeted, and/or the nature of attacks on particular email addresses, among other things. In various implementations, the malicious email detection engine 4612, or components of the malicious email detection engine 4612, can be part of a threat analysis and correlation platform, described above.

Alternatively or additionally, the email server 4604 may receive email addressed to email addresses that do not exist for the customer network 4602. That is, the email may be addressed to neither any of the email users 4608, nor to any of the decoy email addresses 4630. The email server 4604 may send these unknown email addresses 4636 to the email address generation engine 4610. The email address generation engine 4610 may then generate decoy email addresses 4630 based on these unknown email addresses 4636. For example, the email address generation engine 4610 may use the username of an unknown email address 4636 as the username of a decoy email address 4630. Alternatively or additionally, the email address generation engine 4610 may compare the username of the unknown email address 4636 against the usernames of the actual email users 4608. When the unknown username is a marginal or acceptable derivation of an email users' 4608 username, then the email address generation engine 4610 may create a decoy email address using the unknown user name.

The decoy email addresses 4630 are meant to attract the attention of malicious actors. The decoy email addresses 4630 are thus made publicly available. By releasing the decoy email addresses 4630 to the public 4650, the system 4600 attempts to place the decoy email addresses 4630 into the hands of hackers and other bad actors. The decoy email addresses 4630 may be made public by, for example, by placing them on websites in plain text. Email harvesting tools such as "scrapers" search websites—whose underlying structure can be in formatted but human-readable text—for email addresses, which can be identified by their standard format. Alternatively or additionally, the decoy email addresses 4630 can be provided to services that sell or trade email addresses to advertises, a path through which email addresses are often found by malicious actors. Alternatively or additionally, the decoy email addresses 4630 can be provided to services that acquire email addresses by gaining access to a user's contacts list (e.g., "find your friends on our service" type tools). The decoy email addresses 4630 may be made public by the email address generation engine 4610, or by some other device or process in the customer network 4602.

In addition to releasing the decoy email addresses to 4630 to the public 4650, in various implementations, the decoy email addresses 4630 can also be placed in the address books or contacts lists of the email users 4608. In these implementations, when email users' 4608 address books are stolen or exploited, the decoy email addresses 4630 can be publicized along with legitimate email addresses. For example, certain spoofing attacks cause suspect email to be sent to all of the email addresses in an email user's 4608 address book. For example, a user may innocently or unwittingly click a malicious link or open a malicious attachment. In these examples, the suspect email will also be sent to the decoy email addresses 4630 and be captured for analysis.

Alternatively or additionally, in various implementations, the decoy email addresses 4630 can also be provided to the customer network's 4602 security operations team. In these implementations, the security operations team can use the decoy email addresses 4630 to analyze suspect email received at legitimate email addresses. Specifically, the security operation team can forward such suspect email to a decoy email address 4630. Once received at a decoy email address 4630, the suspect email can be analyzed, as discussed further below.

In some implementations, suspect email received for legitimate email addresses can be captured by spam or email or some other network security filters. In these implementations, the spam or email filter can be configured to automatically forward the suspect email to a decoy email address 4630. The suspect email will then be analyzed, as discussed below.

Once released to the public 4650, it is likely that email 4606 addressed to the decoy email addresses 4630 will begin to be received by the customer network 4602. This email 4606 is likely to be mixed with legitimate email that is addressed to the customer network's 4602 email users 4608. The email server 4604 may send the user email 4634 to the email monitor 4614, which is discussed below, for receipt by the email users 4608.

All email 4606 addressed to the decoy email addresses 4630 may be suspect. This is because the decoy email addresses 4630 are not associated with an actual email user, and because they have been released to the public 4650 with the intent that they be acquired by malicious actors. Thus the system 4600 labels all email 4606 that is addressed to the decoy email addresses 4630 is as suspect. Suspect email 4632 can also include email sent to email addresses that do not exist at the customer network 4602. One method used by email attackers to learn about a network is to send a stream of emails, each with a different username, in an attempt to find an email address that exists at the network. The email servers are typically configured to return, or "bounce," emails addressed to unknown email addresses back to the sender. The attacker thus can learn from the bounced emails which email addresses are legitimate and which are not. In the illustrated example system 4600, the email server 4604 may be configured to forward email sent to unknown email addresses to the malicious email detection engine 4612 as suspect email 4632. Suspect email 4632, including both email addressed to the decoy email addresses 4630 and to non-existent email addresses, may also be referred to as non-legitimate email (NLE).

The malicious email detection engine 4612 examines suspect email 4632 and attempts to confirm whether the suspect email 4632 is actually malicious. As discussed further below, a malicious email is one that may cause harm to a computer or a network, or may exploit vulnerabilities in software installed on a computer, or vulnerabilities in a network, including providing unauthorized individuals access to the computer or network. For example, a malicious email may include an attachment or link that can cause harm to a network. As another example, contents of a malicious email may exploit vulnerabilities in software installed on a computer in the network, or vulnerabilities in the network itself. Some email addressed to the decoy email addresses 4630 may be undesirable, such as unsolicited email advertising, but may alone not cause any harm. Even email that is, by itself, harmless may be malicious. For example, flooding the email server 4604 with email advertising may cause the email server 4604 to slow to a crawl or even crash. The malicious email detection engine 4612 may be able to confirm that this, or some other malicious activity, is caused by the suspect email 4632. The operation of the malicious email detection engine 4612 is discussed further with respect to FIG. 47.

Returning to FIG. 46, upon determining that a suspect email 4632 is malicious—and, in some cases, that a suspect email 4632 is not malicious—the malicious email detection engine 4612 may generate indicators 4660 that identify the malicious email. One or more indicators 4660 can be used to describe a specific email identified as malicious, a group of emails identified as malicious, or a class or type of email identified as malicious. The malicious email detection engine 4612 may produce the indicators 4660 in a standardized format, such as for example in Extensible Markup Language (XML), in a proprietary format, or in a combined standard and proprietary format. In some implementations, the indicators 4660 may be encrypted. The indicators 4660 may also be called "non-legitimate email indicators" (NLE indicators) or "non-legitimate email static indicators (NLE static indicators). The contents of the indicators are described in further detail below.

The malicious email detection engine 4612 may provide the indicators 4660 for both malicious and non-malicious email to the email monitor 4614. Using indicators 4660 for email identified as malicious, the email monitor 4614 can scan user email 4634 to attempt to find malicious email among the email user's 4608 normal email. For example, the malicious email detection engine 4612 may have identified an email from a sender address "abcd4623@foo.com" as including a virus as an attachment. The malicious email detection engine 4612 may then send an indicator 4660 to the email monitor 4614 that informs the email monitor 4614 that email from "abcd4623@foo.com" with that particular attachment is malicious. The email monitor 4614 may subsequently scan incoming user email 4634 for any that is sent from "abcd4623@foo.com." The email monitor 4614 may send any such email back to the malicious email detection engine 4612 for possible confirmation that this email is also malicious. The email monitor 4614 may also add information to a logfile to track incidents of such email. The email monitor 4614 may also notify the customer network's 4602 system administrator and/or the intended recipient email user 4608.

As noted above, a set of indicators 4660 may be associated with one email, a group of emails, and/or a class or type of emails. In some implementations, when a user email 4634 matches at least one indicator from a set of indicators 4660, the user email 4634 may be deemed suspect. In some implementations, when a user email 4634 matches all or most of a set of indicators 4660, the user email 4634 may be treated as definitely malicious. The email monitor 4614 may be configured with thresholds or a sliding scale that determines how closely an email should match a set of indicators 4660 before the email is deemed possibly malicious or definitely malicious. Upon identifying user email 4634 that possibly or definitely malicious, the email monitor 4614 may notify a system administrator and/or the email user 4608 to whom the malicious email was addressed.

In some implementations, the email monitor 4614 may also examine user email 4634 that was received in the past, and check whether any of this older user email 4634 was matches the indicators 4660. User email 4634 often remains in a user's mailbox until the user takes some action, such as deleting or moving the email. In some implementations, email is also archived, that is, moved to a repository on a storage disk. Both email stored in a user's mailbox and in an archive can be considered email received in the past. Should the email monitor 4614 determine any past user email 4634 matches the indicators 4660, the email monitor 4614 may notify a system administrator and/or the email user 4608.

For email that is at least suspect, the email monitor 4614 may send this suspect user email 4638 back to the malicious email detection engine 4612. Email may be suspect if it at least partially matches a set of indicators 4660, or if it has others suspect characteristics. The malicious email detection engine 4612 may then attempt to confirm that the suspect user email 4638 was malicious. The malicious email detection engine 4612 may use the result to generate new indicators 4660, and/or to inform a system administrator or email user 4608 that the email user 4608 has received email that is likely malicious.

In some implementations, the malicious email detection engine 4612 may also send the email monitor 4614 indicators 4660 that identify non-malicious email. In these implementations, the email monitor 4614 can use these indicators 4660 to validate user email 4634 that otherwise appears suspect. In some implementations, the email monitor 4614 can be configured to forward this validated user email 4634 to the email users 4608.

In some implementations, the malicious email detection engine 4612 may also send the malicious email indicators 4660 to a central collector 4620. The central collector 4620, which is typically located outside of the customer network 4602, may function as a central database and distribution point for information about malicious email. The central collector 4620 may also collect other indicators 4624 from other networks 4622. The central collector 4620 may the other indicators 4624 from the other networks 4622 to the customer network 4602, and conversely provide the customer network's indicators to the other networks 4622. For example, the central collector 4620 may provide the other indicators 4624 collected from the other networks 4622 to the email monitor 4614 in the customer network 4602. The email monitor 4614 may then add these other indicators 4624 to the indicators it uses to scan user email 4634. The central collector 4620 may send the other indicators 4624 to the customer network 4602 (a "push" data model), or the customer network 4602 may periodically request the other indicators from the central collector 4620 (a "pull" data model). The customer network 4602 may obtain new data from the central collector 4620 as frequently as every few hours or once or twice a day.

Figure 47:
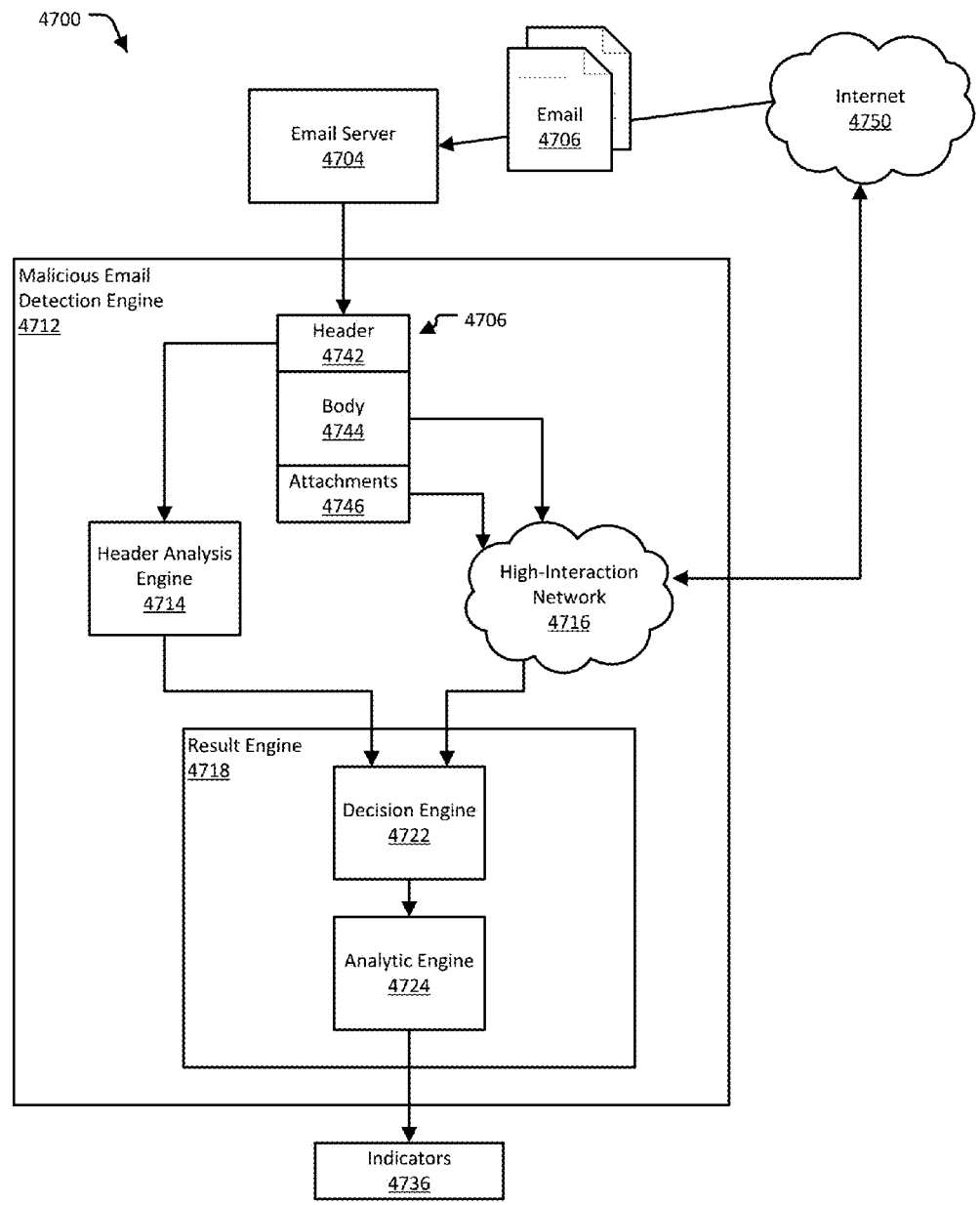
FIG. 47 illustrates in greater detail the operation of a malicious email detection engine in a system for identifying emails as malicious.

FIG. 47 illustrates in greater detail the operation of a malicious email detection engine 4712 in a system 4700 for identifying emails as malicious. The system 4700 may receive email 4706 from the Internet 4750, or some other outside source. As discussed above, at least some of this email 4706 may be addressed to decoy email addresses, configured on a customer network's local email server 4704. Because these decoy email addresses were made public, and thus easily acquired by malicious actors, email 4706 addressed to the decoy email addresses is generally suspect. The email server 4704 may be configured to forward all email addressed to the decoy email addresses to the malicious email detection engine 4712.

An email 4706 generally consists of a header 4742 and a body 4744. Sometimes the email 4706 may also have attachments 4746. The body 4744 and attachments 4746 may be collectively referred to herein as the email's contents. The header 4742 provides information about the email, such as who the email was from and to whom the email is addressed. FIG. 49 provides an example of the contents of an email header. Returning to FIG. 47, the body 4744 of the email contains the message being conveyed by the email 4706. The message may include plain text, rich text (text with formatting, such as fonts and colors), formatted text (such as Hypertext Markup Language (HTML)), embedded images, embedded links to files or websites, or a combination of text, images, and links. Attachments 4746 are files attached to an email 4706 that are not embedded in to the email body 4744. Examples of attachments 4746 include images, documents, and programs, among others.

The malicious email detection engine 4712 may use a header analysis engine 4714 to examine an email header 4742. The malicious email detection engine 4712 may further use a high-interaction network 4716 to analyze the email body 4744 and attachments 4746, if any are present.

The header analysis engine 4714 may examine the header 4742 to look for characteristics that may identify the email 4706 as malicious. Analysis of the header 4742 may involve parsing the header's 4742 fields and searching for matching information in a database. Analysis of the header 4742 may also involve applying heuristic, probabilistic, and or data science algorithms to the information provided by the header 4742, for example when no clear result can be obtained from searching the database. Analysis of the header 4742 may further involve investigating the information provided by the header 4742, such as for example following the apparent path taken by email in traversing the Internet 4750 to reach the system 4700. The header analysis engine 4714 may, in some implementations, by assisted by the high-interaction network 4716 when engaging in this type of investigation. Further examples of analysis that can be conducted on the header 4742 are described with respect to FIG. 49.

The high-interaction network 4716 of FIG. 47 is a self-contained, closely monitored network that can be quickly repaired, brought up or taken down. The high-interaction network 4716 is not a part of customer network's own network, and exists within a physically and/or virtually isolated, contained space. The high-interaction network 4716, however, appears and behaves just as does a real network, including having a connection to the Internet 4750. The high-interaction network 4716 may consist of physical routers, switches, and servers. Alternatively or additionally, the high-interaction network 4716 may consist of a fully emulated network residing on one or more servers. Alternatively or additionally, the high-interaction network 4716 may consist of a combination of physical devices and emulated devices. In some implementations, the high-interaction network 4716 may reside at a cloud service provider, with use of the high-interaction network 4716 provided by the cloud service provider. In some implementations, the high-interaction network 4716 is configured to mirror a customer network's own network. In some implementations, the email server 4704 that hosts the decoy email addresses may also be inside the high-interaction network 4716.

The high-interaction network 4716 provides a controlled space to "detonate" the contents of a suspect email 4706. To "detonate" an email means to interact with the email and see what, if anything, the email may do. For example, an automated process within the high-interaction network 4716 may open the email 4706, download images embedded in the body 4744, follow links in the message body 4744, download and/or open attachments 4746, and so on. The automated process may further interact with any tool or process that is launched by the email 4706. Because the high-interaction network 4716 is self-contained, any malicious activity caused by the email does not affect the customer network. The activity can also be closely monitored and be used to identify a specific malicious email.

Detonation of the email may cause harm or some undesirable affect to the email account that the email was addressed to. For example, following links in an email may cause the recipient email address to be "phished" or acquired by spoofing tool. As another example, following an "unsubscribe" link in a non-malicious email may cause the recipient email address to be unsubscribed from a valid service. The recipient email address is a decoy address, however, and decoy email addresses can be removed, added, and re-released to the public as needed.

The high-interaction network 4716 also provides an environment that can capture lateral movement triggered by releasing the contents of the email 4706. Lateral movement occurs when a malicious program or an unauthorized actor (who has gained access to the high-interaction network 4716 by way of the email 4706) attempts to infiltrate and/or infect other computers in a network. For example, an unauthorized used may infiltrate a customer network through the computer of a user that inadvertently detonated a malicious email. The intruder can then use the user's computer as a base of operations or as a source for inside information. Having gained access to the user's computer, and possibly having acquired information about other computers n the customer network, the intruder may then attempt to access more secure systems within the customer network, either to steal information or to release malware. By resembling and behaving as a real network, the high-interaction network 4716 is able to capture this lateral movement, as well as how this lateral movement was accomplished and what the aim of the lateral movement was. This information can strongly confirm that an email was malicious. In some implementations, the high-interaction network 4716 may be configured with lower security barriers to make lateral movement easier and/or more tempting.

An alternate method for determining what harm a suspect email may do is to launch a virtual machine, and to detonate the email within the virtual machine. A virtual machine, however, may not be able to interact with an email as would a computer attached to what appears to be a real network. For example, lateral movement triggered by the email may not be captured by a virtual machine running in isolation.

The malicious email detection engine 4712 of FIG. 47 provides the results of the header analysis engine 4714 and the high-interaction network 4716 to a result engine 4718. The result engine may include a decision engine 4722 and an analytic engine 4724. The decision engine 4722 may put together the analysis of the header 4742, provided by the header analysis engine, with the outcome of detonating the email 4706 in the high-interaction network 4716 and any lateral movement seen within the high-interaction network 4716. The decision engine 4722 may put these pieces of information together in case any one piece of information, by itself, does not find that the email 4706 was malicious. The decision engine 4722 may apply heuristic, probabilistic, and/or machine learning algorithms and/or rules to determine a status for the email 4706. The email's 4706 status may be either definitely malicious, probably malicious, or not a threat. An email 4706 may be definitely malicious when, for example, it included an attachment that was a virus, or included links that resulted in phishing. An email 4706 may be probably malicious when, for example, the header had all the hallmarks of a malicious email but the contents did not cause any direct harm. An email may be not a threat when, for example, it contained only text, and no attachments or links. These are just a few examples of how an email may fall under one of the possible statuses.

The status determined by the decision engine 4722 may be provided to the analytic engine 4724. The analytic engine 4724 may generate indicators 4736 that identify the email 4706. The indicators 4736 may include, for example, values from the email header 4742 such as values indicating the source of the email 4706 and/or a distinct or unique subject string. The indicators 4736 can also include "indicators of compromise" (IOCs). Indicators of compromise are a set of data that describes identified malicious activity. Indicators of compromise can be used to describe virus signatures, Internet Protocol (IP) addresses associated with suspicious activity, Message Data algorithm 5 (MD5) hashes of malware files, or Uniform Resource Locations (URLs) or domain names of botnet command and control servers. Indicators of compromise can be used by intrusion detection systems and anti-virus software to detect attacks on a network. Indicators of compromise may be formatted for both human and machine readers, such as for example using XML.

The analytic engine 4724 can also use the information provided by the header analysis engine 4714 and the high-interaction network 4716 to attempt to identify computers or networks inside the customer network that have been compromised. For example, malware sent as an attachment may make modifications to a computer (e.g., removing or renaming files) on which it was downloaded, to expose the computer to further attack. In this example, the analytic engine 4724 can generate indicators that describe the modifications that the malware. The malicious email detection engine 4712 can send these indicators to the customer network's system administrator and/or to an automated system, either of which can attempt to find computers in the customer network that have the same modifications. Computers in the customer network that match the indicators may have had infected with the same malware.

As another example, a suspect email 4706 may include an attachment that, when opened, launches a malicious process on a computer. The malicious process may attempt to log into a firewall within the high-interaction network 4716, and having logged into the firewall, may open ports or disable the firewall. The analytic engine 4724 can generate indicators that describe this lateral movement from the computer to the firewall. A system administrator or an automated process can subsequently check whether any firewalls in the customer's real network have been infiltrated in a similar manner.

These are just a few examples of different kinds of attacks, and how the actions undertaken by those attacks can be used to determine whether a customer network has already been attacked. The malicious email detection engine 4712 thus provides a way to identify systems in a costumer network that have already been compromised, in addition to attempting to prevent malicious email from infiltrating the customer network in the first place.

Figure 48:
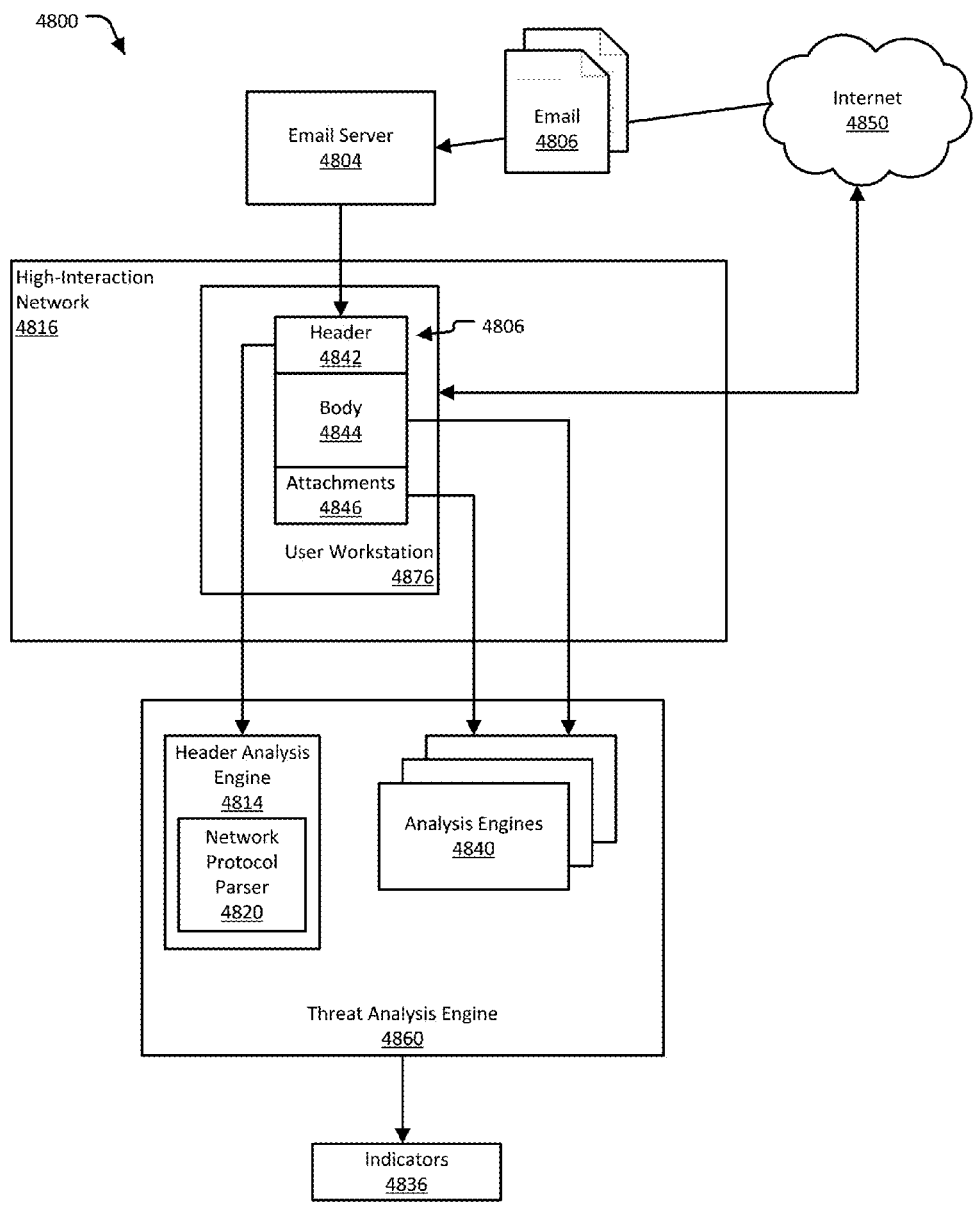
FIG. 48 illustrates an alternate implementation, in which suspect email can be analyzed using a threat analysis engine.

FIG. 48 illustrates an alternate implementation, in which suspect email 4806 can be analyzed using a threat analysis engine 4860. As discussed above, the threat analysis engine 4860, also referred to herein as a threat analysis and correlation engine, can include various analysis engines 4840 that can be used to analyze the body 4844 of an email 4806 and/or attachments 4846 received with the email 4806. Examples of various analysis engines are provided in FIGS. 20-23. The threat analysis engine 4860, as illustrated in FIG. 48, can also include a header analysis engine 4814 for analyzing the header 4842 of an email 4806.

In various implementations, the threat analysis engine 4860 can be included in a system 4800 for identifying malicious emails. The system 4800 may receive email 4806 from the Internet 4850, or some other outside source. As discussed above, at least some of this email 4806 may be addressed to decoy email addresses, configured on a customer network's local email server 4804. The email server 4804 may be configured to forward all email addressed to the decoy email addresses to a high-interaction network 4816.

As discussed above, the high-interaction network 4816 can be configured to emulate systems that can be found in a site network. In the illustrated example, the high-interaction network 4816 has been configured with at least one user workstation 4876. The user workstation 4876 can be configured to receive a suspect email 4806. The user workstation 4876 can also include automated tools that can interact with the suspect email 4806, including opening the suspect email 4806, opening any attachments 4846 included in the suspect email 4806, following links included in the body 4844 of the email 4806, downloading images included in the body 4844 of the email 4806, or otherwise interacting with the contents of the suspect email 4806. The results of interacting with the contents of the email 4806 can be captures, for example, in log files, and memory snapshots. In various implementations, the contents of the suspect email 4806, and/or any results from interacting with the contents, can be sent to an appropriate analysis engine 4840.

The high-interaction network 4816 can provide a contained and monitored environment in which to "detonate" a suspect email 4806. "Detonating" an email means interacting with the contents of the email to determine if the contents are malicious. Detonating an email can be accomplished, for example, by interacting with the suspect email in the same way as would a human recipient. For example, an automated process can manipulate the email as would a human user. Non-malicious email should do nothing unexpected or undesirable when interacted with, or may contain innocent attachments, images, or links. Interacting with malicious email, however, may trigger a number of undesirable actions, such as for example the receiving email address being captured by a spammer to malware being released.

Some activity may be triggered upon opening and interacting with the body 4844 of an email 4806. In some cases, the body 4844 may contain only plaint text, which may be innocent. The text, however, may include a script, and in some cases it may be desirable to see what the script does. An automated process may thus attempt to launch the script. In other cases, the email body 4844 may include embedded images and links. In many cases, email tools can be configured so that embedded images are not automatically downloaded, and an affirmative act by a user is required for the images to be downloaded. Hence, downloading the images in a suspect email 4806 may indicate to an outside entity that the email address that is loading the images is actively in use. The email address may be used for future attacks or spoofing attempts.

Embedded links in the email body 4844 may link to files or websites located on the Internet 4850. In many cases, a link may simply send a user to a website for purposes of advertising, or may cause a user to be unsubscribed from a mailing list. In other cases, particularly when a link is to a file, the link may cause malicious activity. An automated process in the high-interaction network 4816 may "click" on links to see what the links do. Links may cause one or more files to be downloaded from the Internet 4850 and onto the user workstation 4876. Some links may appear innocent: for example a link may send a user to a seemingly legitimate website, but at the same time also cause a file to be downloaded onto the user's computer. Alternatively or additionally, some links may redirect a user from one site to another and eventually to a site designed to steal information or download files onto a user's computer.

A file downloaded as a result of a link in the email body 4844 or included as an attachment 4846 can be a malicious program or hacking tool, such as a virus, a Trojan horse, a worm, a key logger, a screen shot capture tool, a password cracking tool, or some other type of malware or snooping tool that is able to exploit a vulnerability in a computer's operating system and/or software running on the computer. Once downloaded onto the user workstation 4876, the malicious tool can cause all sorts of bad activity. For example, the malicious tool may upload files from user workstation 4876 to the Internet 4850. Alternatively or additionally, the malicious tool may find security holes (possibly left intentionally) in the high-interaction network 4816, and may exploit these security holes to infect other user workstations. Alternatively or additionally, the malicious tool may change the registry of a user workstation 4876, or install back doors, download malware, and/or disable security settings at any of the user workstation 4876 or some other network system emulated in the high-interaction network 4816.

Some malicious tools may be more insidious, and their malicious effect may be evident only after some time. For example, the malicious tool may be malware worm that is configured to locate a user's contacts list, and to upload the contacts list to the Internet 4850. The email addresses in the contacts list may subsequently be used for spoofing attacks and other future attack attempts. As another example, the malicious tool may be a key logger. A key logger captures a user's key strokes, and in this way may be able to steal a user's login credentials. The key logger may also be able to learn about other systems in the high-interaction network 4816. A hacker may subsequently use the user's stolen credentials to log into the user workstation 4876. From there, the hacker may attempt to infiltrate other systems identified by the information observed by the key logger. For example, the hacker may attempt access the file servers, compute servers, or subnets emulated in the high-interaction network 4816. These accesses are particularly interesting if they exceed the authority allowed to the user whose credentials the hacker used to infiltrate the system.

Accesses originating from the user workstation 4876 and connecting to other emulated systems may be called lateral movement. Lateral movement is a strong indicator of malicious activity. The pattern of lateral movement may also be interesting for understanding the scope and nature of an attack. Hence, the infiltration may be allowed to continue for some time, in order to learn as much as possible about the attacker.

Returning to detonation of the email, another way to interact with the email 4806 is to examine any attachments 4846. Unlike embedded links, attachments 4846 travel with the email 4806 itself. In most cases, an attachment stays in an email user's mailbox until the email user "opens" the attachment, which typically causes the attachment to be downloaded to the user's computer. An attached file may be a document, an image, an audio file, a video file, or a program, among others. Examples of files often transmitted over email include Microsoft® Office® documents (e.g., those generated by Word, Excel®, Powerpoint®, and others), Portable Document Format (PDF) documents, Joint Photographic Experts Group (JPEG) image files, Graphic Interchange Format (GIF) mage files, Moving Pictures Experts Group (MPEG) audio and video files, and Windows wave audio and video files, among others. Attachments are sometimes also compressed versions of a file, compressed using for example the ZIP, Gnu ZIP (gzip), Java Archive (JAR), or tape archive (TAR) format, among others. The type of an attached file is often indicated by the file's extension (e.g., ".doc," ".xls," ".ppt," ".pdf," ".jpg," ".gif" ".mp3", ".wav," ".zip," etc.).

The name of an attached file, including its extension, may not, however, be a truthful indication of the contents the file because the name of a file is easily changed. For example, an attached file named "cutecatvideo.wav" may, in fact, be malware. Attached files are thus another method for delivering malicious tools to a user's computer. As discussed above, inadvertently downloading a malicious attachment may release a malicious tool on the user workstation 4876. The malicious tool may, for example, attempt to change the settings of the user workstation 4876 to remove security settings or change permissions and lock out administrators.

In various implementations, the high-interaction network 4816 can alternatively or additionally be configure to reply to an email 4806. One way that phishing schemes work is to solicit replies, where the reply emails then provide a malicious actor with information, such as is found in the email header.

Detonating an analyzing an email 4806 in the high-interaction network 4816 may in some cases confirm the malicious status of an email very quickly, such as when the email launches a virus. Other times, such as in the key logger example, it may take some time before the high-interaction network 4816 can confirm that an email can cause malicious activity. The high-interaction network 4816, however, provides an environment in which malicious activity can be allowed to continue as long as necessary to confirm that an email was malicious.

In various implementations, the header 4842 part of a suspect email 4806 can be send to a header analysis engine 4814 of the threat analysis engine. The header analysis engine 4814 can include a network protocol parser 4820. In various implementations, the network protocol parser 4820 is a network traffic analyzer, capable of inspecting network traffic, including email headers, for suspicious activity. One example of a network protocol parser is the Bro Network Security Monitor.

In various implementations, the threat analysis engine 4860 can examine the output of the header analysis engine 4814 and any analysis engines 4840 used to analyze the contents of the email body 4844 and/or email attachments 4846, and use this output to determine whether the email 4806 was malicious. For example, the threat analysis engine 4860 can use correlation techniques, such as are discussed above. The threat analysis engine 4860 can output indicators 4836, also referred to as indicators of compromise, which describe the email 4806. The indicators 4836 can subsequently be used to identify and block email that is similar to the suspect email 4806, that is, has similar header 4842 contents, similar body 4844 contents, or similar attachments 4846.

As discussed above, an email's header may show tell-tale signs that the email is malicious. FIG. 49 illustrates an example of the format and content of an email header 4900. Email headers are typically formatted in plain text, or a combination of plain text and information encoded in plain text. Email headers typically include some number of fields 4902, where each field 4902 describes a different aspect of the email associated with the header. Typically, each field is delineated by occupying a single line. Generally, each field 4902 includes a name 4904 and a value 4906. The example header 4900 of FIG. 49 includes the following fields 4902: From, Subject, Date, To, Return-Path Envelope-To, Delivery-Date, Received, Dkim-Signature, Domainkey-Signature, Message-Id, Mime-Version, Content-Type, X-Spam-Status, X-Spam-Level, and Message Body, each of which will be briefly described below. An email header may include additional fields not illustrated here, and/or may omit some of the fields shown in this example.

Some fields of an email header are generated by the service or system from which the email was originally transmitted. Other fields may be added or modified by intermediate systems that the email passes through on its way to its destination. Any of these fields, however, can be easily modified, either when the email is first transmitted or while the email is en route, or both. Hence, these fields may not be trusted as providing truthful information. Additionally, the header fields of malicious email have been known to follow certain patterns. Hence, potentially malicious email can sometimes be identified by looking for these patterns in the header fields, as is explained in further detail below.

Some headers fields, such as the "Received" field, are generated by the system or email server that ultimately received the email. Assuming that the receiving system has not been compromised, these fields can generally be relied on to be accurate. These fields can also be used to check the veracity of less reliable fields.

Generally, the fields of an email header provide some basic information that email protocols use to forward the email to its ultimate destination. The fields also provide information about the sender of the email, as well as some information about the route taken by the email to travel from the sender to the receiver. The fields also may provide some information about the contents of the email.

The "From" field displays who the email was from. In the example email header 4900, the user who sent the email is identified by the plain text string "John Doe," and this user's email address is identified as "John.Doe@senderdomain.com." An email address generally includes two parts: a username and a domain name. The username is generally associated with an email account, which may be used by an individual, a group of people, and/or an organization. The domain name generally identifies the system from which the email originated. The originating system typically has one or more mail servers that are responsible for managing incoming and outgoing email. For example, "gmail.com" identifies the email hosting service provided by Google®, and "uspto.gov" identifies email sent from the United States Patent and Trademark Office. Google® and patent office each likely have mail servers that are responsible for accepting email addressed to "@gmail.com" and "@uspto.gov." In this example, the sender's username is "John.Doe" and the domain name is "senderdomain.com."

The value of the "From" field may indicate that an email is suspect. For example, the sender's email address may be omitted, or the field's entire value may be blank. Alternatively, the sender's email address may appear to have been automatically generated. For example, an email address composed of an apparently random string of characters, such as "dakttslvuuso@hedplmtv.com" may have been generated by an email generation program. As another example, successive emails with "From" addresses such as "mike01@xxyyzz.com," "mike02@xxyyzz.com," and "mike03@xxyyzz.com" appear to be automatically generated, and are thus all suspect.

The domain name of the sender's email address may also be used to identify the email as suspect. For example, the plain text string of the "From" field may indicate that the email was sent by Yahoo!® to inform a user of some account-related information, while the domain name of the sender's email address may be "yahooalerts.com." The domain "yahooalerts.com" is likely not be a domain used by Yahoo!®, which can be verified by asking the company or checking a domain name. Alternatively or additionally, the domain name can be verified by sending a reply email addressed to the sender's email address. Continuing with the prior example, when no mail server is configured to respond to "@yahooalerts.com," the a domain name resolution service may generate a message indicating that the domain could not be found. Alternatively, when the domain is valid but the username is not, then the reply may be "bounced" back by a mail server that is responding to "@yahooalerts.com"; that is, the mail server may generate a message indicating that the username is not known. When both the username and domain are valid, but the sender's email address is owned by a malicious actor, a reply email may receive no response at all, or may be responded to with an attack. The owners of domain names, as well as whether a domain actually exists, can be verified using various sources, such the Internet Corporation for Assigned Names and Numbers (ICANN) Whois database, or by sending queries to the domain directly.

The "Subject" field provides a string that is usually used to indicate the subject of the email. In the example header 4900, the subject is "The contents of an email header." The value of the "Subject" field can be matched against strings commonly used by malicious email. When at least a partial match is found, the email can be flagged as possibly malicious.

The "Date" field indicates the date and time that the email was composed, generally capture the time at which the author hit his email tool's "Send" button. In the example header 4900, the date is "Jan. 1, 41016, 12:00:00 PM PDT," indicating that the email was composed and sent on Jan. 1, 41016 at 12:00 PM, Pacific Daylight Time. A date value that is improbable, such as "Jan. 1, 1970" may indicate that the email is potentially malicious. While email is sometimes delayed in transmission, delays of just a few days are atypical, and may indicate a date that was deliberately modified.

The "To" field shows to whom the email was addressed. In the example header 4900, the email was sent to the address "Jane.Smith@recevierdomain.com." Frequently, a malicious email omits the "To" field entirely, thus providing at least one way to identify an email as suspect.

The "Return-Path" field usually indicates an email address for return email. That is, in replying to the email, the user's email tool will address the reply email to the address in this field. In the example header 4900, the return path is the address "John.Doe@senderdomain.com." A malicious email may have a return path address that appears to be automatically generated, or an address with a non-existent domain, or an address that is otherwise characteristic of addresses used by malicious email. Alternatively or additionally, a malicious email may have a legitimate email address, but one that has been configured to collect information from reply email sent to it. For example, a reply to the email address in the return path may be used to identify a customer network's legitimate emails, which may then be put on a list for future attacks.

The "Envelope-To" field displays the email address of the user who received the email. In the example header 4900, the "Envelope-To" indicates that the email was delivered to the mailbox for the address "Jane.Smith@receiverdomain.com."

The "Delivery-Date" field shows the date and time at which the email was received by the recipient's email tool. In the example header 4900, the delivery date is indicated as "Jan. 1, 41016, 12:05:03 –0700" where "–0700" indicates the difference between the indicated time and Greenwich Mean Time (GMT). Since this field is added by the final recipient's email system, this field can usually be relied on. A large discrepancy, however, between the delivery date or time and the value in the "Date" field may indicate that email is suspect.

The "Received" fields form a list of the servers or computers that the email passed through while in en route to the receiving system. Typically, the first "Received" field was added by the final receiving system, and the last "Received" field indicates where the email originated. Each "Received" field typically identifies a system that received the email, and the system from which the email was received. Each email system may have its own format for the value it supplies in a "Received" field. The "Received" fields can be traced to validate whether any of the intermediate systems are questionable. When any system in the list cannot be verified as a real system, or does not match the information in a corresponding "Received" field, or is already known to be compromised, then the email may be suspect.

The "Dkim-Signature" and "Domainkey-Signature" fields are examples of fields that can be used to authenticate an email. Each provides some information that can be used by a receiving email system to verify that the email is from a domain that is authorized by that domain's administrators to send email. The information provided by these fields, however, can be stolen or falsified. Alternatively or additionally, the information may indicate that the email is legitimate while the sending system was actually compromised, and is sending malicious email. The signature information thus may not be a reliable indicator of the legitimacy of an email.

The "Message-Id" field is a unique string assigned by the email system where the email system originated. This field can be easily forged, and thus may not be a reliable indicator of the validity of the email.

The "Mime-Version" field, where "MIME" stands for Multipurpose Internet Mail Extensions, indicates the MIME version used to transmit the email. MIME is an Internet standard used to transmit email content that is not text, such as non-American Standard Code for Information Interchange (ASCII) characters, and audio, video, image, and executable attachments. This field assists an email tool in reading the body of the email.

The "Content-Type" field indicates the format of the body of the email. For example, "text" indicates that the body of the mail is plain text, and "html" indicates that the body of email includes HTML-formatted text. This field also assists an email tool in reading the body of the email.

The "X-Spam-Status" and "X-Spam-Level" indicate spam scores created by the receiving email service. These scores may be helpful in identifying an email as malicious, though by themselves may not provide enough information.

The "Message Body" field contains the content of the email. As discussed above, the contents may be a combination of text, formatted text, embedded images, and/or embedded links. The message body may be examined by a header analysis tool for static characteristics associated with malicious email. The message body may also be dynamically analyzed, by detonating the email within a high-interaction network.

Specific details were given in the preceding description to provide a thorough understanding of various implementations of systems and components for network threat detection and analysis. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for network threat detection and analysis.

As used below, any reference to a series of examples is to be understood as a reference to each of those examples disjunctively (e.g., "Examples 1-4" is to be understood as "Examples 1, 2, 3, or 4").

Example 1 is a method, the method including receiving, at a network device in a network, suspect network traffic, wherein suspect network traffic includes network traffic identified as potentially causing harm to the network. The method further includes determining that the suspect network traffic is associated with an unknown threat. The method further includes analyzing the suspect network traffic using a high-interaction network, wherein the high-interaction network is configured to emulate at least a part of the network, and wherein analyzing includes determining a behavior of the suspect network traffic in the high-interaction network. The method further includes generating indicators, wherein the indicators describe the suspect network traffic, and wherein the indicators facilitate analysis of a network's susceptibility to the unknown threat.

Example 2 is the method of example 1, the method further including determining whether the network has been subjected to the unknown threat, wherein determining includes examining the network for a behavior described by the indicators.

Example 3 is the method of examples 1-2, the method further including generating a packet including the indicators, wherein the packet is addressed to a central collector. In this example, the method further includes transmitting the packet from the network.

Example 4 is the method of examples 1-3, The method further including storing the indicators, wherein determining that the suspect network traffic is associated with an unknown threat includes using the stored indicators.

Example 5 is the method of examples 1-4, the method further including receiving additional indicators, wherein determining that the suspect network traffic is associated with an unknown threat includes using the additional indicators.

Example 6 is the method of examples 1-5, wherein the high-interaction network is a configurable network including a testing device.

Example 7 is the method of examples 1-6, wherein the behavior described by the indicators includes a change made by contents of the suspect network traffic to the testing device.

Example 8 is the method of examples 1-7, wherein the behavior described by the indicators includes uploading a file from the testing device or downloading a file to the testing device.

Example 9 is the method of examples 1-8, wherein the behavior described by the indicators includes creating, deleting, modifying, copying, or moving a file on the testing device.

Example 10 is the method of examples 1-9, wherein the behavior described by the indicators includes repeated attempts to log into the testing device.

Example 11 is the method of examples 1-10, wherein the behavior described by the indicators includes changing credentials on the testing device.

Example 12 is the method of examples 1-11, wherein the behavior described by the indicators includes uploading credentials from the testing device.

Example 13 is the method of examples 1-12, wherein the behavior described by the indicators includes modifying a configuration of the testing device.

Example 14 is the method of examples 1-13, wherein the behavior described by the indicators includes attempting to access, from the testing device, another testing device in the configurable network.

Example 15 is the method of examples 1-14, wherein the behavior described by the indicators includes attempting to decrypt an encrypted file on the testing device.

Example 16 is the method of examples 1-15, wherein the behavior described by the indicators includes encrypting a file on the testing device.

Example 17 is the method of examples 1-16, wherein the high-interaction network is configured to have the same configuration as the network.

Example 18 is the method of examples 1-17, wherein the high-interaction network is configured to have the same configuration as a part of the network.

Example 19 is the method of examples 1-18, wherein the high-interaction network is configured to have a part of the network that is accessible to a specified user.

Example 20 is the method of examples 1-19, the method further including receiving additional suspect network traffic. In this example, the method further includes determining that the additional suspect network traffic is not a threat to the network.

Example 21 is the method of examples 1-20, wherein determining that the additional suspect network traffic is not a threat includes determining that the network is incapable of responding to a behavior of the additional suspect network traffic.

Example 22 is the method of examples 1-21, wherein determining that the additional suspect network traffic is not a threat includes determining that the network has been secured against a behavior of the additional suspect network traffic.

Example 23 is the method of examples 1-22, the method further including receiving additional suspect network traffic. In this example, the method further includes determining that the additional suspect network traffic is a known threat. The method further includes analyzing the additional suspect network traffic using the high-interaction network, wherein analyzing includes determining whether the network can be harmed by a behavior of the additional suspect network traffic.

Example 24 is a network device, which includes one or more processors and a non-transitory computer-readable medium. The non-transitory compute readable medium includes instructions that, when executed by the one or more processors, cause the one or more processors to perform operations according to the method(s) of examples 1-23.

Example 25 is a computer-program product tangibly embodied in a non-transitory machine-readable storage medium, including instructions that, when executed by one or more processors, cause the one or more processors to perform steps according to the method(s) of examples 1-23.

Example 26 is a method, the method including receiving incident data at a network device in a network, wherein the incident data includes information derived starting at detection of an attack on the network until detection of an event, the incident data including one or more types of data, and wherein the network device includes one or more analytic engines that run in a predetermined order. the method further includes analyzing the incident data according to data type, wherein an analytic engine analyzes incident data of a certain data type, and wherein an analytic engine produces a result indicating whether a piece of data in the incident data is associated with the attack. The method further includes producing a report of the attack, wherein producing the report includes correlating the results from the one or more analytic engines, the report providing information about a sequence of events that occurred in the course of the attack. The method further includes using the record of the attack to generate one or more indicators, wherein the indicators describe the attack, and wherein indicators facilitate configuring security for the network.

Example 27 is the method of example 26, the method further including modifying the predetermined order using updated threat intelligence.

Example 28 is the method of examples 26-27, the method further including adding a new analytic engine to the predetermined order.

Example 29 is the method of examples 26-28, the method further including removing an analytic engine from the predetermined order.

Example 30 is the method of examples 26-29, wherein the predetermined order includes running two or more analytic engines in parallel.

Example 31 is the method of examples 26-30, wherein the predetermined order includes running one analytic engine after another analytic engine, wherein the other analytic engine using a result from the one analytic engine.

Example 32 is the method of examples 26-31, wherein at least one analytic engine includes one or more sub-engines, wherein the one or more sub-engines are configured to run in parallel.

Example 33 is the method of examples 26-32, wherein correlating the results from the one or more analytic engines includes using a result to examine the incident data for events relating to the result, wherein examining the incident data includes examining events that occurred before or after an event that corresponds to the result.

Example 34 is the method of examples 26-33, wherein a result from an analytic engine indicates whether data from the incident data corresponds to an event that was adverse to the network.

Example 35 is the method of examples 26-34, wherein the incident data includes an email with decoy email address as a sender address, wherein analyzing the incident data includes determining the email includes a malicious link, and wherein producing the report of the attack includes determining that the email was sent by a compromised network device in the network, wherein the compromised network device was configured to include the decoy email address in an address book stored on the compromised network device; and identifying the compromised network device Example 36 is a network device, which includes one or more processors and a non-transitory computer-readable medium. The non-transitory compute readable medium includes instructions that, when executed by the one or more processors, cause the one or more processors to perform operations according to the method(s) of examples 26-35.

Example 37 is a computer-program product tangibly embodied in a non-transitory machine-readable storage medium, including instructions that, when executed by one or more processors, cause the one or more processors to perform steps according to the method(s) of examples 26-35.

Example 38 is a method, the method including configuring, using a malicious email detection engine, a decoy email address, wherein the decoy email address includes a username that is associated with the malicious email detection engine, and wherein all email directed to the decoy email address is received by the malicious email detection engine. The method further includes making the decoy email address publicly available. The method further includes receiving a suspect email addressed to the decoy email address, wherein the suspect email includes a header and content. The method further includes analyzing the header using a header analysis engine. The method further includes analyzing the content using a high-interaction network. The method further includes determining a status for the suspect email, wherein the status indicates whether the suspect email was malicious, wherein determining includes using the header and content analysis, and wherein the status is determined using an results engine.

Example 39 is the method of example 38, the method further including generating the username of the decoy email address using a name of a past or current email user.

Example 40 is the method of examples 38-39, the method further including generating the username of the decoy email address using common patterns for email usernames.

Example 41 is the method of examples 38-40, the method further including generating the username of the decoy email address using known patterns of attack on email.

Example 42 is the method of examples 38-41, the method further including receiving another email addressed to another email address, wherein the other email address includes another username. In this example, the method further includes determining that other username does not exist. The method further includes generating the username of the decoy email address using the other username.

Example 43 is the method of examples 38-42, wherein making the decoy email address publicly available includes placing the decoy email address on Internet sites in plain text.

Example 44 is the method of examples 38-43, wherein making the decoy email address publicly available includes offering the decoy email address for sale.

Example 45 is the method of examples 38-44, wherein making the decoy email address publicly available includes leaking the decoy email address.

Example 46 is the method of examples 38-45, wherein analyzing the header includes determining that a one or more fields in the header are empty.

Example 47 is the method of examples 38-46, wherein analyzing the header includes determining that a sender email address is suspect.

Example 48 is the method of examples 38-47, wherein the sender email address includes a suspect username that matches a pattern for an automatically generated username.

Example 49 is the method of examples 38-48, wherein the sender email address includes a domain name associated with a malicious site.

Example 50 is the method of examples 38-49, wherein the sender email address does not exist.

Example 51 is the method of examples 38-50, wherein analyzing the header includes determining that a string in the header matches a suspect string.

Example 52 is the method of examples 38-51, wherein analyzing the header includes determining that a return path is suspect.

Example 53 is the method of examples 38-52, wherein analyzing the header includes generating and sending a response email to a sender email address.

Example 54 is the method of examples 38-53, wherein the contents included in the suspect email include an attached file, and wherein analyzing the contents includes analyzing the attached file using the high-interaction network.

Example 55 is the method of examples 38-54, wherein analyzing the attached file includes opening the file using the high-interaction network and monitoring activity initiated by the attached file.

Example 56 is the method of examples 38-55, wherein the attached file is an executable file, and wherein analyzing the attached file includes running the executable file using the high-interaction network and monitoring activity initiated by the executable file.

Example 57 is the method of examples 38-56, wherein the contents included in the suspect email include a link, and wherein analyzing the contents includes analyzing the link using the high-interaction network.

Example 58 is the method of examples 38-57, wherein analyzing the link includes following the link to determine whether the link executes malicious activity.

Example 59 is the method of examples 38-58, wherein malicious activity includes launching malicious software.

Example 60 is the method of examples 38-59, wherein malicious activity includes appropriating the decoy email address.

Example 61 is the method of examples 38-60, wherein malicious activity includes copying files from the high-interaction network.

Example 62, is the method of examples 38-61, wherein the link is a pointer to a website, and wherein analyzing the link includes following the link to determine whether the website is legitimate.

Example 63 is the method of examples 38-62, wherein the contents associated with the suspect email include images, and wherein analyzing the contents includes downloading the images using the high-interaction network.

Example 64 is the method of examples 38-63, wherein determining a status for the email includes determining that the email is malicious.

Example 65 is the method of examples 38-64, the method further including generating indicators for the suspect email, wherein the indicators identify the suspect email, and wherein the indicators are generated using the results engine. In this example, the method further includes using the indicators to identify malicious email sent to a non-decoy email address.

Example 66 is the method of examples 38-65, wherein the email sent to the non-decoy email address is email received in the past.

Example 67 is the method of examples 38-66, the method further including generating indicators for the suspect email, wherein the indicators identify the suspect email. In this example, the method further includes generating a packet including the indicators, wherein the packet is addressed to a central collector. The method further includes transmitting the packet onto a network.

Example 68 is the method of examples 38-67, wherein determining a status for the suspect email includes determining that the email is possibly malicious, and further comprising generating indicators for the suspect email, wherein the indicators identify the suspect email. In this example, the method further includes using the indicators to analyze additional email received by the malicious email detection engine.

Example 69 is the method of examples 38-68, wherein determining a status for the suspect email includes determining that the email is not a threat.

Example 70 is the method of examples 38-69, the method further including determining that a computer system has been compromised, wherein determining that the computer system has been compromised includes using the header and content analysis, and wherein the computer system is determined to be compromised using the results engine.

Example 71 is the method of examples 38-70, wherein determining that a computer system has been compromised includes generating indicators for the suspect email, wherein the indicators identify the suspect email, and wherein the indicators are generated using the results engine, and wherein determining that the computer system has been compromised includes determining that the computer system matches the indicators.

Example 72 is a network device, which includes one or more processors and a non-transitory computer-readable medium. The non-transitory compute readable medium includes instructions that, when executed by the one or more processors, cause the one or more processors to perform operations according to the method(s) of examples 38-71.

Example 73 is a computer-program product tangibly embodied in a non-transitory machine-readable storage medium, including instructions that, when executed by one or more processors, cause the one or more processors to perform steps according to the method(s) of examples 38-71.

What is claimed is:

1. A computer-implemented method, comprising:
    receiving, at a network security device configured to perform network threat analysis, data produced by an emulated network, the data including a record of processes that executed and terminated in the emulated network during a span of time and a record of Application Programming Interface (API) calls made by the processes during the span of time, wherein a process is program code being executed by one or more processors, wherein the process is capable of generating a child process that executes concurrently with the process, wherein the span of time includes a security incident that lead to an identifiable harm in the emulated network, wherein the data is received after conclusion of the span of time, and wherein, at the conclusion of the span of time, no process in the record of processes is still executing in the emulated network;
    executing, at the conclusion of the span of time, a first set of analytic engines on the data, wherein the first set of analytic engines:
        search the record of processes for a first process that did not generate any child processes, wherein searching is enabled by the record of processes including all processes that executed and terminated during the span of time;
        determine, using the record of API calls, a first set of API calls made by the first process; and
        classify the first process as malicious or not malicious based on an identity of at least one API call from the first set of API calls;
    executing, after executing the first set of analytic engines, a second set of analytic engines on the data, wherein the second set of analytic engines:
        identify, using the record of processes, a second process, wherein the second process generated the first process as a child process of the second process;
        determine a second set of API calls made by the second process; and
        classify the second process as malicious based on an identity of at least one API call from the second set of API calls and a result of classifying the first process;
    executing, after executing the second set of analytic engines, a third set of analytic engines, wherein the third set of analytic engines identify a set of files associated with the second process, the set of files including at least a file used to execute the second process;
    generating indicators for the set of files, wherein the indicators can be used to identify the set of files; and
    distributing the indicators to one or more production network devices on a network, wherein, when the indicators are received by the one or more production network devices, the one or more production network devices are modified to defend against the identifiable harm.

2. The method of claim 1, wherein the first process is classified as not malicious based on no API call from the first set of API calls being a cause of the identifiable harm.

3. The method of claim 2, wherein the second process is classified as malicious based on the identity of the at least one API call from the second set of API calls being a cause of the identifiable harm.

4. The method of claim 1, wherein the first process is classified as malicious based on the identity of the at least one API call from the first set of API calls indicating that the first process is a cause of the identifiable harm.

5. The method of claim 4, wherein the second process is classified as malicious based on classification of the first process as malicious.

6. The method of claim 1, wherein the second process generated an additional child process, and wherein the first set of analytic engines determine, based on one or more API calls made by the additional child process, that the additional child process is unrelated to the identifiable harm.

7. The method of claim 1, wherein the first set of analytic engines search the record of processes for processes of a certain type, wherein the type is determined from current threat intelligence.

8. The method of claim 1, wherein the emulated network includes virtual machines configured to emulate production network devices in the network, wherein the emulated network includes programs capable of performing behavior associated with users of the production network devices, wherein programs interact with network traffic to produce the data, and wherein the network traffic is input into the emulated network until the identifiable harm occurs.

9. A network device, comprising:
    one or more processors; and
    a non-transitory computer-readable medium including instructions that, when executed by the one or more processors, cause the one or more processors to perform operations including:
        receiving, at a network security device configured to perform network threat analysis, data produced by an emulated network, the data including a record of processes that executed and terminated in the emulated network during a span of time and a record of Application Programming Interface (API) calls made by the processes during the span of time, wherein a process is program code being executed by one or more processors, wherein the process is capable of generating a child process that executes concurrently with the process, wherein the span of time includes a security incident that lead to an identifiable harm in the emulated network, wherein the data is received after conclusion of the span of time, and wherein, at the conclusion of the span of time, no process in the record of processes is still executing in the emulated network;

executing, at the conclusion of the span of time, a first set of analytic engines on the data, wherein the first set of analytic engines:
search the record of processes for a first process that did not generate any child processes, wherein searching is enabled by the record of processes including all processes that executed and terminated during the span of time;
determine, using the record of API calls, a first set of API calls made by the first process; and
classify the first process as malicious or not malicious based on an identity of at least one API call from the first set of API calls;
executing, after executing the first set of analytic engines a second set of analytic engines on the data, wherein the second set of analytic engines:
identify, using the record of processes, a second process, wherein the second process generated the first process as a child process of the second process;
determine a second set of API calls made by the second process; and
classify the second process as malicious based on an identity of at least one API call from the second set of API calls and a result of classifying the first process;
executing, after executing the second set of analytic engines, a third set of analytic engines, wherein the third set of analytic engines identify a set of files associated with the second process, the set of files including at least a file used to execute the second process;
generating indicators for the set of files, wherein the indicators can be used to identify the set of files; and
distributing the indicators to one or more production network devices on a network, wherein, when the indicators are received by the one or more production network devices, the one or more production network devices are modified to defend against the identifiable harm.

10. The network device of claim 9, wherein the first process is classified as not malicious based on no API call from the first set of API calls being a cause of the identifiable harm.

11. The network device of claim 10, wherein the second process is classified as malicious based on the identity of the at least one API call from the second set of API calls being a cause of the identifiable harm.

12. The network device of claim 9, wherein the first process is classified as malicious based on the identity of the at least one API call from the first set of API calls indicating that the first process is a cause of the identifiable harm.

13. The network device of claim 12, wherein the second process is classified as malicious based on classification of the first process as malicious.

14. The network device of claim 9, wherein the second process generated an additional child process, and wherein the first set of analytic engines determine, based on one or more API calls made by the additional child process, that the additional child process is unrelated to the identifiable harm.

15. The network device of claim 9, wherein the first set of analytic engines search the record of processes for processes of a certain type, wherein the type is determined from current threat intelligence.

16. A computer-program product tangibly embodied in a non-transitory machine-readable storage medium, including instructions that, when executed by one or more processors, cause the one or more processors to:
receive data produced by an emulated network, the data including a record of processes that executed and terminated in the emulated network during a span of time and a record of Application Programming Interface (API) calls made by the processes during the span of time, wherein a process is program code being executed by one or more processors, wherein the process is capable of generating a child process that executes concurrently with the process, wherein the span of time includes a security incident that lead to an identifiable harm in the emulated network, wherein the data is received after conclusion of the span of time, and wherein, at the conclusion of the span of time, no process in the record of processes is still executing in the emulated network;
execute, at the conclusion of the span of time, a first set of analytic engines on the data, wherein the first set of analytic engines:
search the record of processes for a first process that did not generate any child processes;
determine, using the record of API calls, a first set of API calls made by the first process; and
classify the first process as malicious or not malicious based on an identity of at least one API call from the first set of API calls;
execute, after executing the first set of analytic engines, a second set of analytic engines on the data, wherein the second set of analytic engines:
identify, using the record of processes, a second process, wherein the second process generated the first process as a child process of the second process;
determine a second set of API calls made by the second process; and
classify the second process as malicious based on an identity of at least one API call from the second set of API calls and a result of classifying the first process;
execute, after executing the second set of analytic engines, a third set of analytic engines, wherein the third set of analytic engines identify a set of files associated with the second process, the set of files including at least a file used to execute the second process;
generate indicators for the set of files, wherein the indicators can be used to identify the set of files; and
distribute the indicators to one or more production network devices on a network, wherein, when the indicators are received by the one or more production network devices, the one or more production network devices are modified to defend against the identifiable harm.

17. The computer-program product of claim 16, wherein the first process is classified as not malicious based on no API call from the first set of API calls being a cause of the identifiable harm.

18. The computer-program product of claim 17, wherein the second process is classified as malicious based on the identity of the at least one API call from the second set of API calls being a cause of the identifiable harm.

19. The computer-program product of claim 16, wherein the first process is classified as malicious based on the identity of the at least one API call from the first set of API calls indicating that the first process is a cause of the identifiable harm.

20. The computer-program product of claim 19, wherein the second process is classified as malicious based on classification of the first process as malicious.

21. The computer-program product of claim 16, wherein the second process generated an additional child process, and wherein the first set of analytic engines determine, based on one or more API calls made by the additional child process, that the additional child process is unrelated to the identifiable harm.

22. The computer-program product of claim 16, wherein the first set of analytic engines search the record of processes for processes of a certain type, wherein the type is determined from current threat intelligence.

* * * * *